US010823656B1

(12) United States Patent
Nuss-Warren et al.

(10) Patent No.: US 10,823,656 B1
(45) Date of Patent: Nov. 3, 2020

(54) INSTRUMENTATION THAT EMBRACES A ROTATIONAL VISCOMETER, OR THAT HAS A CANTILEVERED PLATFORM ELEVATOR AND/OR EMPLOYS HEAT IN ONE AREA BUT NOT ANOTHER

(71) Applicants: Sarah R. Nuss-Warren, Midland, MI (US); Douglas J. Wirsing, Midland, MI (US); Derrick D. Hilliker, Midland, MI (US); Theodore W. Selby, Midland, MI (US); Jonathan C. Evans, Midland, MI (US); Michael T. Kelly, Midland, MI (US); Robert Culver, Midland, MI (US); Fernando Moreira Mendes, Midland, MI (US)

(72) Inventors: Sarah R. Nuss-Warren, Midland, MI (US); Douglas J. Wirsing, Midland, MI (US); Derrick D. Hilliker, Midland, MI (US); Theodore W. Selby, Midland, MI (US); Jonathan C. Evans, Midland, MI (US); Michael T. Kelly, Midland, MI (US); Robert Culver, Midland, MI (US); Fernando Moreira Mendes, Midland, MI (US)

(73) Assignee: TANNAS COMPANY, Midland, MI (US)

( * ) Notice: Subject to any disclaimer, the term of this patent is extended or adjusted under 35 U.S.C. 154(b) by 0 days.

(21) Appl. No.: 16/350,085

(22) Filed: Sep. 21, 2018

Related U.S. Application Data

(60) Provisional application No. 62/606,424, filed on Sep. 22, 2017.

(51) Int. Cl.
*G01N 11/14* (2006.01)
*G01N 35/00* (2006.01)
(Continued)

(52) U.S. Cl.
CPC ....... *G01N 11/14* (2013.01); *G01N 35/00722* (2013.01); *G01N 35/025* (2013.01);
(Continued)

(58) Field of Classification Search
CPC .................. G01N 11/00–16; G01N 2011/0013
(Continued)

(56) References Cited

U.S. PATENT DOCUMENTS

| 1,334,856 | A | * | 3/1920 | Hayes | ..................... G01N 11/14 |
|           |   |   |        |       | 73/54.33 |
| 2,782,629 | A | * | 2/1957 | Norcross | ................. G01N 11/04 |
|           |   |   |        |          | 73/54.16 |

(Continued)

FOREIGN PATENT DOCUMENTS

GB      2306674 A   *   5/1997   ............. G01N 11/14

OTHER PUBLICATIONS

Tannas Co., TBS 2100E-F HTHS Tapered Bearing Simulator Viscometer (Year: 2016).*

(Continued)

*Primary Examiner* — David L Singer
(74) *Attorney, Agent, or Firm* — Christopher John Rudy

(57) ABSTRACT

Instrumentation embraces an at least partially automated rotational tapered bearing simulator viscometer having electronic control and/or monitoring that includes task unit electronics, which includes a task unit electronics interface. With or without such electronics, the instrumentation may include a particular component configuration and/or employ at least one particular material. Further feature(s) may be extant.

20 Claims, 138 Drawing Sheets

(51) Int. Cl.
*G01N 35/02* (2006.01)
*G01N 11/00* (2006.01)

(52) U.S. Cl.
CPC .............. *G01N 2011/002* (2013.01); *G01N 2011/0013* (2013.01); *G01N 2035/0091* (2013.01)

(58) Field of Classification Search
USPC ............................................. 73/54.01–54.43
See application file for complete search history.

(56) References Cited

U.S. PATENT DOCUMENTS

| | | | | |
|---|---|---|---|---|
| 3,977,235 | A * | 8/1976 | Topham | G01N 11/08 73/54.04 |
| 4,062,225 | A * | 12/1977 | Murphy, Jr. | G01N 11/14 73/54.35 |
| 4,352,287 | A * | 10/1982 | Orth | G01N 11/14 702/43 |
| 4,445,365 | A * | 5/1984 | Selby | G01N 11/14 73/54.34 |
| 4,488,427 | A * | 12/1984 | Matusik | G01N 11/162 73/54.23 |
| 4,574,622 | A * | 3/1986 | Hatfield | G01N 11/08 73/54.04 |
| 4,648,263 | A * | 3/1987 | Deysarkar | G01N 11/14 73/54.33 |
| 4,965,518 | A * | 10/1990 | Agarwala | G01R 33/1215 324/226 |
| 5,369,988 | A * | 12/1994 | Selby | F16D 1/095 279/43.1 |
| 5,503,002 | A * | 4/1996 | Selby | G01N 11/14 73/54.12 |
| 5,513,517 | A * | 5/1996 | Van Meter | G01N 11/14 279/2.03 |
| 5,517,850 | A * | 5/1996 | Van Meter | G01N 11/14 411/305 |
| 5,548,994 | A * | 8/1996 | Selby | G01N 11/14 73/54.28 |
| 5,565,621 | A * | 10/1996 | Selby | G01N 11/14 73/54.28 |
| 5,571,952 | A * | 11/1996 | Kauzlarich | G01N 11/16 73/54.24 |
| 5,660,362 | A * | 8/1997 | Selby | F16M 7/00 248/188.4 |
| 5,681,985 | A * | 10/1997 | Selby | G01N 11/14 73/54.28 |
| 5,821,407 | A * | 10/1998 | Sekiguchi | G01N 11/14 73/54.28 |
| 5,852,230 | A * | 12/1998 | Selby | G01N 11/14 73/54.35 |
| 6,393,898 | B1 * | 5/2002 | Hajduk | G01N 11/06 73/54.05 |
| 6,575,019 | B1 * | 6/2003 | Larson | G01N 11/04 73/54.04 |
| 6,755,044 | B1 * | 6/2004 | Hildebrandt | B01L 7/00 219/523 |
| 6,786,081 | B1 * | 9/2004 | Hildebrandt | G01N 11/14 73/54.01 |
| 6,840,305 | B2 * | 1/2005 | Zheng | G01N 11/14 165/11.1 |
| 6,928,860 | B1 * | 8/2005 | Hildebrandt | B01L 7/02 73/54.28 |
| 7,043,968 | B1 * | 5/2006 | Hildebrandt | G01N 11/14 73/54.28 |
| 7,344,299 | B2 * | 3/2008 | Sprinkle | B01F 15/00175 366/136 |
| 7,373,804 | B1 * | 5/2008 | Hildebrandt | G01N 11/14 73/54.28 |
| 8,826,728 | B1 * | 9/2014 | Hildebrandt | G01N 33/2888 73/54.43 |
| 2004/0011149 | A1 * | 1/2004 | Carroll | G01B 21/24 73/866.1 |
| 2005/0247115 | A1 * | 11/2005 | Grey | G01N 11/16 73/54.27 |
| 2006/0010964 | A1 * | 1/2006 | Sparks | G01N 11/06 73/54.01 |
| 2007/0256507 | A1 * | 11/2007 | Morgan | F16C 32/0446 73/862.041 |
| 2007/0295055 | A1 * | 12/2007 | Doe | G01N 11/14 73/1.02 |
| 2009/0194664 | A1 * | 8/2009 | Evans | B25J 17/0216 248/670 |
| 2013/0104630 | A1 * | 5/2013 | Varni | G01N 11/08 73/54.09 |
| 2014/0047904 | A1 * | 2/2014 | Mak | G01N 11/14 73/54.33 |
| 2014/0053638 | A1 * | 2/2014 | Sneujink | G01N 11/10 73/54.28 |
| 2016/0091404 | A1 * | 3/2016 | Flock | B08B 9/04 134/8 |
| 2018/0274993 | A1 * | 9/2018 | Walker | G01K 15/007 |

OTHER PUBLICATIONS

Selby, A method of generating and appraising the five viscosity loss parameters of lubricating oils—the viscosity loss trapezoid, Ninth International Conference on the Viscometry of Automotive Lubricants Oct. 13, 1993 thru Oct. 14, 1993 (Year: 1993).*
Selby et al, Viscometry of New and Used Engine Oils at Engine Shear Rates—Application of the Automatic TBS Viscometer (Year: 2002).*
ASTM, Standard Test Method for Measuring Viscosity at High Shear Rate and High Temperature by Tapered Bearing Simulator D 4683-04 (Year: 2004).*
Zadorozhnaya et al, Study of HTHS Viscosity of Modern Motor Oils, International Conference on Industrial Engineering, ICIE 2016 (Year: 2016).*
Tannas Co., Tapered Bearing Simulator TBS 2100E-F Viscometer (Year: 2011).*
Theodore W. Selby et al., "Automatic Tapered Bearing Simulator," U.S. Appl. No. 10/646,158, filed Aug. 21, 2003 A.D.
Evans, Jonathan C., et al., "Instrumentation," U.S. Appl. No. 62/606,424, filed Sep. 22, 2017 A.D.
Tannas Co., TBS(TM) | HTHS Tapered Bearing Simulator Viscometer with TBS 2100E-F Brochure, 2017.
Selby, Theodore W., Savant Inc., "High Shear Rate Rheology of Lower Viscosity Engine Oils Over a Temperature Range of 80 Degrees to 150 Degrees Using the Tapered Bearing Simulator (TBS) Viscometer," SAE International Paper No. 2010-01-2288, Oct. 25, 2010.
Selby, T., "Engine Oil Viscometry and Viscometers—Fact and Fallacy," STLE Annual Meeting, Detroit, Michigan, May 7, 2013.

* cited by examiner

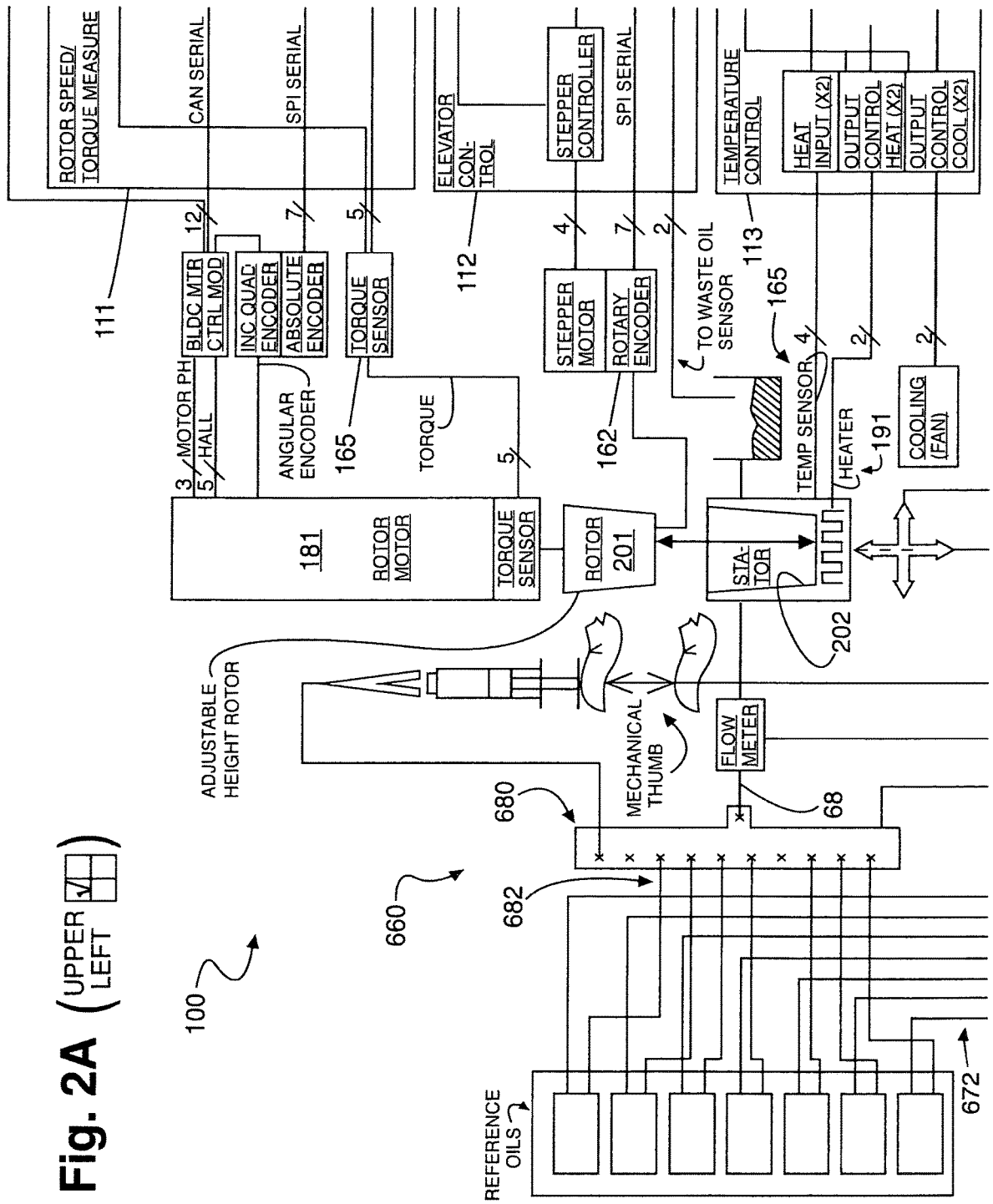
Fig. 2A (UPPER LEFT)

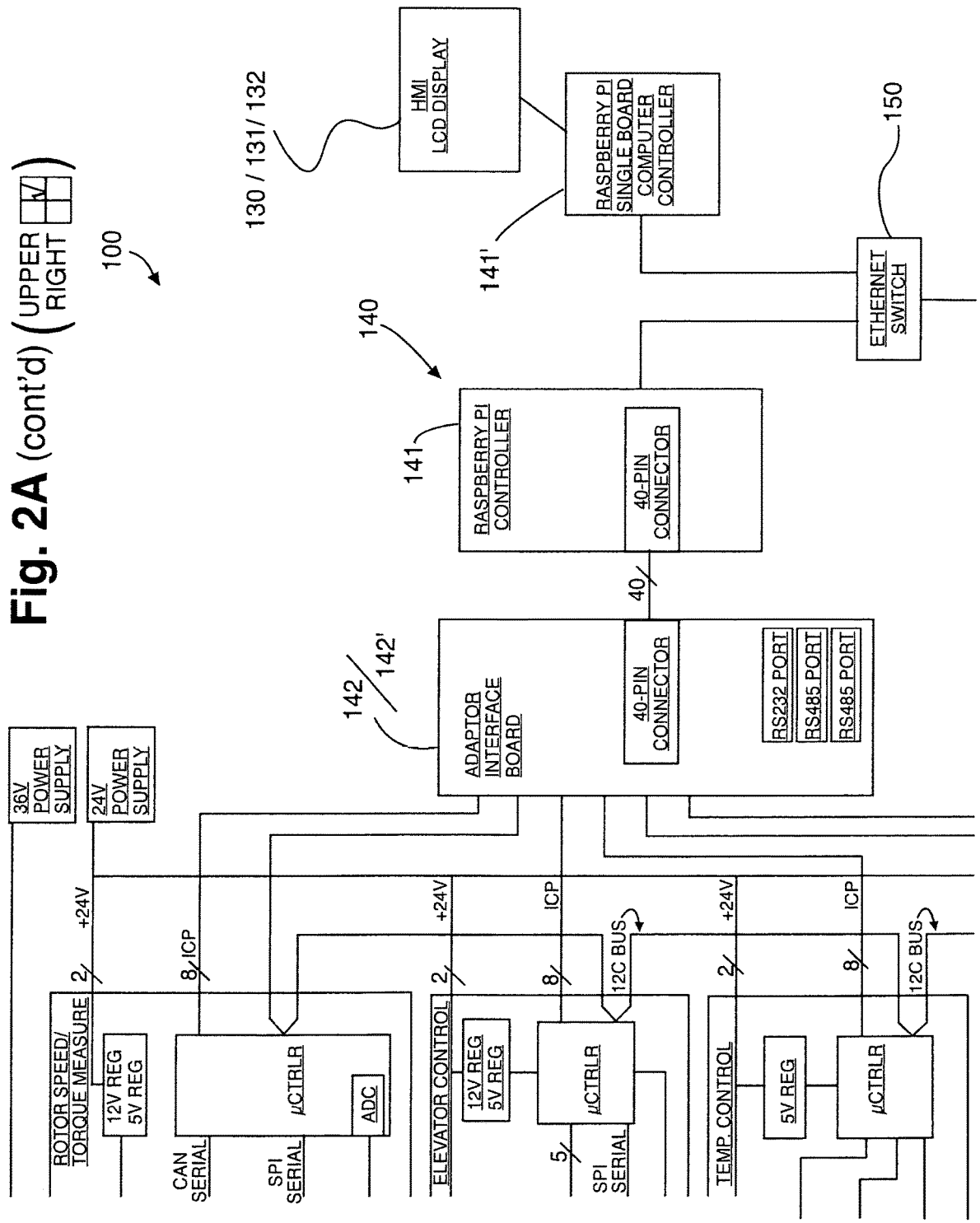
Fig. 2A (cont'd) (UPPER RIGHT)

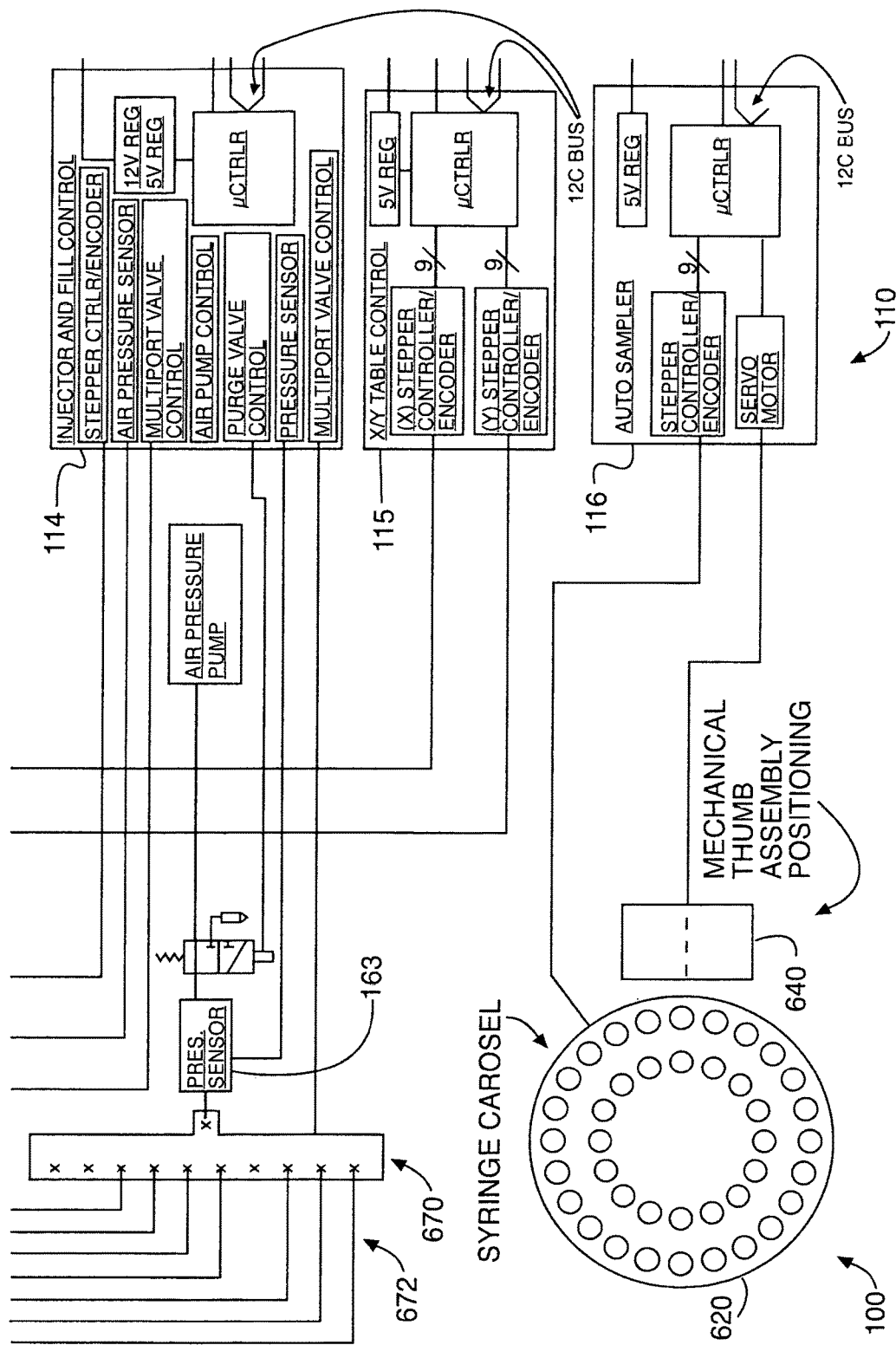

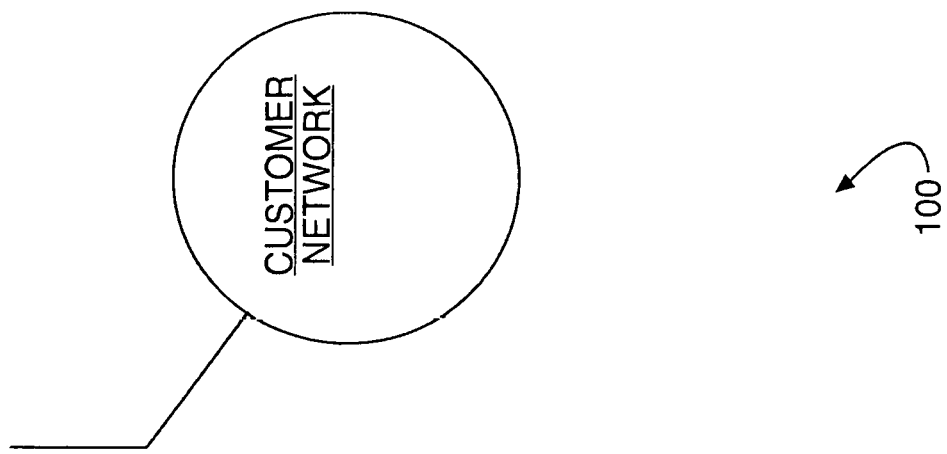
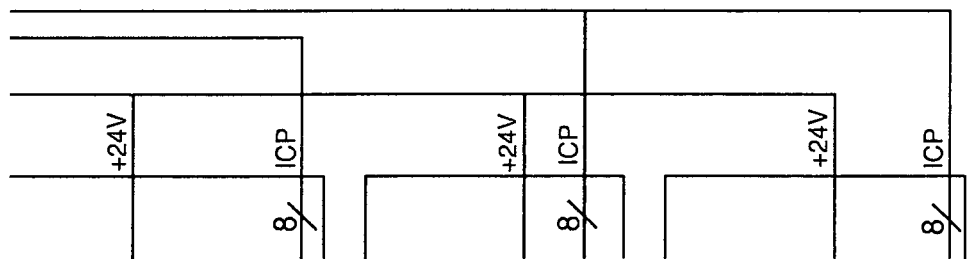
Fig. 2A (cont'd) (LOWER RIGHT)

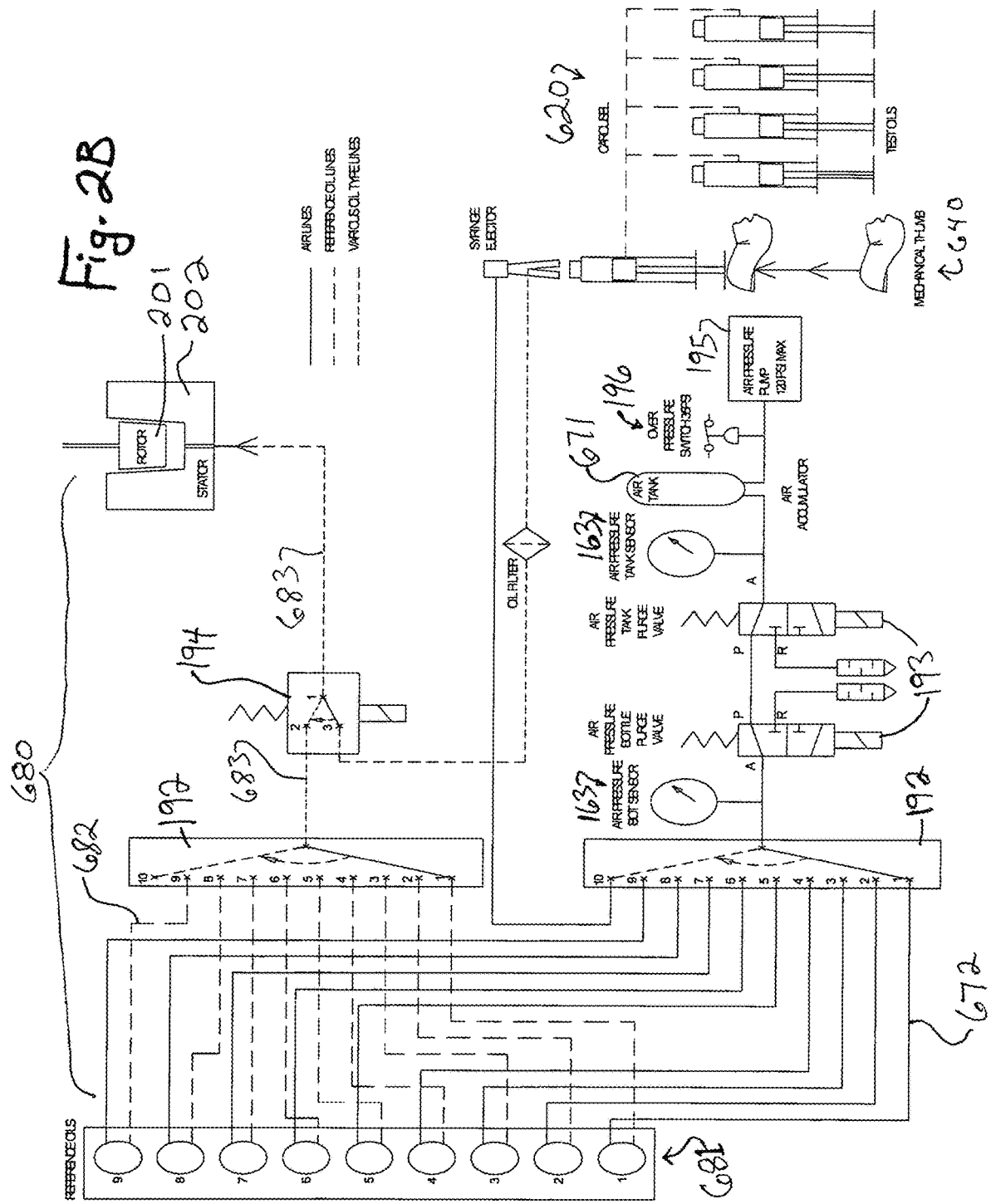

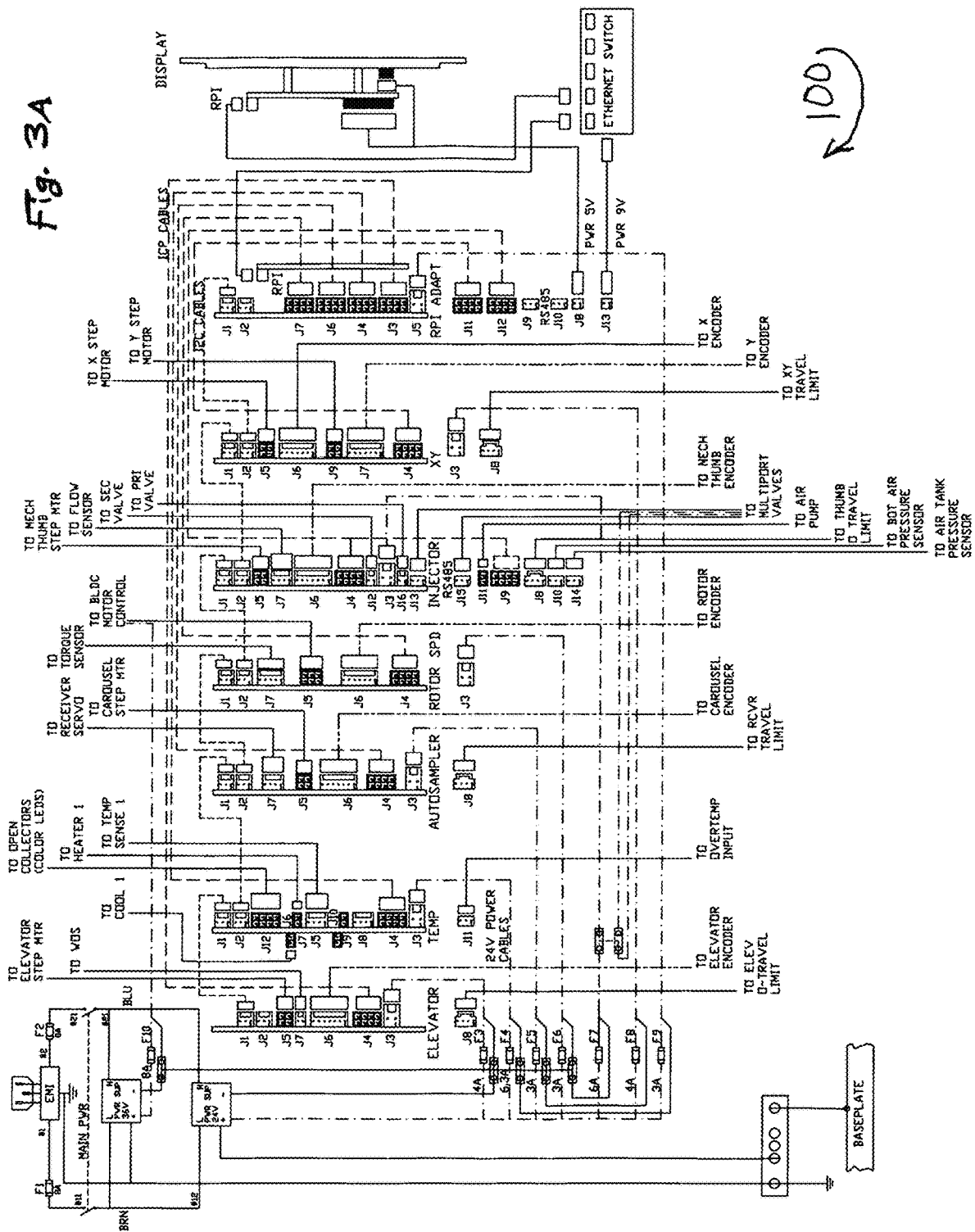

100/110

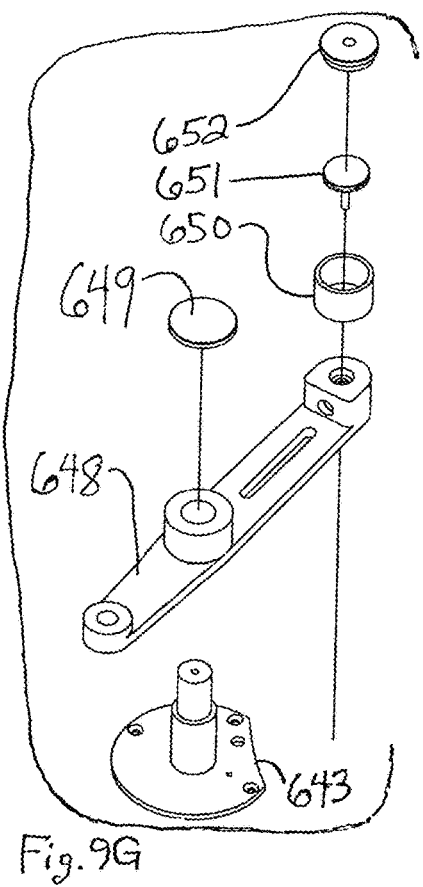
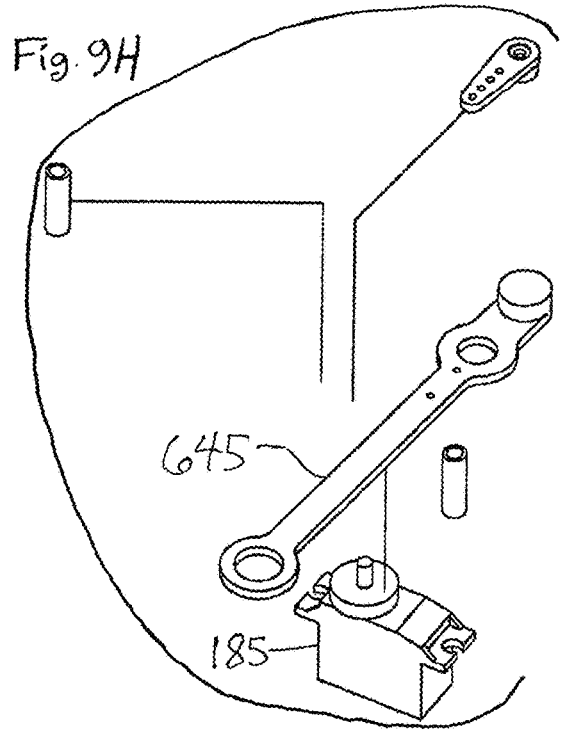
Fig. 9G
Fig. 9H
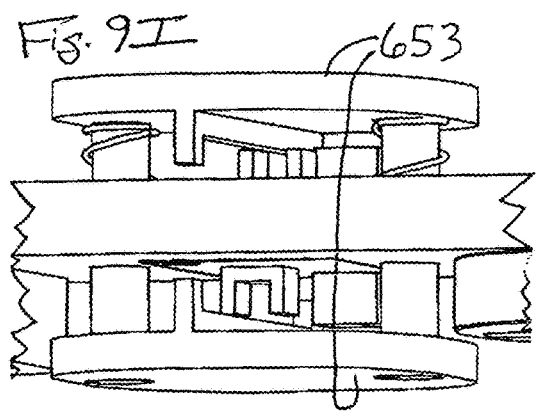
Fig. 9I
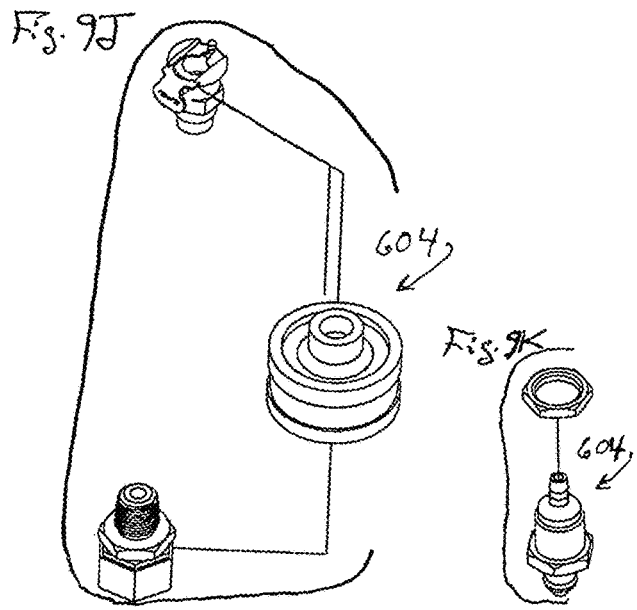
Fig. 9J
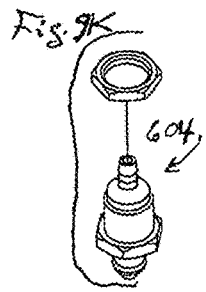
Fig. 9K

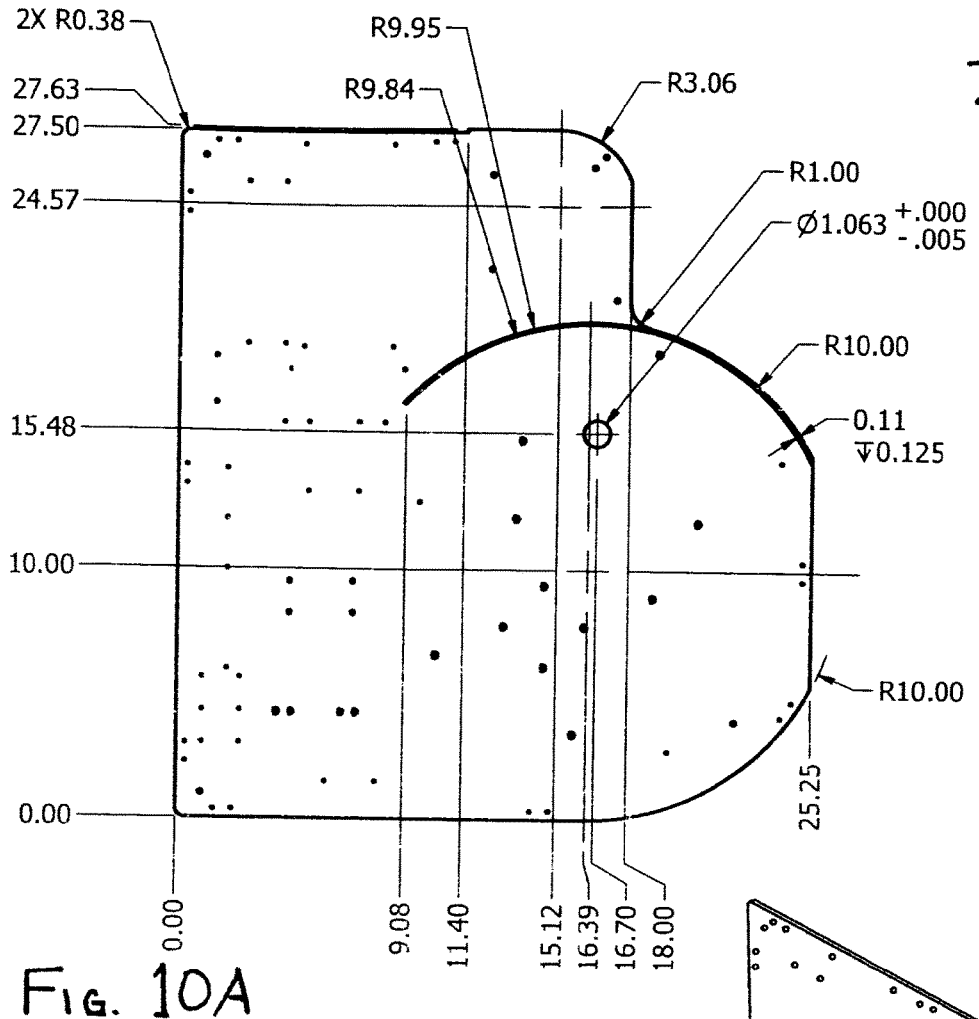
FIG. 10A
FIG. 10B
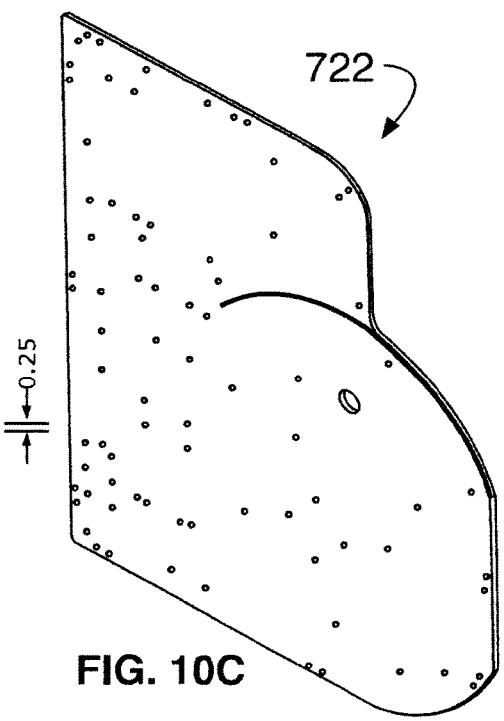
FIG. 10C

| HOLE TABLE | | | |
|---|---|---|---|
| HOLE | XDIM | YDIM | DESCRIPTION |
| A1 | 1.50 | -27.13 | Ø0.13 THRU |
| A2 | 2.25 | -27.13 | Ø0.13 THRU |
| A3 | 10.15 | -27.13 | Ø0.13 THRU |
| A4 | 10.90 | -27.13 | Ø0.13 THRU |
| A5 | .38 | -25.00 | Ø0.13 THRU |
| A6 | .38 | -24.25 | Ø0.13 THRU |
| A7 | .38 | -14.13 | Ø0.13 THRU |
| A8 | .38 | -13.38 | Ø0.13 THRU |
| A9 | 24.88 | -10.38 | Ø0.13 THRU |
| A10 | 24.88 | -9.63 | Ø0.13 THRU |
| A11 | 24.49 | -4.79 | Ø0.13 THRU |
| A12 | 24.06 | -4.17 | Ø0.13 THRU |
| A13 | .38 | -3.00 | Ø0.13 THRU |
| A14 | .38 | -2.25 | Ø0.13 THRU |
| A15 | 1.50 | -.38 | Ø0.13 THRU |
| A16 | 2.25 | -.38 | Ø0.13 THRU |
| A17 | 14.14 | -.38 | Ø0.13 THRU |
| A18 | 14.89 | -.38 | Ø0.13 THRU |
| B1 | 16.70 | -15.48 | Ø1.06 THRU |

| HOLE TABLE | | | |
|---|---|---|---|
| HOLE | XDIM | YDIM | DESCRIPTION |
| C1 | 5.00 | -27.00 | 8-32 UNC - 2B |
| C2 | 8.54 | -27.00 | 8-32 UNC - 2B |
| C3 | 2.75 | -25.50 | 8-32 UNC - 2B |
| C4 | 4.25 | -25.50 | 8-32 UNC - 2B |
| C5 | 2.75 | -19.00 | 8-32 UNC - 2B |
| C6 | 4.25 | -19.00 | 8-32 UNC - 2B |
| C7 | 5.00 | -18.90 | 8-32 UNC - 2B |
| C8 | 8.54 | -18.90 | 8-32 UNC - 2B |
| C9 | 5.25 | -15.85 | 8-32 UNC - 2B |
| C10 | 7.25 | -15.85 | 8-32 UNC - 2B |
| C11 | 24.02 | -14.35 | 8-32 UNC - 2B |
| C12 | 2.00 | -14.00 | 8-32 UNC - 2B |
| C13 | 5.25 | -13.10 | 8-32 UNC - 2B |
| C14 | 7.25 | -13.10 | 8-32 UNC - 2B |
| C15 | 9.68 | -12.70 | 8-32 UNC - 2B |
| C16 | 2.00 | -12.00 | 8-32 UNC - 2B |
| C17 | 19.59 | -2.79 | 8-32 UNC - 2B |
| C18 | 6.00 | -1.50 | 8-32 UNC - 2B |
| C19 | 8.00 | -1.50 | 8-32 UNC - 2B |
| D1 | 16.94 | -26.57 | 1/4-20 UNC - 2B |
| D2 | 1.00 | -26.50 | 1/4-20 UNC - 2B |
| D3 | 16.50 | -26.13 | 1/4-20 UNC - 2B |
| D4 | 12.44 | -25.82 | 1/4-20 UNC - 2B |
| D5 | 12.44 | -22.07 | 1/4-20 UNC - 2B |
| D6 | 17.44 | -20.82 | 1/4-20 UNC - 2B |
| D7 | 22.25 | -4.00 | 1/4-20 UNC - 2B |
| D8 | 1.00 | -1.00 | 1/4-20 UNC - 2B |
| E1 | 1.52 | -18.48 | 10-24 UNC - 2B |
| E2 | 1.52 | -16.61 | 10-24 UNC - 2B |

Fig. 10I

| HOLE TABLE | | | |
|---|---|---|---|
| HOLE | XDIM | YDIM | DESCRIPTION |
| F1 | 4.50 | -18.00 | 6-32 UNC - 2B |
| F2 | 9.02 | -18.00 | 6-32 UNC - 2B |
| F3 | 4.25 | -15.85 | 6-32 UNC - 2B |
| F4 | 8.25 | -15.85 | 6-32 UNC - 2B |
| F5 | 2.00 | -10.00 | 6-32 UNC - 2B |
| F6 | 2.00 | -6.00 | 6-32 UNC - 2B |
| F7 | 1.02 | -5.66 | 6-32 UNC - 2B |
| F8 | 2.52 | -5.66 | 6-32 UNC - 2B |
| F9 | 1.02 | -4.33 | 6-32 UNC - 2B |
| F10 | 2.52 | -4.33 | 6-32 UNC - 2B |
| F11 | 1.02 | -3.02 | 6-32 UNC - 2B |
| F12 | 2.52 | -3.02 | 6-32 UNC - 2B |
| G1 | 4.50 | -9.51 | M6x1 - 6H |
| G2 | 7.06 | -9.51 | M6x1 - 6H |
| G3 | 4.50 | -8.25 | M6x1 - 6H |
| G4 | 7.06 | -8.25 | M6x1 - 6H |

| HOLE TABLE | | | |
|---|---|---|---|
| HOLE | XDIM | YDIM | DESCRIPTION |
| H1 | 19.12 | -18.66 | ⌀0.18 THRU ⌴ ⌀0.31 ▽ 0.16 |
| H2 | 13.69 | -15.18 | ⌀0.18 THRU ⌴ ⌀0.31 ▽ 0.16 |
| H4 | 13.48 | -12.06 | ⌀0.18 THRU ⌴ ⌀0.31 ▽ 0.16 |
| H3 | 20.73 | -11.92 | ⌀0.18 THRU ⌴ ⌀0.31 ▽ 0.16 |
| H5 | 14.63 | -9.37 | ⌀0.18 THRU ⌴ ⌀0.31 ▽ 0.16 |
| H6 | 18.95 | -8.90 | ⌀0.18 THRU ⌴ ⌀0.31 ▽ 0.16 |
| H7 | 13.01 | -7.75 | ⌀0.18 THRU ⌴ ⌀0.31 ▽ 0.16 |
| H8 | 16.26 | -7.75 | ⌀0.18 THRU ⌴ ⌀0.31 ▽ 0.16 |
| H9 | 10.32 | -6.59 | ⌀0.18 THRU ⌴ ⌀0.31 ▽ 0.16 |
| H10 | 14.63 | -6.12 | ⌀0.18 THRU ⌴ ⌀0.31 ▽ 0.16 |
| H11 | 15.79 | -3.43 | ⌀0.18 THRU ⌴ ⌀0.31 ▽ 0.16 |
| I1 | 4.00 | -4.25 | ⌀0.18 THRU ⌴ ⌀0.32 ▽ 0.16 |
| I2 | 4.59 | -4.25 | ⌀0.18 THRU ⌴ ⌀0.32 ▽ 0.16 |
| I3 | 6.59 | -4.25 | ⌀0.18 THRU ⌴ ⌀0.32 ▽ 0.16 |
| I4 | 7.18 | -4.25 | ⌀0.18 THRU ⌴ ⌀0.32 ▽ 0.16 |

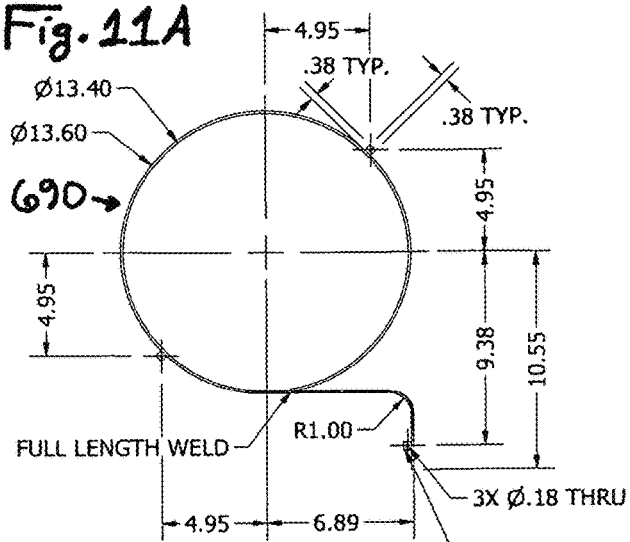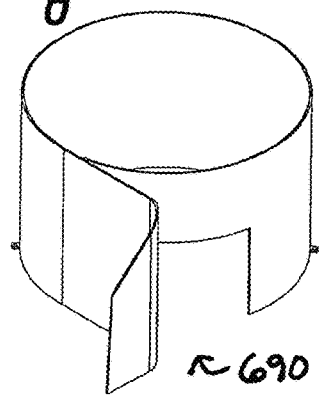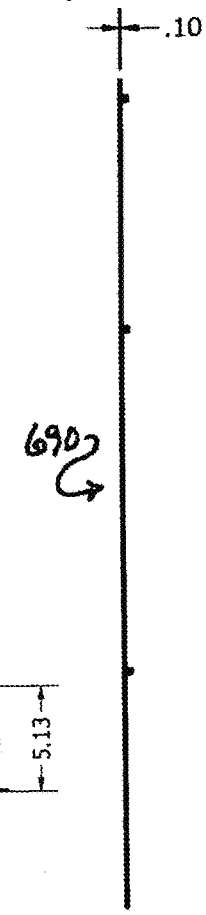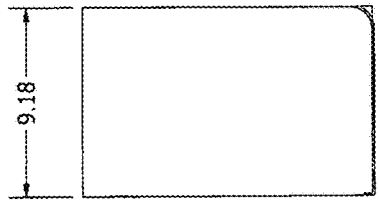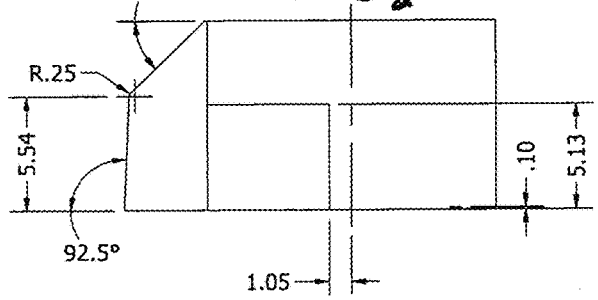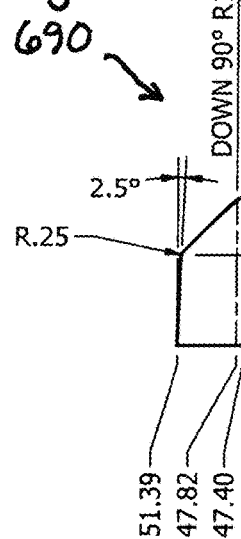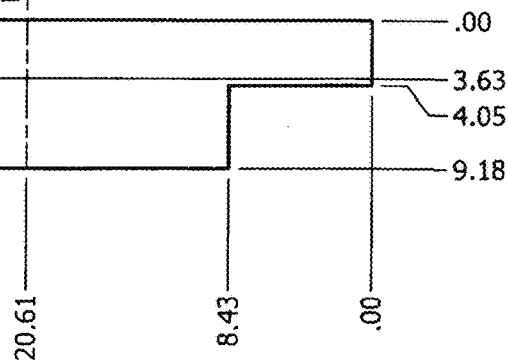

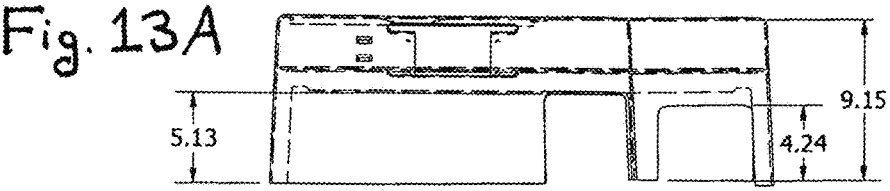
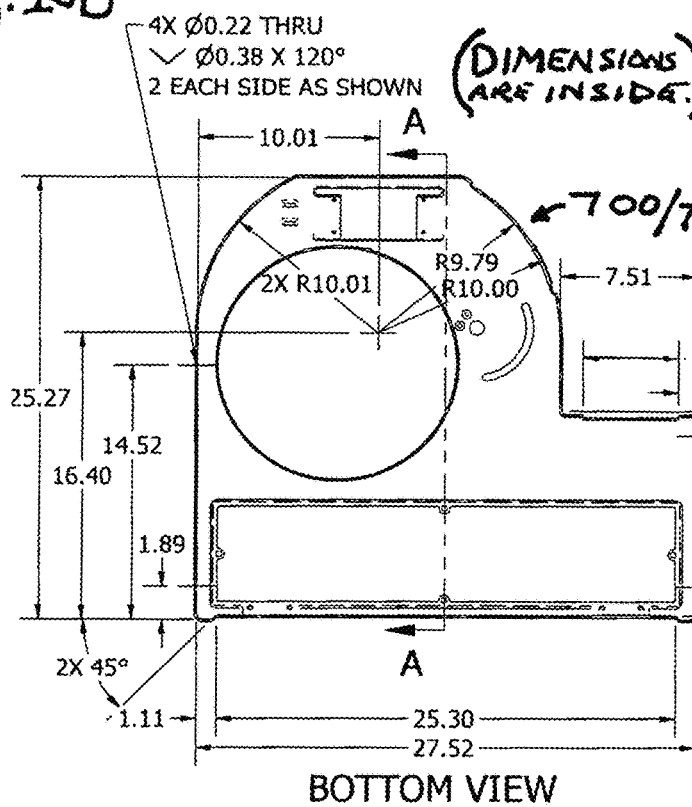
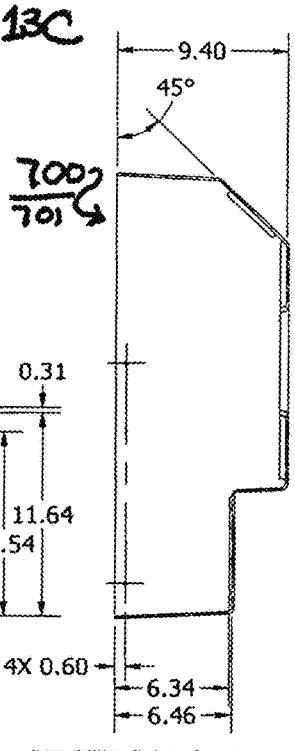
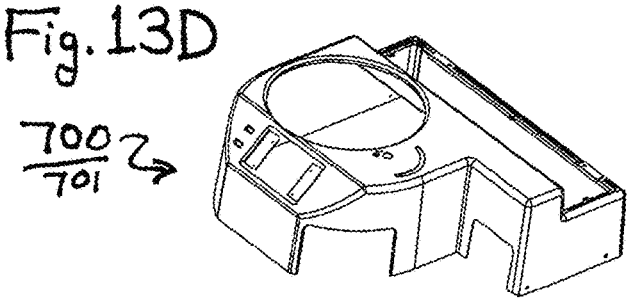

685

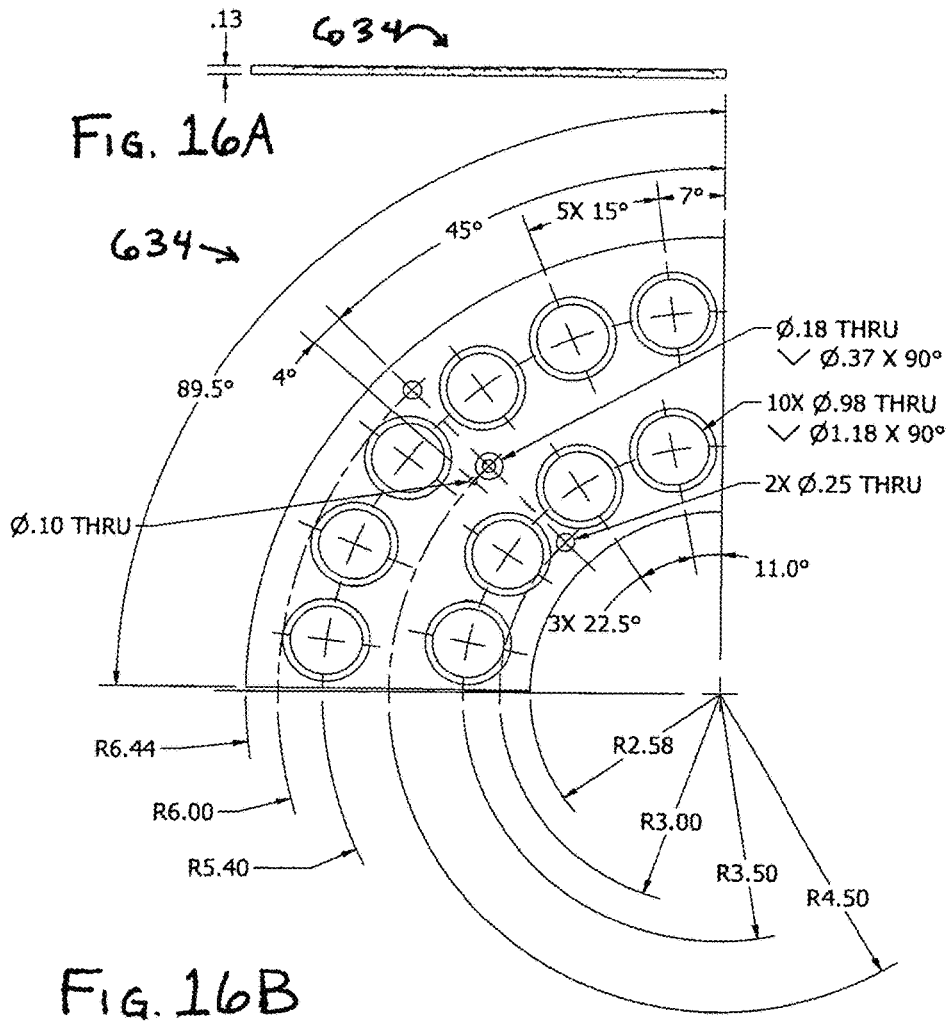
FIG. 16A
FIG. 16B
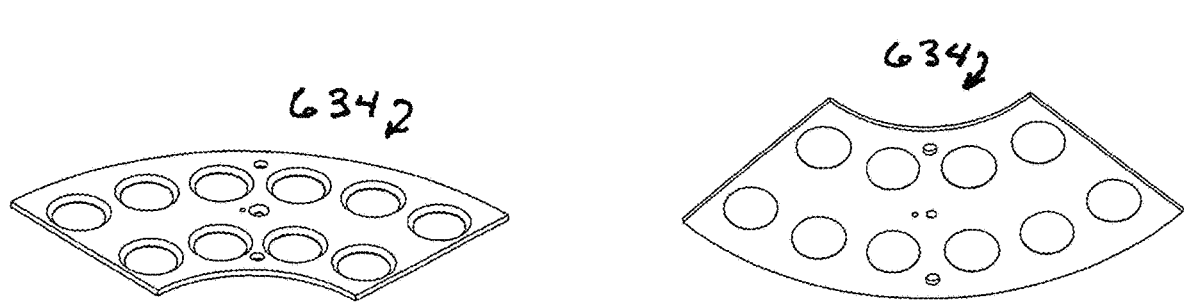
FIG. 16C
FIG. 16D

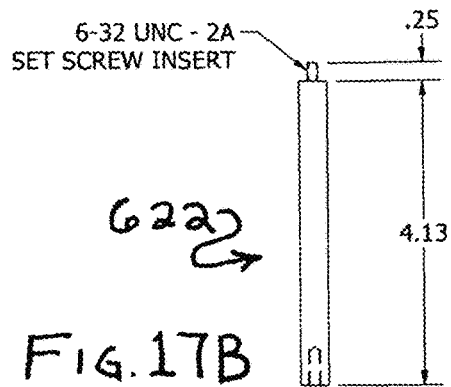
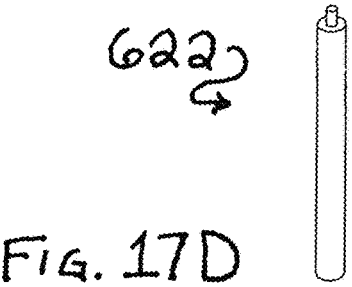
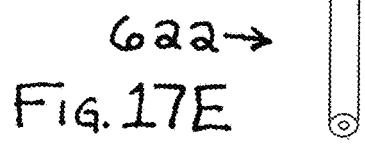
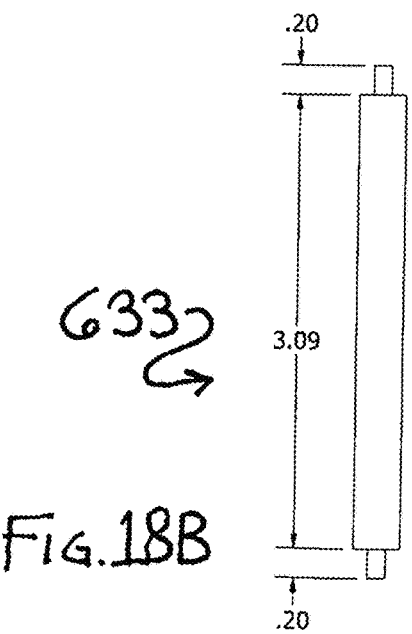
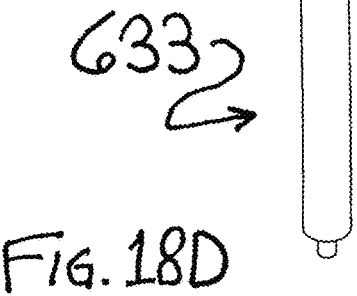

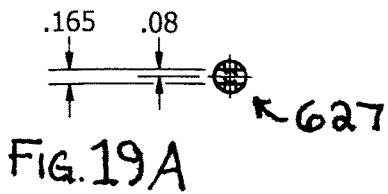
FIG. 19A
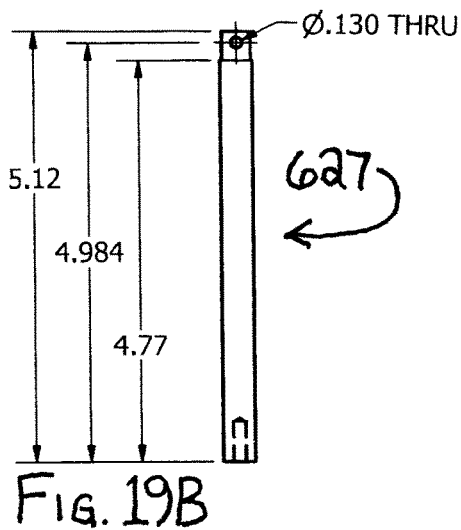
FIG. 19B
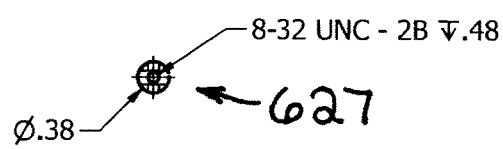
FIG. 19C
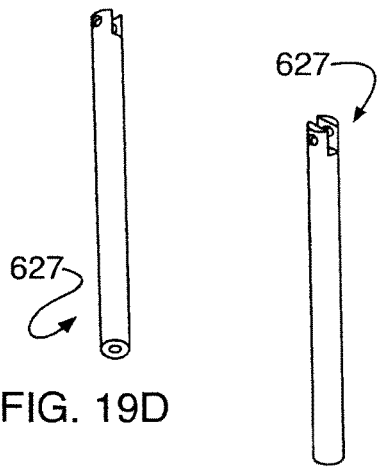
FIG. 19D  FIG. 19E
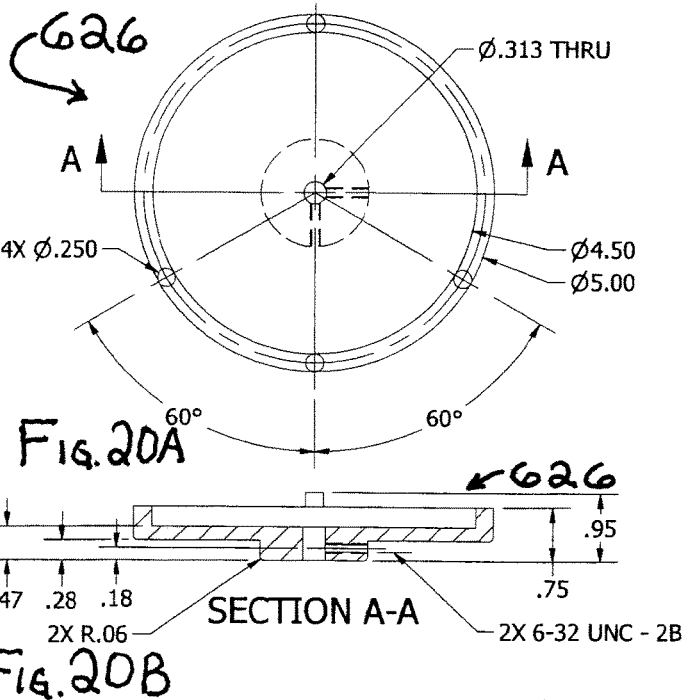
FIG. 20A
FIG. 20B
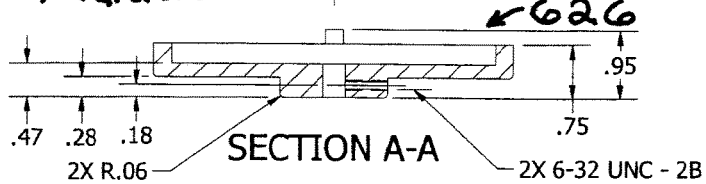
FIG. 20C
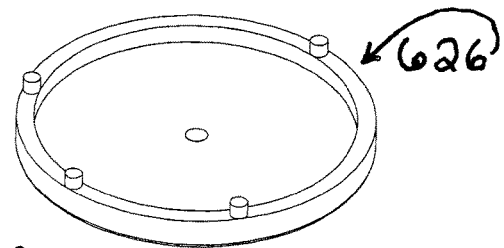
FIG. 20D
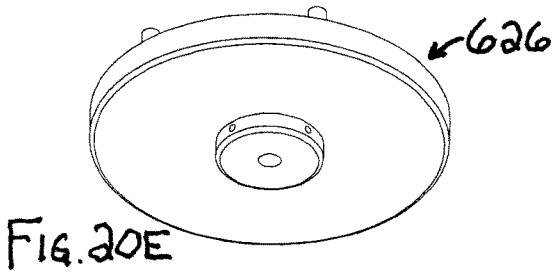
FIG. 20E

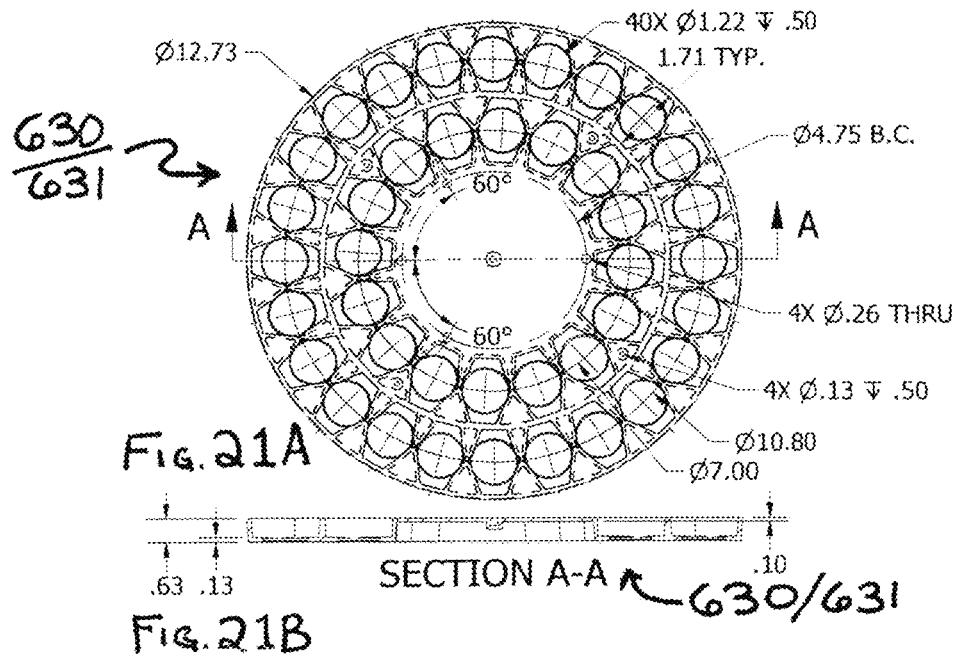
FIG. 21A
FIG. 21B
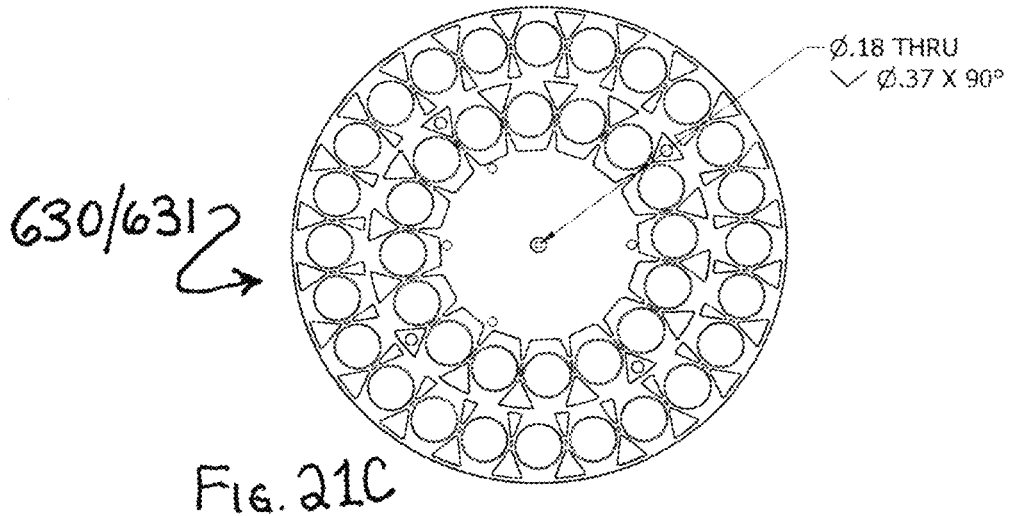
FIG. 21C
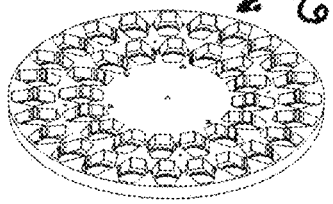
FIG. 21D
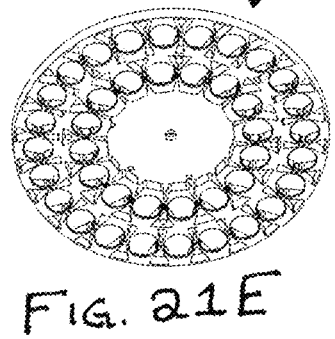
FIG. 21E

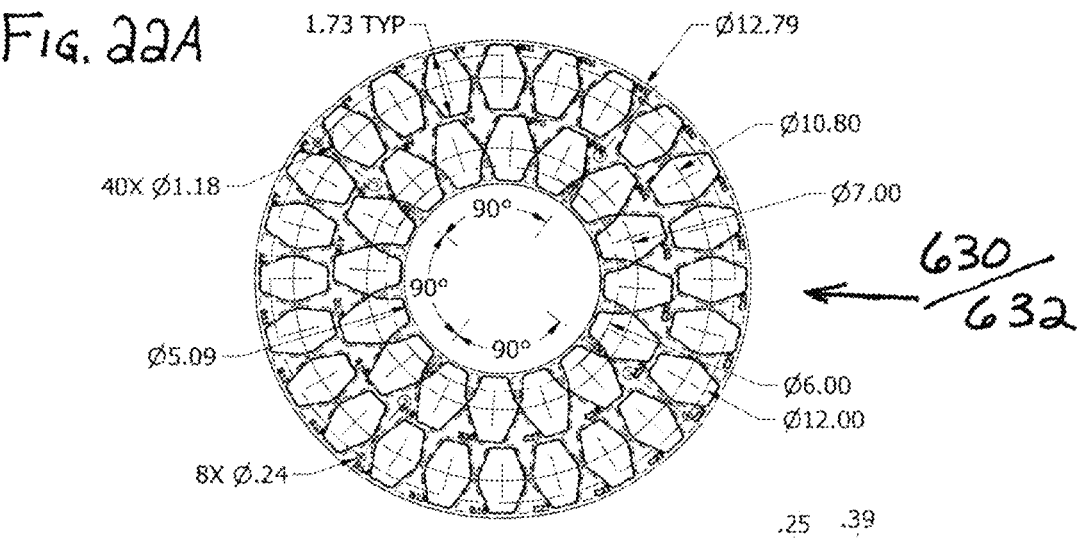
FIG. 22A
FIG. 22B
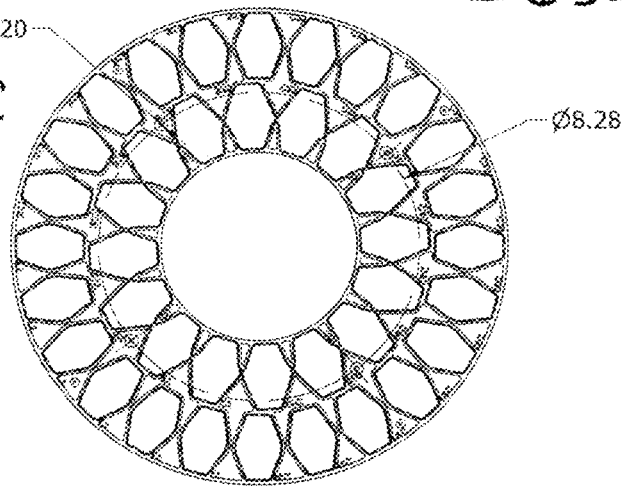
FIG. 22C
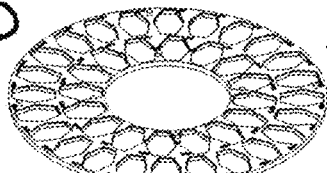
FIG. 22D
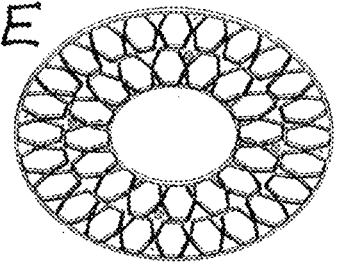
FIG. 22E

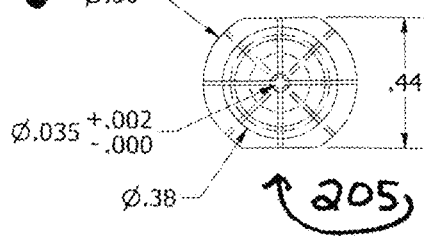
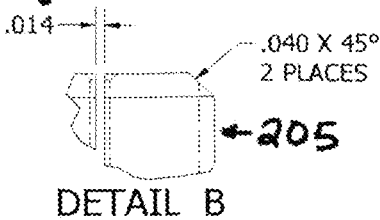
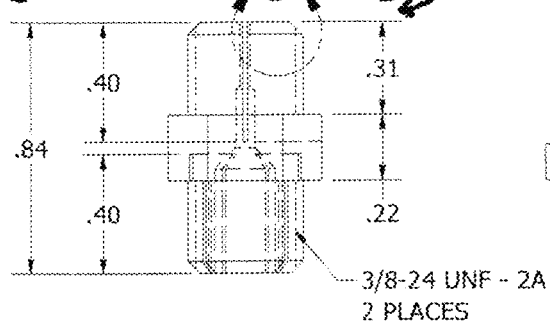
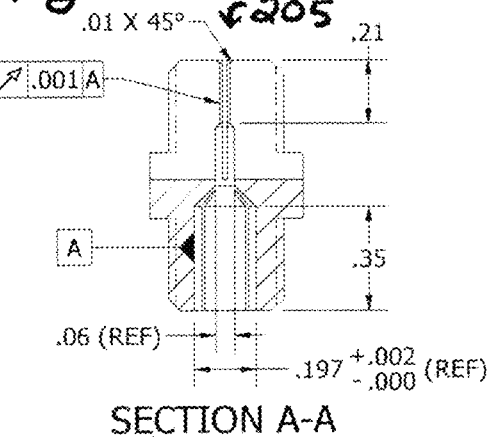
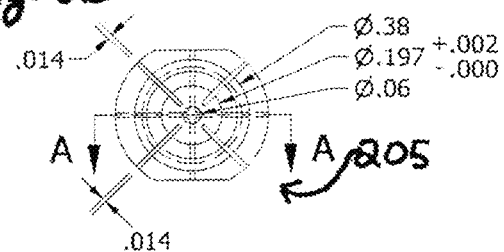
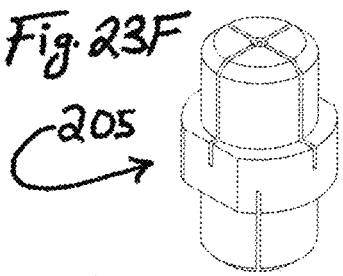
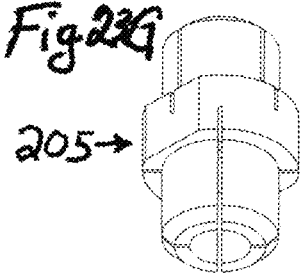

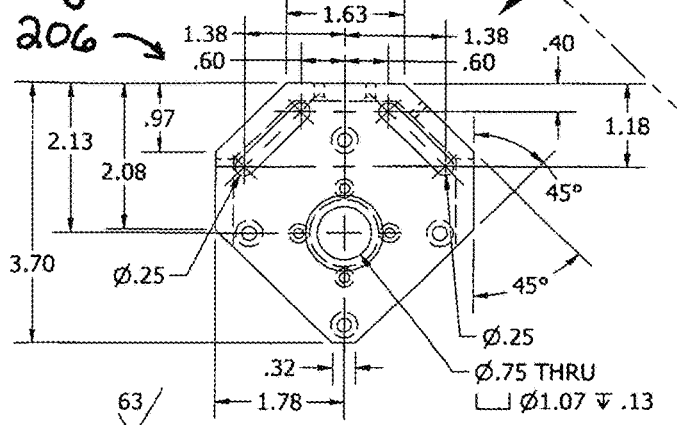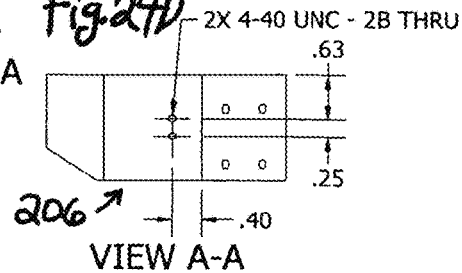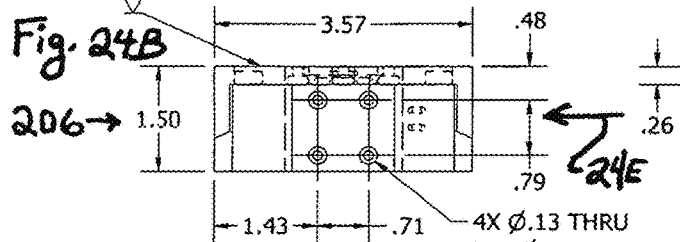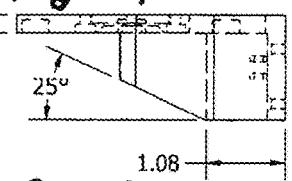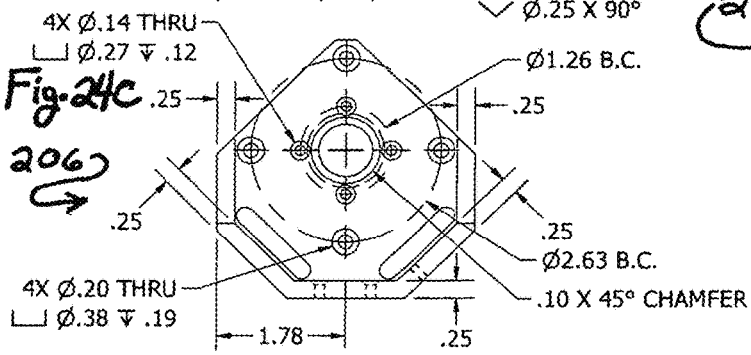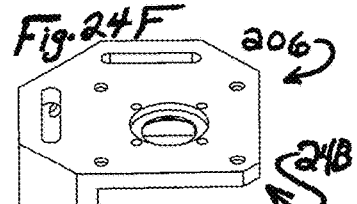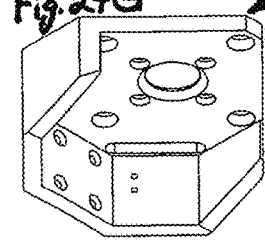

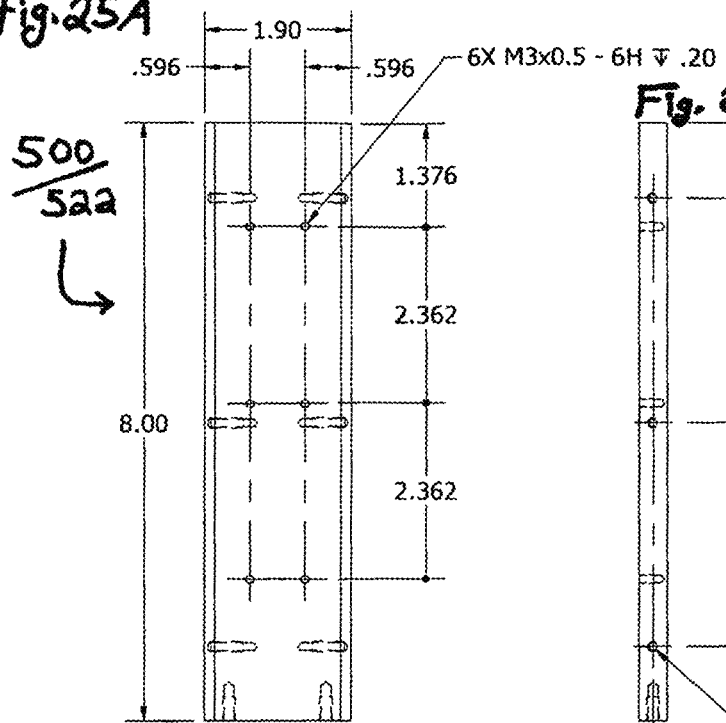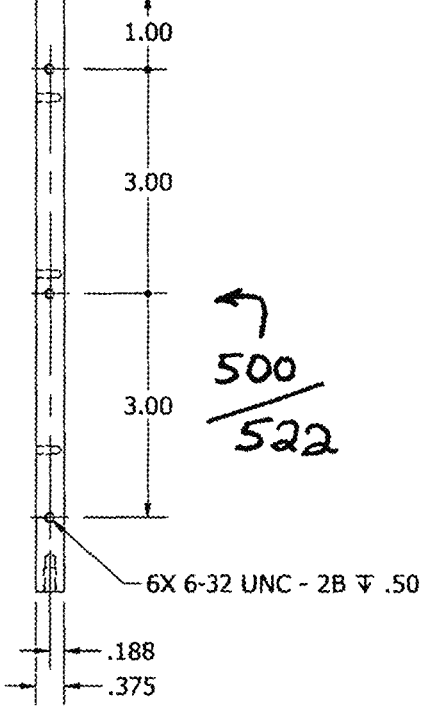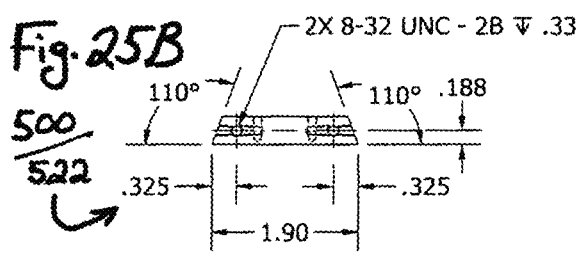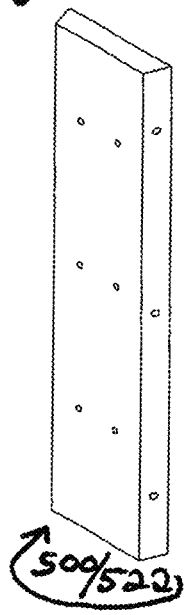

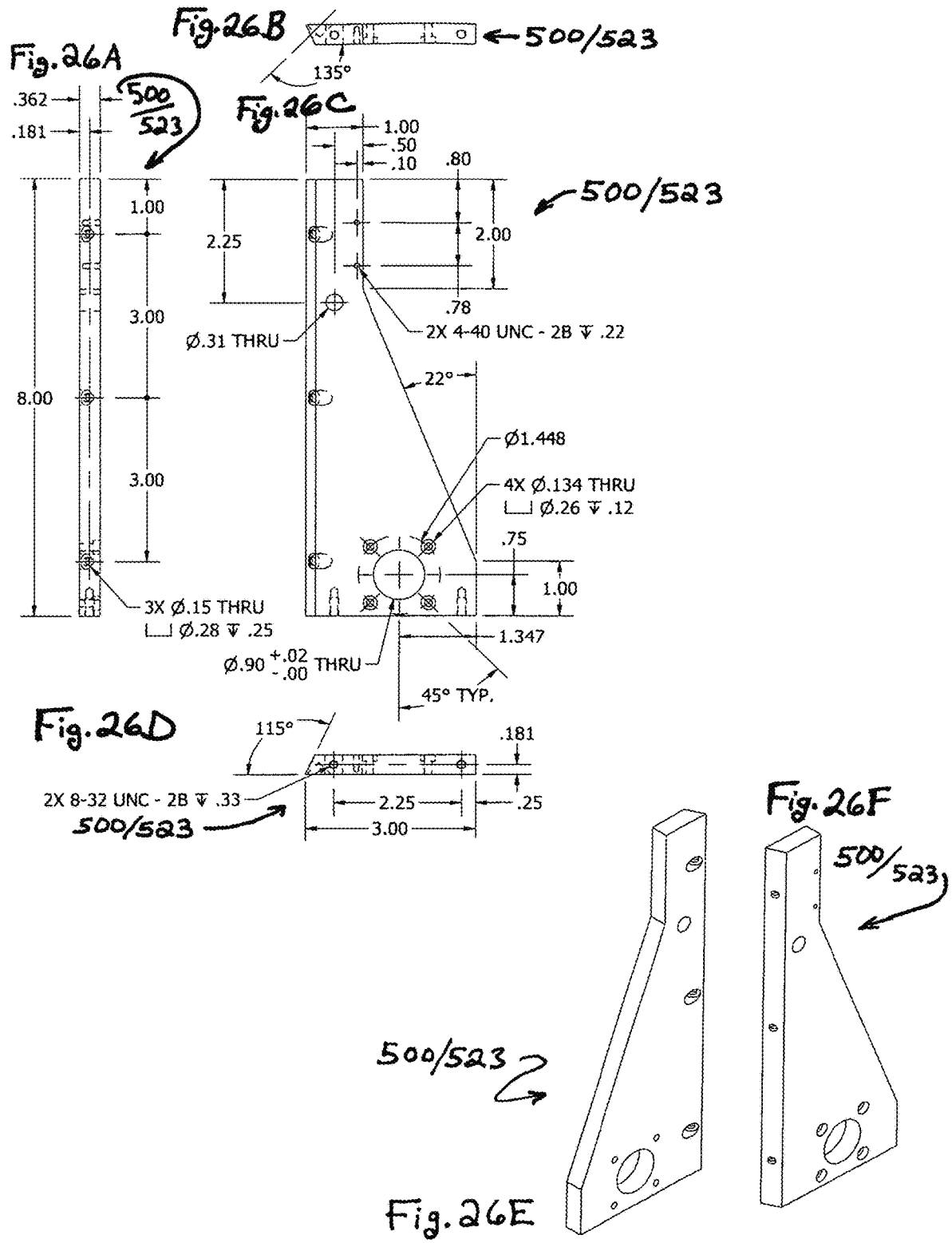

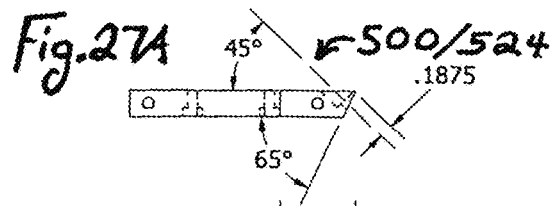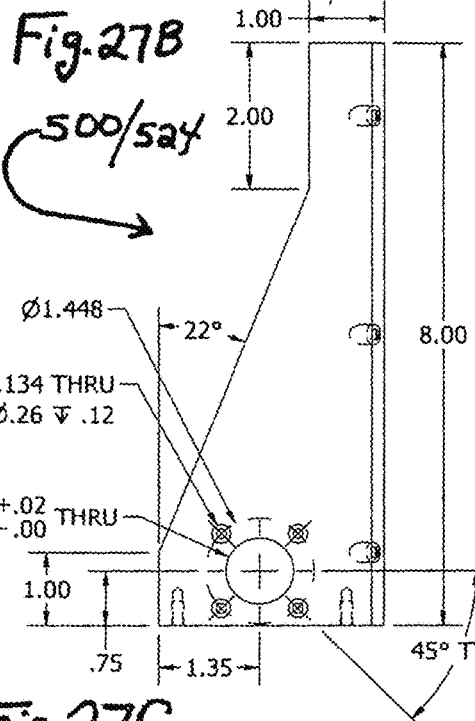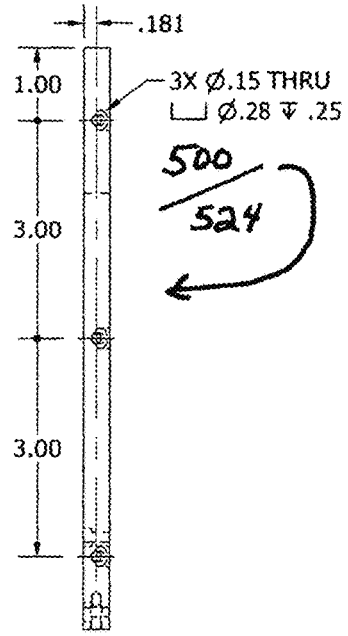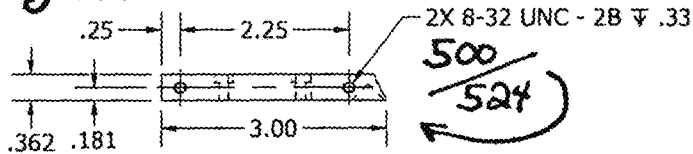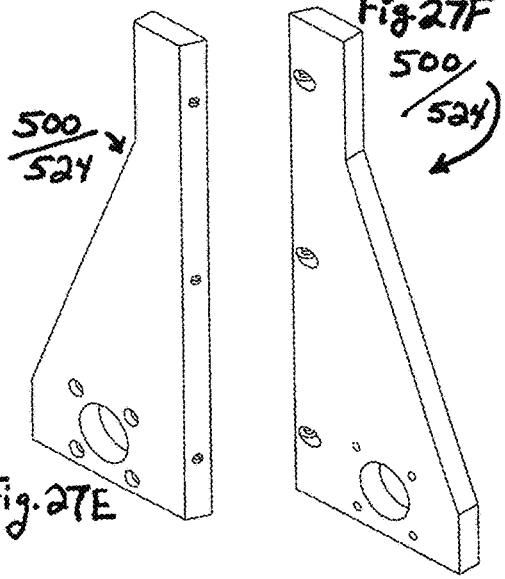

FIG. 28C SECTION A-A

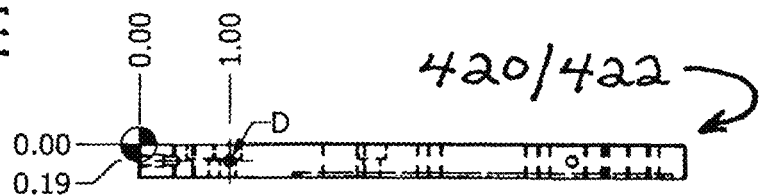
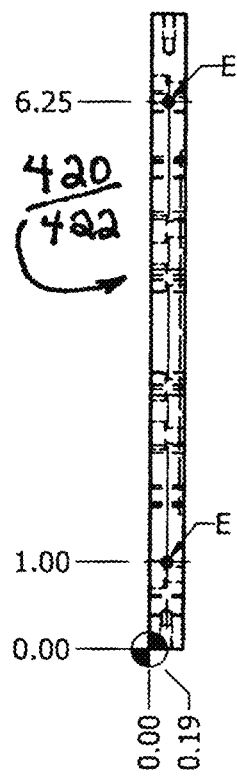
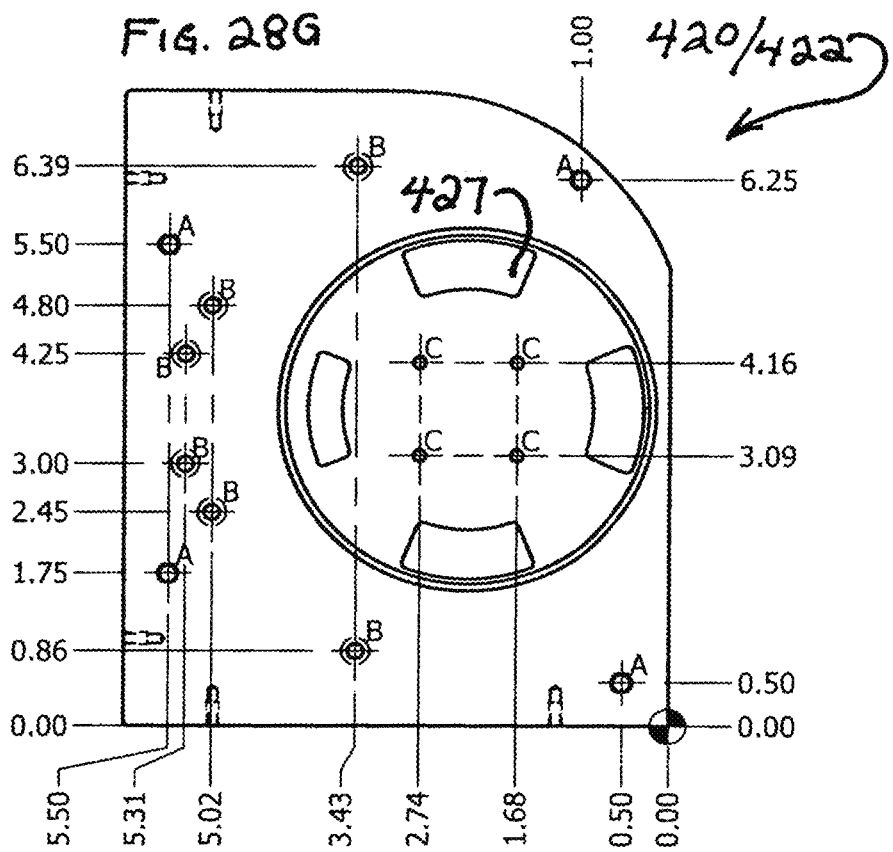
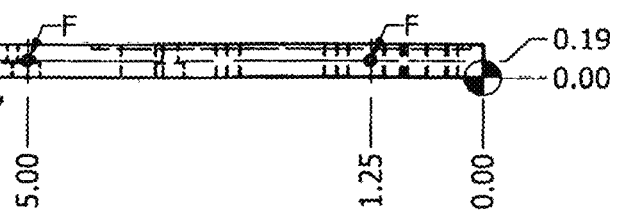

Fig. 28I
| QUANTITY | HOLE | DESCRIPTION |
|---|---|---|
| 4 | A | 1/4-20 UNC - 2B THRU |
| 6 | B | Ø0.18 THRU ⌴ Ø0.31 ▼ 0.16 |
| 4 | C | 8-32 UNC - 2B THRU |
| QUANTITY | HOLE | DESCRIPTION |
|---|---|---|
| 1 | D | 6-32 UNC - 2B ▼ 0.28 |
| QUANTITY | HOLE | DESCRIPTION |
|---|---|---|
| 2 | E | 6-32 UNC - 2B ▼ 0.28 |
| QUANTITY | HOLE | DESCRIPTION |
|---|---|---|
| 2 | F | 6-32 UNC - 2B ▼ 0.28 |
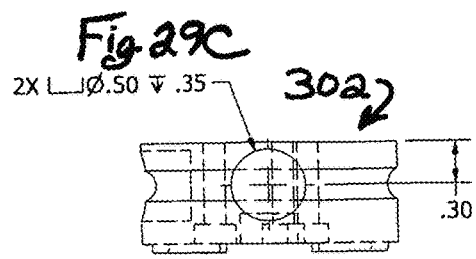
Fig. 29C
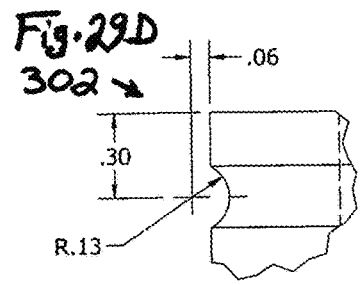
Fig. 29D
DETAIL A
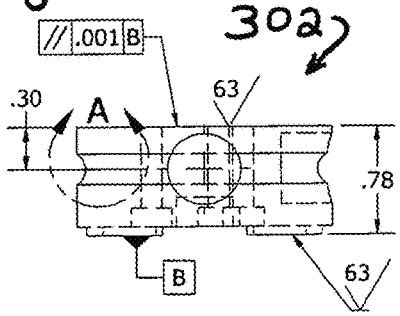
Fig. 29A
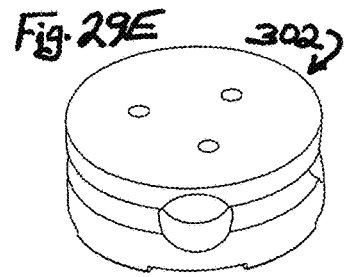
Fig. 29E
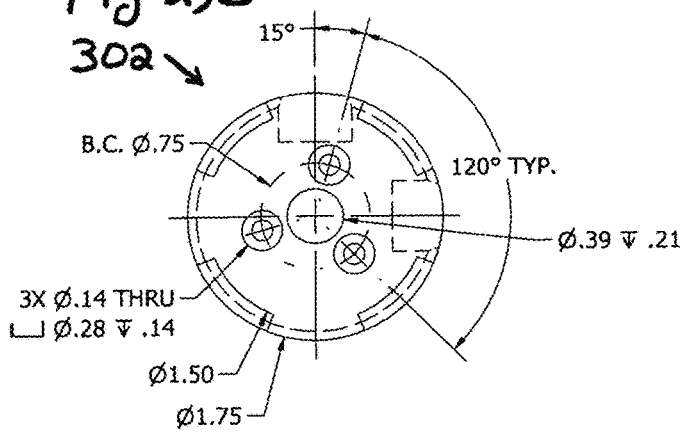
Fig. 29B
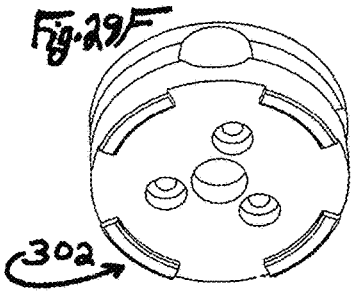
Fig. 29F

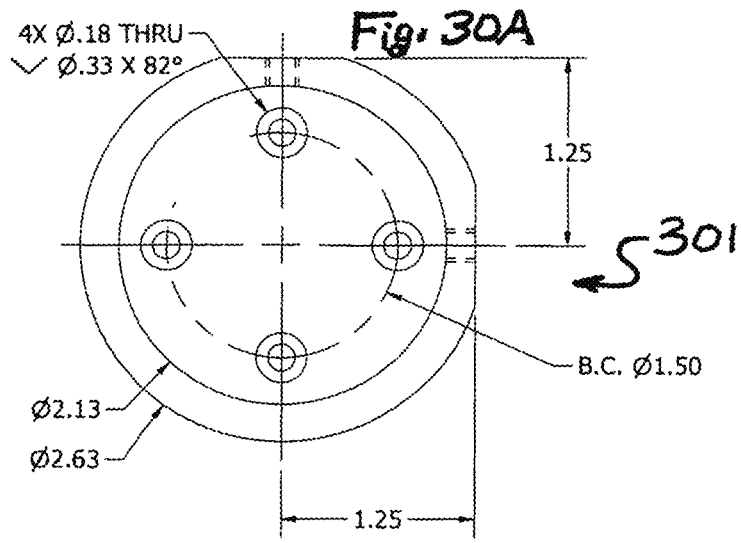
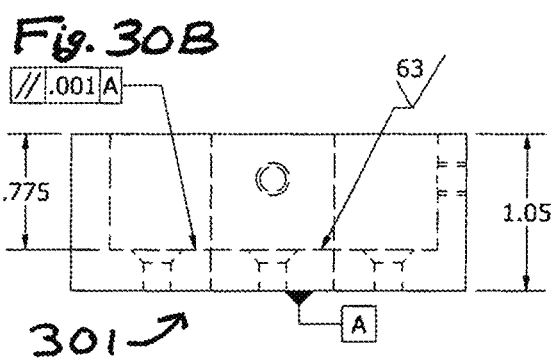
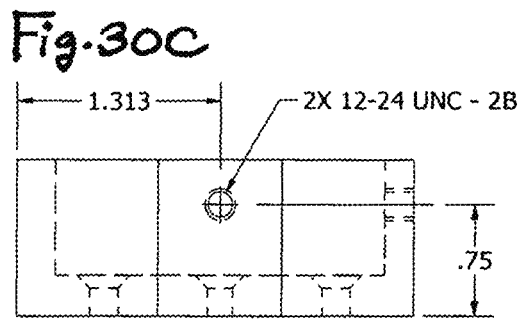
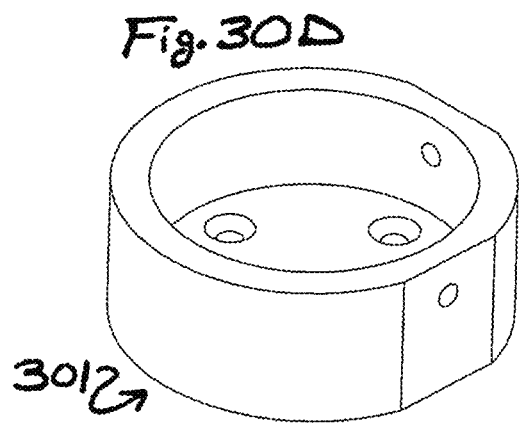

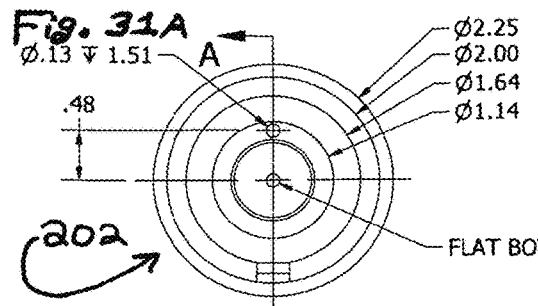
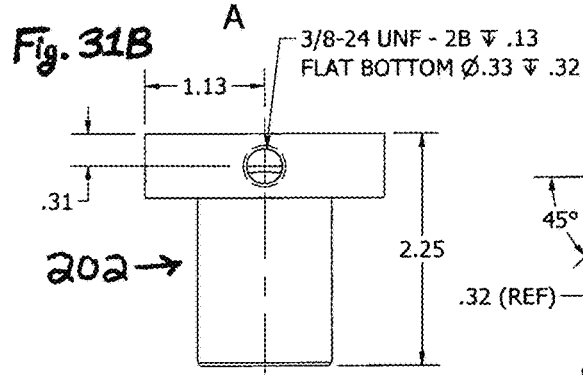
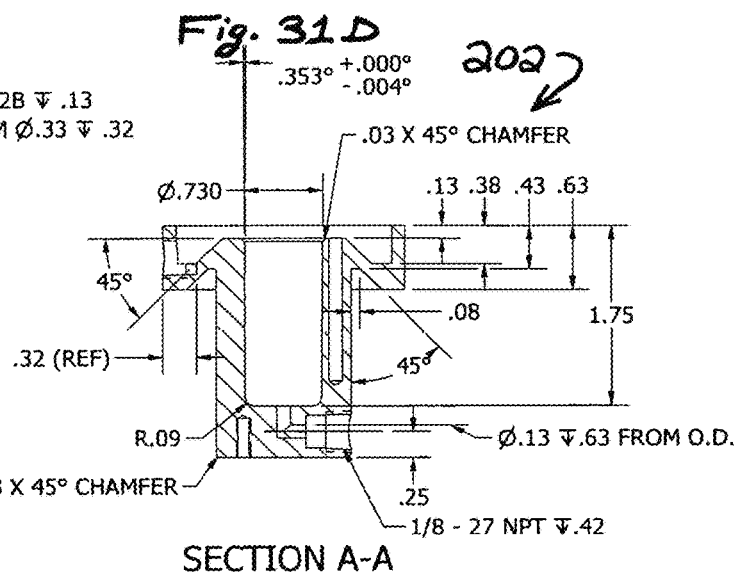
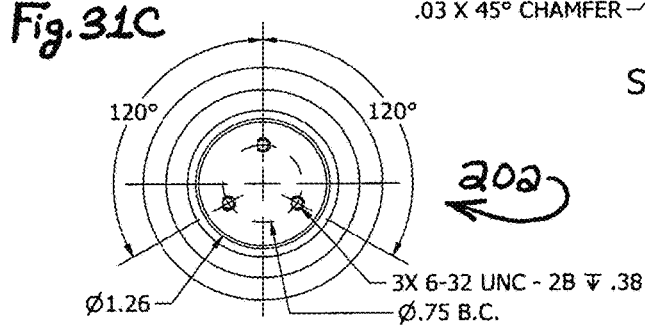
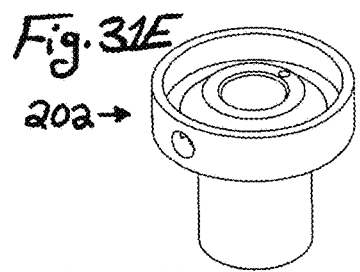
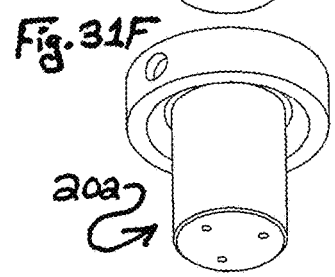

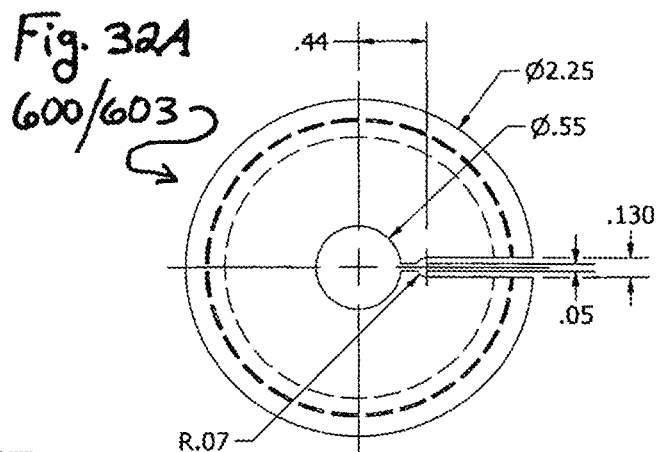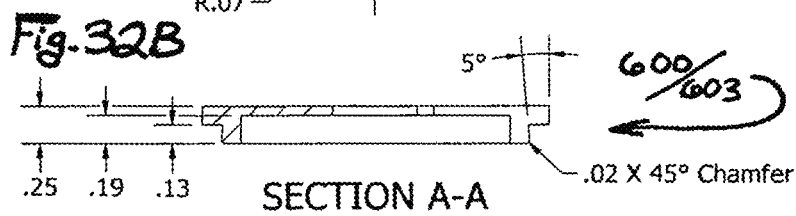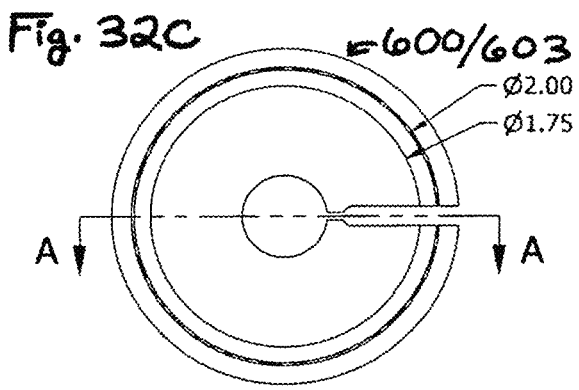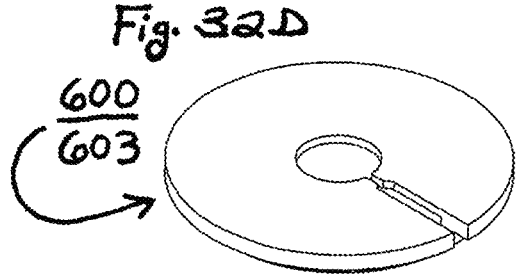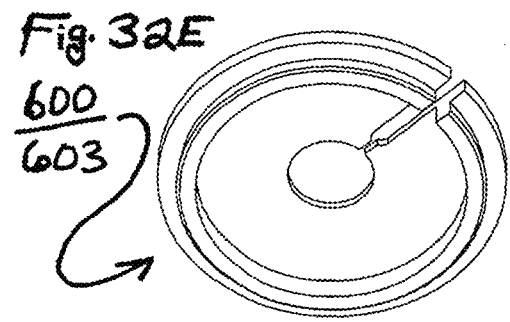

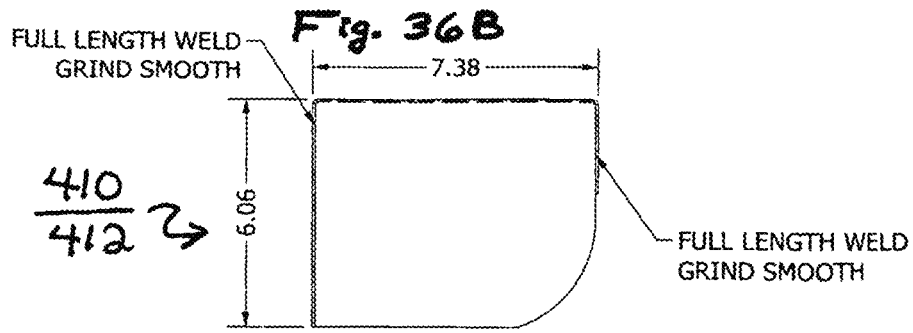
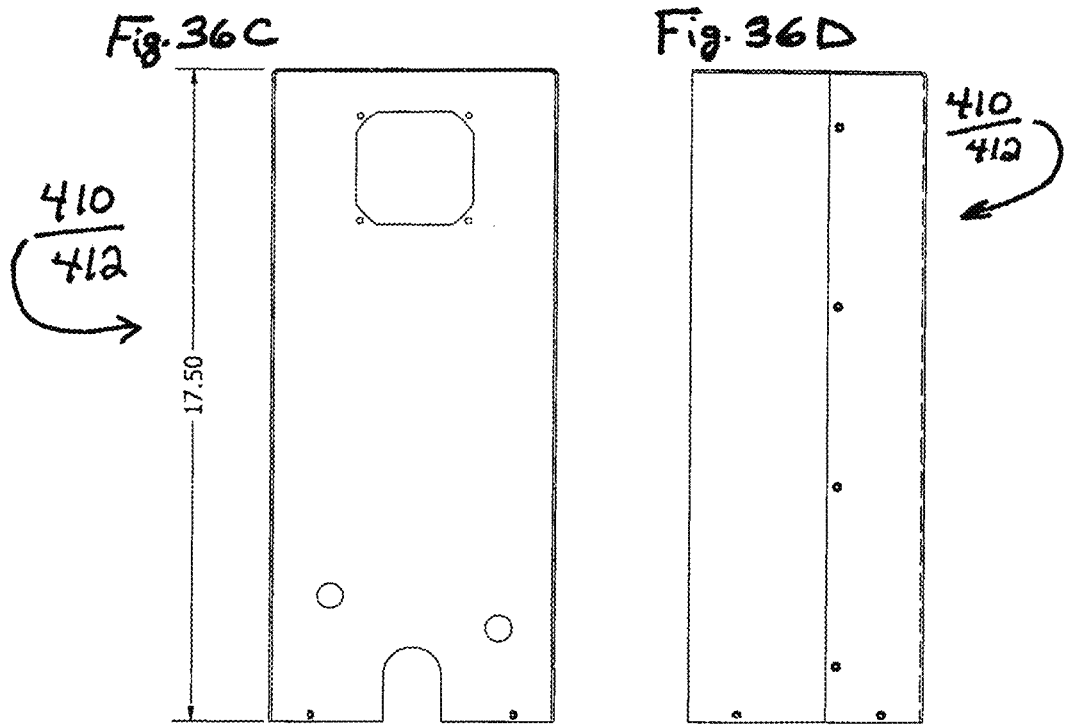
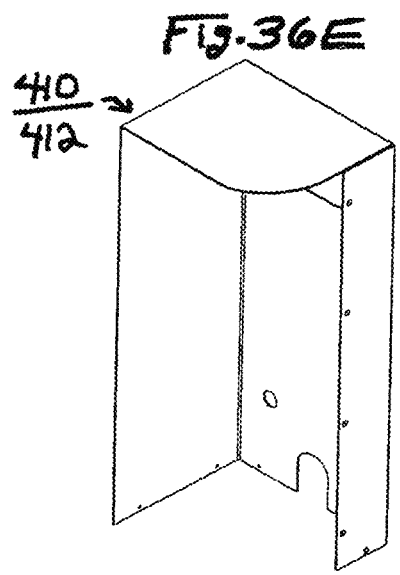

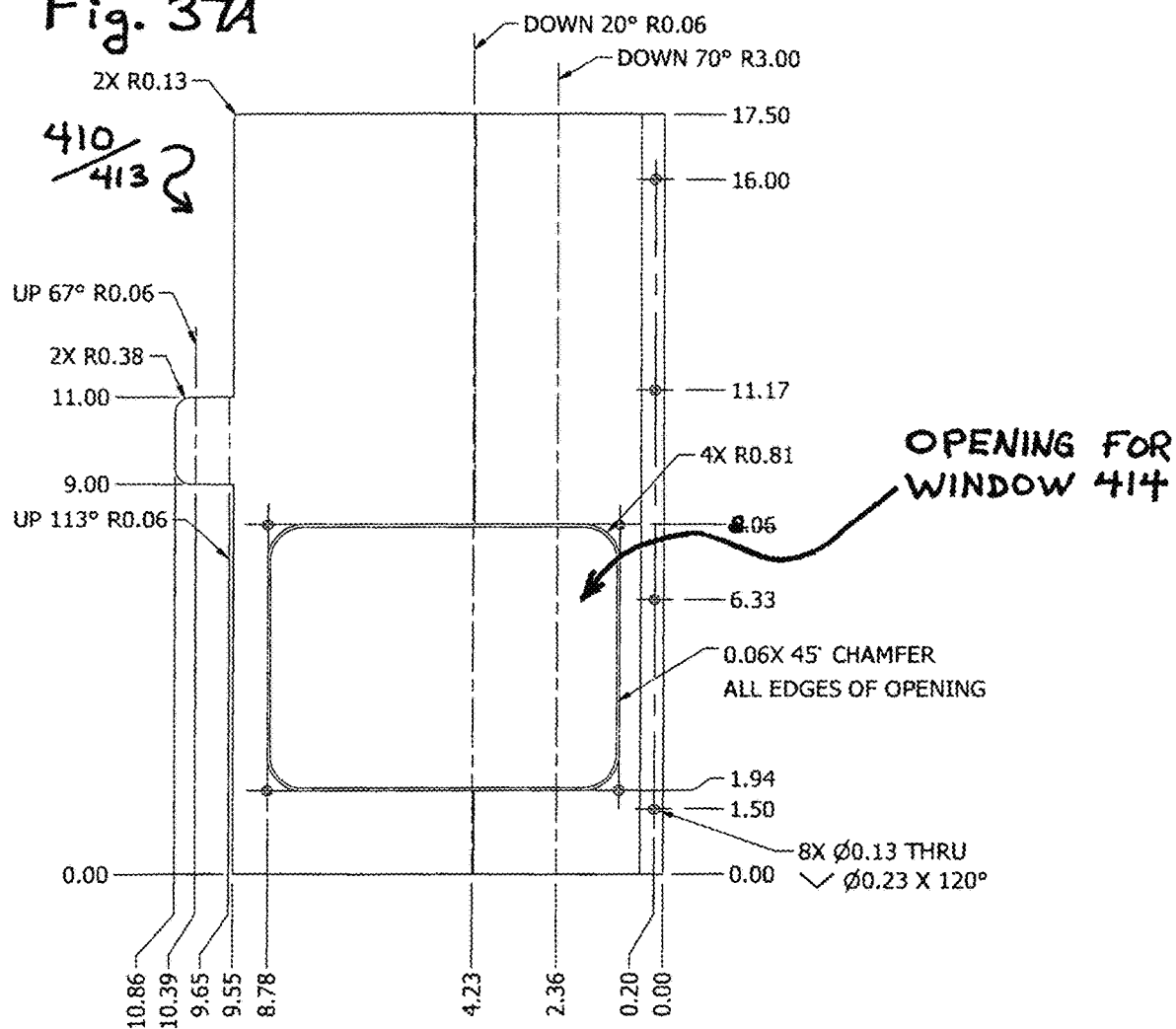

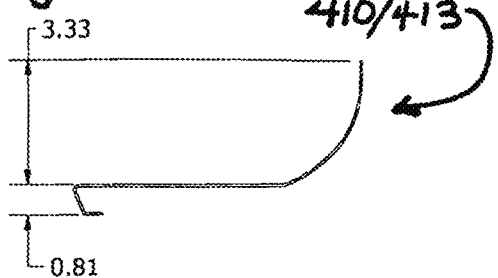
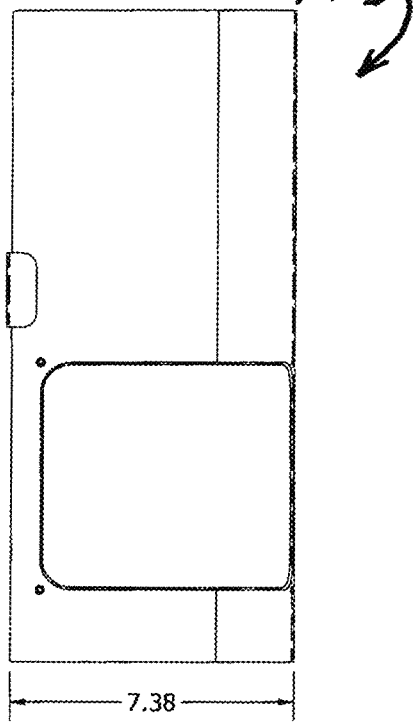
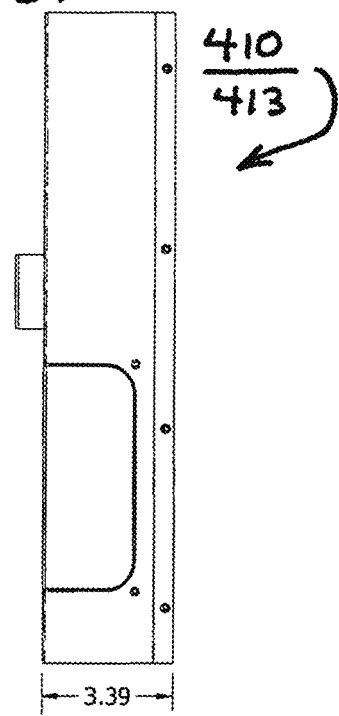
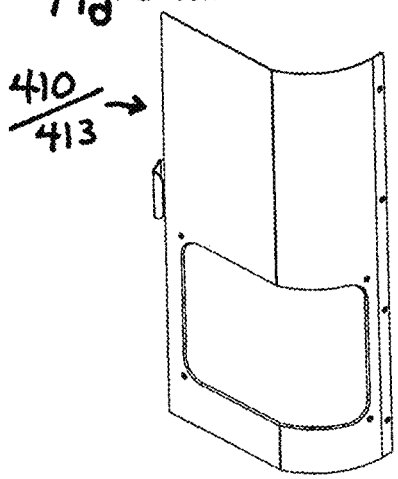

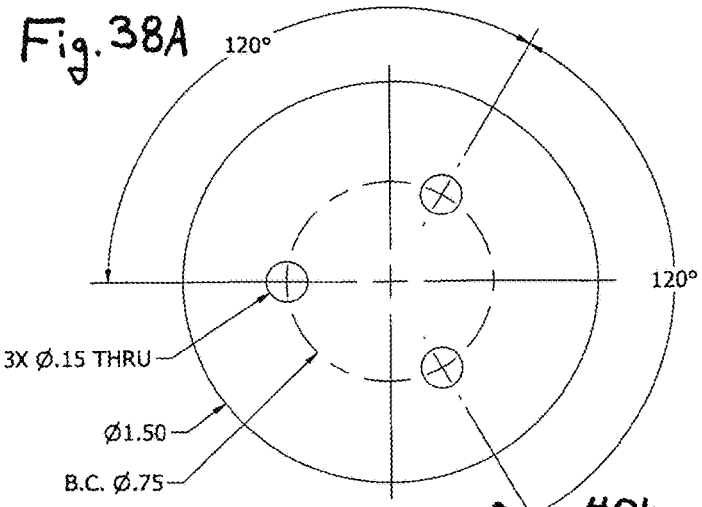
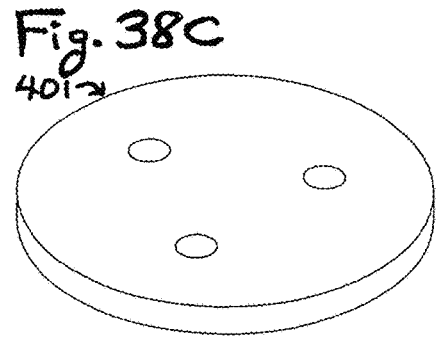
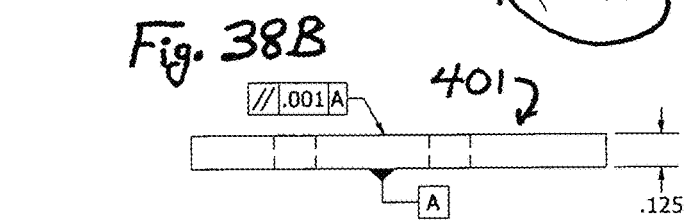
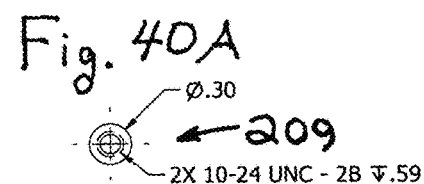
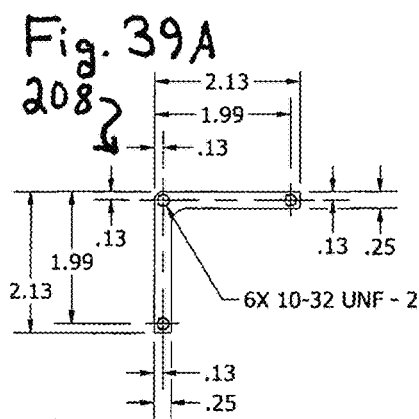
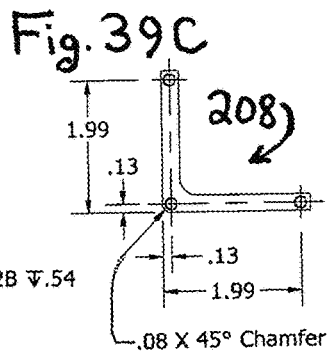
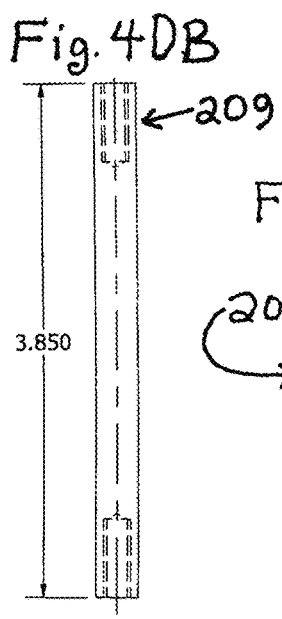
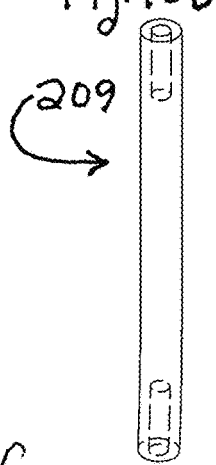
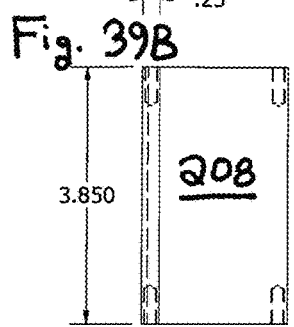
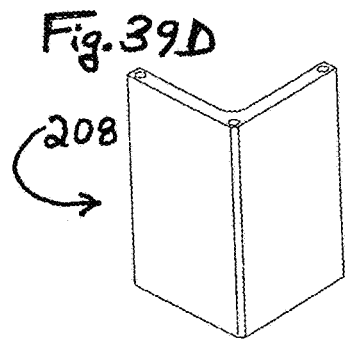
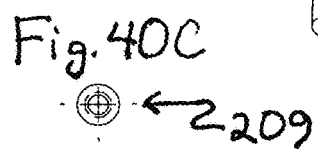

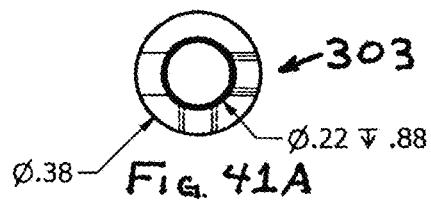
FIG. 41A
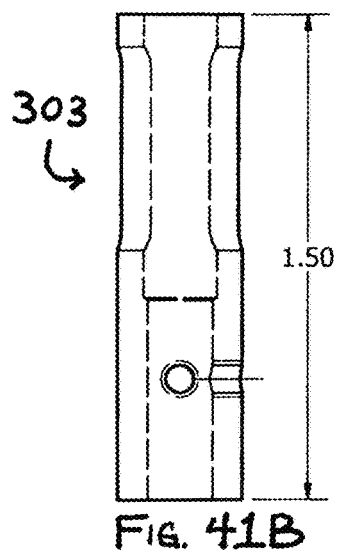
FIG. 41B
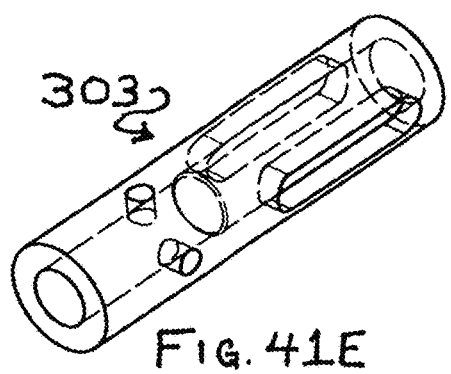
FIG. 41E
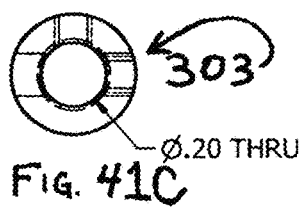
FIG. 41C
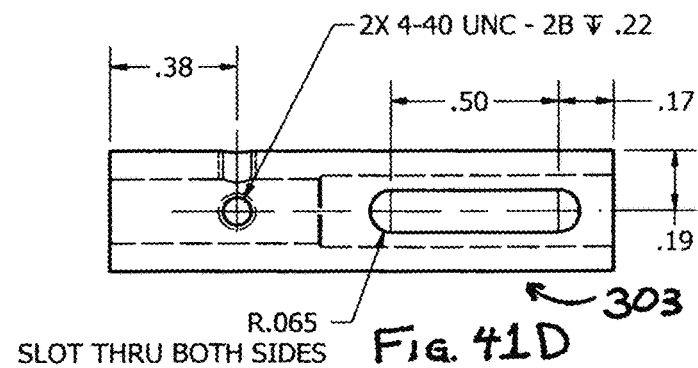
FIG. 41D
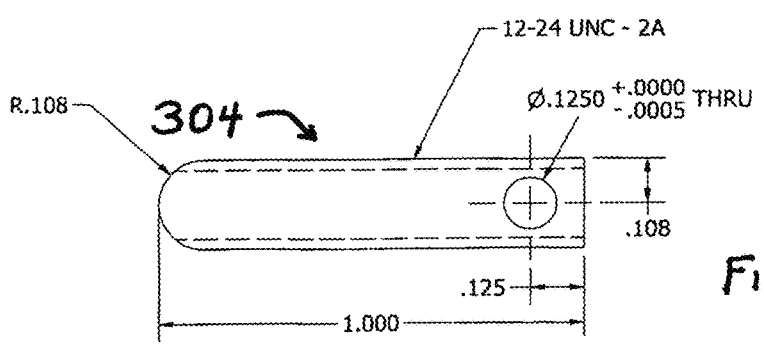
FIG. 42A
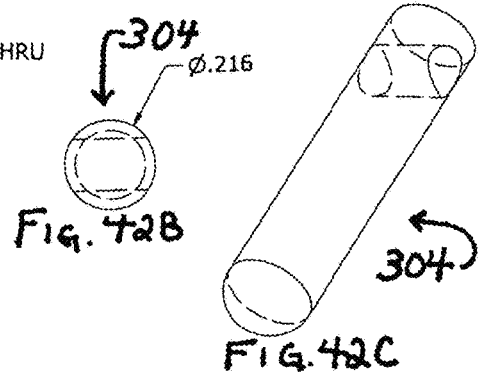
FIG. 42B
FIG. 42C

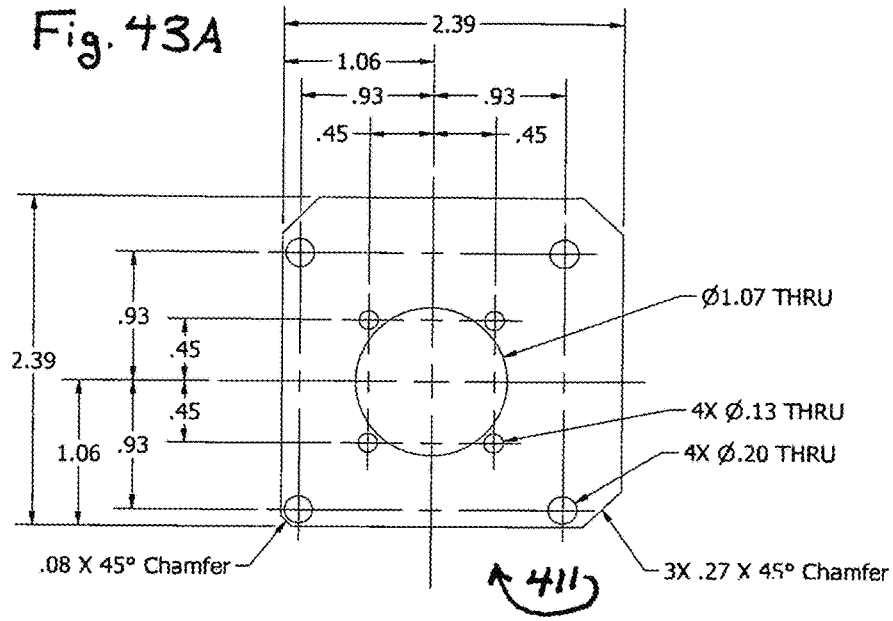
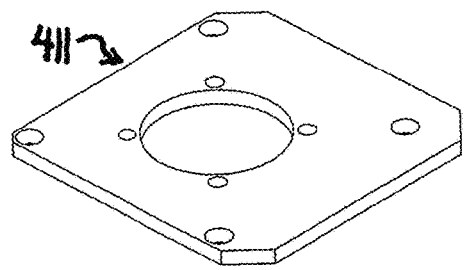
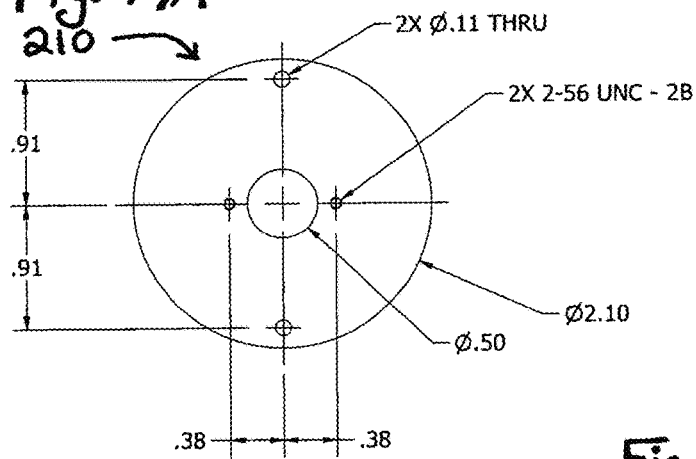
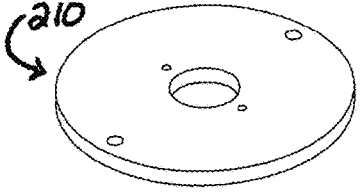
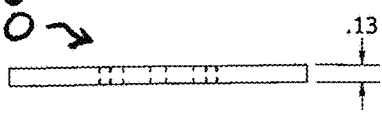

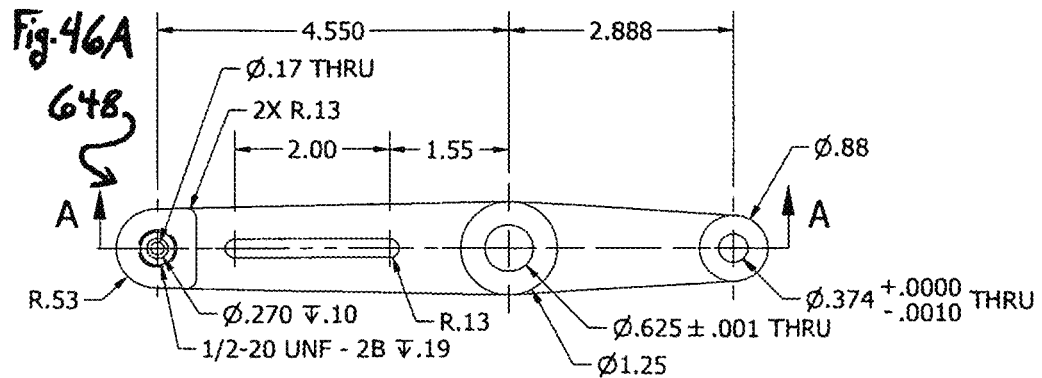
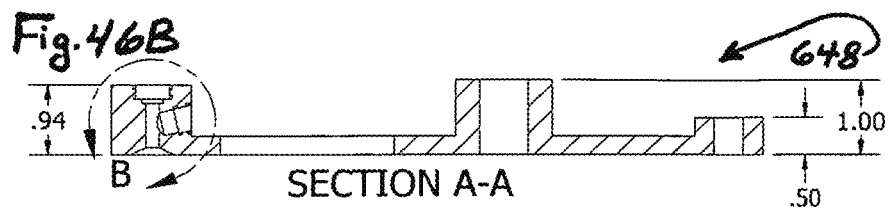
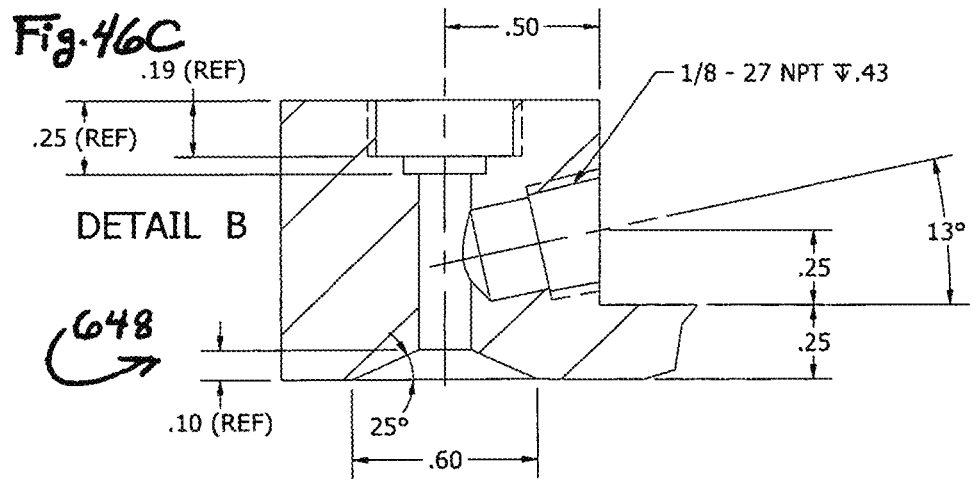
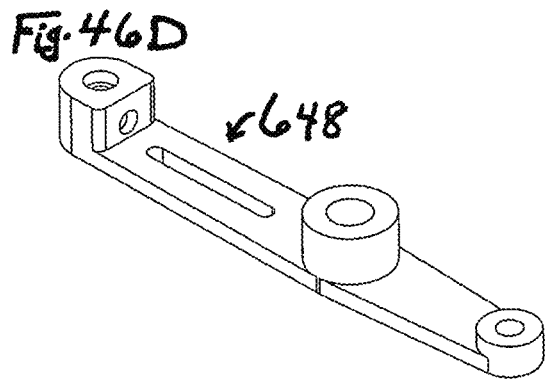
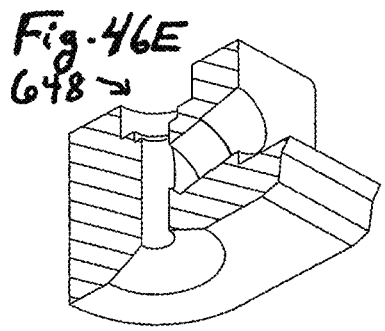

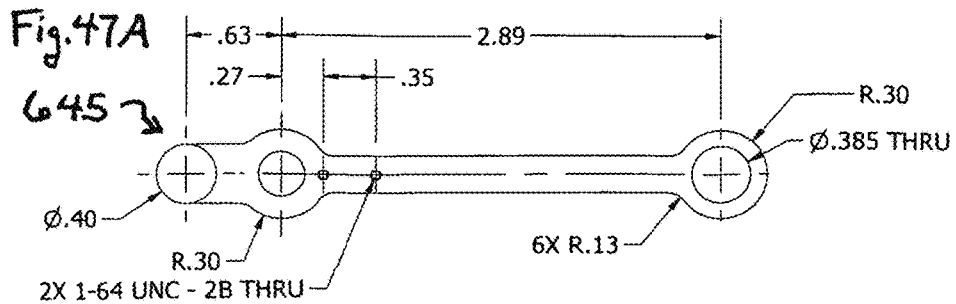
Fig. 47A
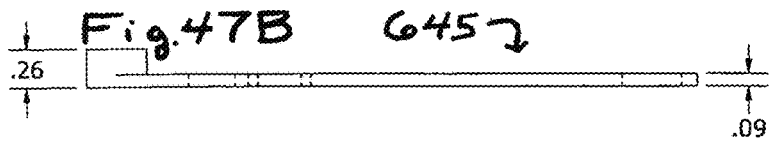
Fig. 47B
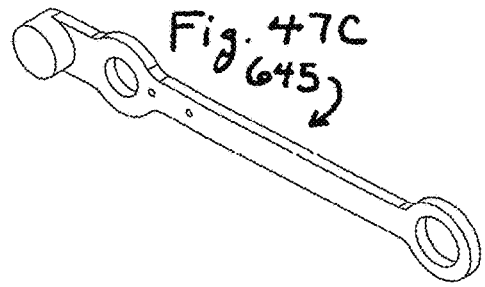
Fig. 47C
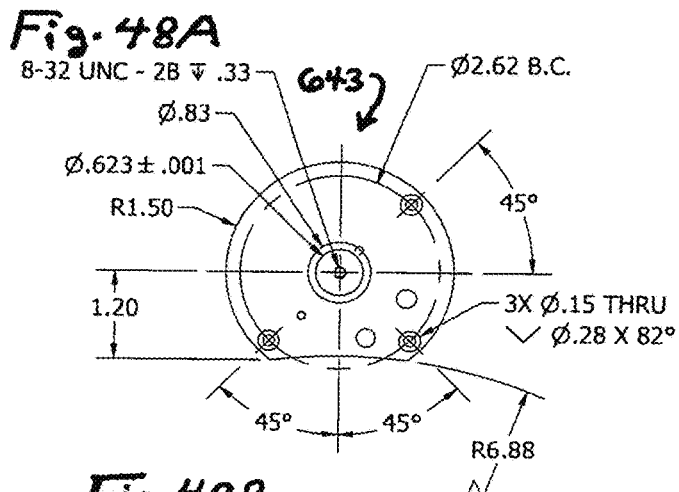
Fig. 48A
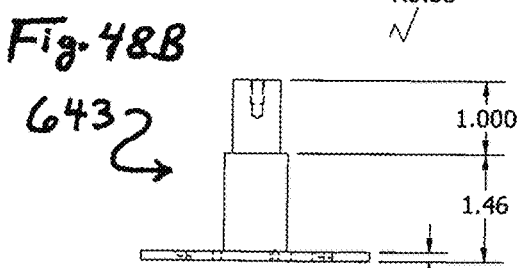
Fig. 48B
Fig. 48C
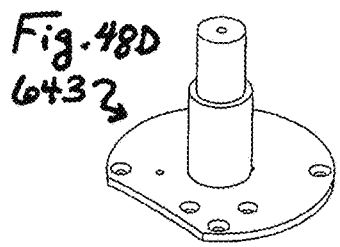
Fig. 48D
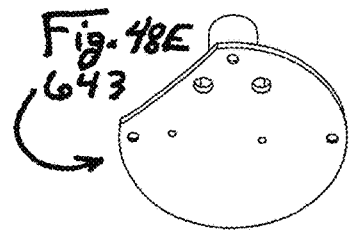
Fig. 48E
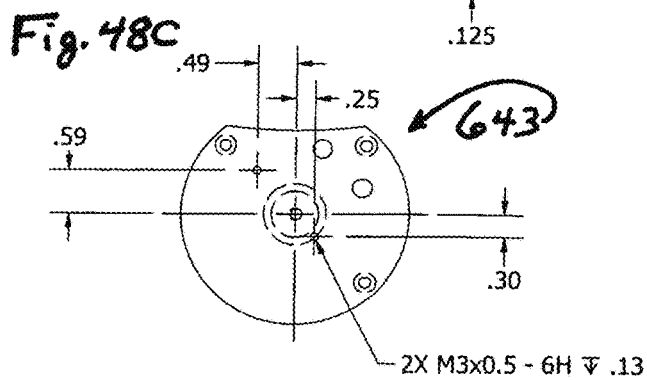

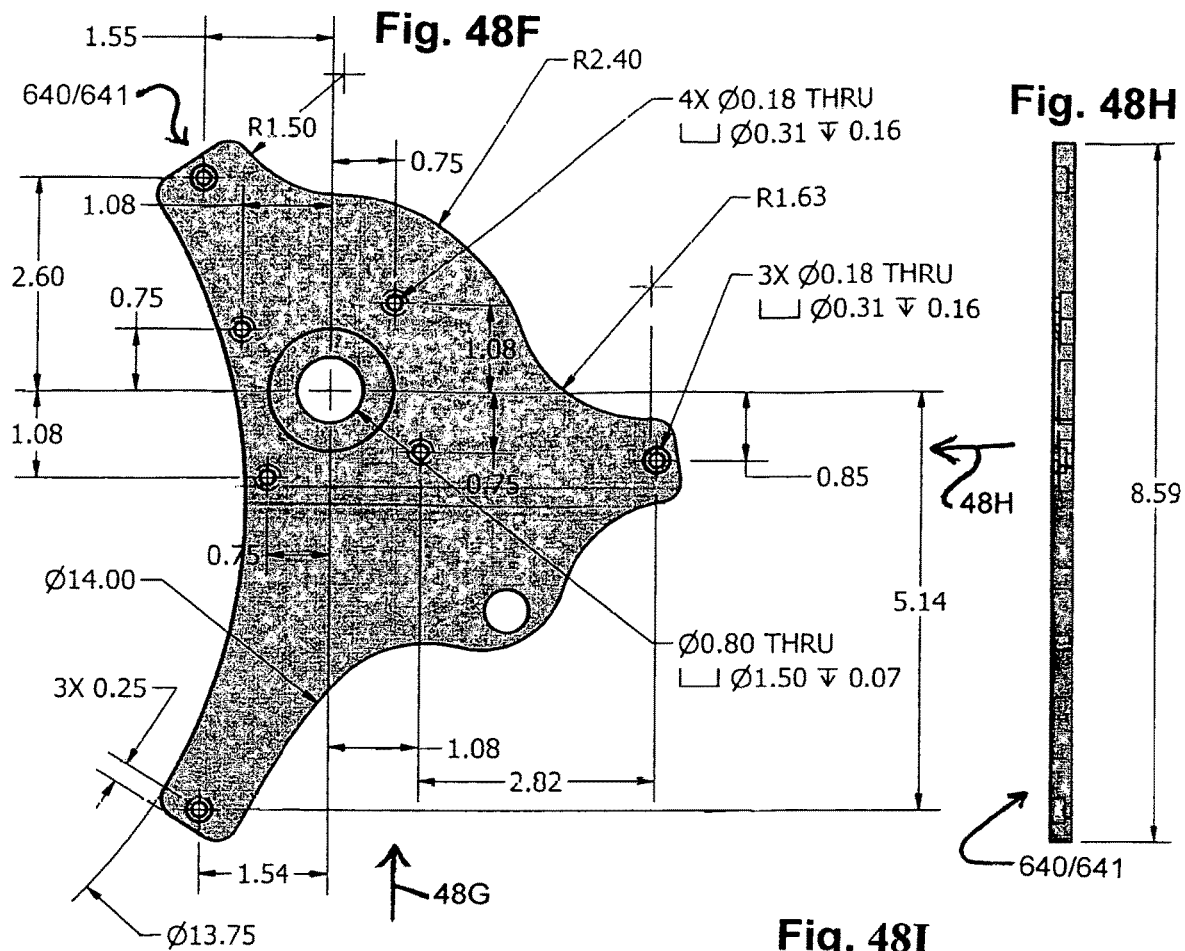
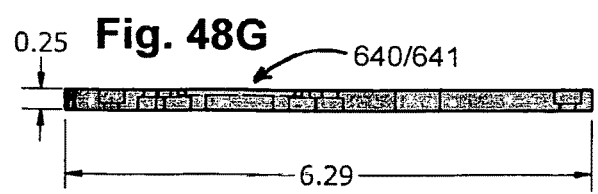
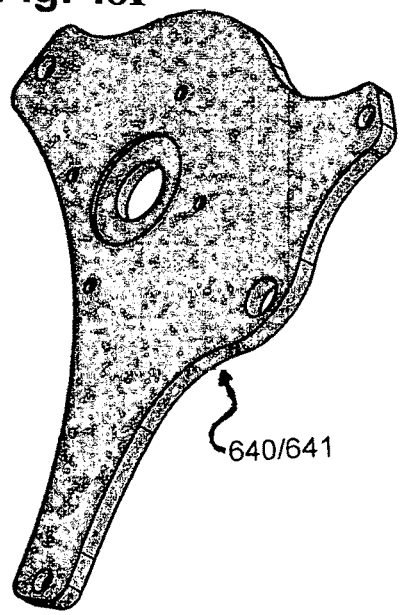
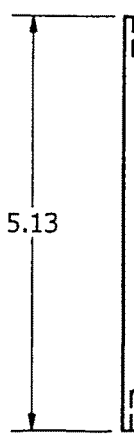

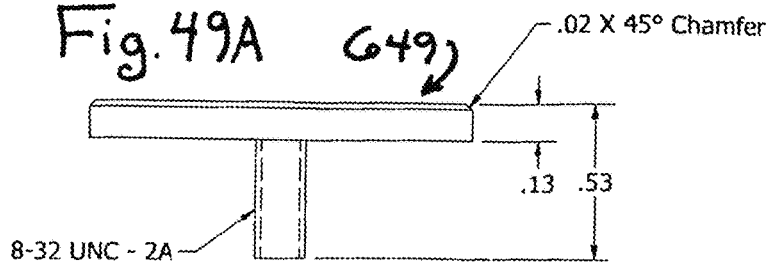
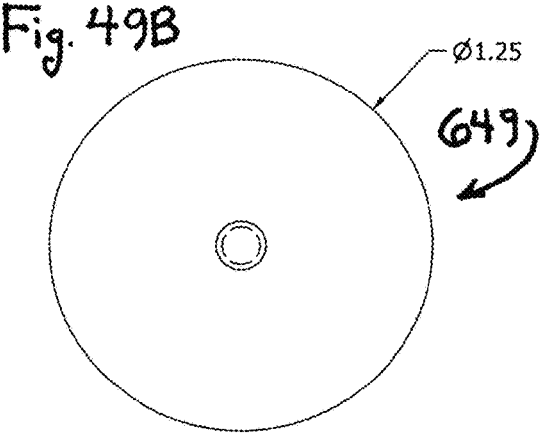
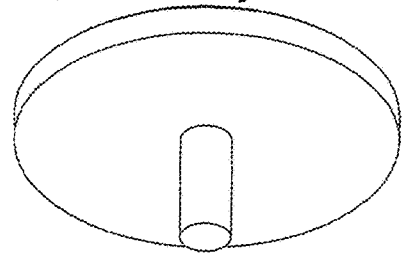
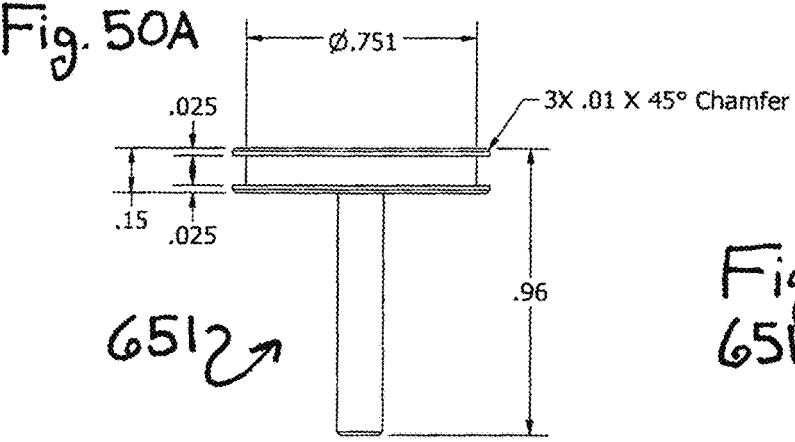
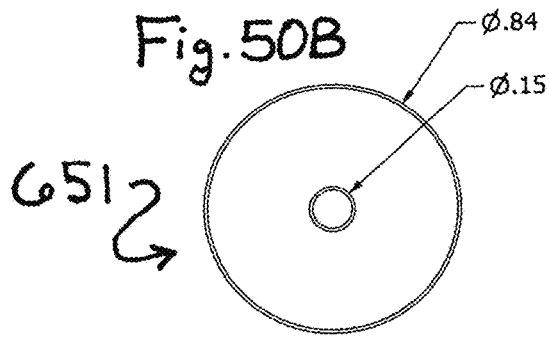
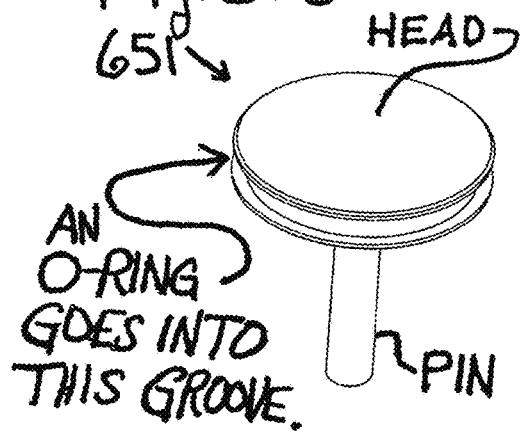

652
Ø1.06
1/4-28 UNF - 2B ▼.25

.02 X 45° CHAMFER
652
.13
.31

652
Ø1.06
15/16-20 UNEF - 2A
Ø.06 THRU

652

652

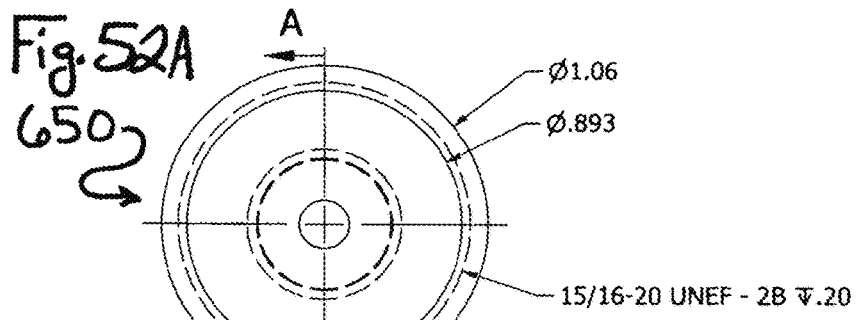
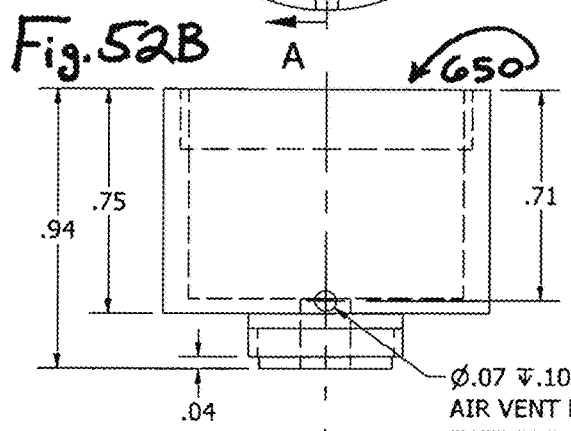
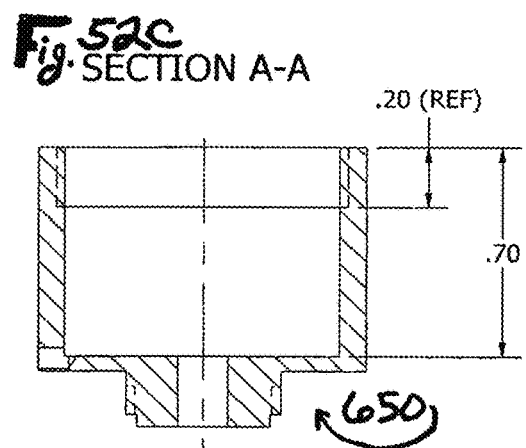
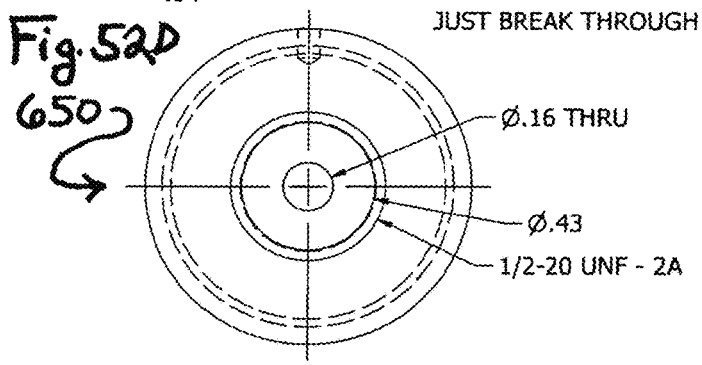
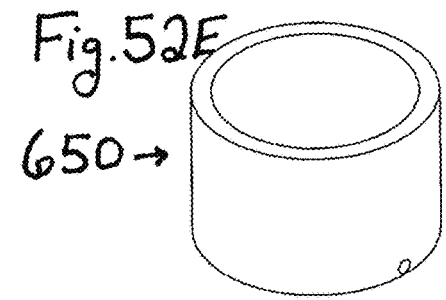
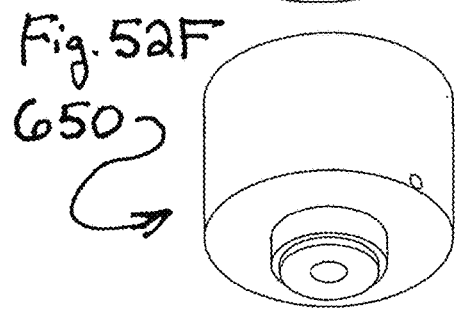

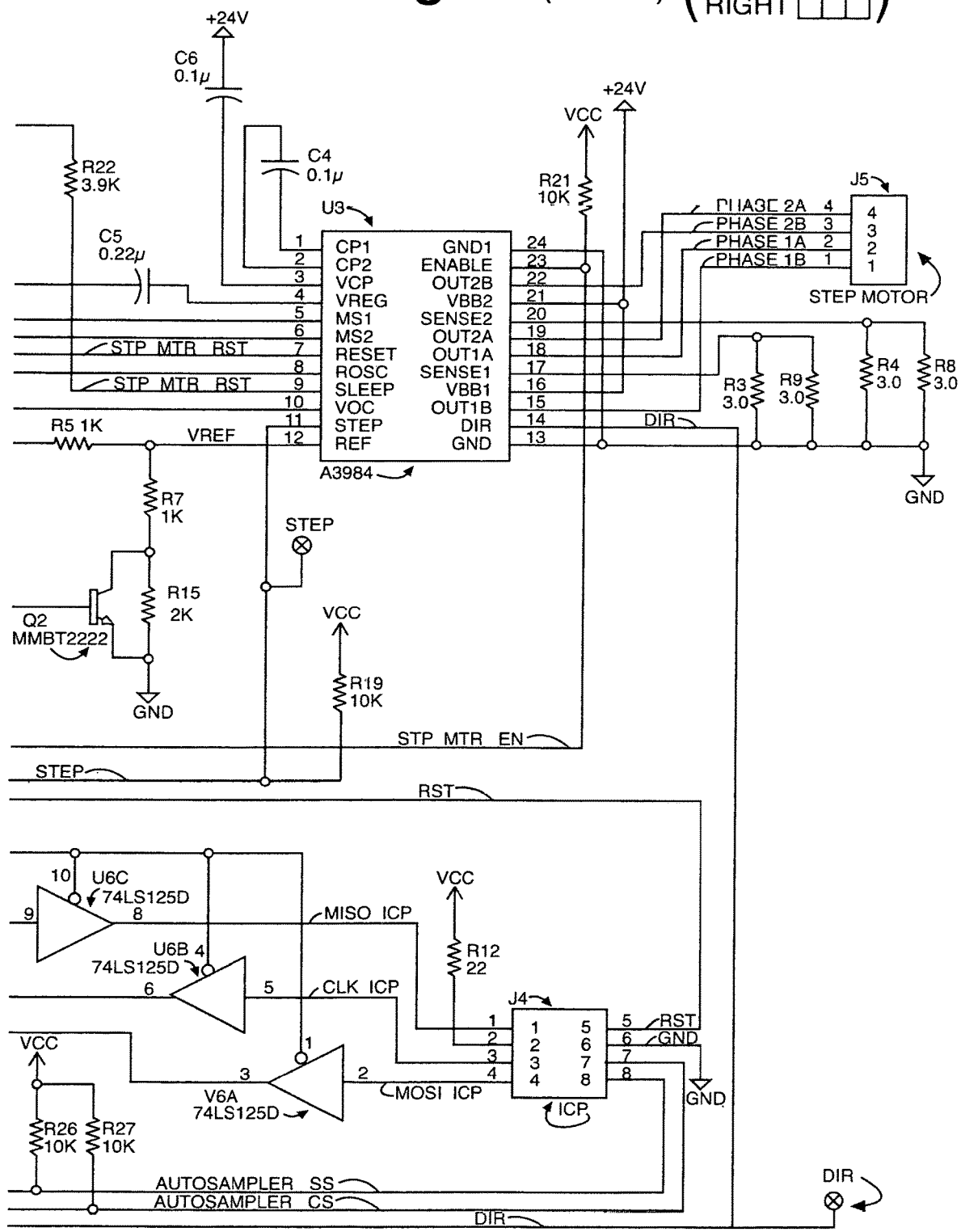
Fig. 53 (cont'd) (UPPER RIGHT)

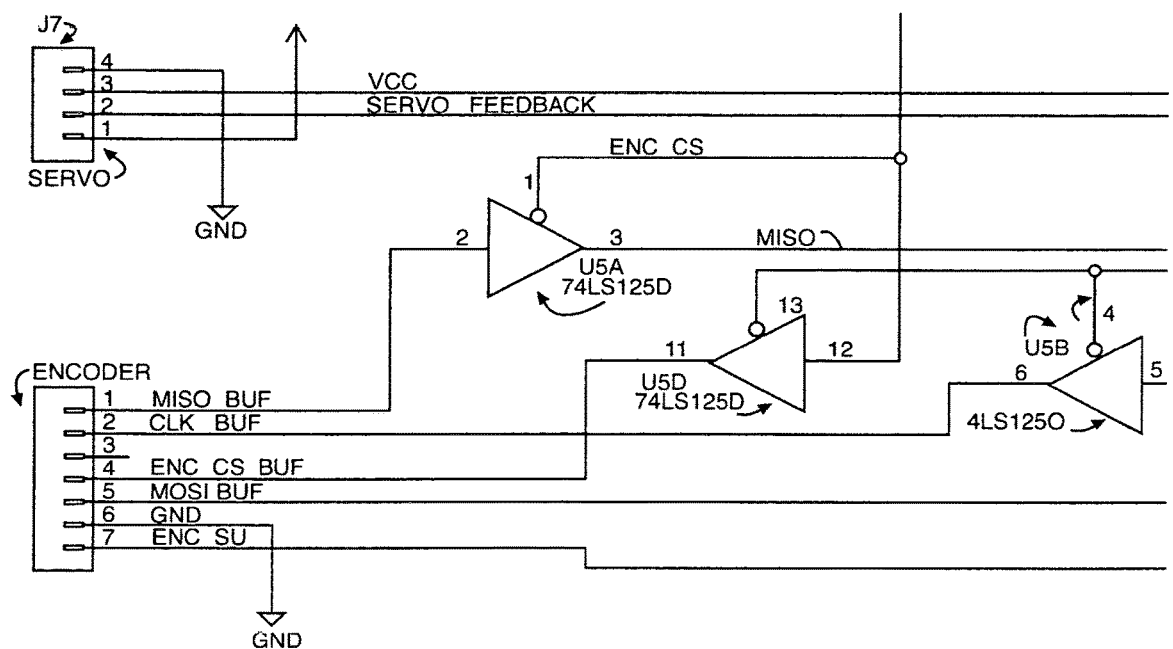

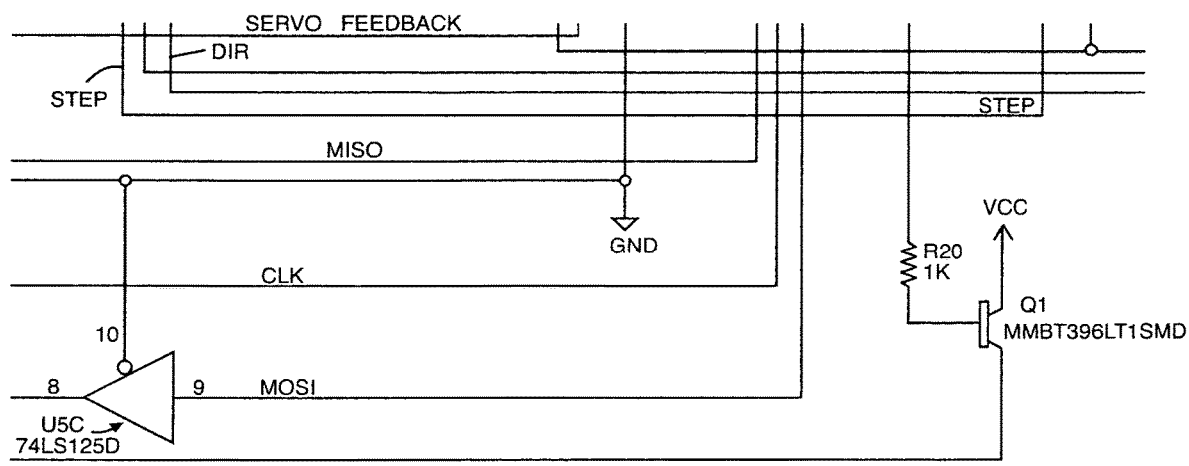

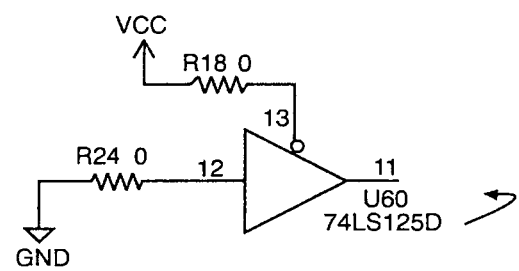

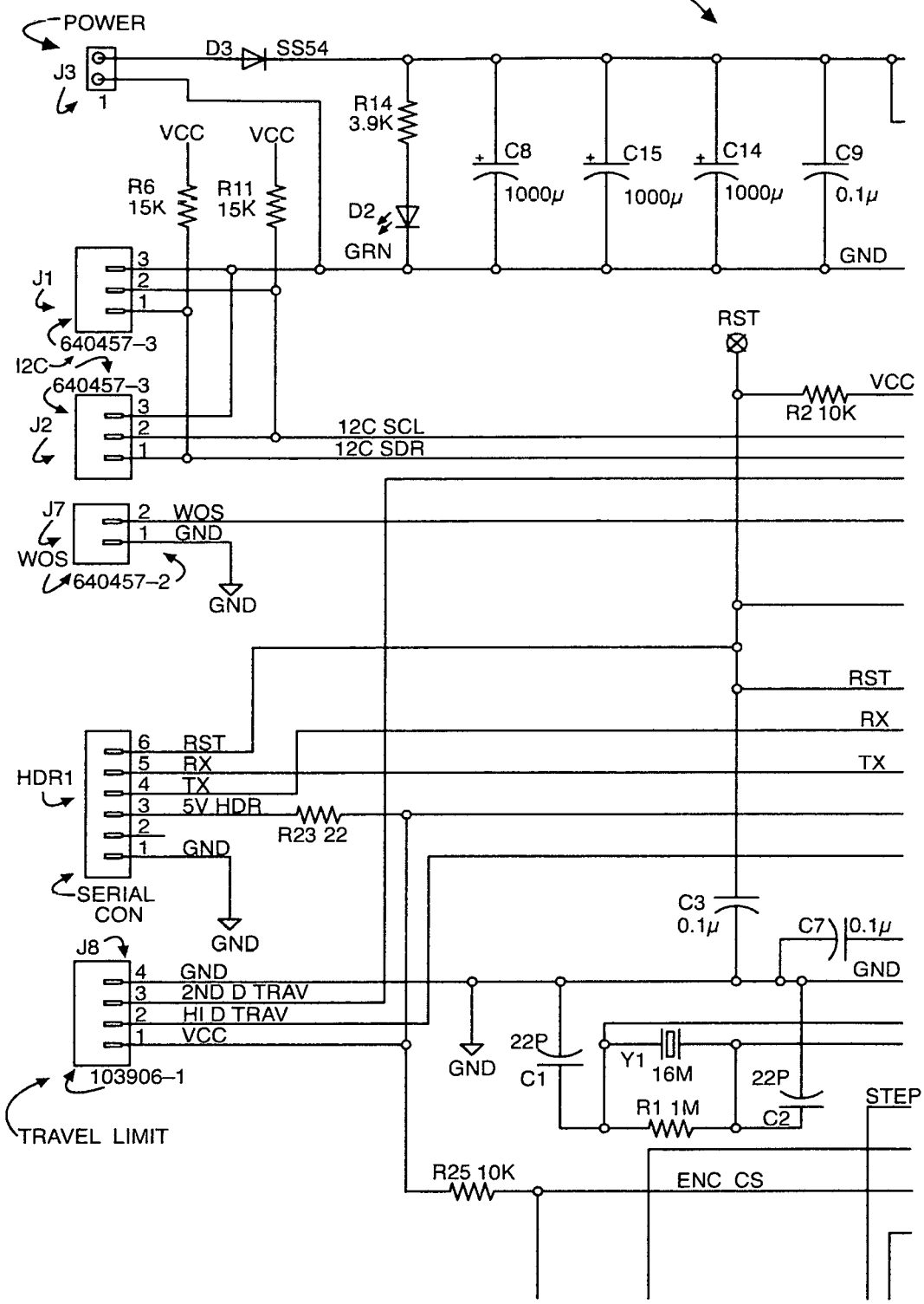
Fig. 54 (UPPER LEFT)

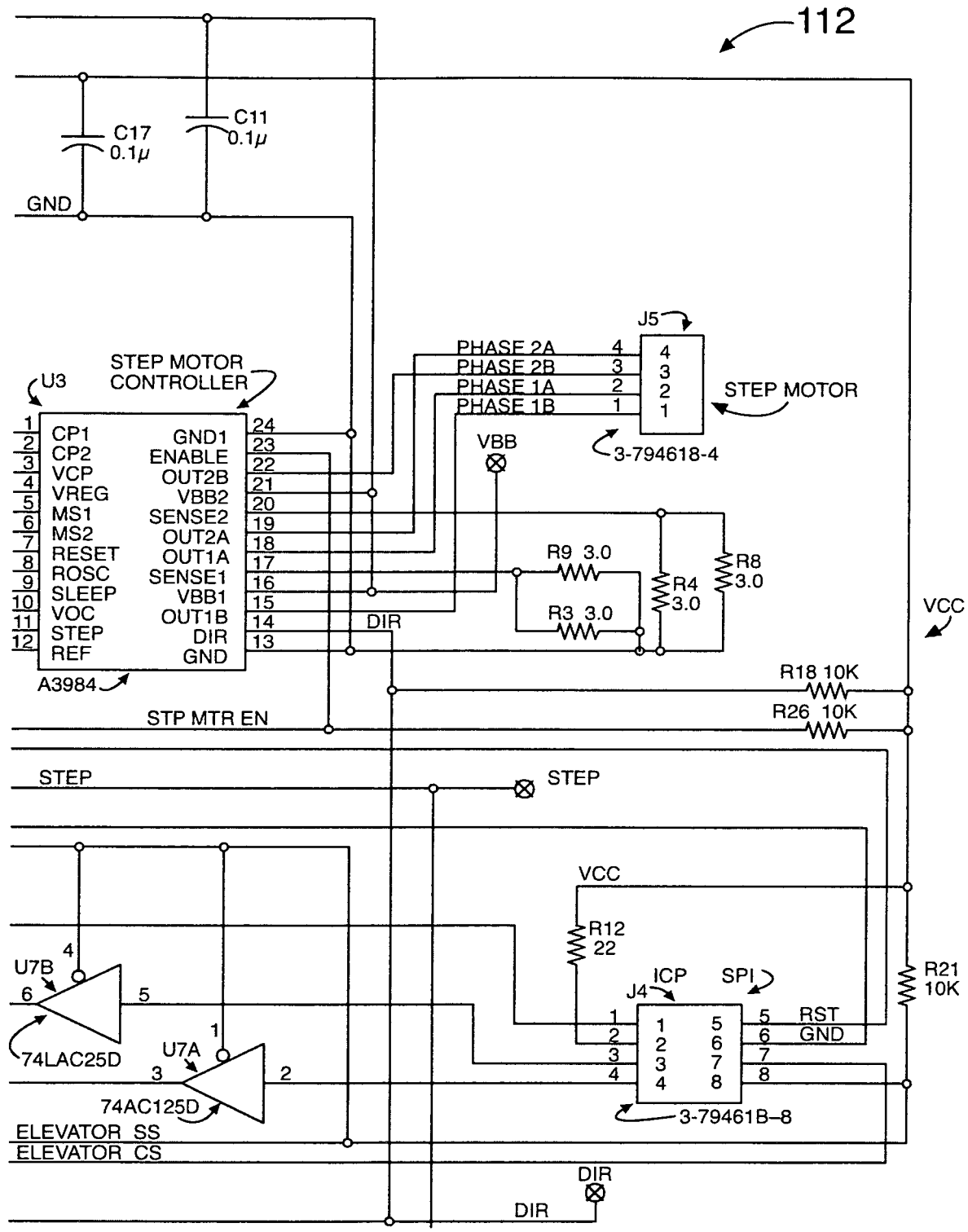

Fig. 54 (cont'd)
$\begin{pmatrix}\text{LOWER}\\\text{LEFT}\end{pmatrix}$ 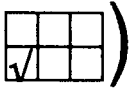
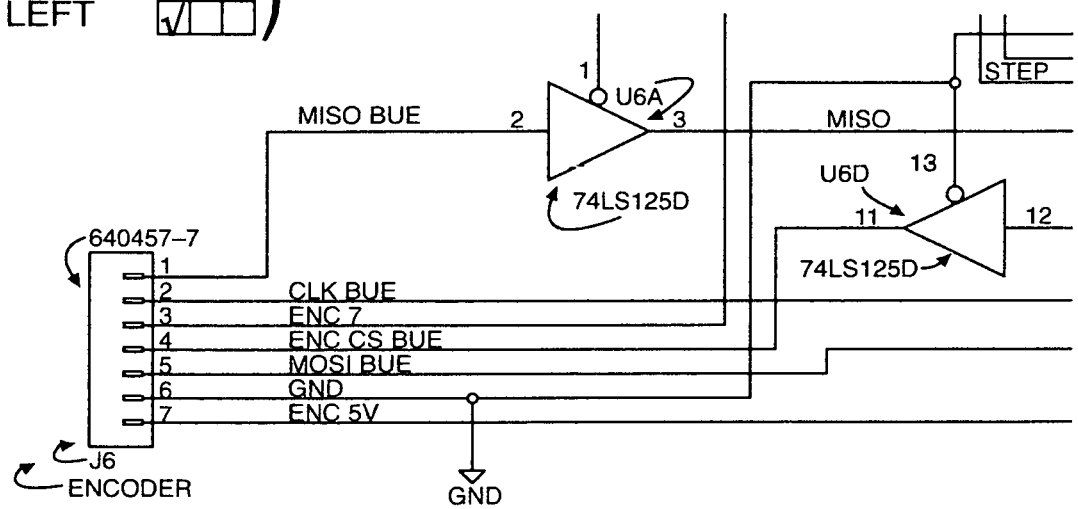

Fig. 54 (cont'd)
(LOWER MIDDLE )
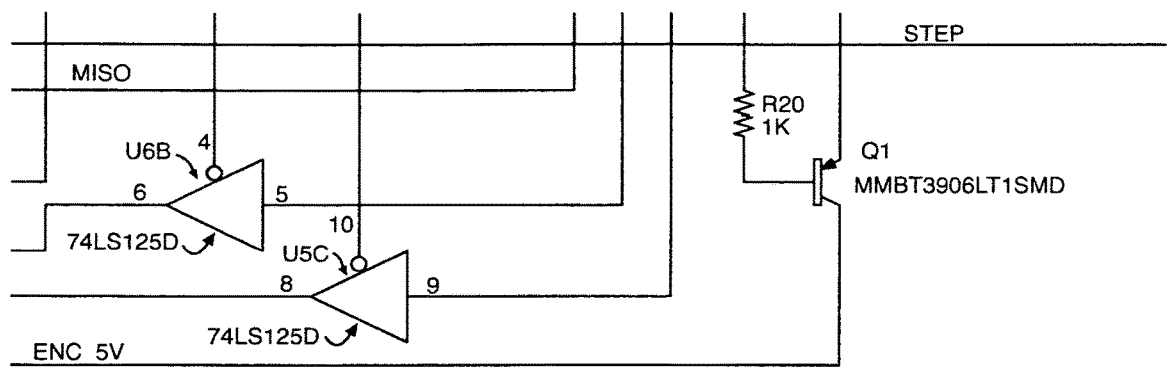

Fig. 54 (cont'd) (LOWER RIGHT 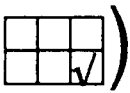)
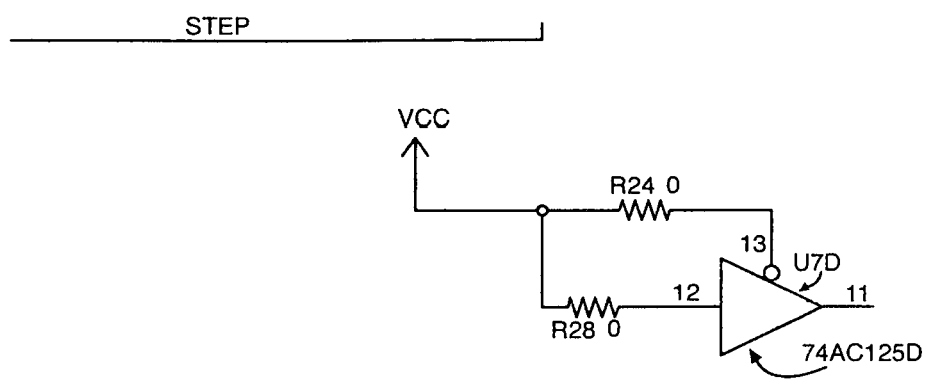

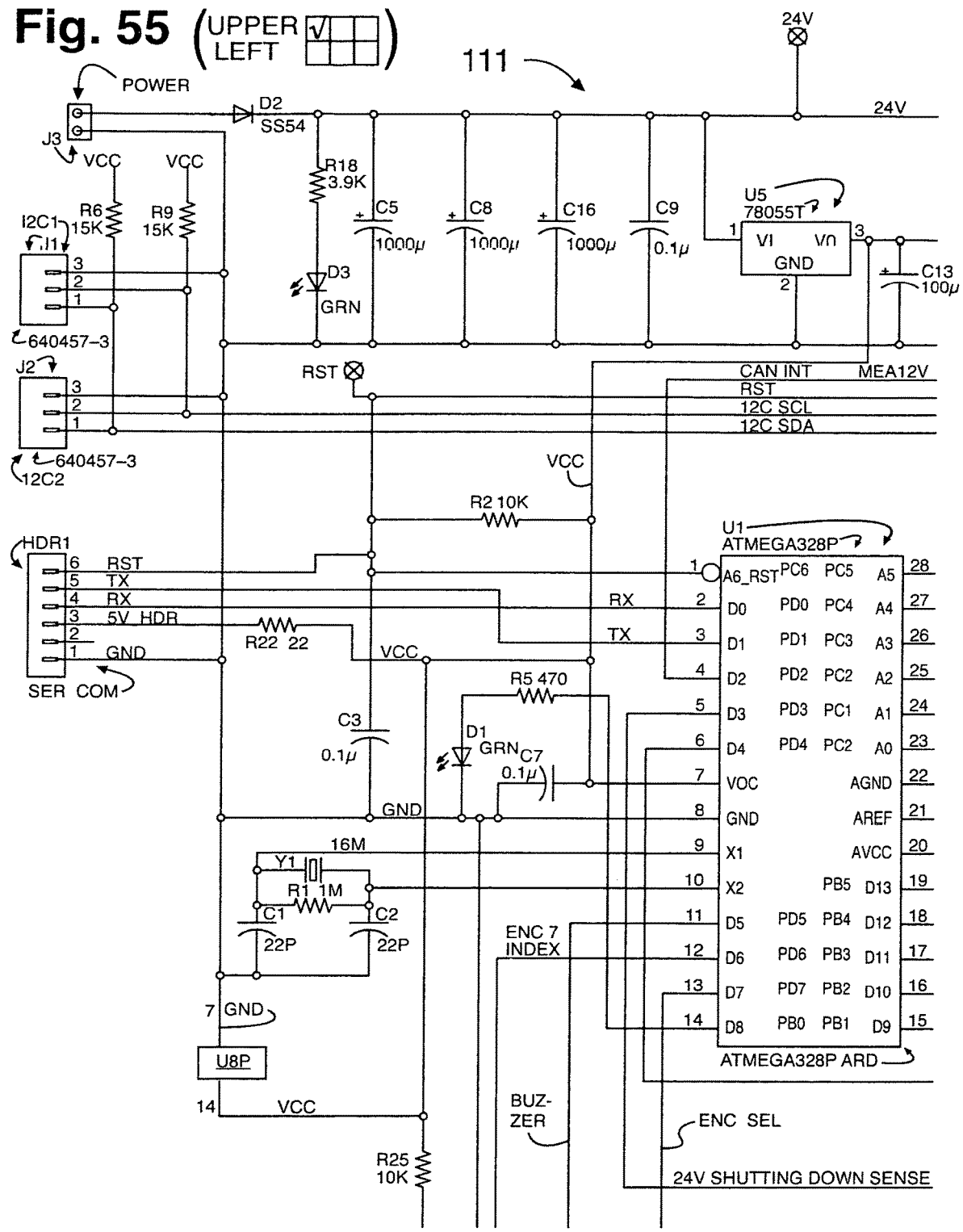
Fig. 55 (UPPER LEFT ✓)

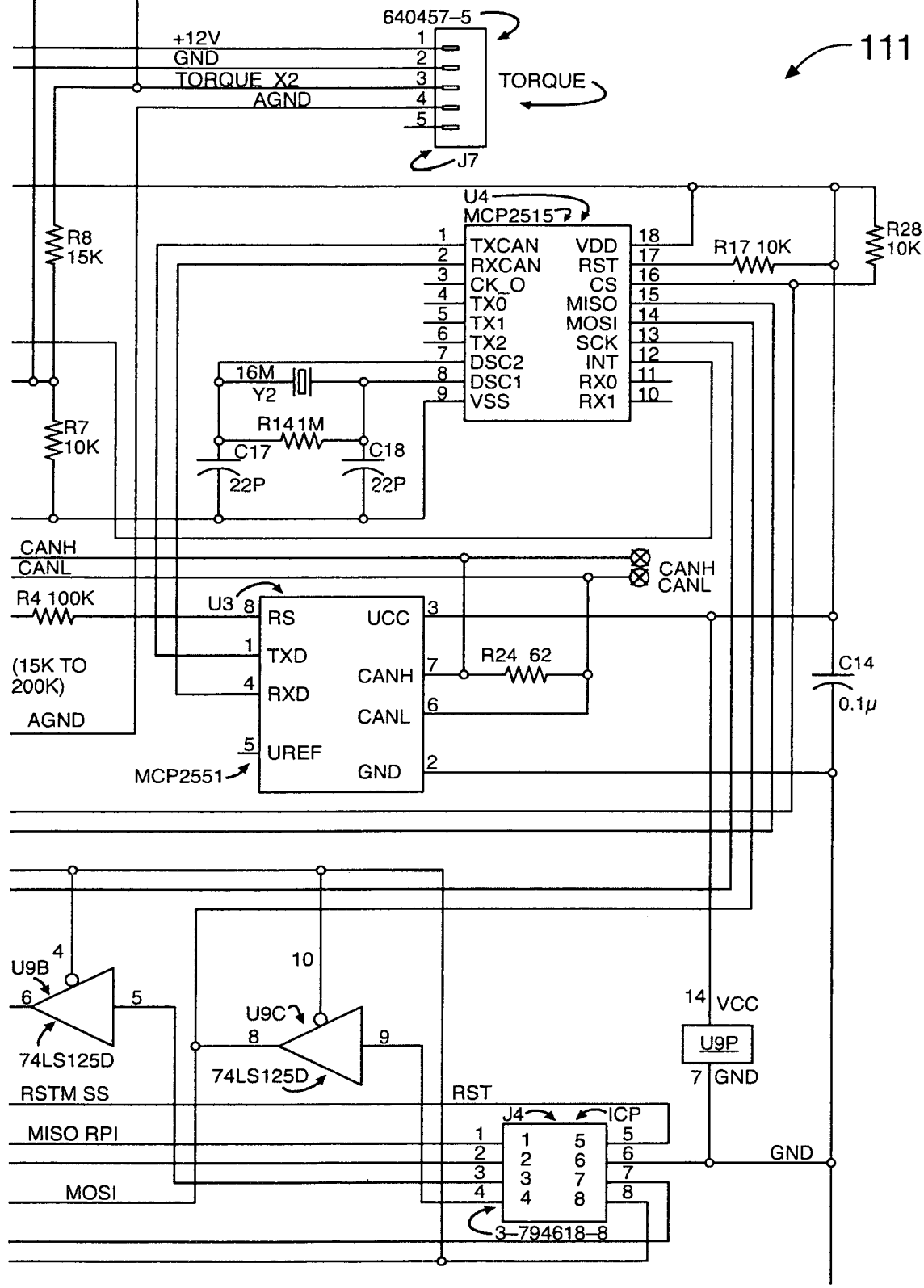
Fig. 55 (cont'd) (UPPER RIGHT)

Fig. 55 (cont'd)
(LOWER LEFT 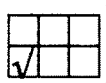)
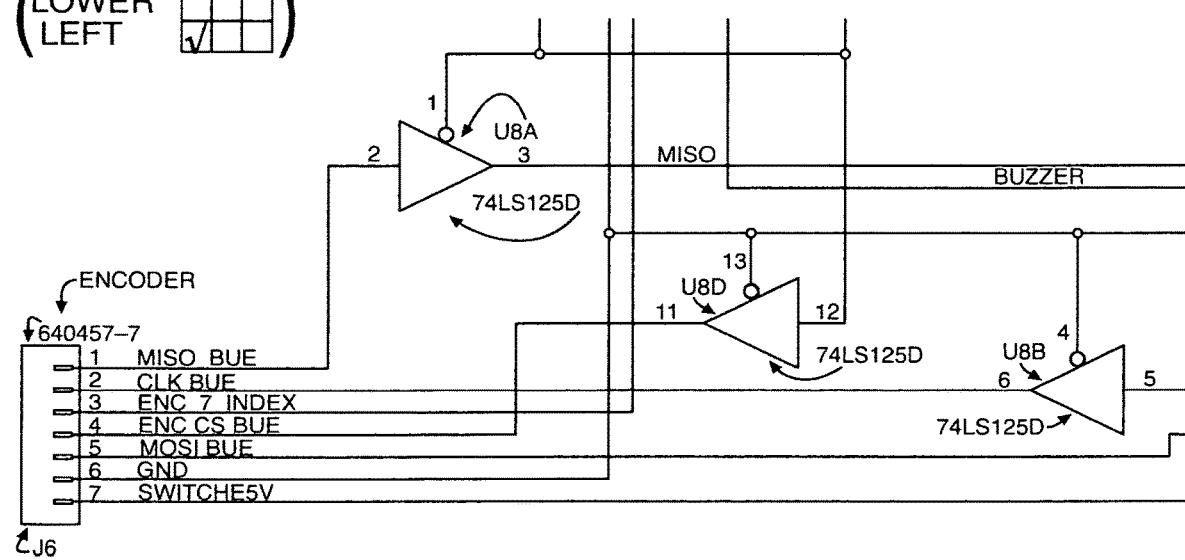

$\begin{pmatrix}\text{LOWER}\\\text{MIDDLE}\end{pmatrix}$

Fig. 55 (cont'd)
$\begin{pmatrix}\text{LOWER}\\\text{RIGHT}\end{pmatrix}$ 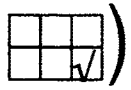
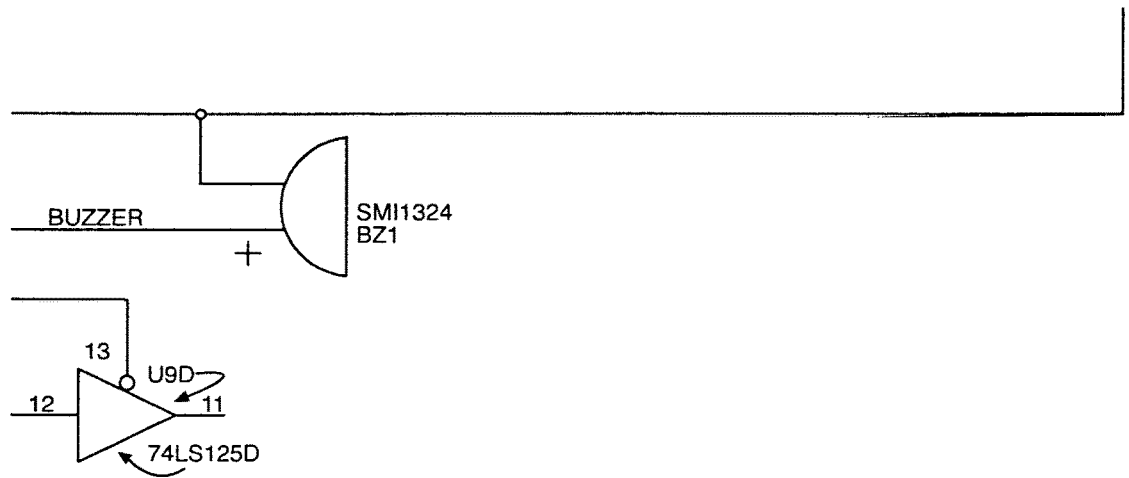

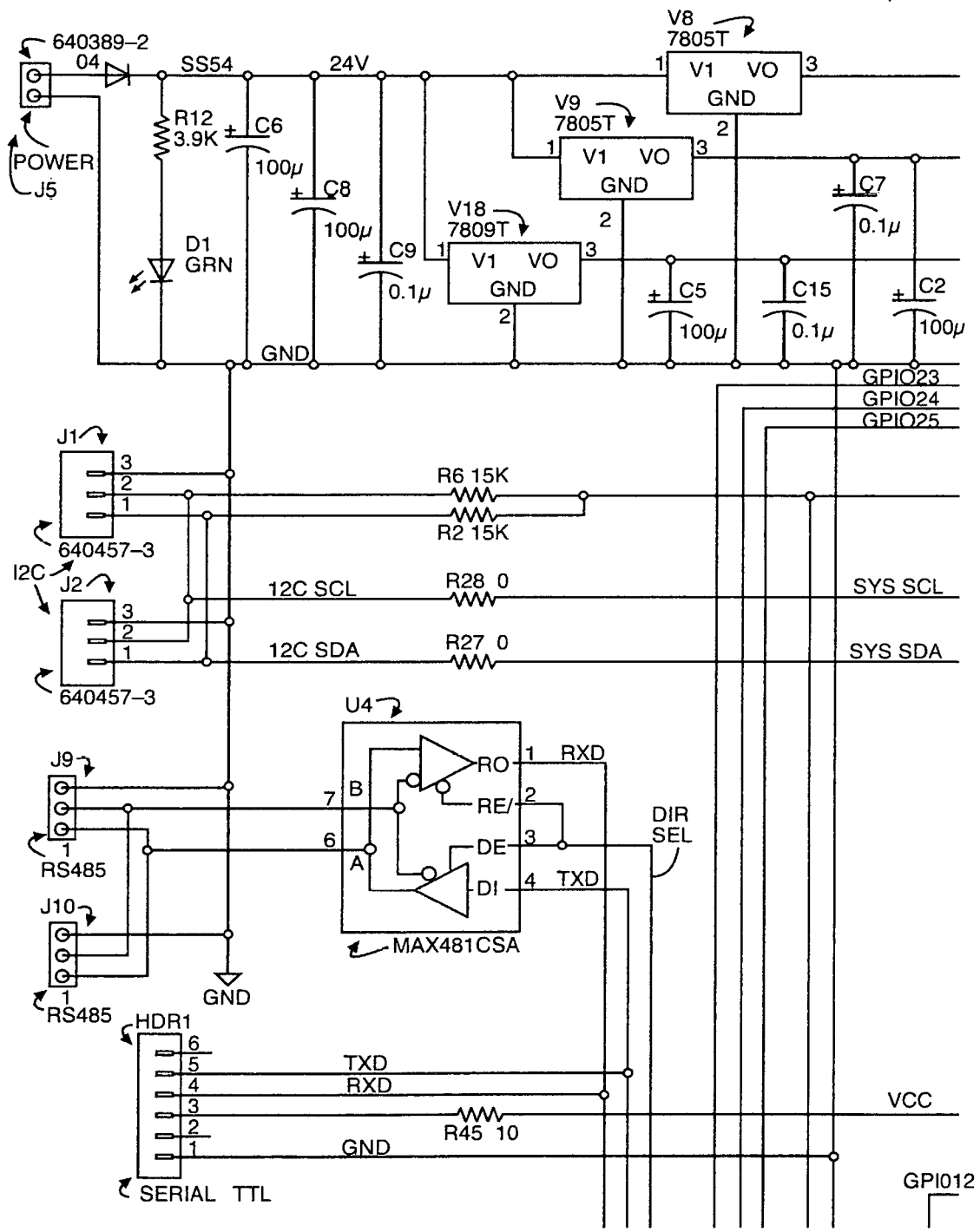
Fig. 56 (UPPER LEFT 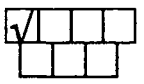)

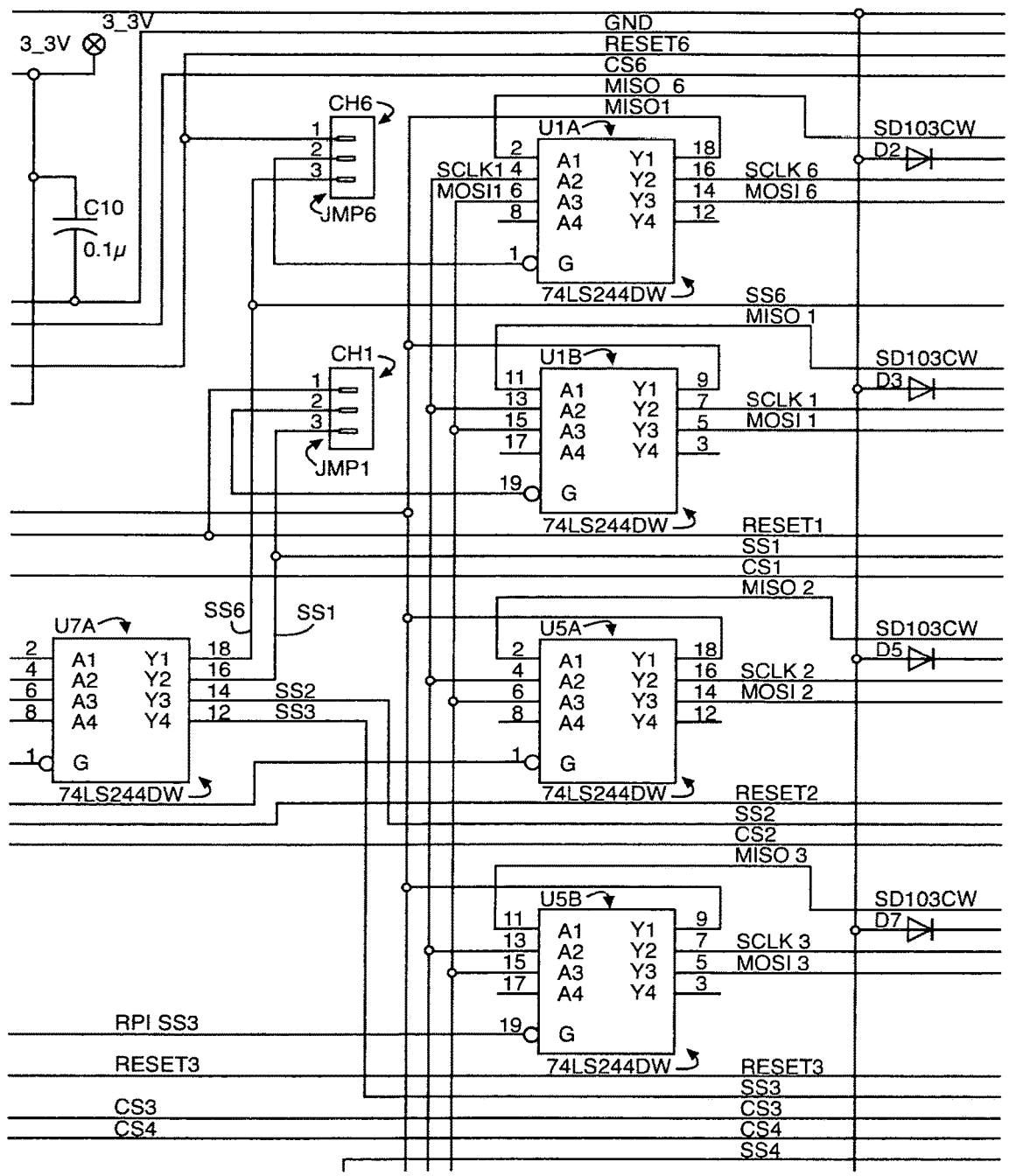

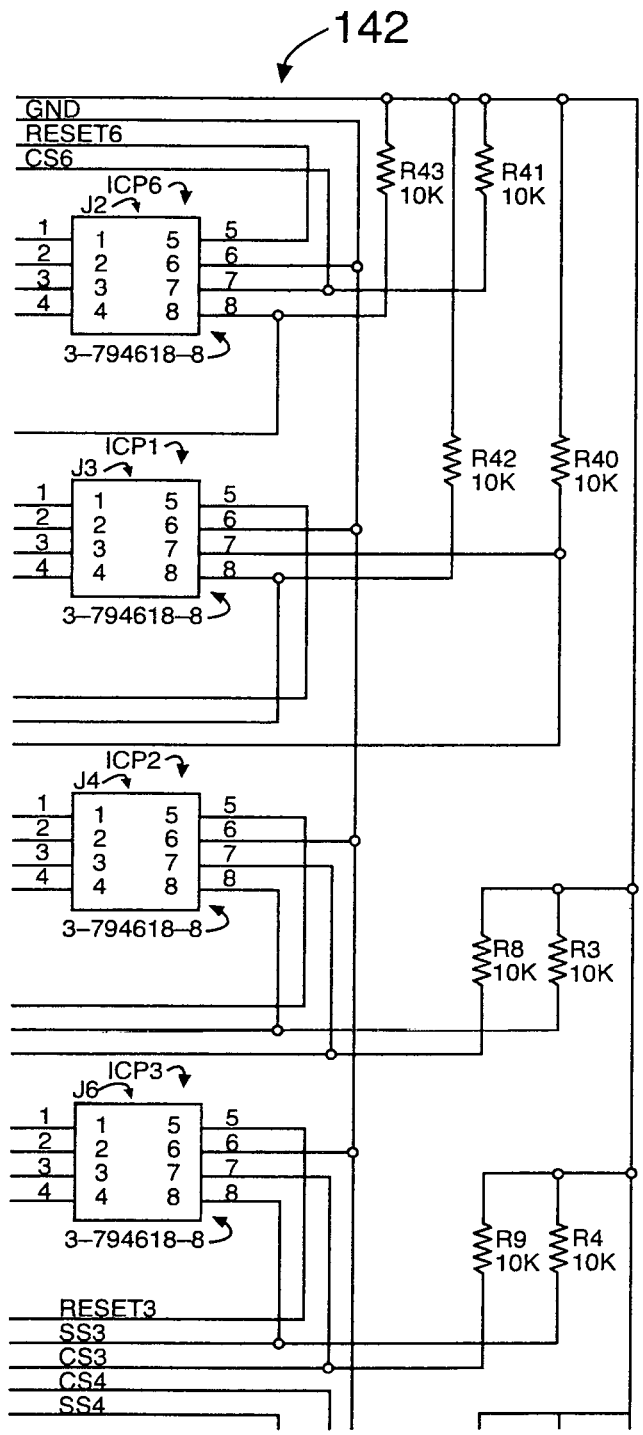
Fig. 56 (cont'd) (UPPER RIGHT)

Fig. 56 (cont'd) (LOWER LEFT)
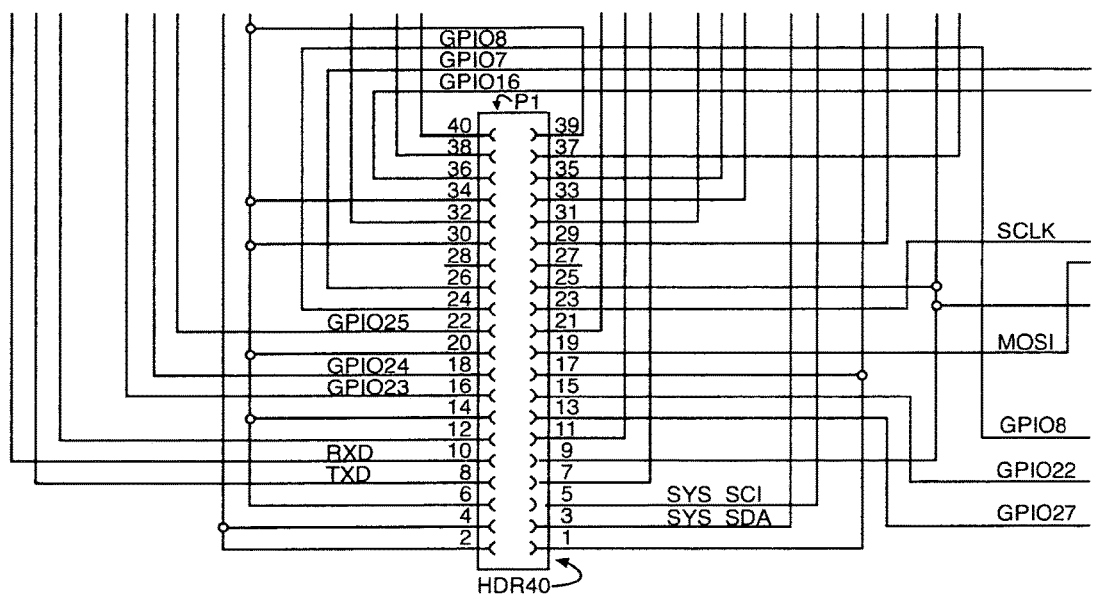

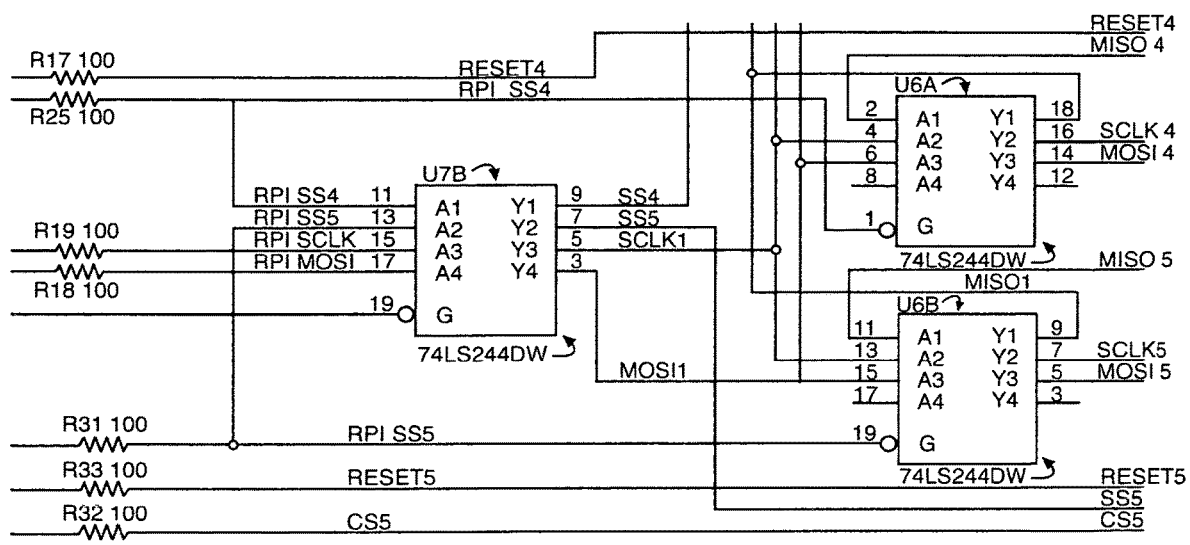

Fig. 56 (cont'd) (LOWER RIGHT)
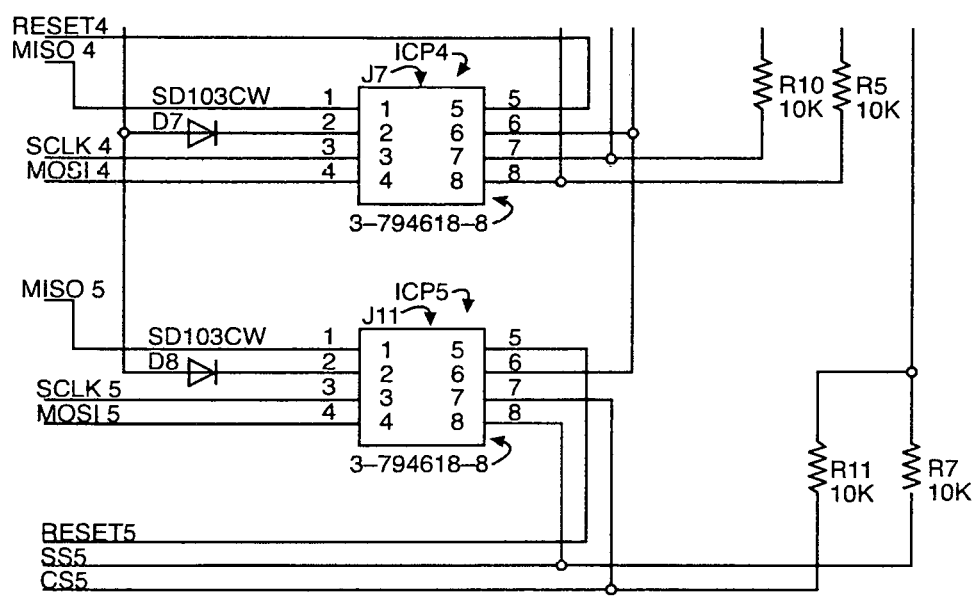

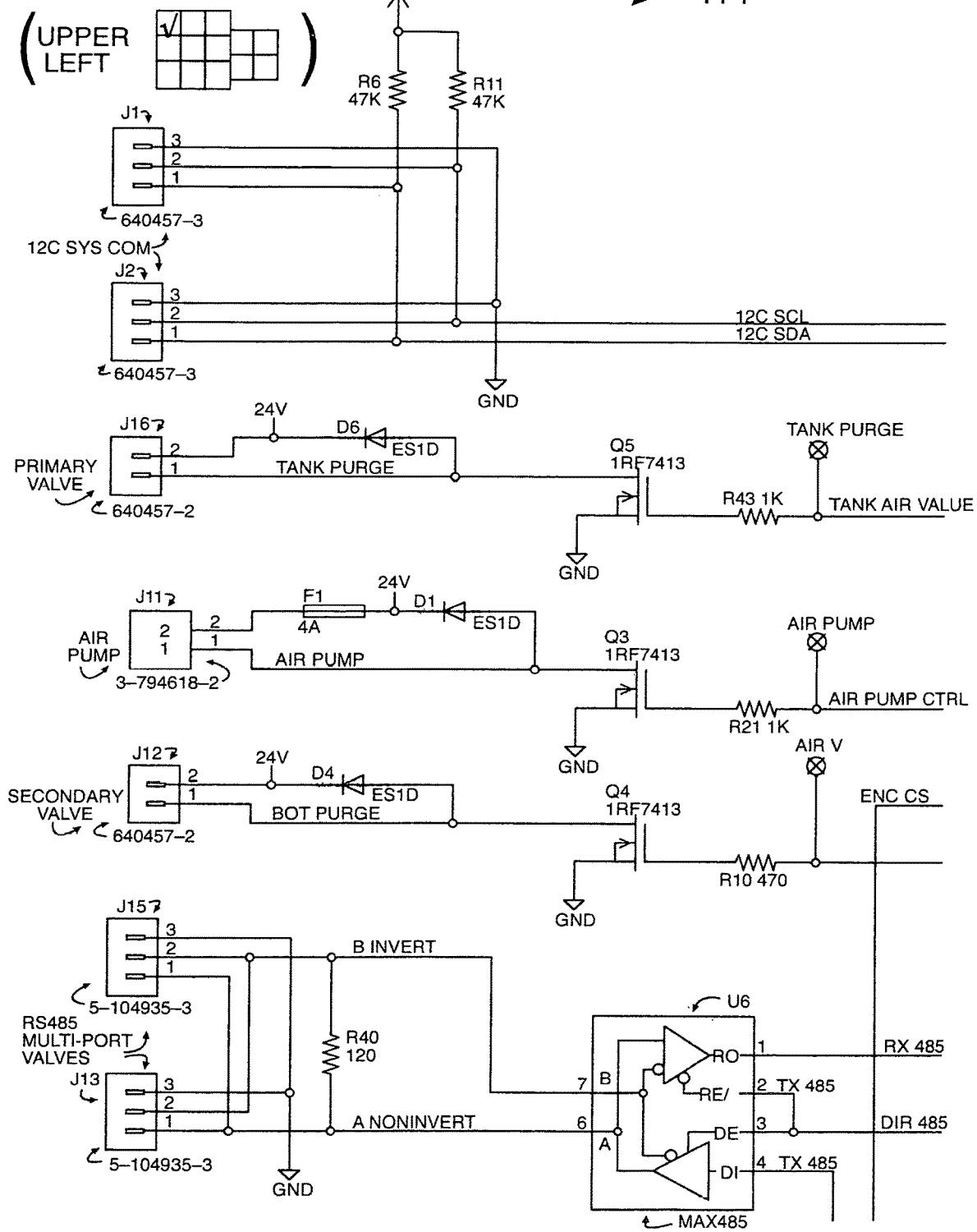

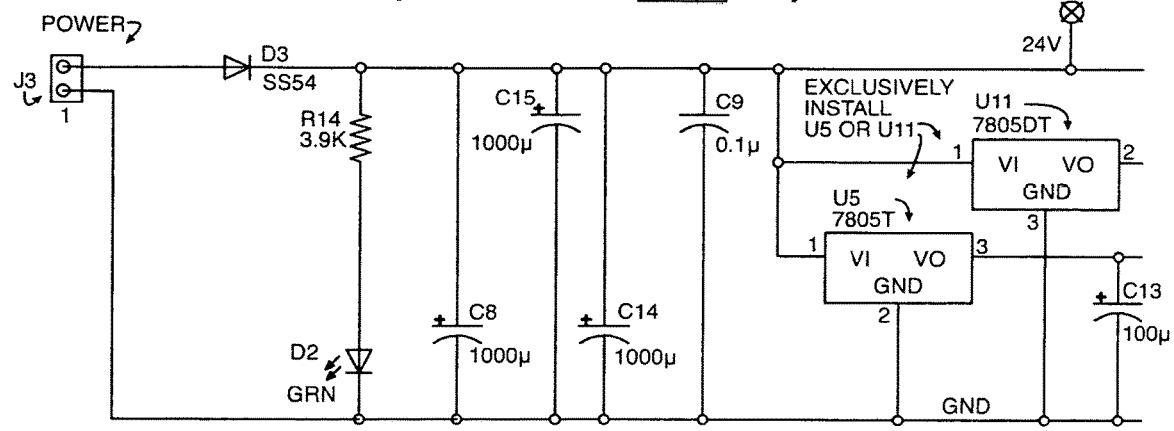
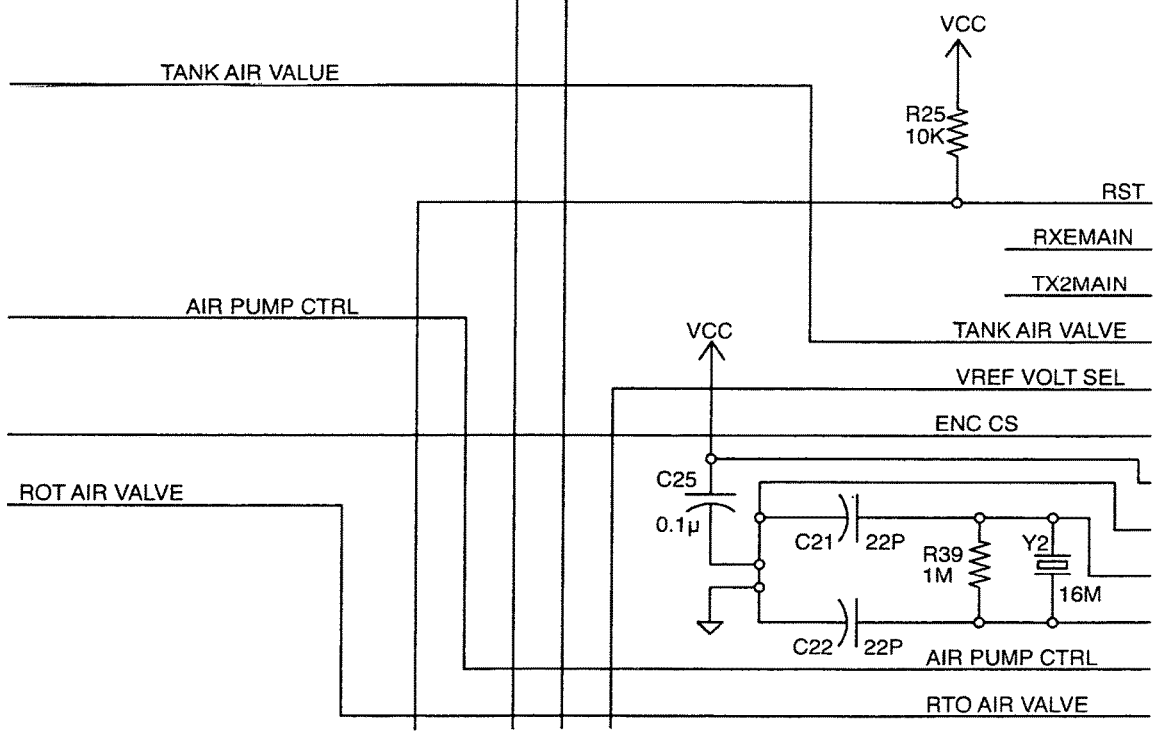

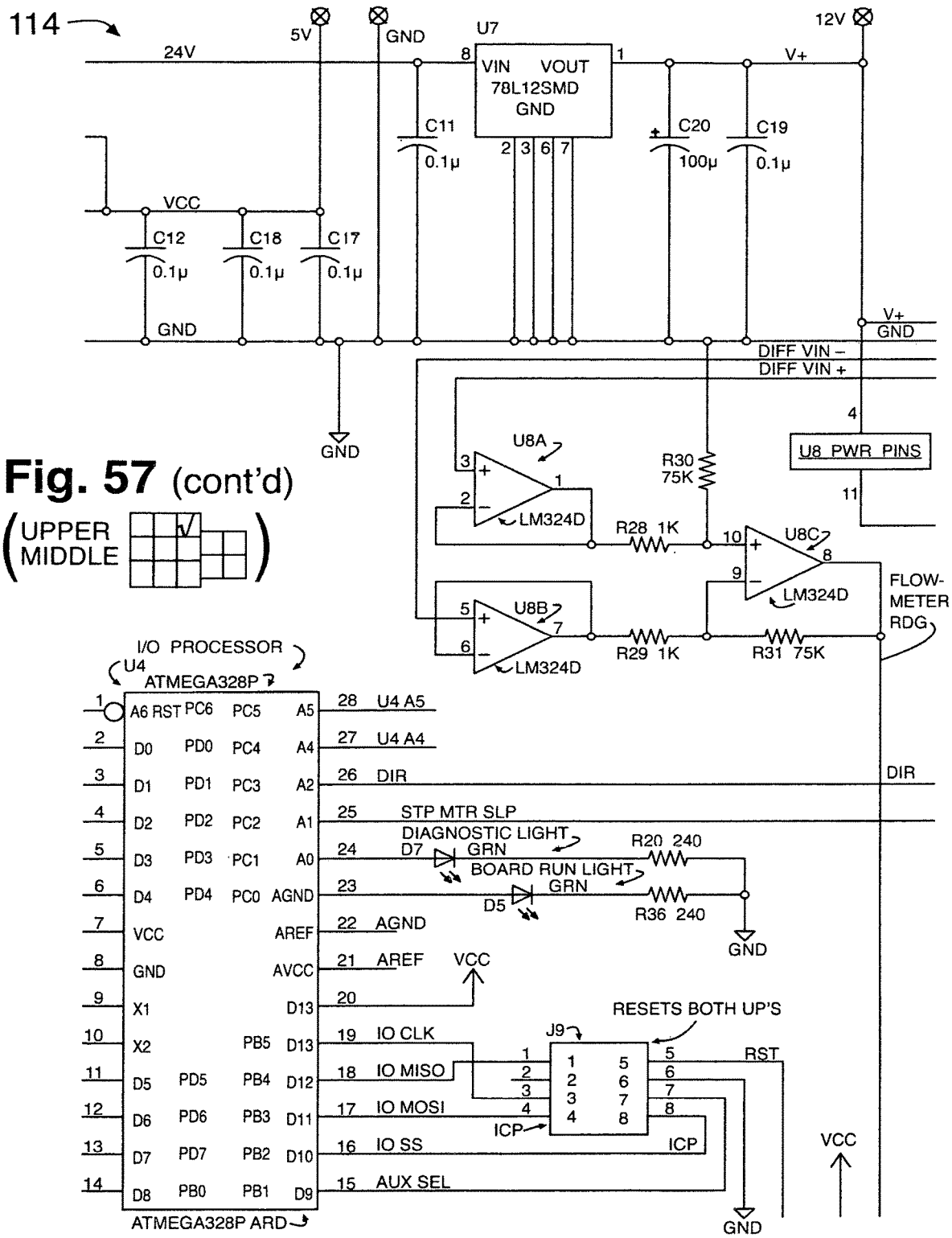
Fig. 57 (cont'd) (UPPER MIDDLE)

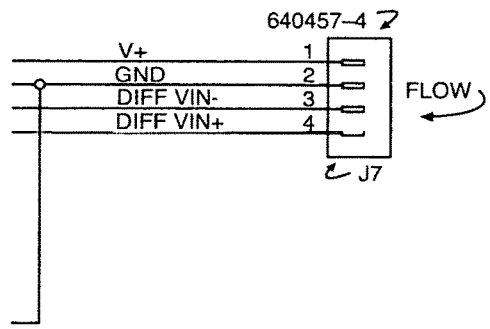
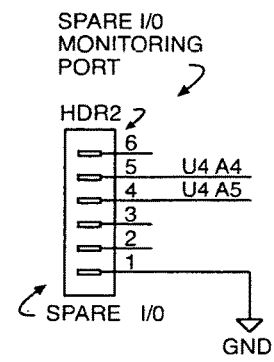
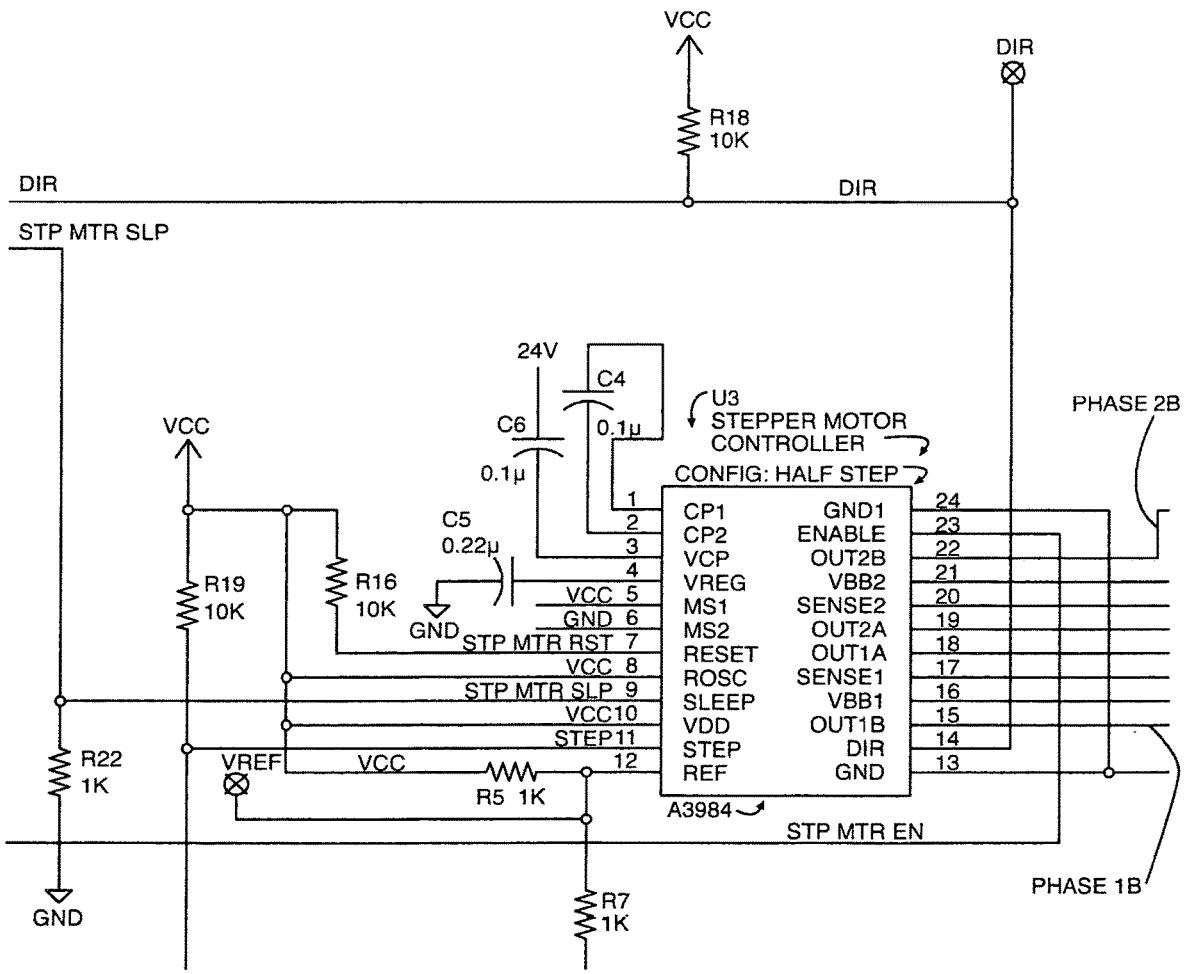

Fig. 57 (cont'd)
114
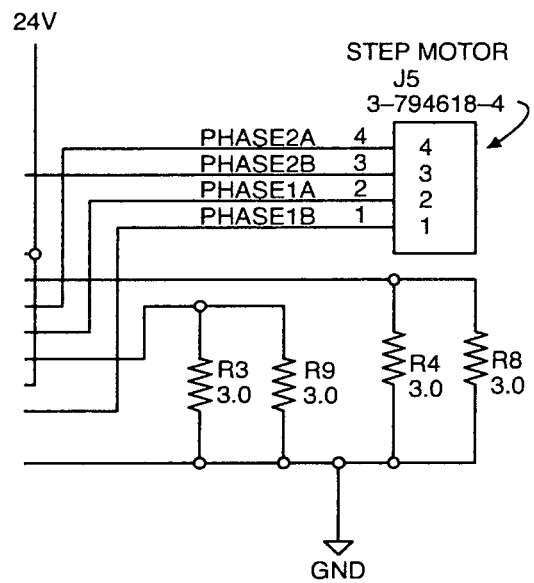

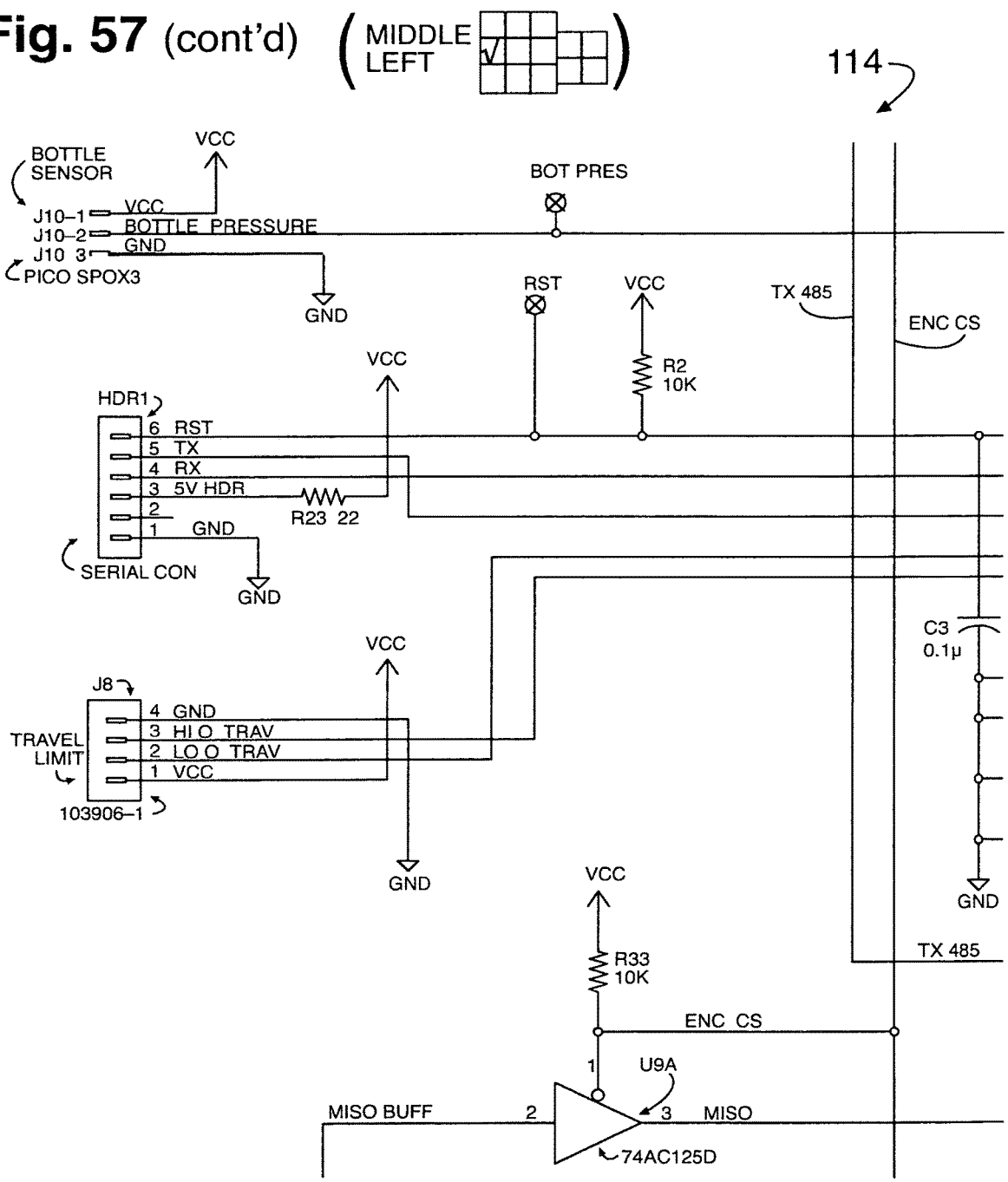
Fig. 57 (cont'd) (MIDDLE LEFT ✓)

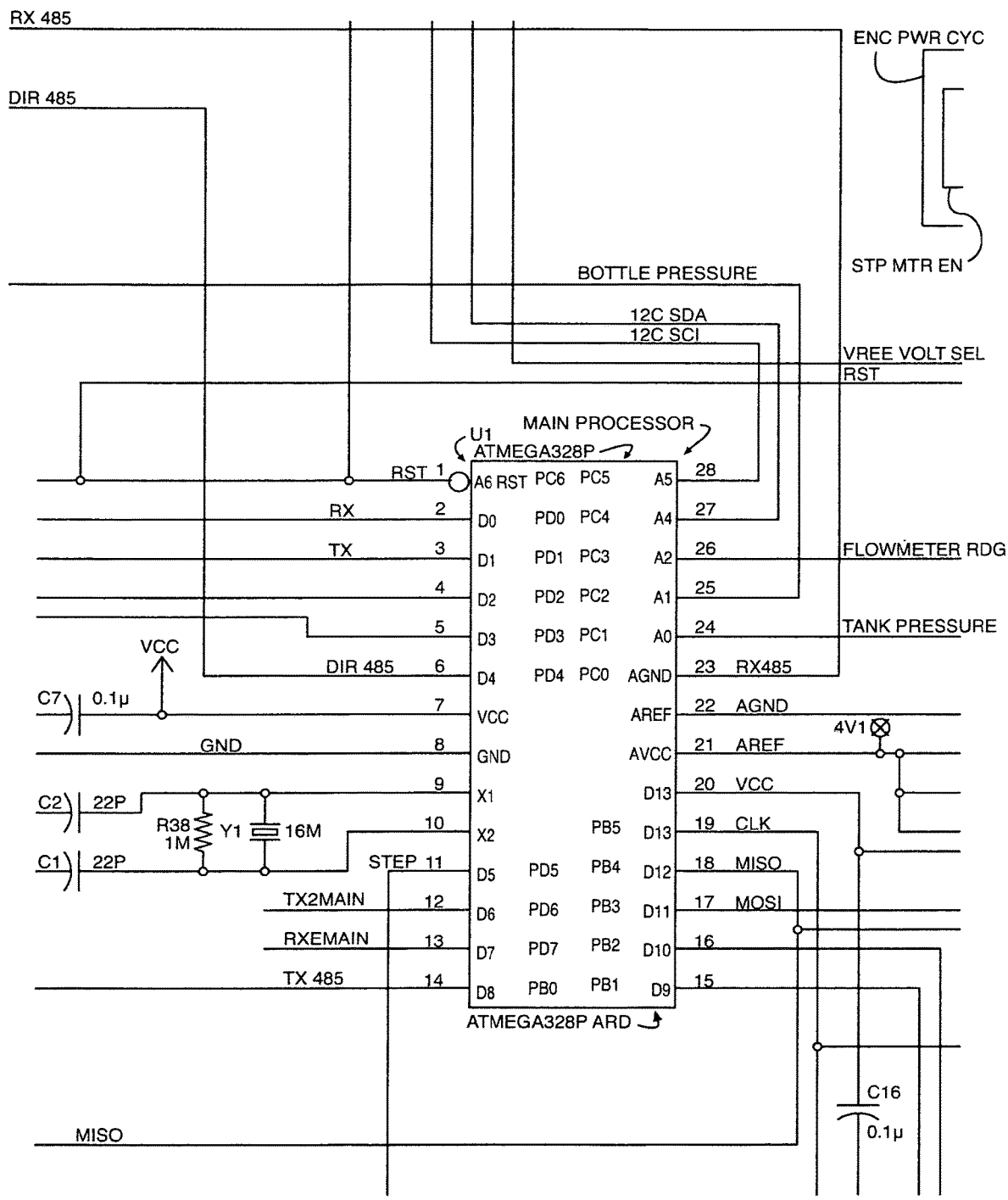

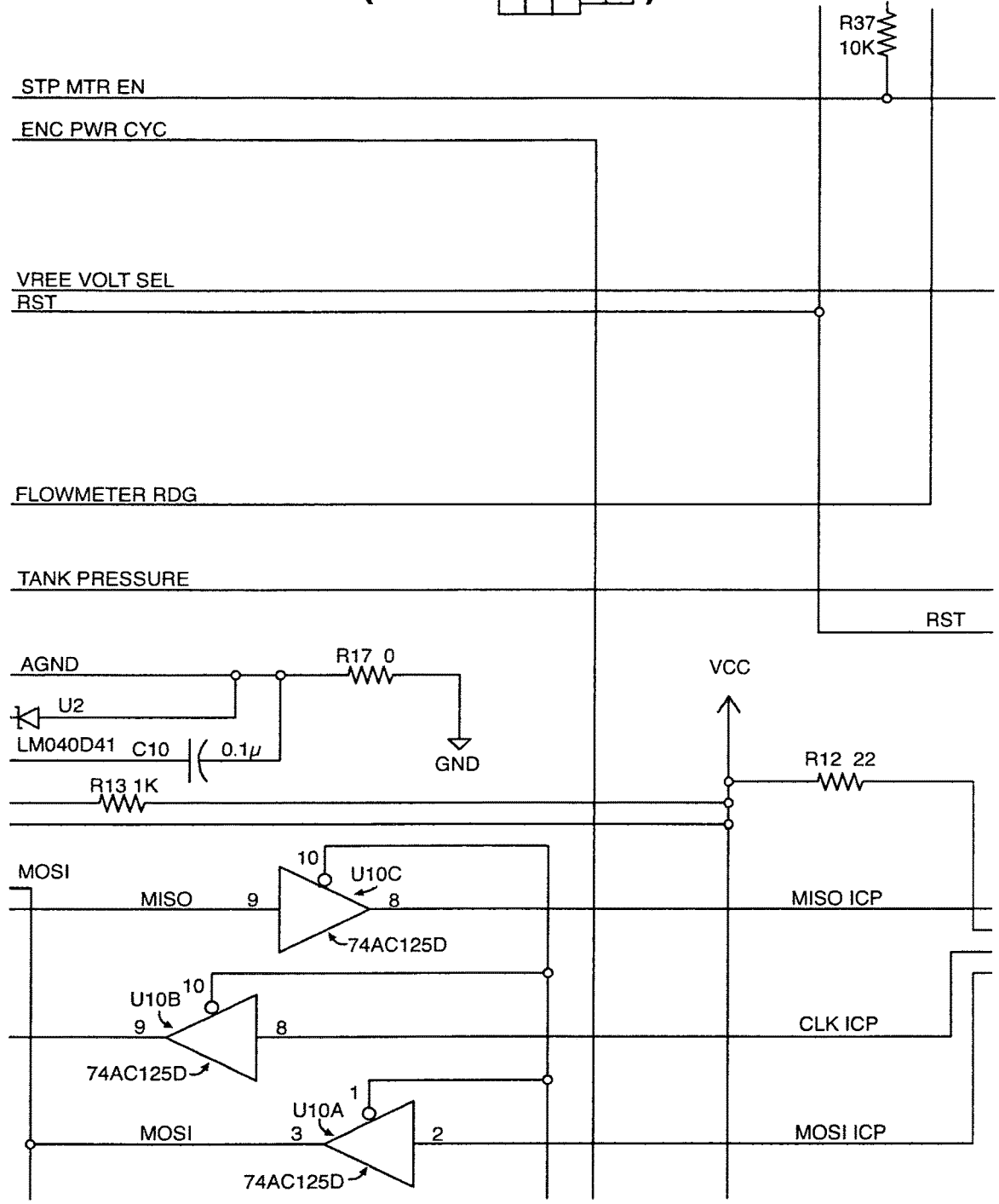
Fig. 57 (cont'd) (MIDDLE RIGHT)

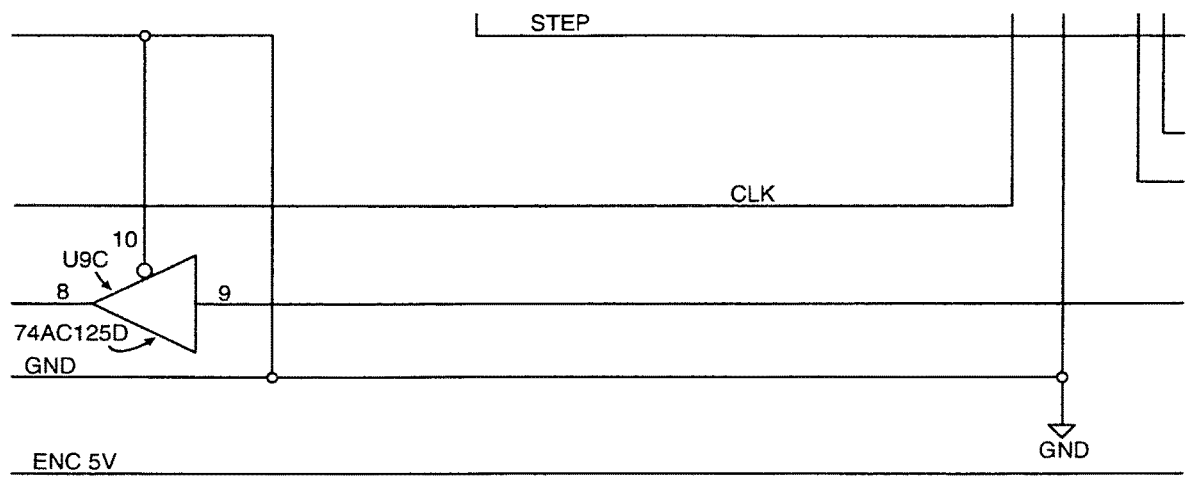
114

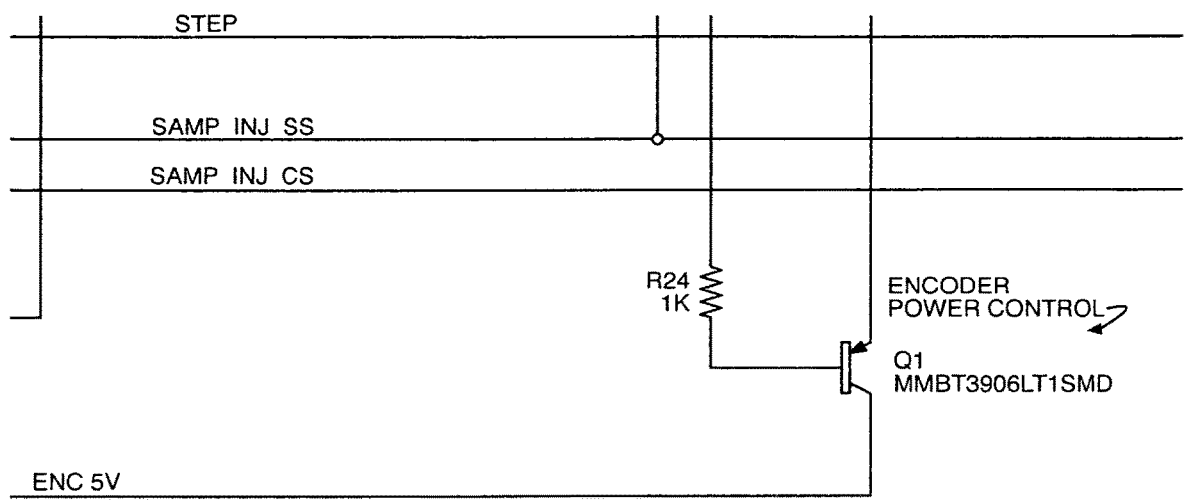
114

(LOWER MIDDLE RIGHT)

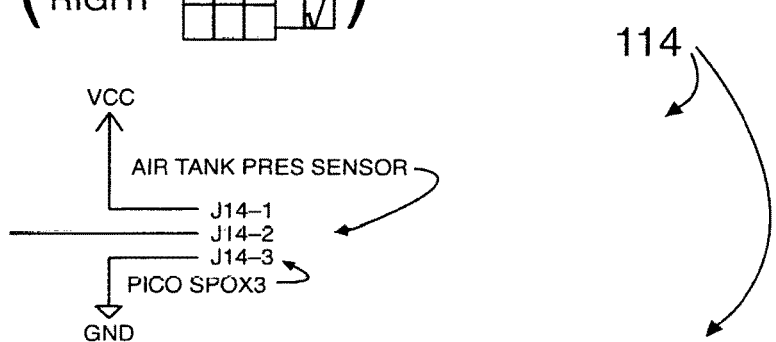
114
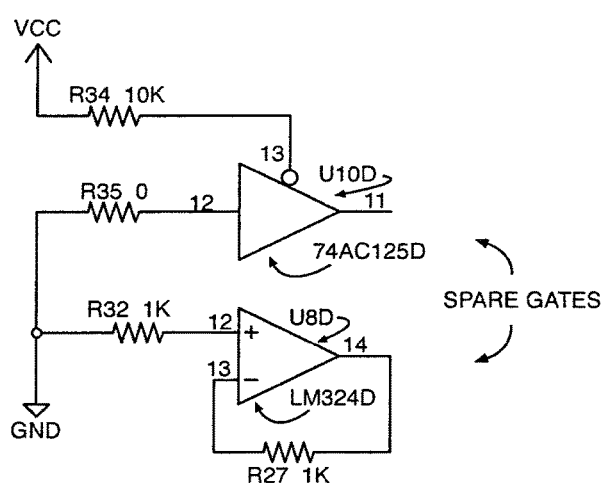

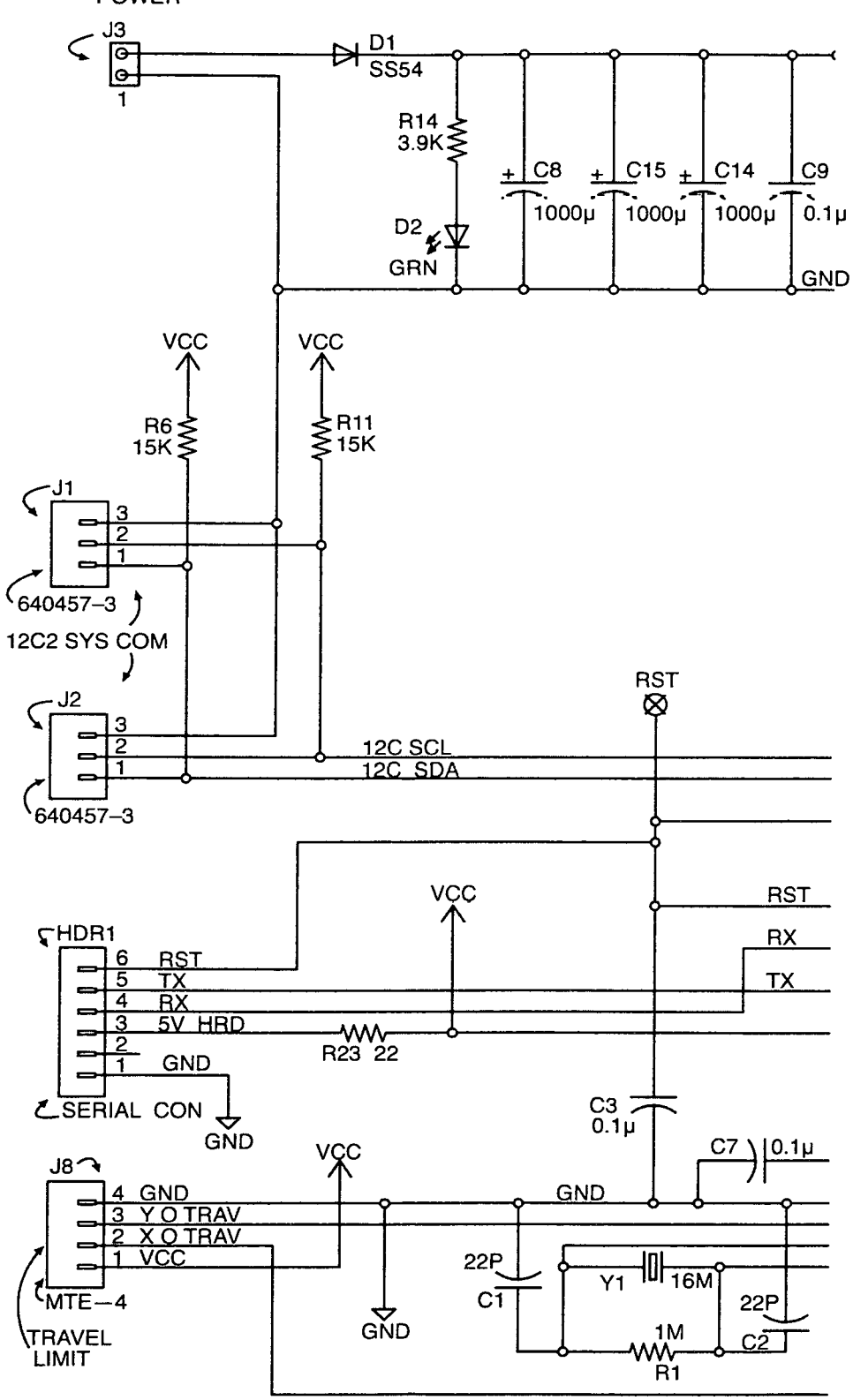
Fig. 58 (UPPER LEFT)

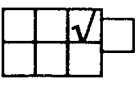
Fig. 58 (cont'd) (UPPER MIDDLE RIGHT)
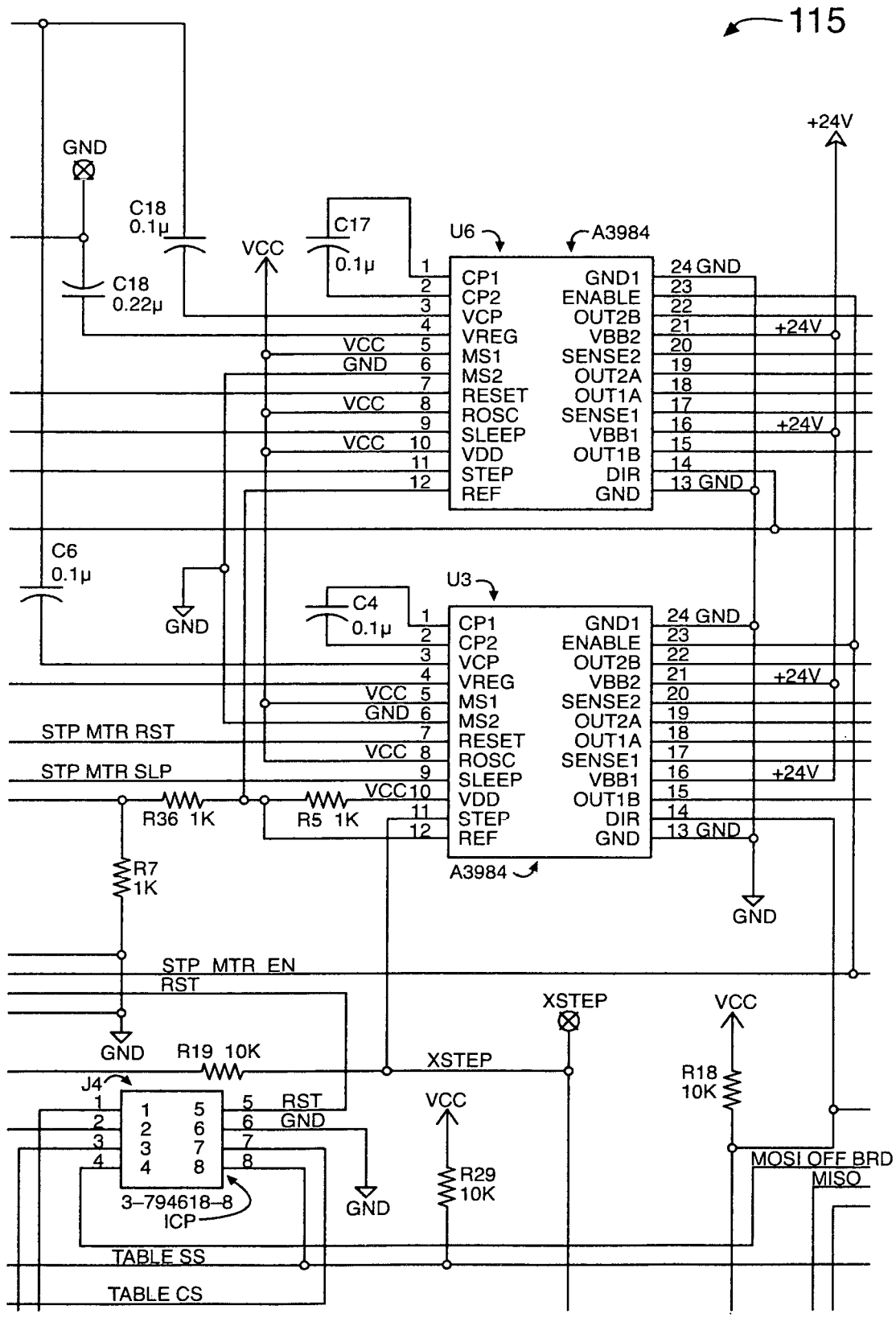

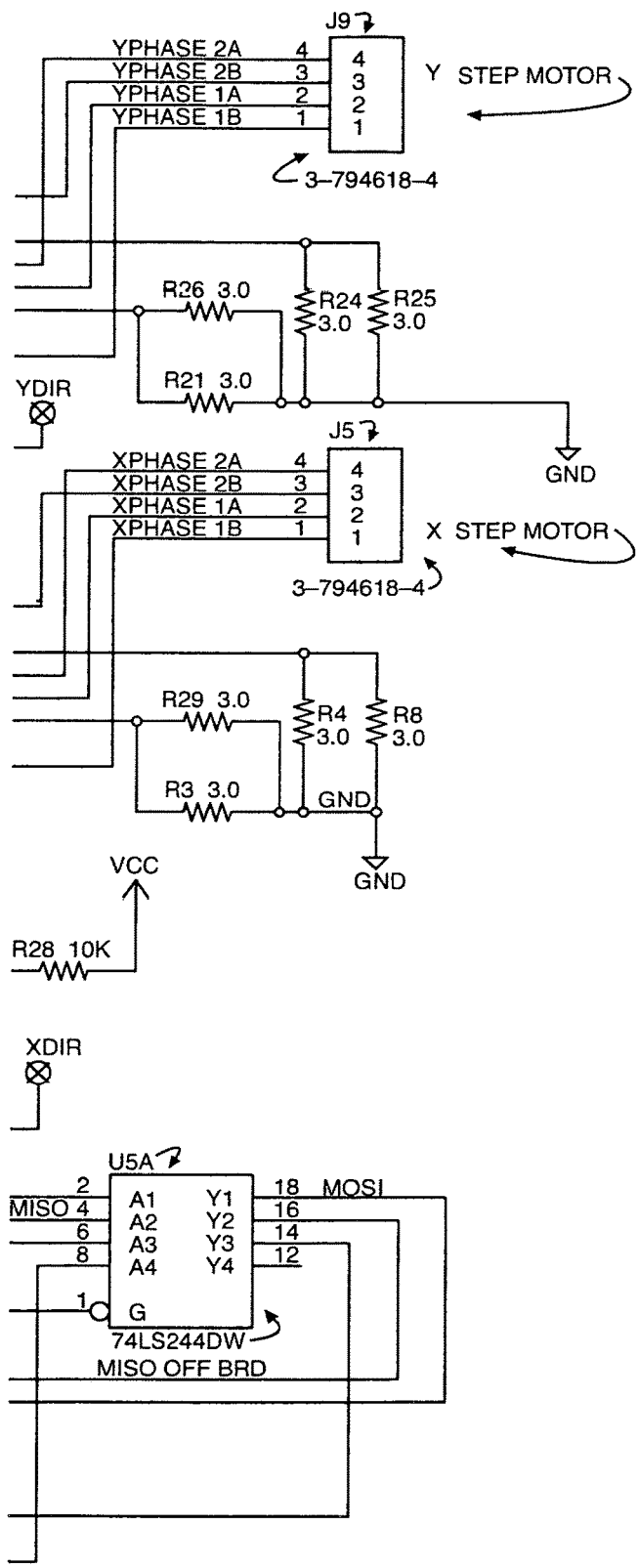
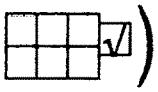
Fig. 58 (cont'd)
(FAR RIGHT)

Fig. 58 (cont'd)
(LOWER LEFT 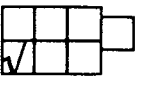)
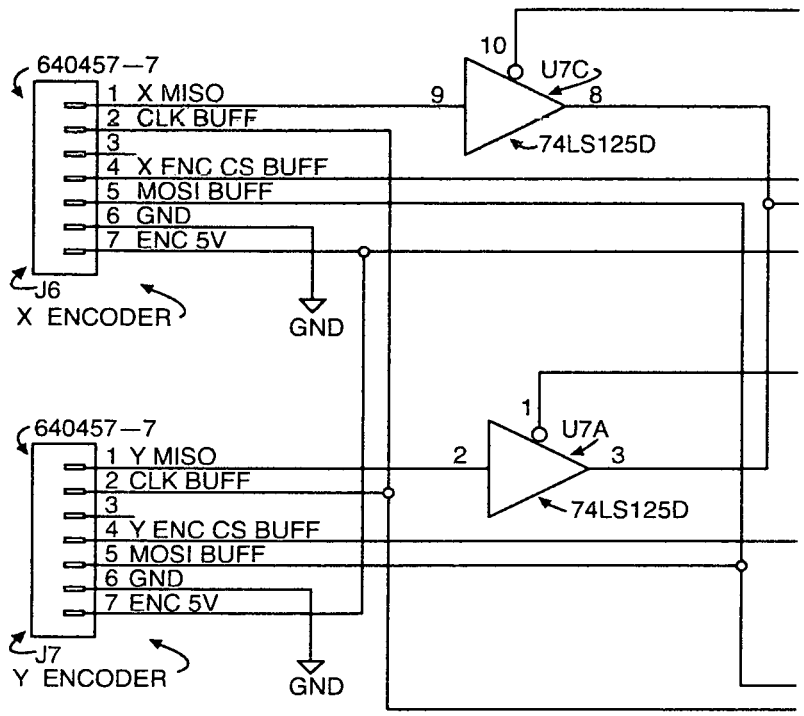
115

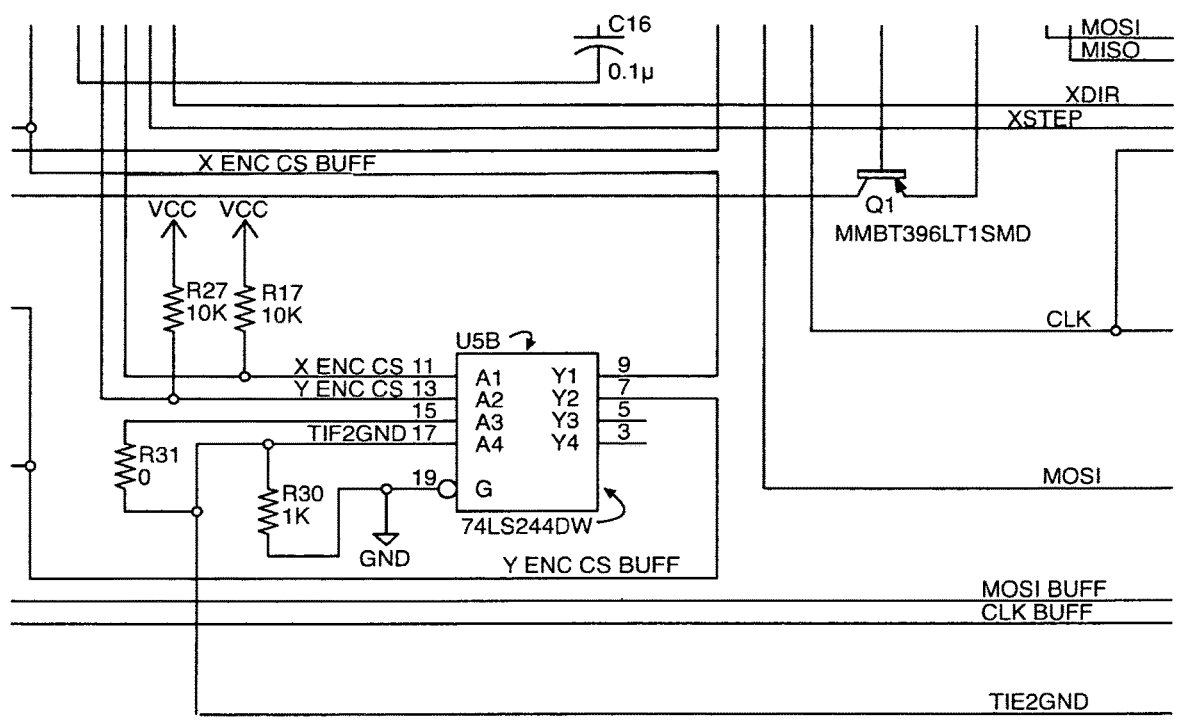

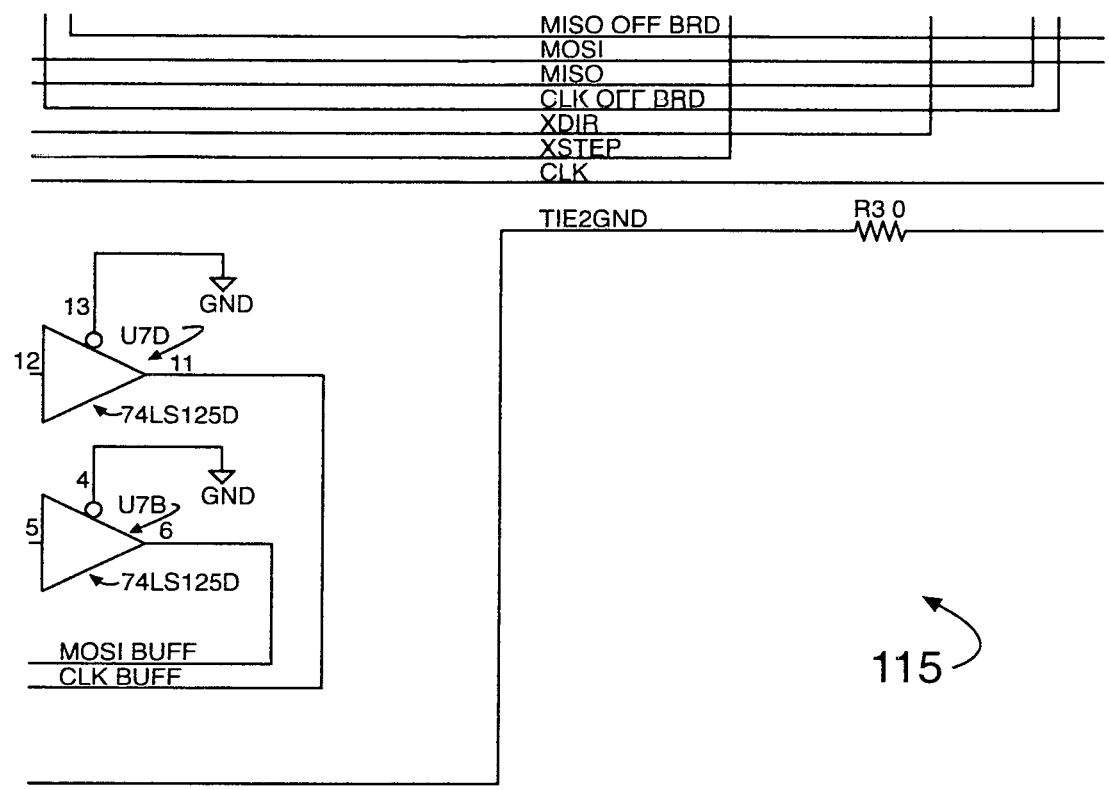

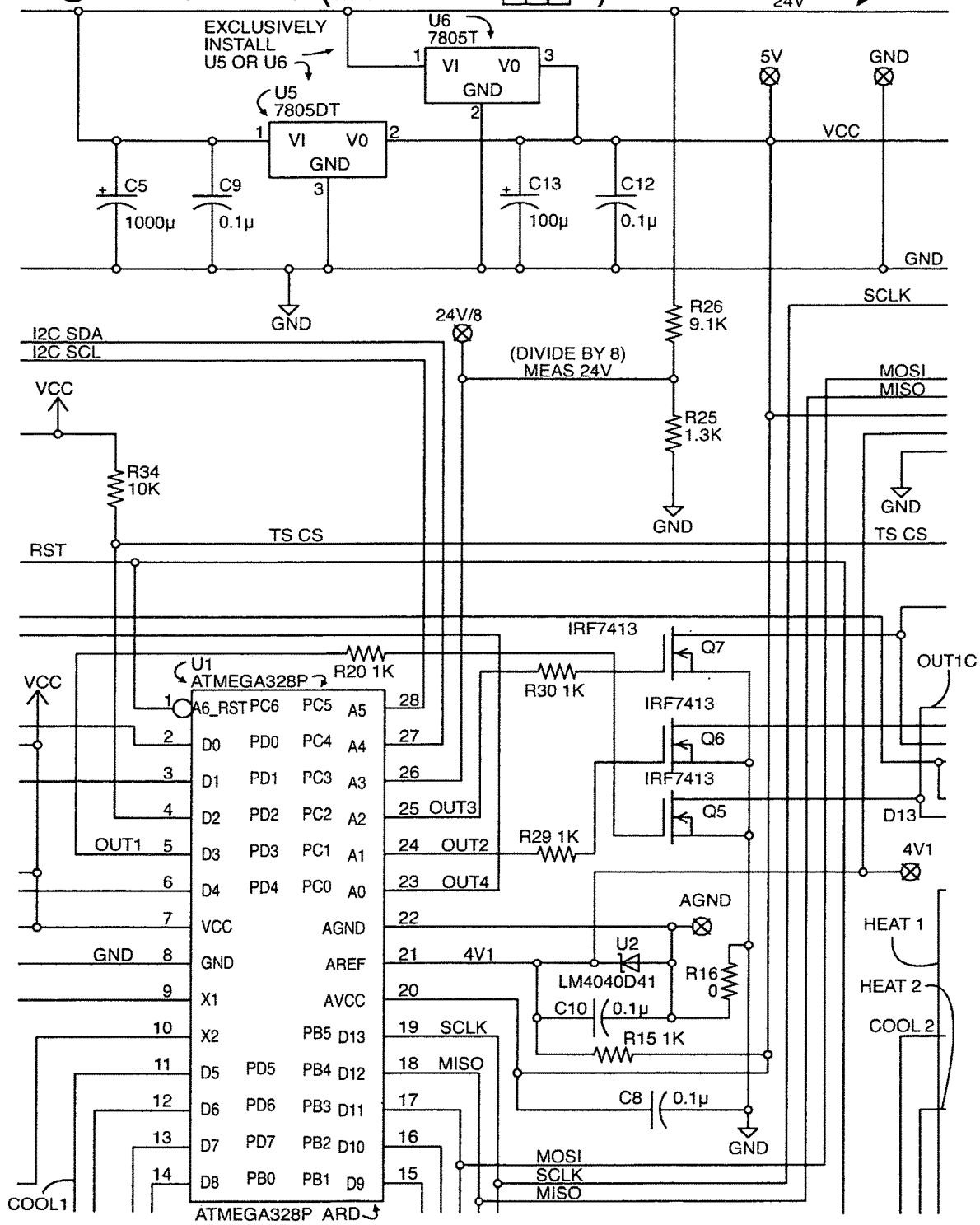
Fig. 59 (cont'd) (UPPER MIDDLE LEFT)

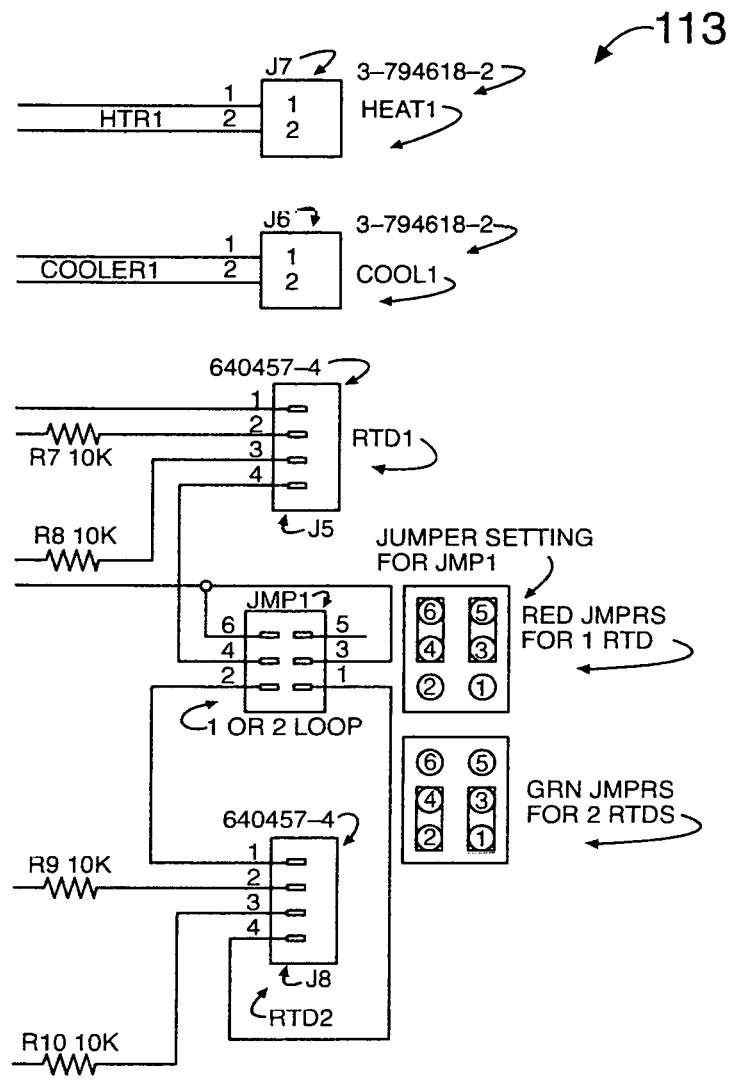
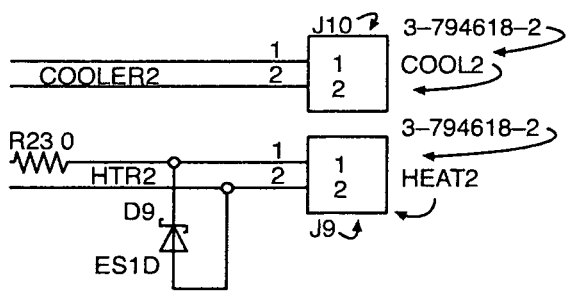

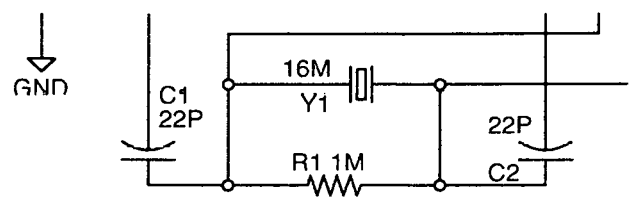
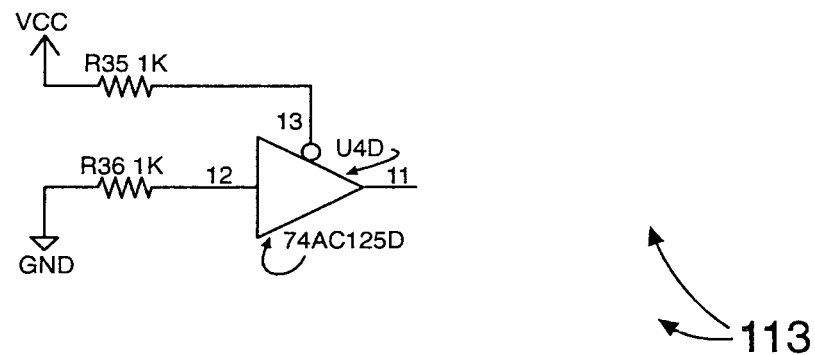

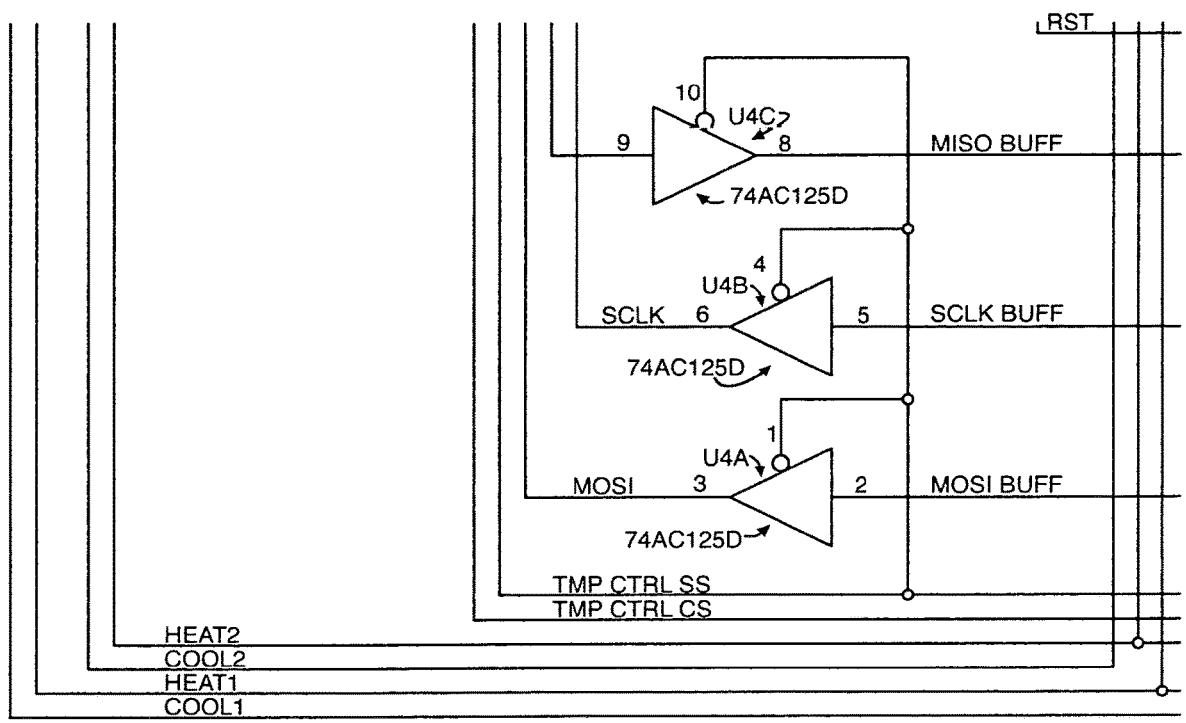
113

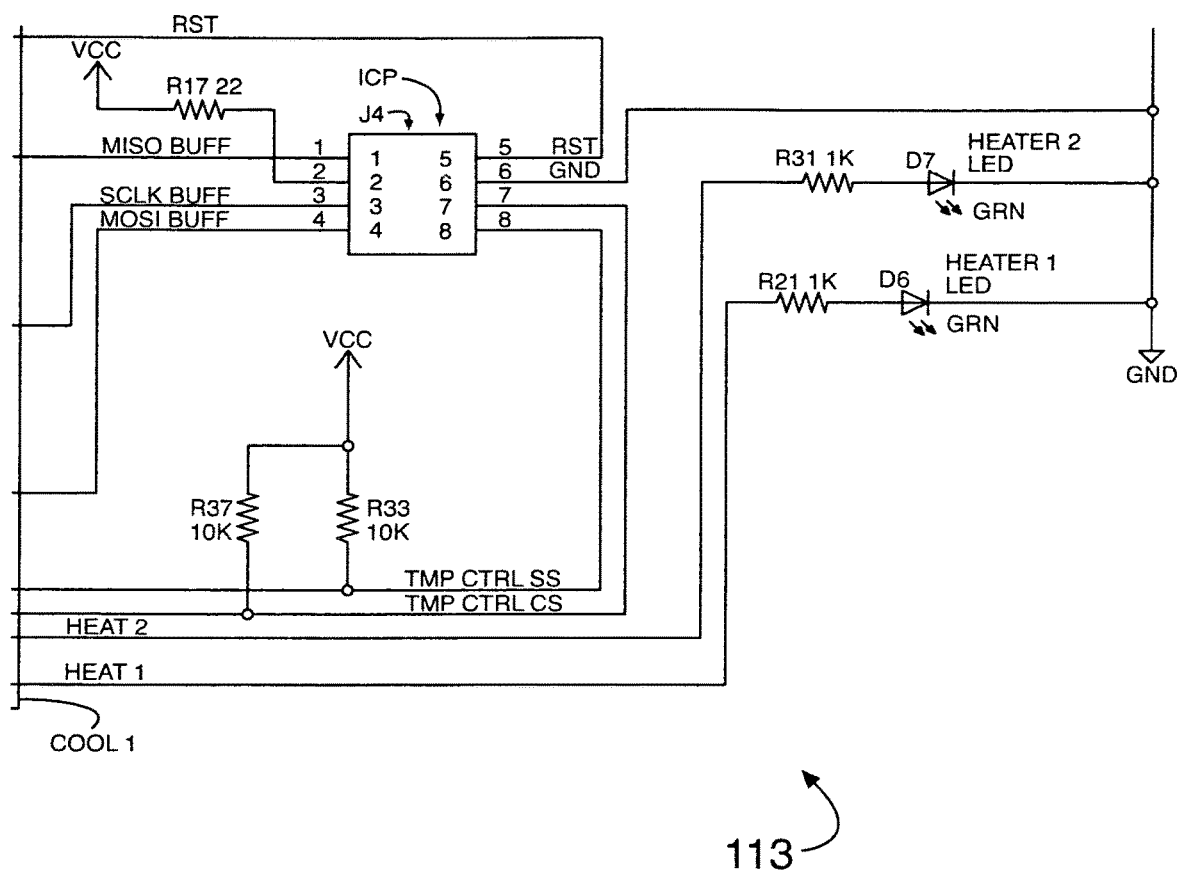

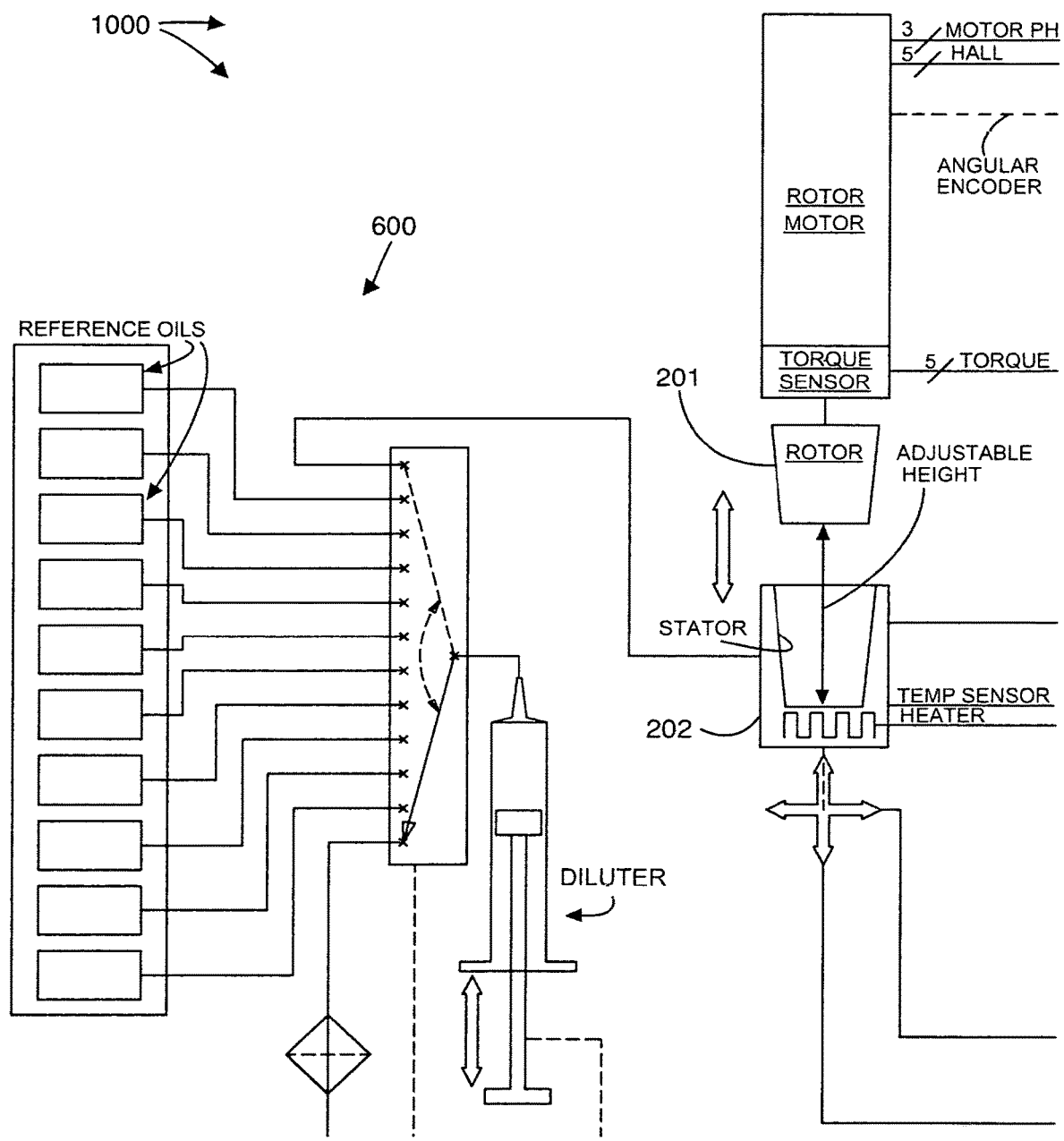
Fig. 63 (UPPER LEFT)

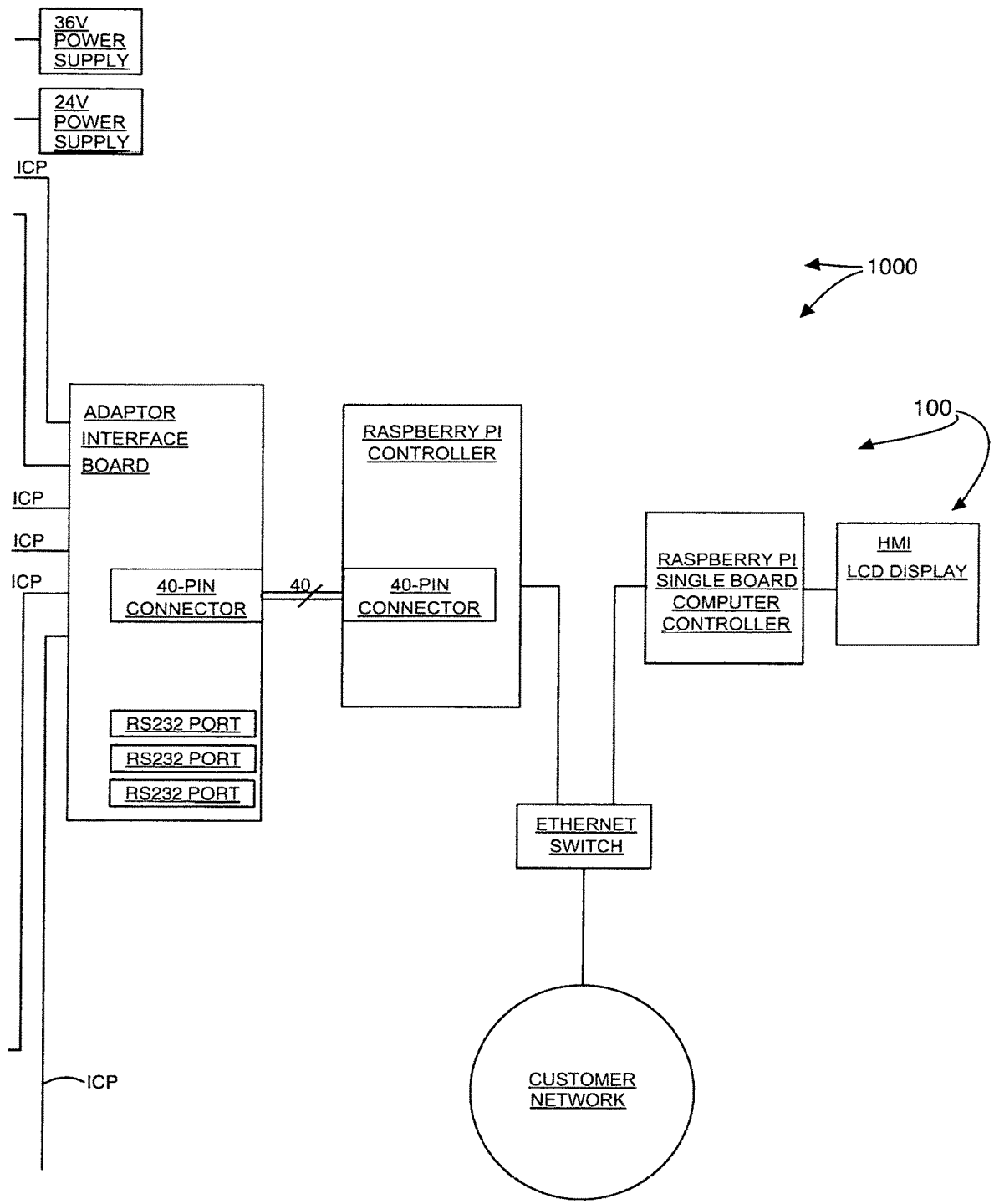

Fig. 63 (cont'd)
(LOWER LEFT 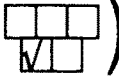)
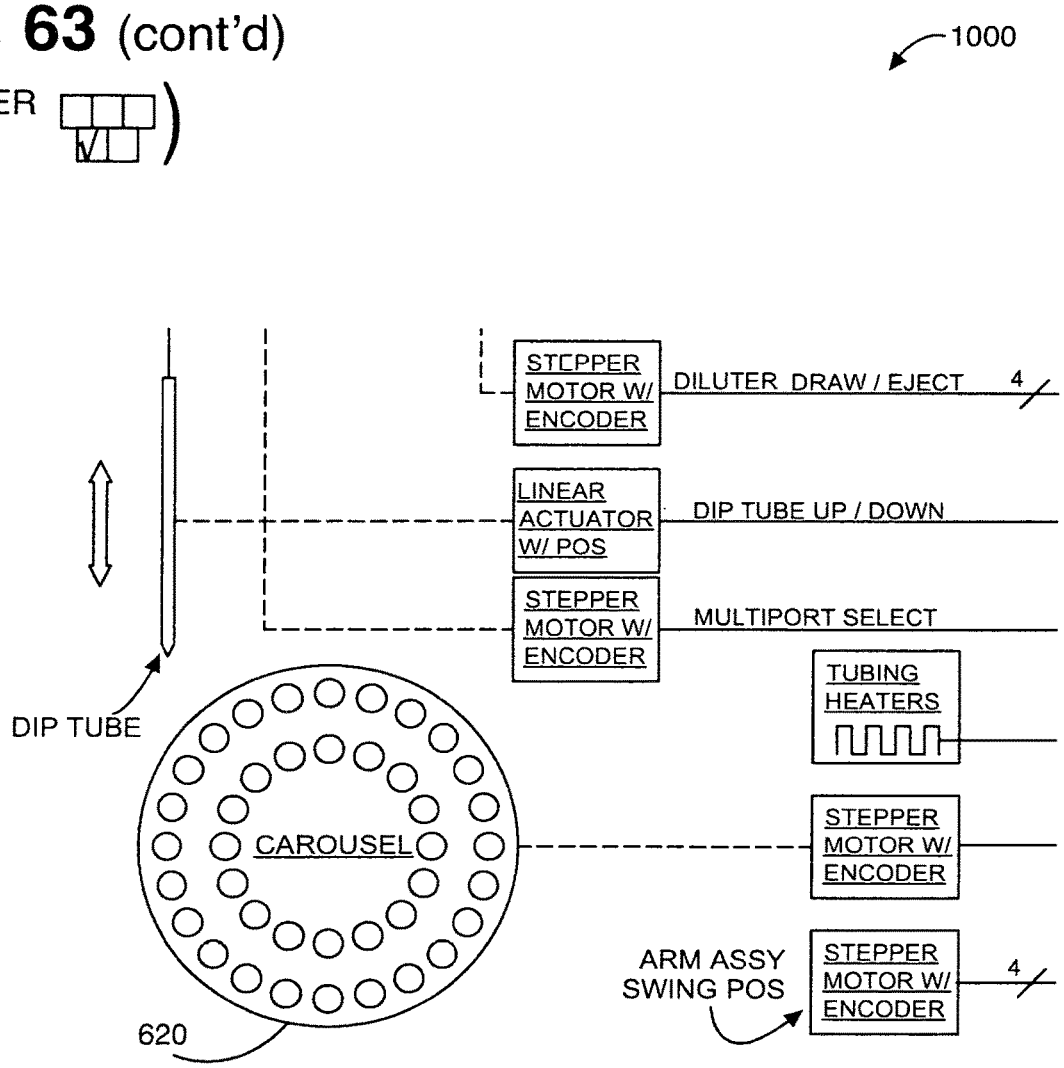

Fig. 63 (cont'd)
$\left(\begin{smallmatrix}\text{LOWER}\\\text{RIGHT}\end{smallmatrix}\right.$  $\left.\right)$
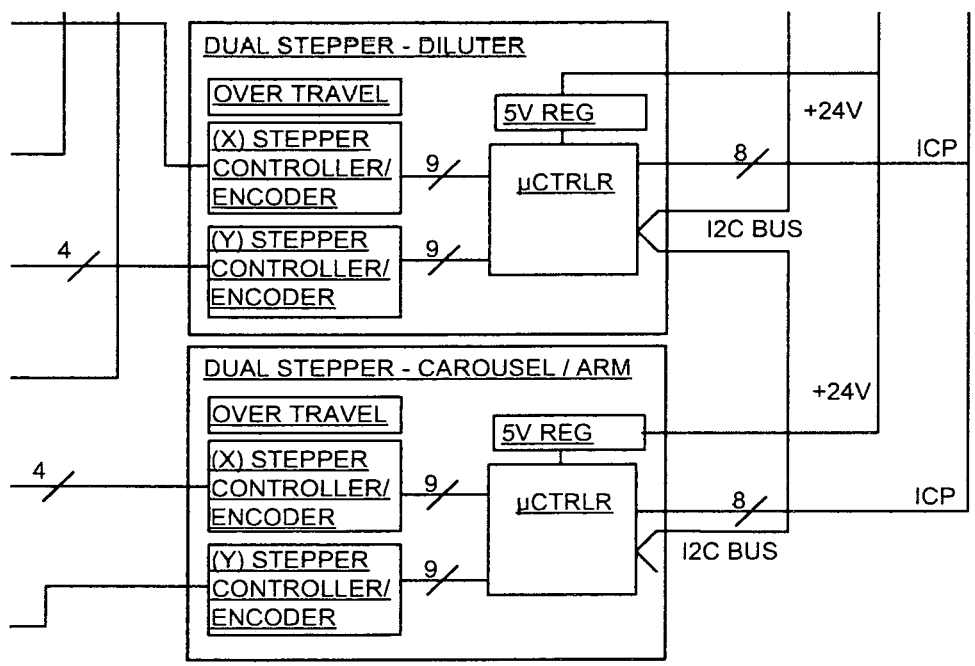

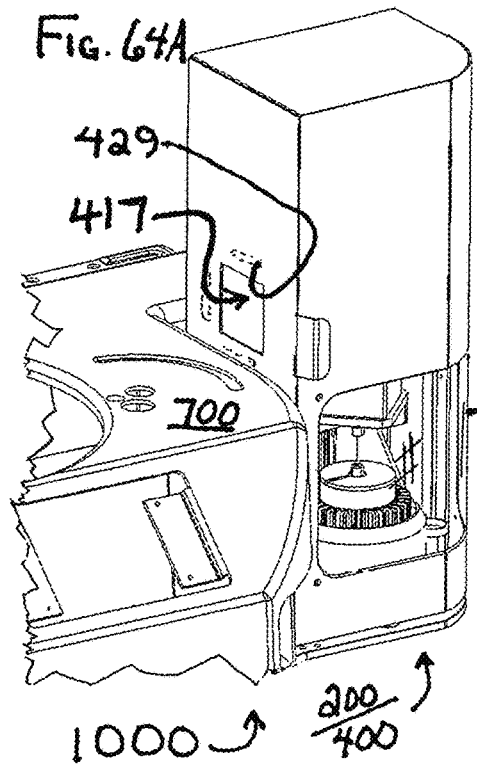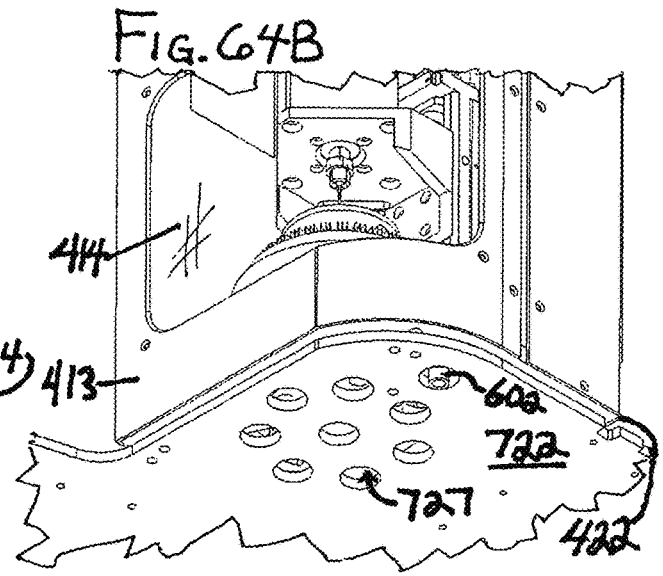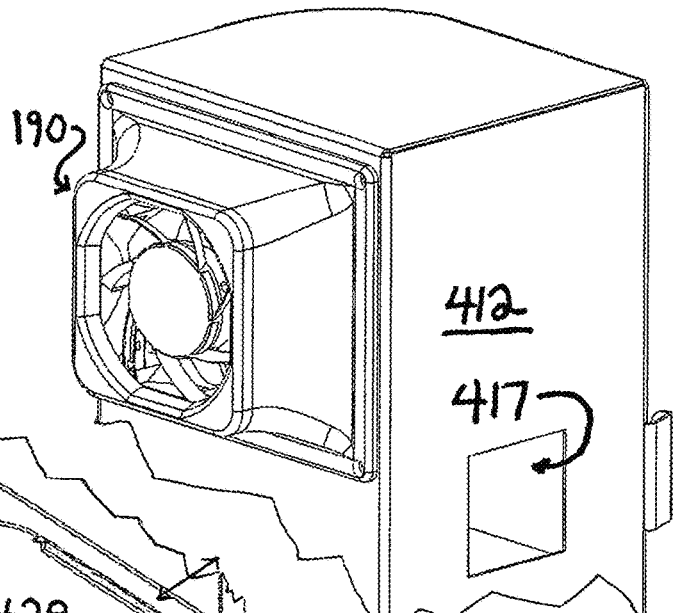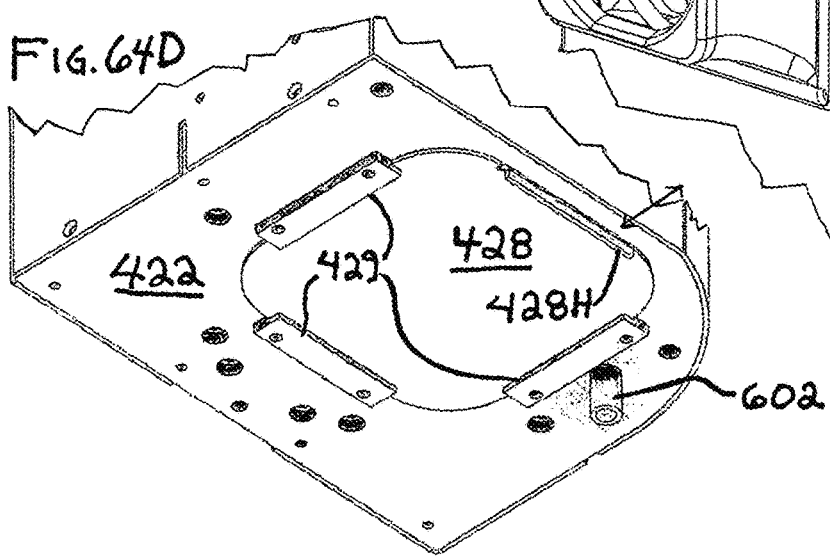

Fig. 65 (cont'd) (UPPER MIDDLE RIGHT 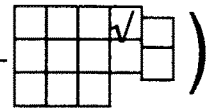)
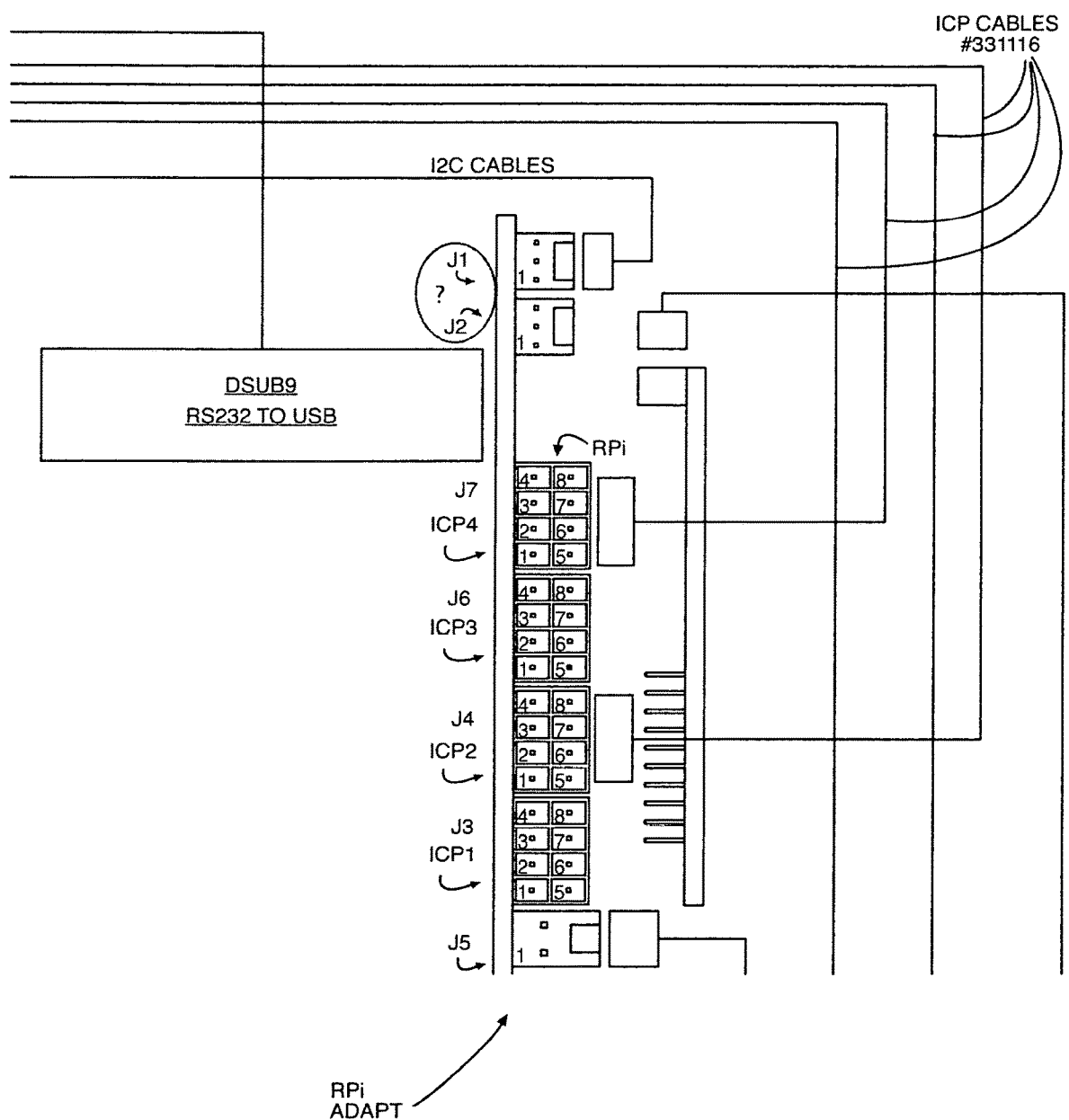

Fig. 65 (cont'd)
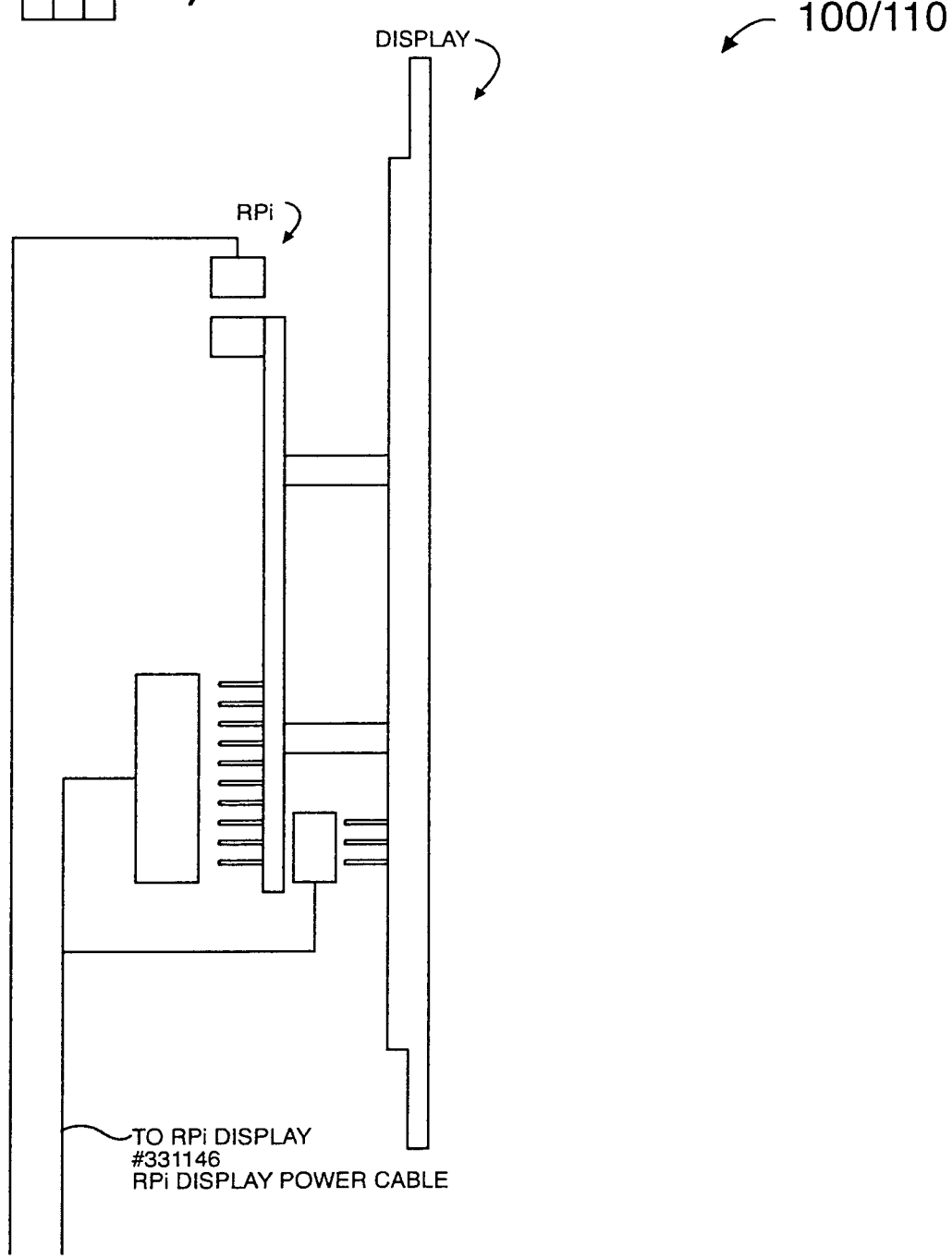

Fig. 65 (cont'd) (MIDDLE LEFT 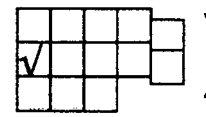)
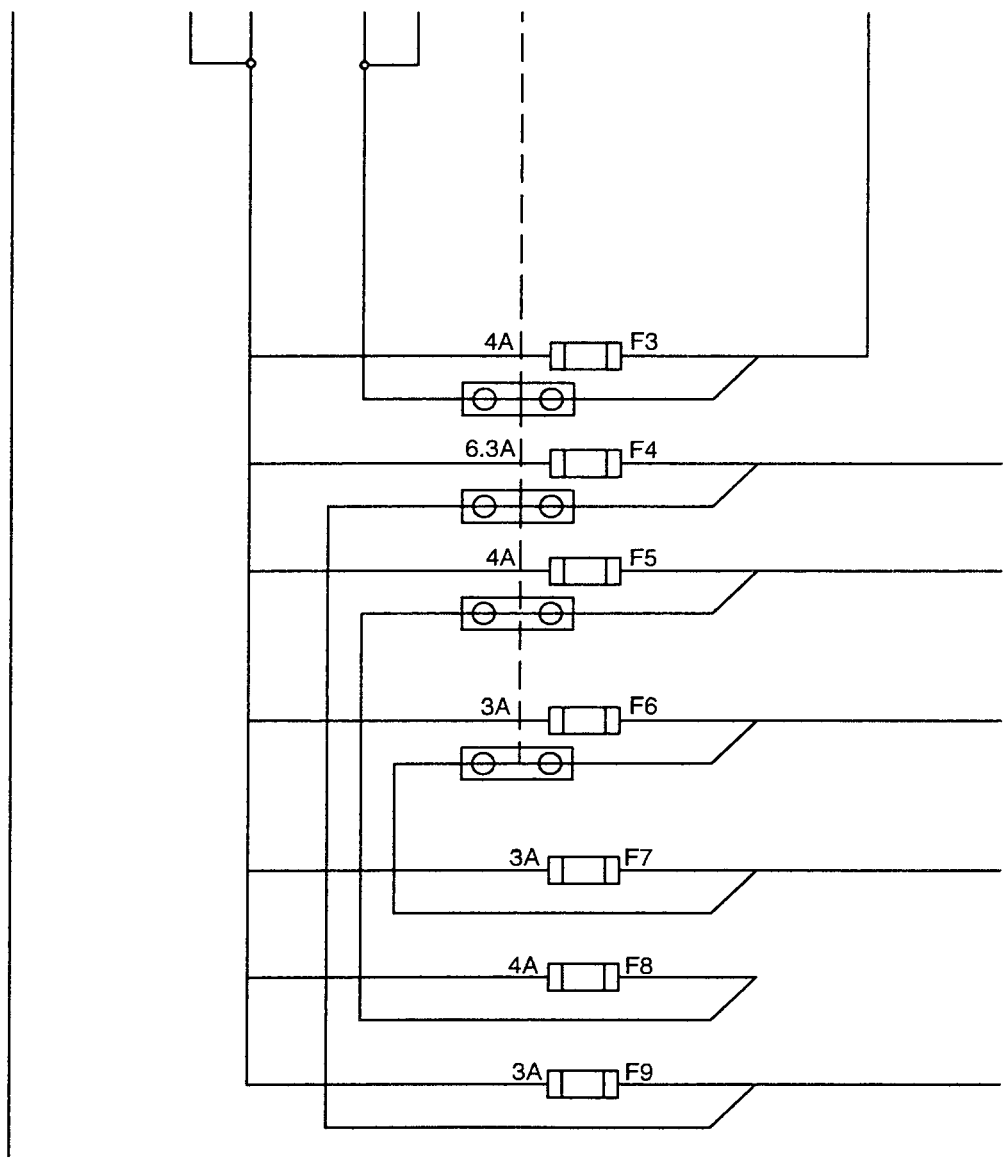

Fig. 65 (cont'd) (MIDDLE / MIDDLE LEFT 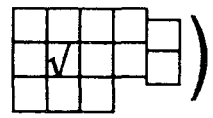)
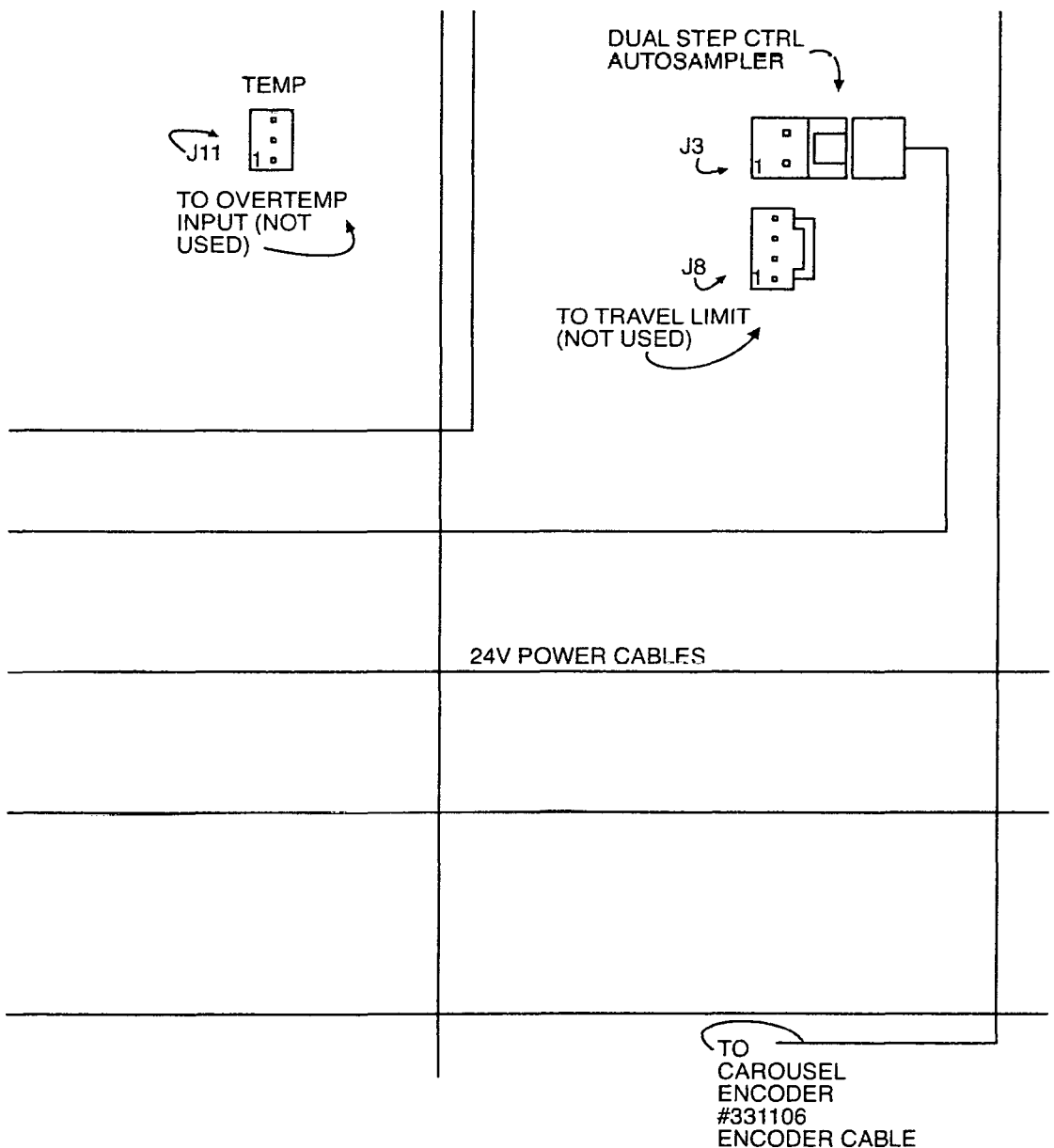

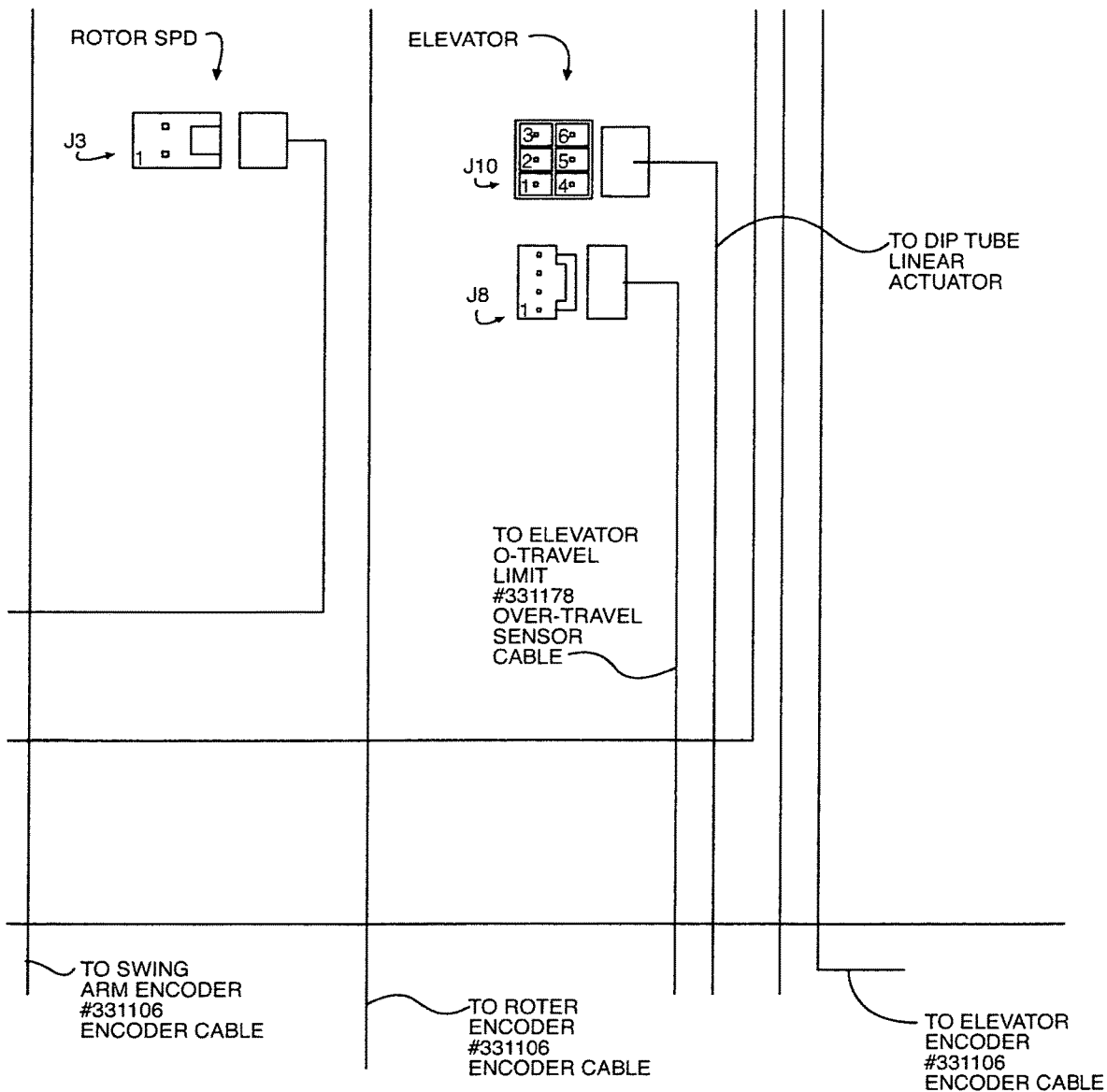

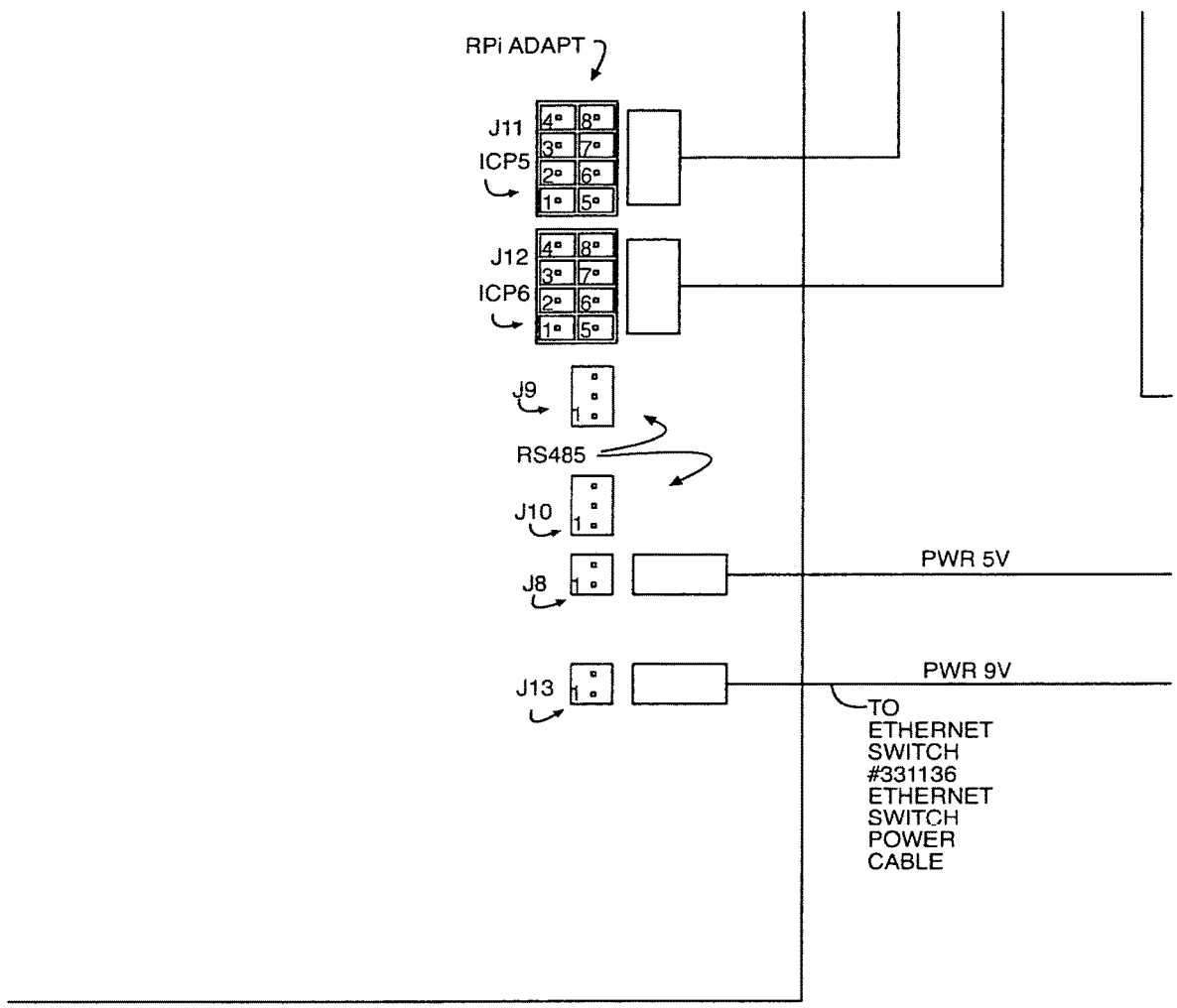

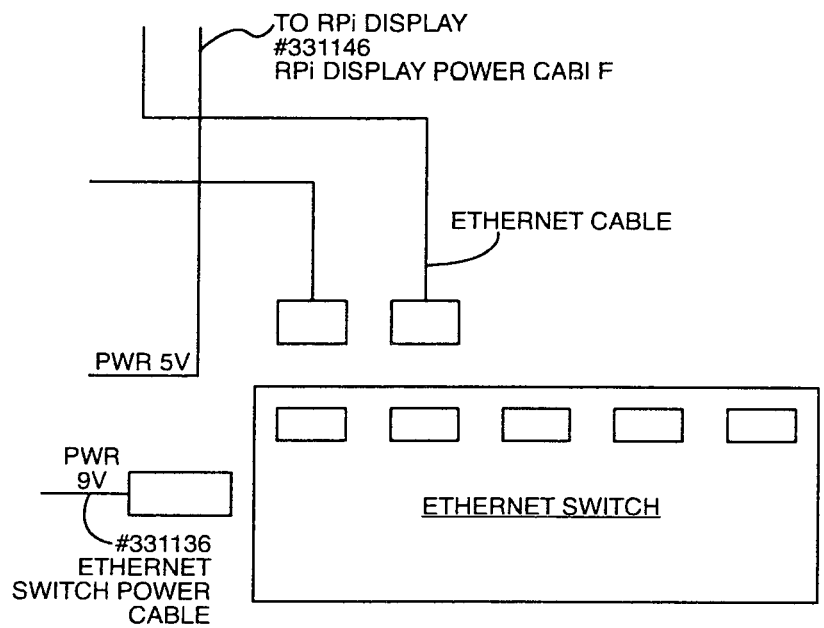

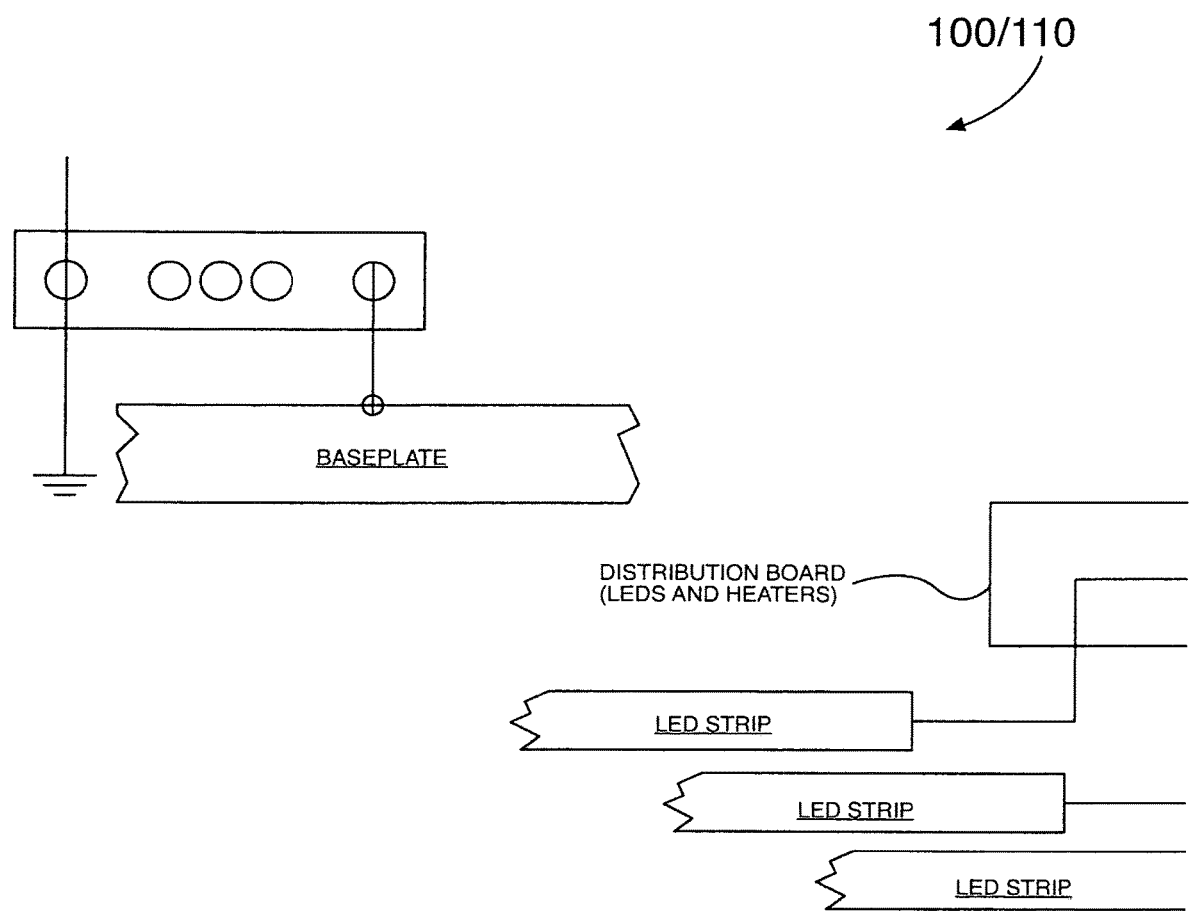

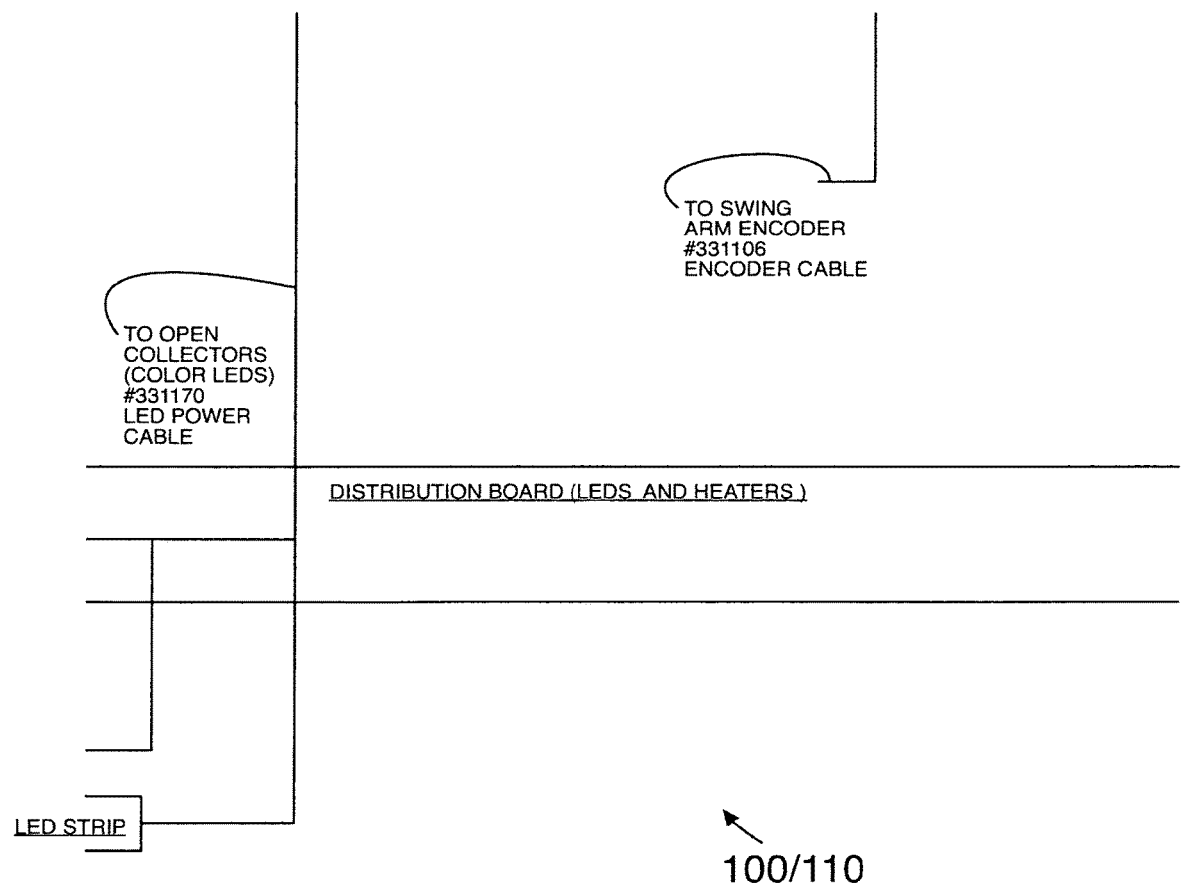

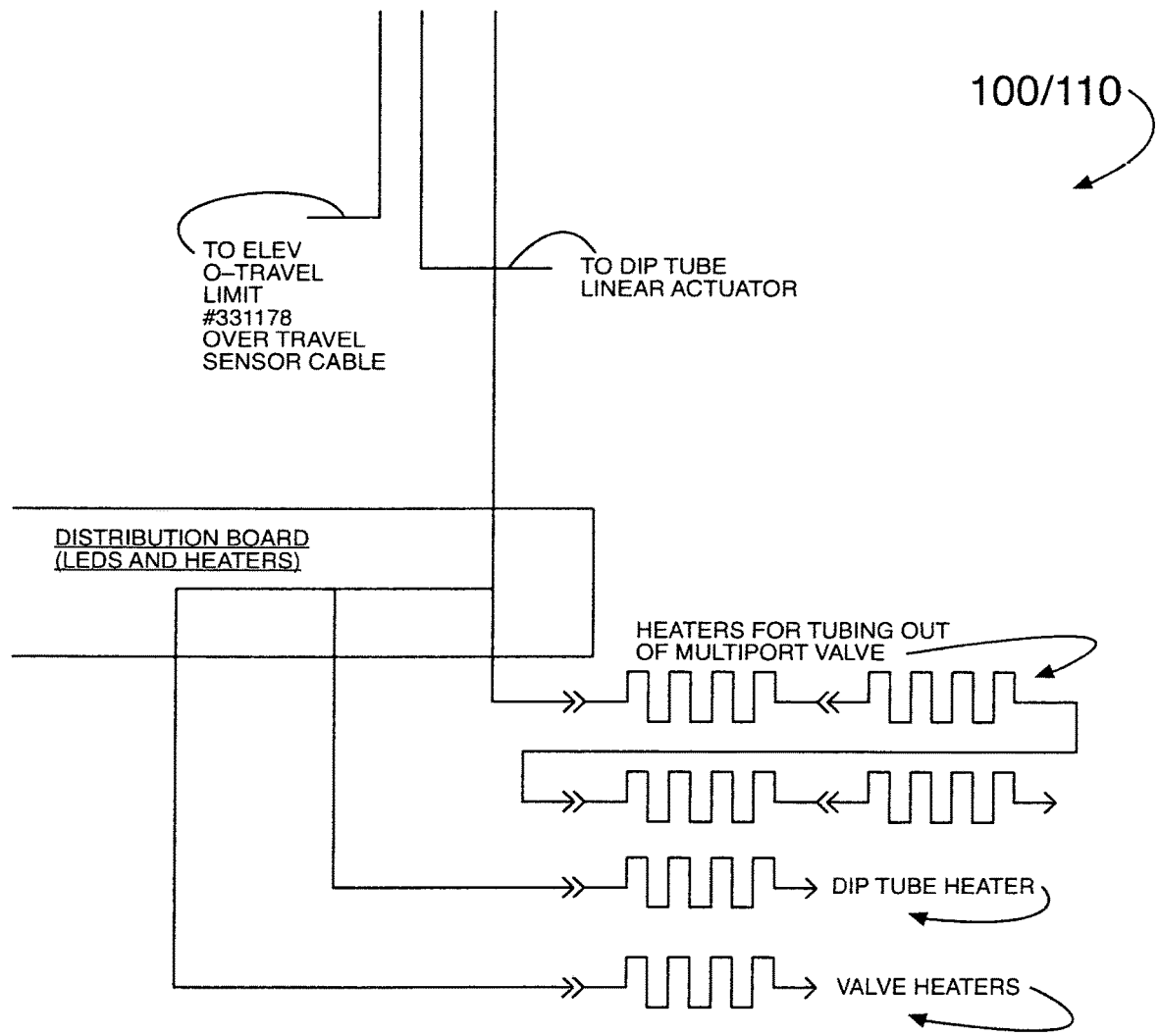

FIG. 66

(UPPER LEFT ☑)

| ISSUE | ACTION | Old TBS unit Manual Injection - Address |
|---|---|---|
| rubbing contact | when needed | initial setup or change of R/S |
| | opertor steps | inject oil by hand - 1 min |
| | | spin rotor by hand and lower - 3 min |
| | operator time | 4 min |
| | total time | 4 min |
| | total operator interventions | 1 - long |
| crossover | when needed | initial setup, change in R/S, change in shear rate or temperature |
| | operator steps | inject NNR by hand - 1 min |
| | | unit measures NNR - 8 - 10 min |
| | | inject R400 by hand - 1 min |
| | | unit measures R400 - 8 - 10 minutes |
| | possible additional interventions | |
| | operator time | 2 min over 30 min |
| | free time between interventions | 8 - 10 minutes |
| | total operator intervations | 2 - short |
| viscosity calibration | when needed | daily before samples |
| | operator steps | inject low oil by hand - 1 min |
| | | unit measures low oil - 8 - 10 min |
| | | inject high oil by hand - 1 min |
| | | unit measures high oil - 8 - 10 min |
| | | inject NNR by hand - 1 min |
| | | unit measures NNR - 8 - 10 min |
| | | inject 3rd oil - 1 min |
| | | unit measures 3rd oil - 8 - 10 min |
| | | inject 4th oil - 1 min |
| | | unit measures 4th oil - 8 - 10 min |
| | possible additional interventions | NNR is out - adjust position and repeat full test - about 1 hr, 5 minutes operator time, separated by 10 min |

| Old TBS unit with Autosampler-Address | New TBS unit (invention)-Address |
|---|---|
| initial setup or change of R/S | initial setup or change of R/S |
| inject oil by hand - 1 min | press button and verify start - 10 s |
| spin rotor by hand and lower - 3 min | unit completes - < 1 min |
| 4 min | 10 s |
| 4 min | 1 min |
| 1 -long | 1 -short |
| initial setup, change in R/S, change in shear rate or temperature | initial setup, change in R/S, change in shear rate or temperature |
| press button and verify start- 10 s | select oils - 5 s |
| unit measures - about 20 min | press button and verify start - 10 s |
| operator sets position - 10 s | unit measures - about 35 min |
|  |  |
| out of reference oil(up to 2) - refill - 30 s | out of reference oil (up to 2) - refill - 30 s |
| 10 s over 30 min | 15 s over 40 min |
| 20 minutes | 40 minutes |
| 1 - 2 - short | 1 - 2 - short |
| daily before samples | daily before samples |
| press button if not automatically beginning after crossover - 10 s | select oils - 5 s |
| unit injects and measures 5 oils; ajdusts and repeats NNR if needed - 1 to 1.5 hrs | press button and verify start - 10 s |
|  | unit injects and measures 5 oils; adjusts and repeats NNR if needed - 1 hr - 1.5 hrs |
|  |  |
|  |  |
|  |  |
|  |  |
|  |  |
|  |  |
| reference oil out (up to 5) - refill 30 s each | reference oil out (up to 5) - refill 30 s each |

FIG. 66 (Cont.)

| | | reference oil out (up to 5) - refill 30 s each |
|---|---|---|
| | operator time | 5 min to 10 min over 1 - 2 hrs |
| | free time between interventions | 8 - 10 minutes |
| | total operator intervations | 5 - 11 - short |
| samples (30 samples) + 5 NNR checks | operator steps | enter samples - 15 min |
| | | fill syringe - 30 s/sample |
| | | inject - 1 min/sample |
| | | unit measures - 8 - 10 min |
| | | repeat |
| | possible additional interventions | |
| | operator time | 1 hr over 6 hours |
| | free time between interventions | 8 - 10 minutes |
| | total operator intervations | 30 - 1 long, remaining short |

FIG. 66 (Cont.)

FIG. 66 (Cont.)
(LOWER RIGHT ☐☑)

|  |  |
|---|---|
| 0 to 10 s over 1 - 1.5 hrs | 40 s over 1.5 |
| 1 - 1.5 hrs | 1.5 - 2 hrs |
| 1 -2 - short | 1 -2 - short |
| enter samples - 15 min | enter samples - 15 min |
| fill samples - 10 s/sample - 5 min | fill samples - 10 s/sample - 5 min |
| unit injects and measures - 8 - 10 min | unit injects and measures - 15 min ea |
|  |  |
|  |  |
| NNR is out - refill - 30 s | NNR is out - refill - 30 s |
| 20 minutes over 5.5 hours | 20 minutes over 7.5 hours |
| 5 hours | 7 hours |
| 1 - 2 , 1 - long, if 2nd needed it is short | 1 - 2 , 1 - long, if 2nd needed it is short | ns
INSTRUMENTATION THAT EMBRACES A ROTATIONAL VISCOMETER, OR THAT HAS A CANTILEVERED PLATFORM ELEVATOR AND/OR EMPLOYS HEAT IN ONE AREA BUT NOT ANOTHER

This claims priority benefits under 35 USC 119(e) of provisional No. U.S. 62/606,424 filed on Sep. 22, 2017 A. D. The specification of that application, to include its drawings, is incorporated herein by reference in its entirety.

FIELD AND PURVIEW OF THE INVENTION

This concerns instrumentation, its making and use. For example, the instrumentation can be a rotational tapered bearing simulator viscometer. The instrumentation may be automated and have electronic control and/or monitoring to include task unit electronics, which may include a task unit electronics interface. Particular component configuration and/or particular material(s), and so forth, may be employed. The instrumentation may be used for testing viscosities of oils and other lubricants, fuels, inks, and so forth and the like.

BACKGROUND TO THE INVENTION

Laboratory and field instruments for testing various properties of materials can be critical in providing efficient and reliable determinations of how the materials will perform or have performed in the field. Based to a great extent upon those determinations, compositions and adjustments in such compositions can be tested and sometimes discovered so as to assure better practical performance in the field. As one illustration, laboratory instrumentation may be designed to ascertain the viscosity of a liquid under certain conditions so as to take advantage of or design machinery to work efficiently in accordance with the same.

One example of the latter are instruments for testing the viscosities of oils and so forth under conditions found in automotive engine bearing lubricating conditions. Notable among these are the rotational tapered bearing simulator instruments from Tannas Company, Midland, Mich., U.S.A. See, U.S. Pat. No. 4,445,365 to Selby, which discloses a tapered bearing simulator-viscometer; U.S. Pat. No. 5,369,988 to Selby, which discloses a cojoined collet; and U.S. Pat. No. 5,565,621 to Selby et al., which discloses a stacked component tapered bearing simulator device. See also, Tannas Co., TBS™|HTHS Tapered Bearing Simulator with TBS 2100E-F brochure, 2017. Compare, Selby, SAE International paper No. 2010-01-2288 published Oct. 25, 2010, "High Shear Rate Rheology of Lower Viscosity Engine Oils over a Temperature Range of 80° to 150° C. Using the Tapered Bearing Simulator (TBS) Viscometer."

As fine as they are, such instruments may be incapable of the most excruciatingly accurate and precise measurements, which are sought after by the industry so as to continue to refine, develop and produce better and better compositions and materials. And, as user-friendly and efficient as the aforementioned instruments from Tannas Company are, operator error and inefficiency are difficulties that must be constantly addressed through diligent training, practice and operation, and repeated test runs may be required to obtain more reliable average test values.

It would be desirable to provide improved performance over that provided by such instruments, and ameliorate if not solve such problems and difficulties. It would be desirable to provide the art an alternative. In one particular respect, it would desirable to provide an advanced rotational tapered bearing simulator for testing viscosities of oils and so forth.

A Full Disclosure of the Invention

In general, provided hereby in one aspect is instrumentation, which comprises an at least partially automated rotational tapered bearing simulator viscometer having electronic control and/or monitoring that includes task unit electronics, which includes a task unit electronics interface. With or without such electronics, the instrumentation may include a particular component configuration and/or employ at least one particular material, and further feature(s) may be extant. For example, in a precision instrument having an elevator member in a form of a cantilevered platform that can be moved up and down between spaced apart first and second heights, a compact, vertically oriented elevator member support having at least one buttress is attached to a chassis base to provide vertical and lateral support for the elevator member so as to minimize positional variance from instrument configuration. Also, in a precision instrument that employs heat in a first part thereof with a second part thereof not subject to that heat, a first material having a first coefficient of thermal expansion is employed in the first part, and a second material having a second coefficient of thermal expansion different from the first coefficient of thermal expansion is employed in the second part, say, with the first coefficient of thermal expansion less than the second coefficient of thermal expansion such that, in the particular configuration under consideration, thermal expansion of aggregated first and second parts is minimized if not avoided, thus minimizing or avoiding positional variance from instrument materials. In one embodiment, the instrumentation comprises an advanced rotational tapered bearing simulator for testing viscosities of oils and other lubricants, fuels, inks, and so forth and the like. In addition to the capability of including at least one of the particular component configuration and particular material(s) such as mentioned, as in a rotational tapered bearing simulator, among a number of other significant features, automatic or manual x,y-control of rotor-stator centering, passive integral cooling and/or an automated sample delivery system can be provided. Associated methodology is also provided.

The invention is useful in testing and evaluation of materials.

By the present invention, the art is advanced in kind. Thus, instrumentation is provided with improved performance, and problems and difficulties in the art are ameliorated if not solved. The art is provided an alternative, most viable and efficient. In one particular aspect, the art is provided an advanced rotational tapered bearing simulator for testing viscosities of oils and so forth. Such an advanced rotational tapered bearing simulator can be considered to be an improvement over the tapered bearing simulator instruments of U.S. Pat. Nos. 4,445,365 and 5,565,621. For instance, some of the improvements beyond the currently available tapered bearing simulator viscometer, and these are significant, include the following:

Integrated electronic controls to automate instrument operation.

Control software and user interface customized to the application.

Automated or manual x,y-control and centering capability.

Tower configured to minimize unwanted changes in rotor-stator gap.

Passive, integrated cooling, to include with respect to the stator.

Integral, automated delivery for reference and test sample liquids, for example, oils. The particular instrument component configuration(s) and/or particular material(s), and further optional feature(s) add significantly to the performance, efficiency, and reliability. And so, the most excruciatingly accurate and precise measurements can be provided, which are sought after by the industry so as to continue to refine, develop and produce better and better compositions and materials. User-friendliness and efficiency are increased, and operator error and inefficiency, with consequent need for a battery of repeated test runs to obtain more reliable average test values, reduced, if not well-nigh eliminated. In addition, other benefits include enablement of higher shear rate testing from a more powerful rotor motor, which can produce higher torques at higher speeds, all the while maintaining high accuracy and precision; safeguarding of rotor-stator integrity and extremely accurate, automated finding of "rubbing contact" through torque change determination operation and calculation, and "zero crossing" calculation; and high efficiency in troubleshooting to overcome problems through employment of telemetry and error code generation, and so forth. Automatic axial positioning can be carried out without detriment to elevator stability. Further advantages attend the invention.

DRAWINGS

The drawings along with any text therein form part of the specification hereof. With respect to the drawings, which are not necessarily drawn to scale, the following is noted:

FIGS. 1A-1C are views of instrumentation hereof, with FIGS. 1A and 1B front, top, right and left perspective views of instrumentation hereof, embodied as an advanced rotational tapered bearing simulator to test viscosities of oils, other lubricants, fuels, inks, and so forth and the like, and FIG. 1C is an exploded view thereof.

FIGS. 2A and 2B are block diagrams of the instrumentation of FIGS. 1A-1C, with FIG. 2A a hardware block diagram schematic for the instrumentation of FIGS. 1A-1C, which shows functional control partitioned into control boards; and FIG. 2B a block diagram for the same instrumentation showing fluid distribution to include pneumatic schematics, which shows how reference and test sample fluids are injected into a stator for measurement.

FIGS. 3A and 3B show a electrical system harness schematic and a corresponding integrated circuit control board module for the instrumentation of FIGS. 1A-1C, with FIG. 3A the electrical system harness (card nest cabling) schematic, which shows system wiring, to include power-in, power supplies, fusing, display wiring, inter-board wiring coordination, and wiring to peripheral components such as motors, sensors, valves, encoders, heaters, and so forth; and FIG. 3B a side, top perspective view of the integrated circuit control module with integrated circuit control boards embodying the card nest cabling. Thereby, a plurality of independent boards can be provided, for example, six, each of which controls a subsystem, with subsystem-confined automation on each subsystem board and algorithms specific to the function of each board; boards can communicate with a master computer to integrate functions, with separate master computers for control coordination and user interface processing able to be provided; and the application specific embedded systems printed wiring boards can include such boards as these:

A rotor speed control board, which enables commandable rotor speeds (not discrete) and ramping of rotor speed.

An elevator control board, which positions and measures rotor height and enables automatically finding rubbing contact.

A temperature control board, which controls stator temperature.

A sample injector board, which controls dispensing of reference oils and injection of sample oils.

An x,y-control board, which horizontally positions stator with respect to rotor and enables automatic centering.

An autosampler board, which controls a sample carousel, say, as an autosampler.

FIG. 4 is a block diagram of application-specific controls and user interface for the instrumentation of FIGS. 1A-1C. Therein, as well as elsewhere in the present specification, "HMI" is an acronym for human-machine interface; "PM" is an acronym for preventive maintenance; "PID" is an acronym for proportional-integral-derivative control; and "NNR" is an acronym for non-Newtonian reference. Thus, for example, control of alarming and errors based on out-of-range signals from boards can be provided; reference oil and sample oil interfacing can be managed; shear rate entry can be provided for alternate shear rate measurements; and/or temperature entry can be provided for alternate temperature measurements.

FIGS. 5A-5G show additional component parts of the instrumentation of FIGS. 1A-1C, namely, parts of its rotational dynamometer tower system, to include an elevator, a rotor, and so forth; with FIG. 5A an exploded front, top perspective view; and FIG. 5B a front, top perspective view of various internal parts thereof, to include certain operational parts, assembled. The same includes a moment arm reduced in size, which provides for less vertical deflection in the rotor; an enclosed chassis, which minimizes effects of ambient drafts; select materials in the elevator, which lift the rotor and stator equally, for example, from predetermined expansion at operation temperature; and a torque sensor unaffected by stresses to mounting or cables. Thus, among these parts are those that help minimize variance in rotor height and false torque shifts. FIG. 5C is a top perspective view of further various parts of the rotational dynamometer tower system depicted in FIGS. 5A and 5B, to include a view of automated x,y-control and rotor centering, which includes a stepper-motor driven, spring-loaded table, which positions the stator and maintains placement, and which is controlled through an automated centering algorithm to avoid operator judgment in rotor-stator placement, thus increasing accuracy, precision and reliability; and FIGS. 5D and 5E, respectively, are top and bottom perspective views of a passive, integral stator cooling provision in the rotational dynamometer tower system depicted in FIGS. 5A and 5B, which avoids an external cooling unit, with cooling achieved by a heat sink across which air is caused to flow so as to remove heat generated by sample measurement; avoids a need for stator insulation, and associated dimensional changes with change in temperature; and provides for an oil draining member added to the stator. FIG. 5F is a side elevational plan view of the rotor, with FIG. 5G a side, exploded view thereof. Compare, U.S. Pat. No. 5,369,988.

FIGS. 6A-6C are views of a sample fluid delivery system found in the instrumentation of FIGS. 1A-1C, for example, a carousel with associated contrivances for rotation, delivery of test fluid, for example, test oil, and so forth, with FIG. 6A a top perspective view showing the system assembled with a cover (cabinet member); FIG. 6B showing the system assembled without the cabinet member; and FIG. 6C a bottom perspective view. For example, by the same—in comparison to the provision of reference fluid, say, reference oil, which is forced out of bottles and into tubing by air pressure, and routed with a ten-to-one multiport valve to the stator—test samples are loaded into 30-mL syringes and placed in a 40-sample carousel, from which a sample of interest is automatically selected, with alignment of a "mechanical thumb" under the sample; and the mechanical thumb, which has integral limit switches and employs air pressure injection, depresses the syringe to inject the sample at a constant rate.

FIG. 7B from a side elevation; and FIG. 7C from a bottom perspective.

Figure 6A:
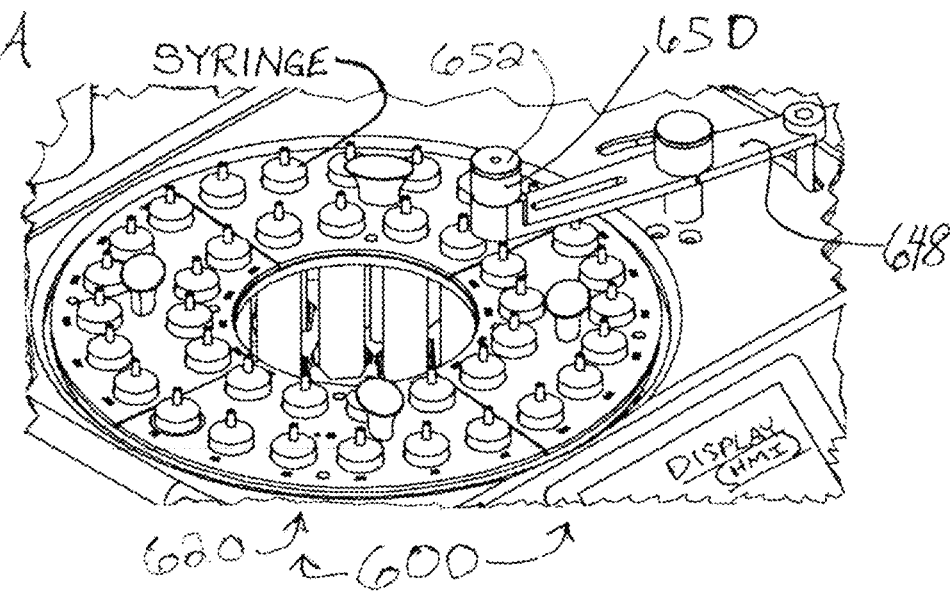
Figure 6B:
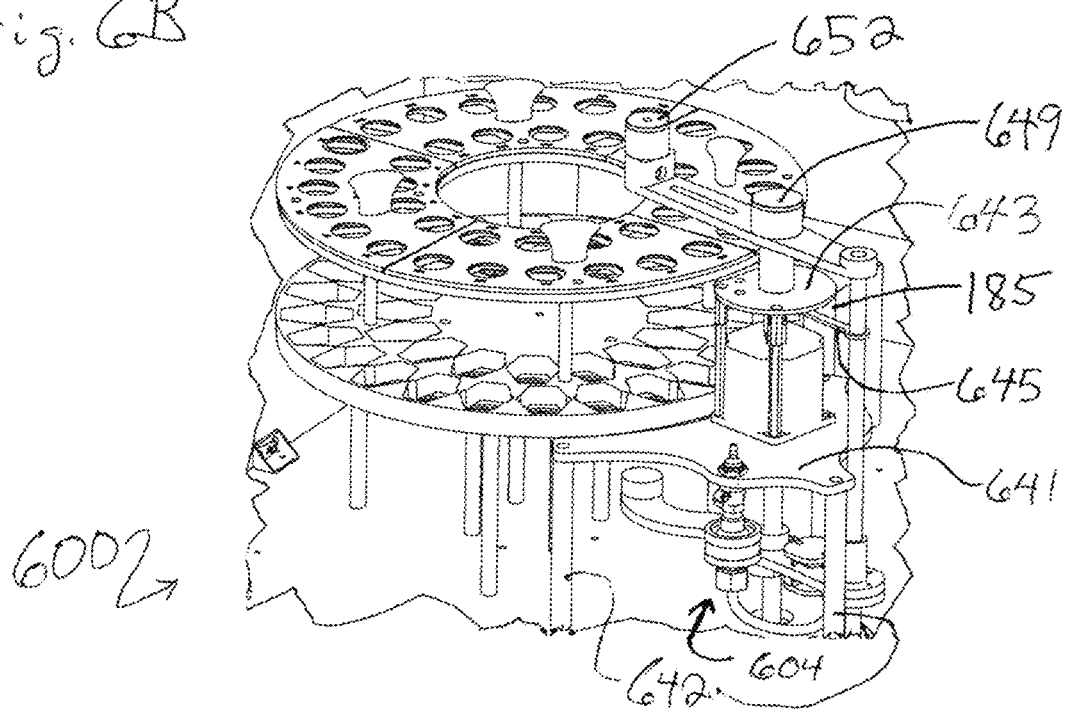
Figure 6C:
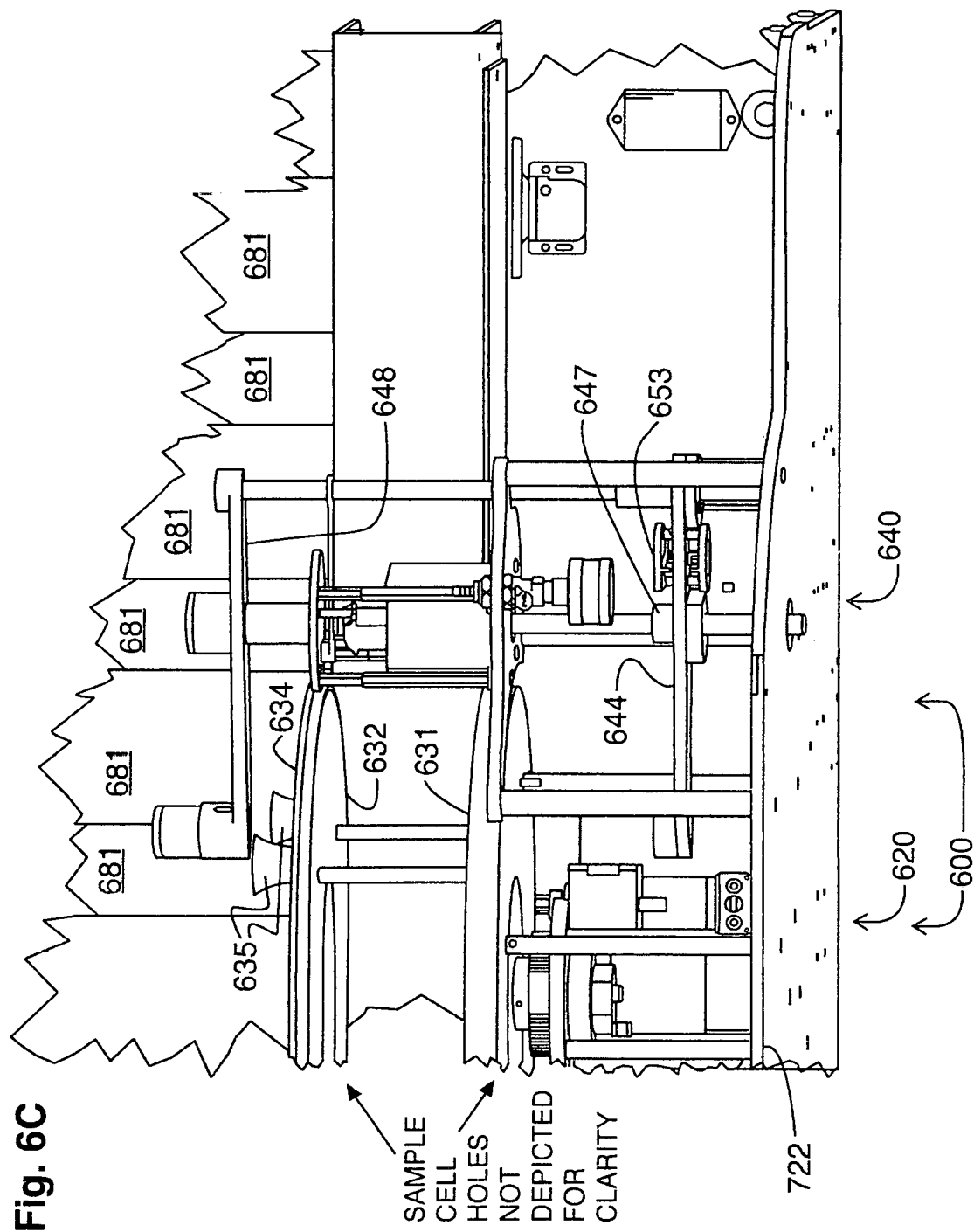
Figure 7A:
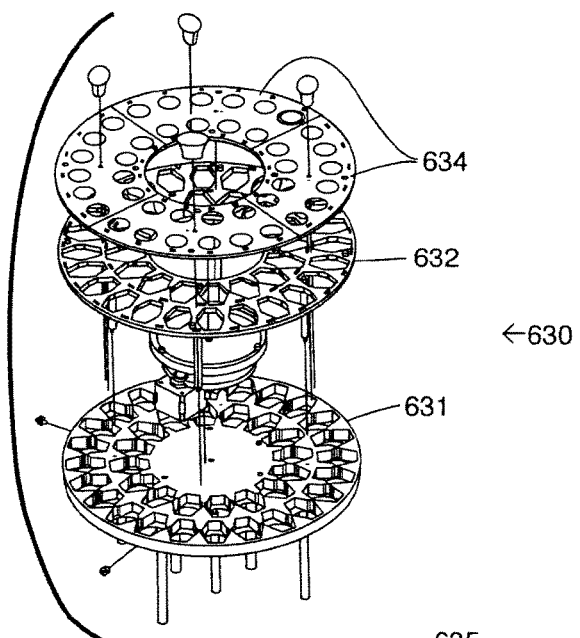
FIGS. 7A-7C are exploded views of the carousel with its drive of the sample fluid delivery system of FIGS. 6A-6C, with FIG. 7A from a top perspective.
Figure 7B:
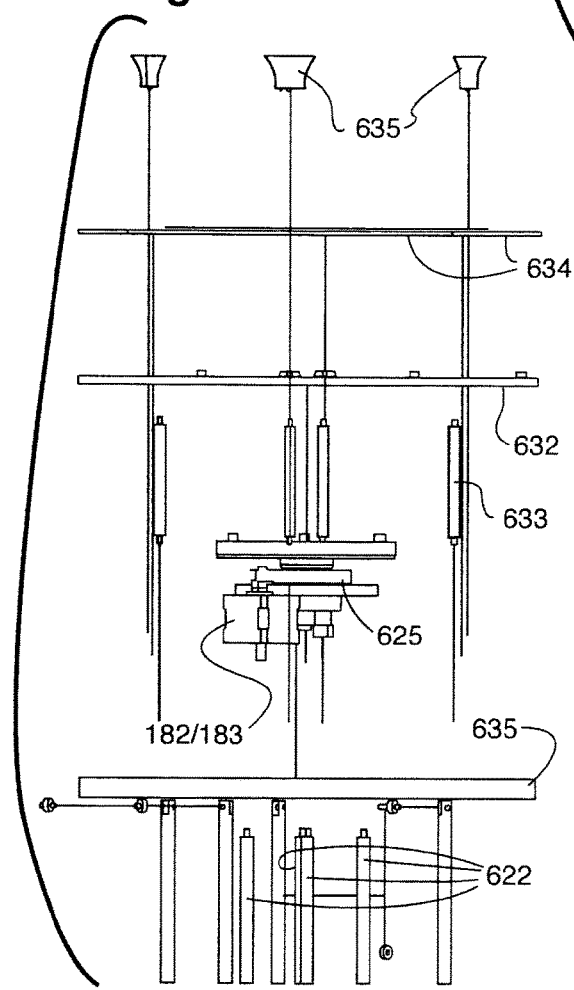
Figure 7C:
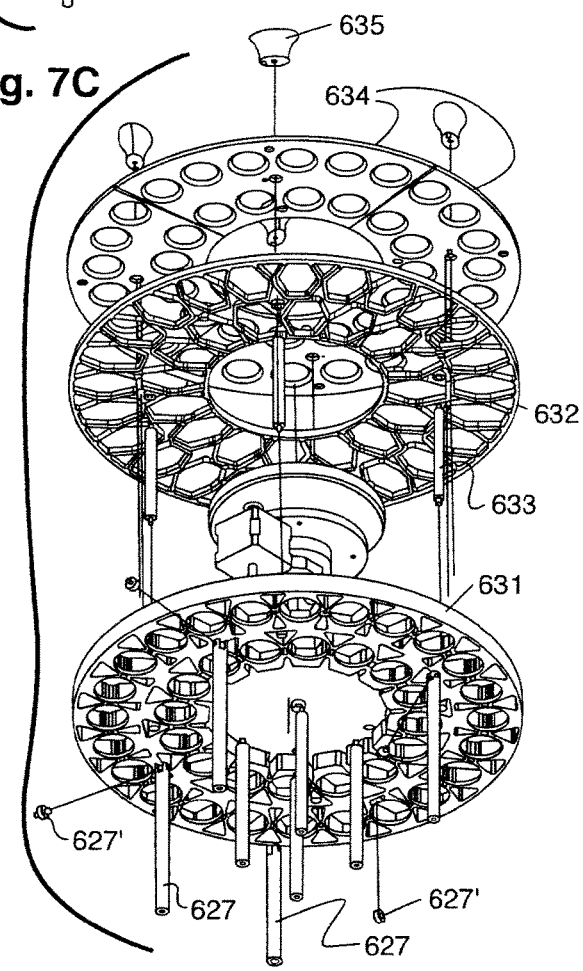
Figure 9A:
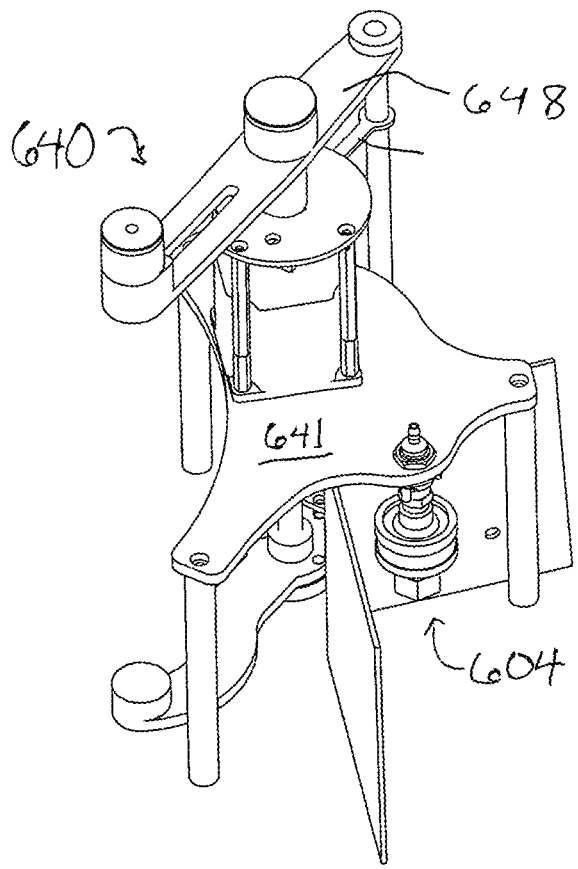
FIG. 9D an exploded, side elevational view whereof.
FIG. 9E a side sectional view whereof.
Figure 9B:
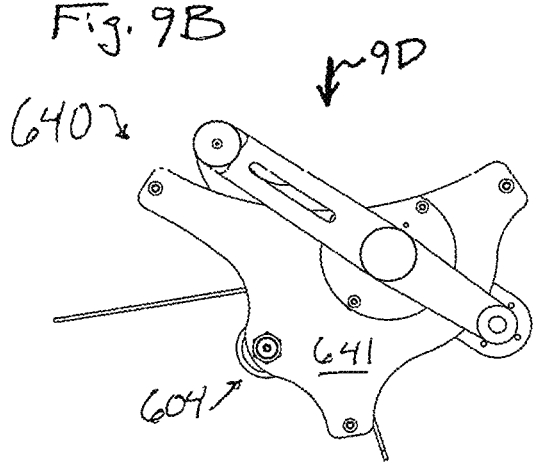
Figure 9C:
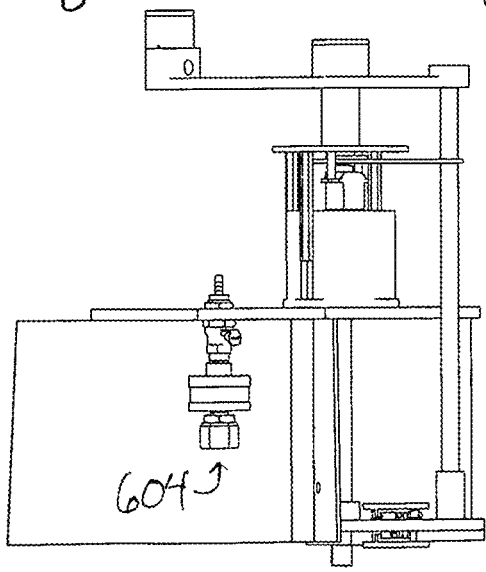
Figure 9D:
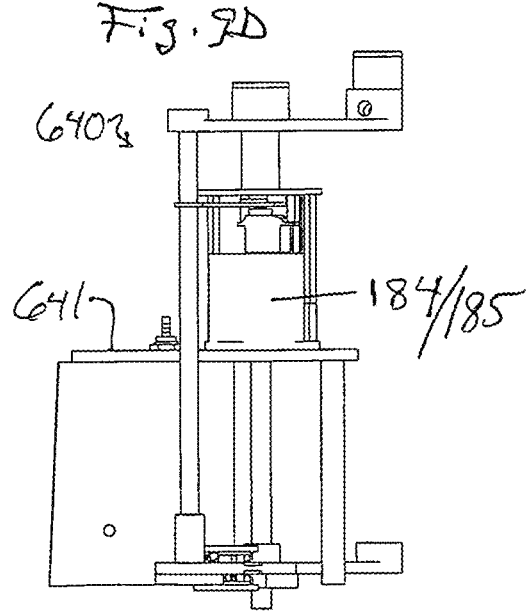
Figure 9E:
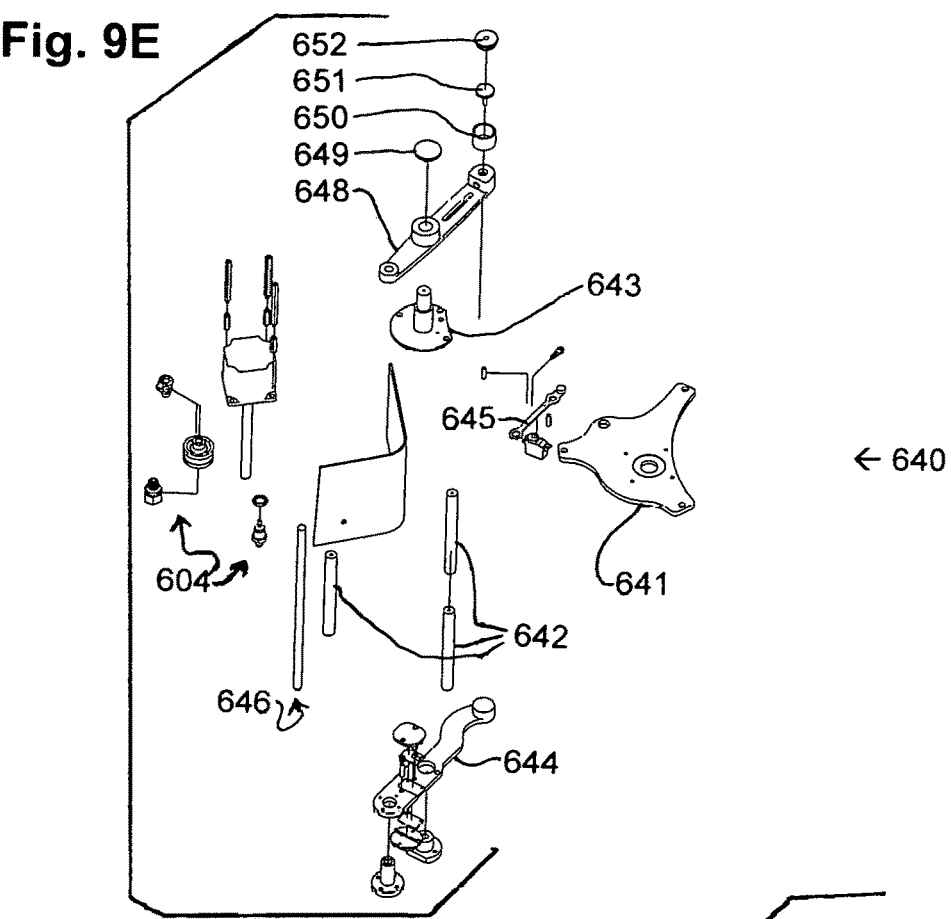
Figure 9F:
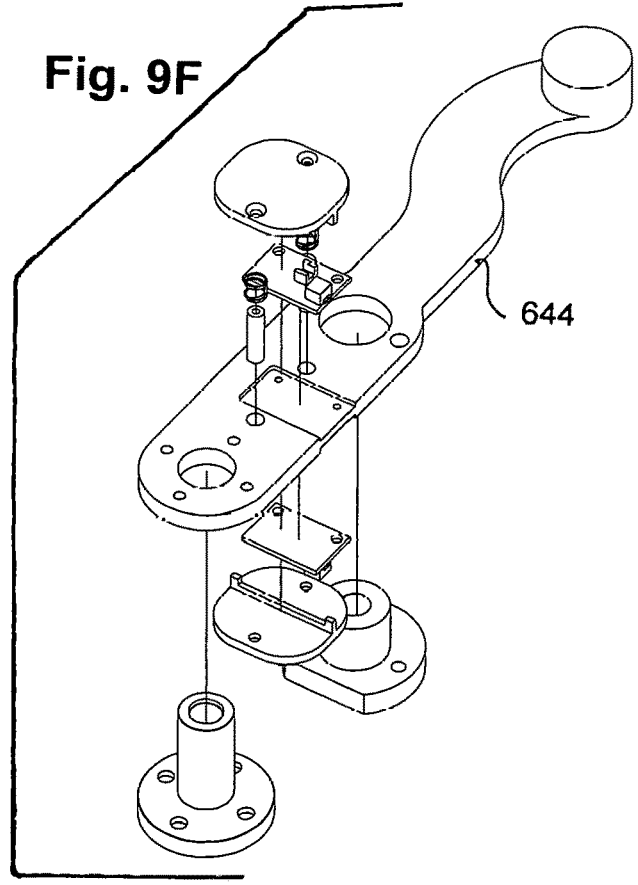

FIGS. 9A-9K are views of the associated contrivance for delivery of test fluid, for example, test oil, including a mechanical thumb and some subsystems, as within FIGS. 6A-6C, with FIG. 9A a top perspective view of the associated contrivance for delivery of test fluid, for example, test oil; FIG. 9B a top view; FIG. 9C a first side elevational view, taken in the direction of arrow 9C in FIG. 9B; FIG. 9D a second side elevational view, taken in the direction of arrow 9D in FIG. 9B; and FIG. 9E an exploded view. FIG. 9F is an exploded view of the mechanical thumb, with FIG. 9G an exploded view of its injector arm system; FIG. 9H an exploded view of its servo motor capture system; FIG. 9I a side, bottom perspective view of its, over-limit switch; FIGS. 9J and 9K exploded views of filter components whereof.

FIGS. 10A-10I through FIGS. 52A-52F are views of various components/features as for the advanced rotational tapered bearing simulator viscometer instrumentation seen in FIGS. 1A-1C through FIGS. 9A-9E. Dimensional tolerances for FIGS. 10A-10I through FIGS. 52A-52F, with dimensions given in inches and angles in degrees, unless otherwise noted, are as follows:

| 0.0: | ±0.015 inches | 0.00: | ±0.10 inches |
|---|---|---|---|
| 0.000: | ±0.005 inches | Angles: | ±1°. |

Figure 10D:
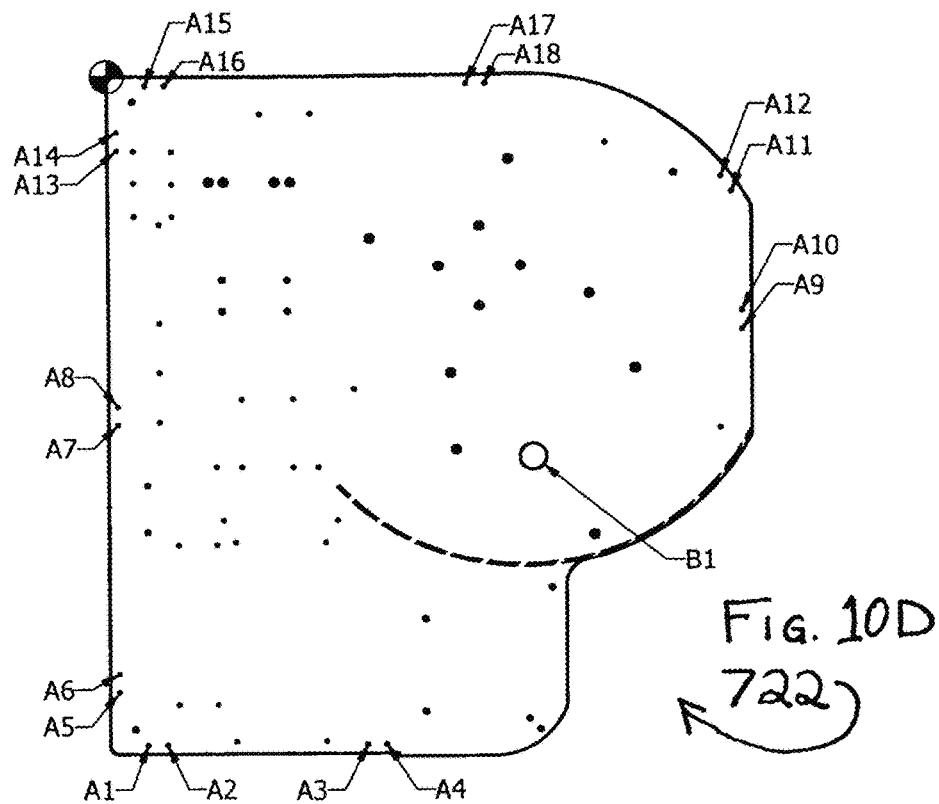
Figure 10E:
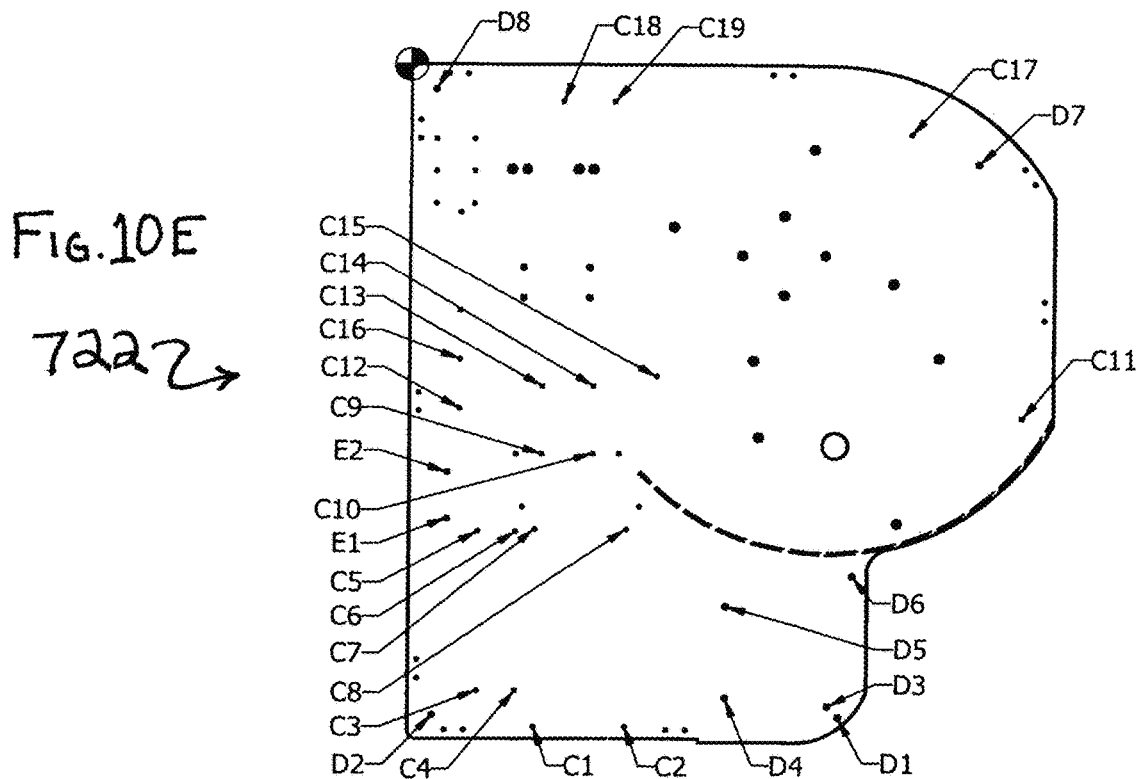
Figure 10F:
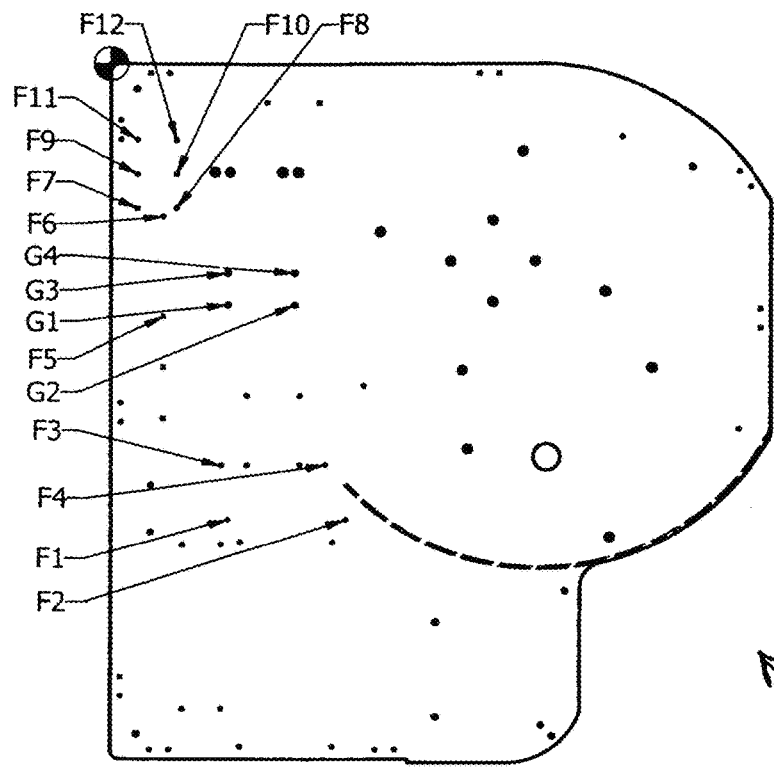
Figure 10G:
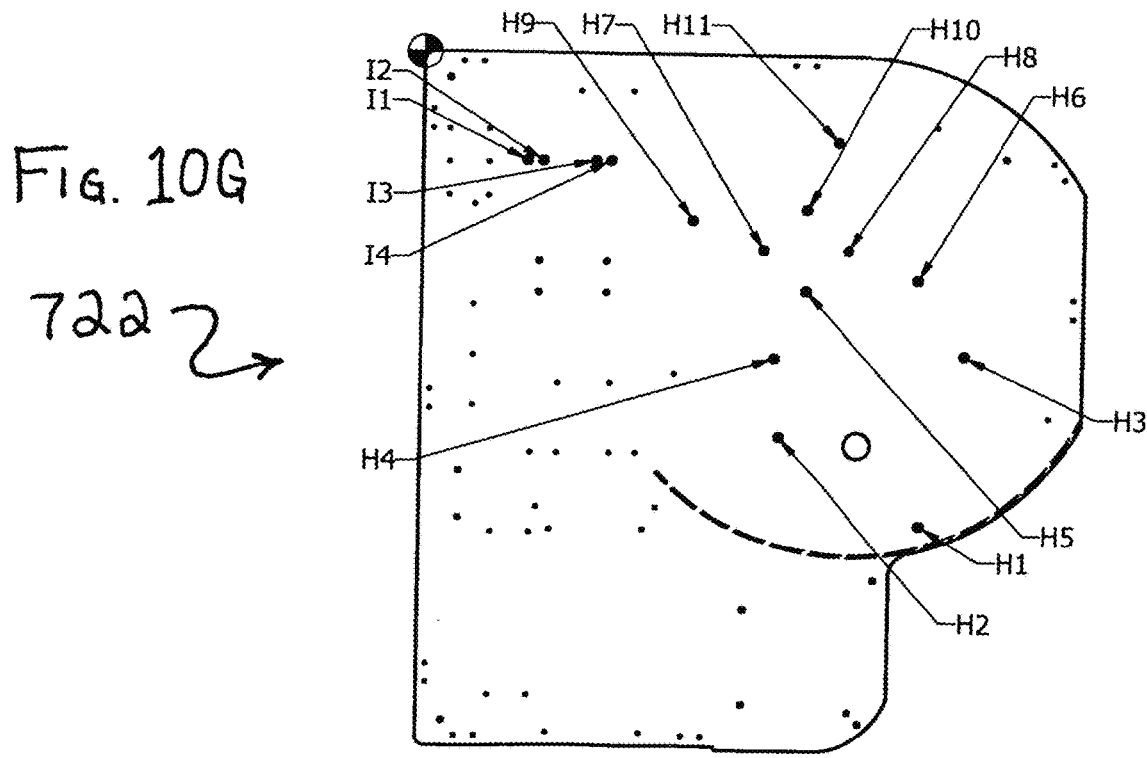

FIGS. 10A-10I, 11A-11F, 12A-12D, 13A-13D and 14A-14G are views of component parts, with tables, comprising a cabinet system as for the instrumentation of FIG. 1, as follows:

FIGS. 10A-10G are views of a cabinet base, with FIG. 10A a top plan view; FIG. 10B a side elevational view; FIG. 10C a top perspective view; and FIGS. 10D-10G bottom plan views of hole layout charts therein. FIGS. 10H and 10I are hole layout tables for the hole layout charts of FIGS. 10D-10G.

FIGS. 11A-11F are views of a carousel shroud, with FIG. 11A a top plan view; FIG. 11B a first side elevational plan view; FIG. 11C a second side elevational plan view opposite the direction of view of FIG. 11B; FIG. 11D a top perspective view; FIG. 11E a flat pattern view of the carousel shroud edge; and FIG. 11F a flat pattern view of the unbent metal pattern of the carousel shroud.

Figure 12A:
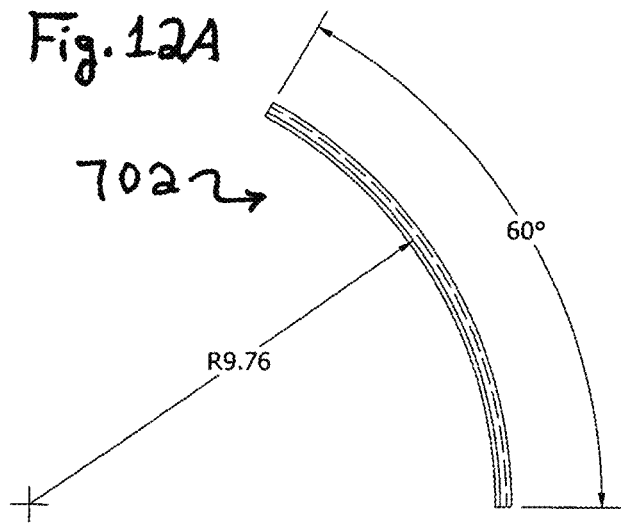
Figures 12B, 12C:
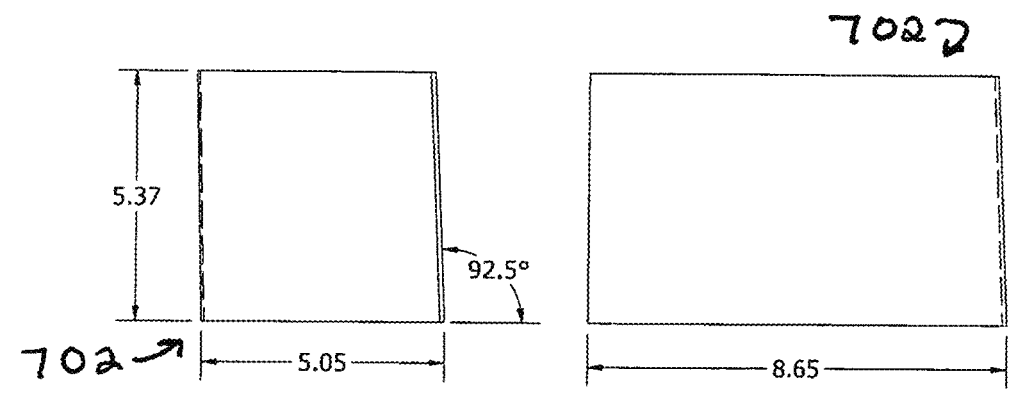
Figure 12D:

FIGS. 12A-12D are views of a cabinet access panel, with FIG. 12A a top plan view; FIG. 12B a first side elevational plan view; FIG. 12C a second side elevational plan view orthogonal to the direction of view of FIG. 12B; and FIG. 12D is a perspective view whereof.

FIGS. 13A-13D are views of a cabinet member, with FIG. 13A a front elevational plan view; FIG. 13B a bottom plan view; FIG. 13C a sectional view, taken along section line A-A in FIG. 13B; and FIG. 13D a top, right perspective view.

Figure 14A:
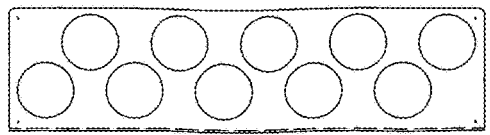
Figure 14B:
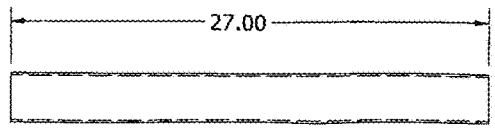
Figure 14C:
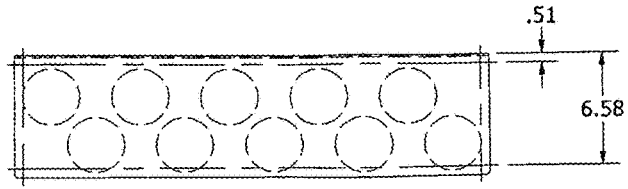
Figure 14D:
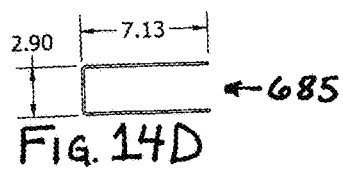
Figure 14E:
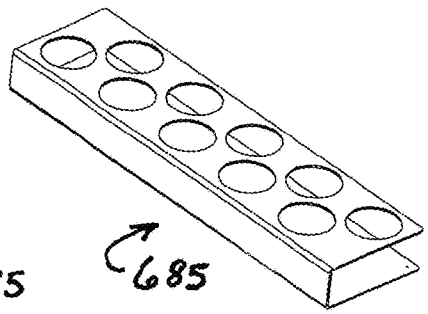
Figure 14F:
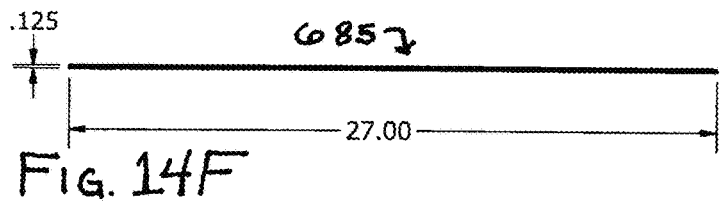
Figure 14G:
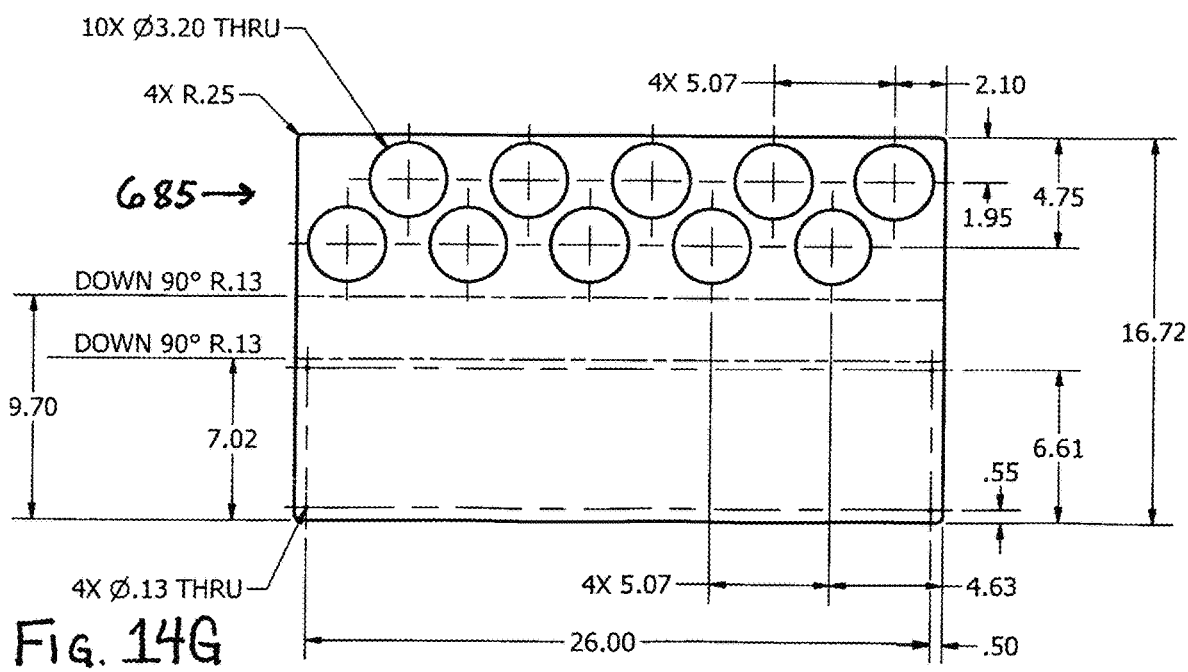

FIGS. 14A-14G are views of a reference sample rack, for example, for oil samples, with FIGS. 14A-14E views of the rack folded for use and FIGS. 14F and 14G views of the rack before folding, i.e., flat rack. FIG. 14A is a top plan view; FIG. 134 a first side elevational plan view;

FIG. 14C a bottom plan view; FIG. 14D a second side elevational plan view orthogonal to the direction of view of FIG. 14B; FIG. 14E a top perspective view; FIG. 14F a side elevational view; and FIG. 14G a top view. The reference rack holds reference fluid bottles, for example, bottles of reference oils, and a bottle to use as a injecting gas, for example, air, accumulator. The reference fluids, for example, as reference oils, have a known viscosity, and are used to establish a correlation between the signal from the torque sensor and viscosity; have a known viscosity at a specific shear rate, which is used to establish an operating position resulting in a specific shear rate; or can be used between tests to maintain the rotor and stator in good working condition.

Figure 15A:
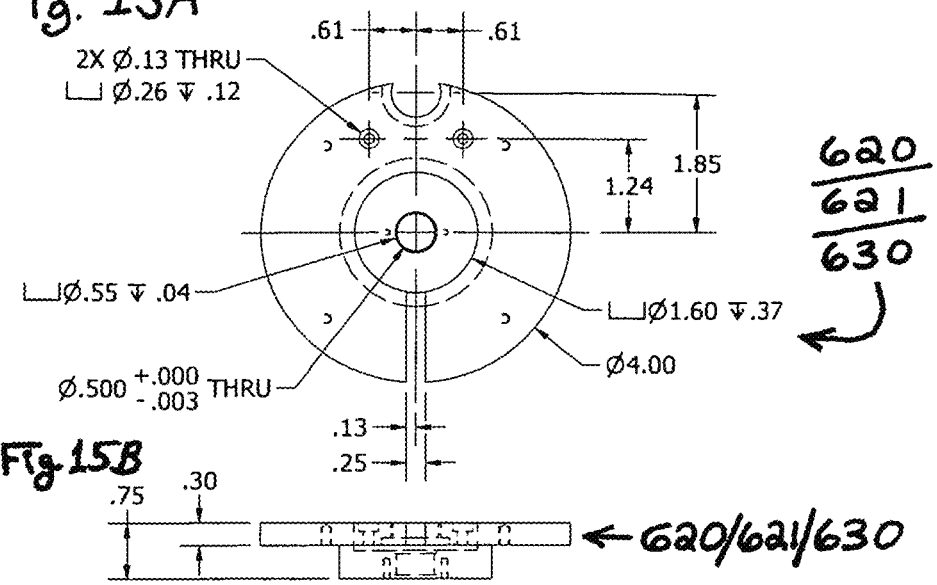
Figure 15B:
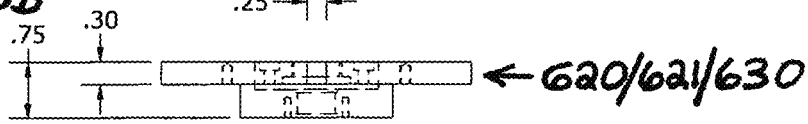
Figure 15C:
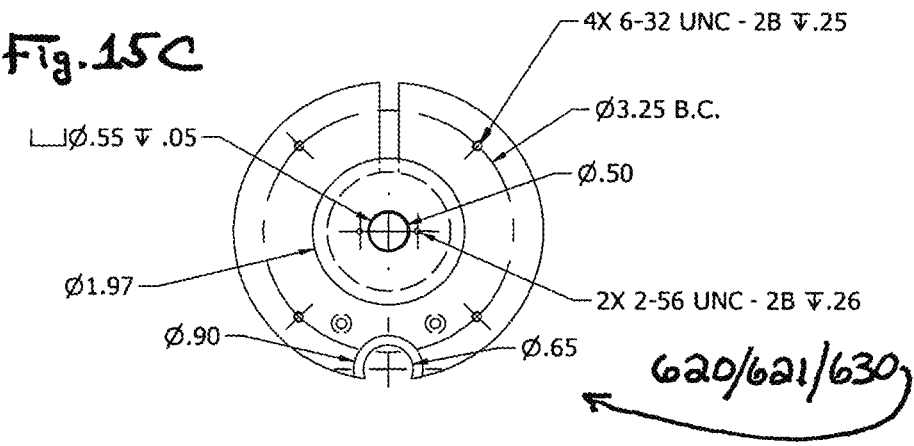
Figure 15D:
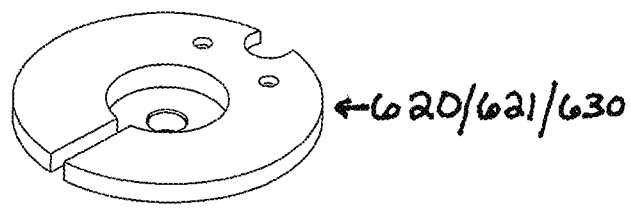
Figure 15E:
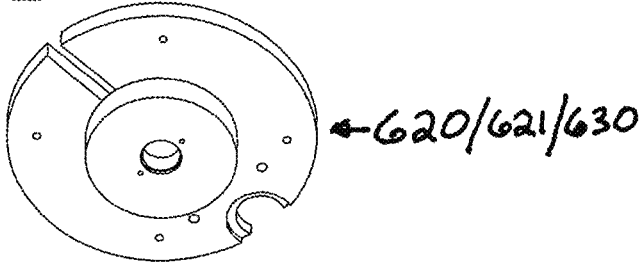

FIGS. 15A-15E, 16A-16D, 17A-17E, 18A-18D, 19A-19E, 20A-20E, 21A-21E, and 22A-22E are views of component parts comprising a carousel system for holding reference and test samples as for the instrumentation of FIG. 1, as follows:

FIGS. 15A-15D are views of a carousel motor mount, with FIG. 15A a bottom plan view; FIG. 15B a side elevational plan view; FIG. 15C a top plan view; FIG. 15D a top perspective view; and FIG. 15E a bottom perspective plan view.

FIGS. 16A-16D are views of a carousel top plate quarter section, noting that four such sections are employed to make up a carousel top plate, with FIG. 16A a side elevational plan view; FIG. 16B a top plan view; FIG. 16C a top perspective view; and FIG. 16D a bottom perspective view.

FIGS. 17A-17E are views of a carousel drive motor post, noting that four such posts are employed in this exemplary embodiment, with FIG. 17A a top plan view; FIG. 17B a side elevational plan view; FIG. 17C a bottom plan view; FIG. 17D a top perspective view; and FIG. 17E a bottom perspective view.

FIGS. 18A-18D are views of a carousel dowel, noting that four such dowels are employed in this exemplary embodiment, with FIG. 18A a top plan view; FIG. 18B a side elevational plan view; FIG. 18C a bottom plan view; and FIG. 18D a perspective view.

FIGS. 19A-19E are views of a carousel bearing post, noting that four such posts are employed in this exemplary embodiment, with FIG. 19A a top plan view; FIG. 19B a side elevational plan view; FIG. 19C a bottom plan view; FIG. 19D a bottom perspective view; and FIG. 19E a top perspective view.

FIGS. 20A-20E are views of a carousel coupler, with FIG. 20A a top plan view; FIG. 20B a side elevational plan view; FIG. 20C a bottom plan view; FIG. 20D a top perspective view; and FIG. 20E a bottom perspective view.

FIGS. 21A-21E are views of a carousel lower plate, with FIG. 21A a top plan view; FIG. 21B a side elevational plan view; FIG. 21C a bottom plan view; FIG. 21D a top perspective view; and FIG. 21E a bottom perspective view.

FIGS. 22A-22E are views of a carousel lower plate, with FIG. 22A a top plan view; FIG. 22B a side elevational plan view; FIG. 22C a bottom plan view; FIG. 22D a top perspective view; and FIG. 22E a bottom perspective view.

FIGS. 23A-23G, 24A-24G, 25A-25D, 26A-26F, 27A-27F, 28A-28I, 29A-29F, 30A-30D, 31A-31F, 32A-32E, 33A-33D, 34A-34C, 35A-35C, 36A-36E, 37A-37E, 38A-38C, 39A-39D, 40A-40D, 41A-41E, 42A-42C, 43A-43C and 44A-44C are views of components/features of a rotational dynamometer tower system for examining reference and test samples as for the instrumentation of FIG. 1, as follows:

FIGS. 23A-23G are views of a torque sensor collet, with FIG. 23A a bottom plan view; FIG. 23B an inverted, side elevational plan view; FIG. 23C a top plan view; FIG. 23D an inverted, side elevational plan view, taken within detail feature B in FIG. 23B; FIG. 23E an inverted, sectional side elevational plan view, taken along section line A-A in FIG. 23C; FIG. 23F a bottom perspective view; and FIG. 23G a top perspective view.

FIGS. 24A-24G are views of a torque sensor platform, with FIG. 24A a top plan view; FIG. 24B a side elevational plan view, taken in the direction of arrow 24B in FIG. 24F; FIG. 24C a bottom plan view; FIG. 24D a first side elevational, quartering plan view, taken along the viewing direction A-A in FIG. 24A; FIG. 24E a second side elevational plan view orthogonal to the direction of view and taken in the direction of arrow 24E of FIG. 24B; FIG. 23F a top perspective view; and FIG. 23G a bottom perspective view.

FIGS. 25A-25D are views of a back corner elevator support, with FIG. 25A a first side elevational plan view; FIG. 25B a top plan view; FIG. 25C a second side elevational plan view orthogonal to the direction of view of FIG. 25A; and FIG. 25D a top perspective view.

FIGS. 26A-26F are views of a right wing corner elevator support, with FIG. 26A a first side elevational plan view; FIG. 26B a top plan view; FIG. 26C a second side elevational plan view orthogonal to the direction of view of FIG. 26A; FIG. 26D a bottom plan view; FIG. 26E a top, front perspective view; and FIG. 26F a top, rear perspective view.

FIGS. 27A-27F are views of a left wing corner elevator support, with FIG. 27A top plan view; FIG. 27B a first side elevational plan view; FIG. 27C a bottom plan view; FIG. 27D a second side elevational plan view orthogonal to the direction of view of FIG. 27B; FIG. 27E a top, rear perspective view; and FIG. 27F a top, front perspective view.

Figures 28A, 28B, 28D:
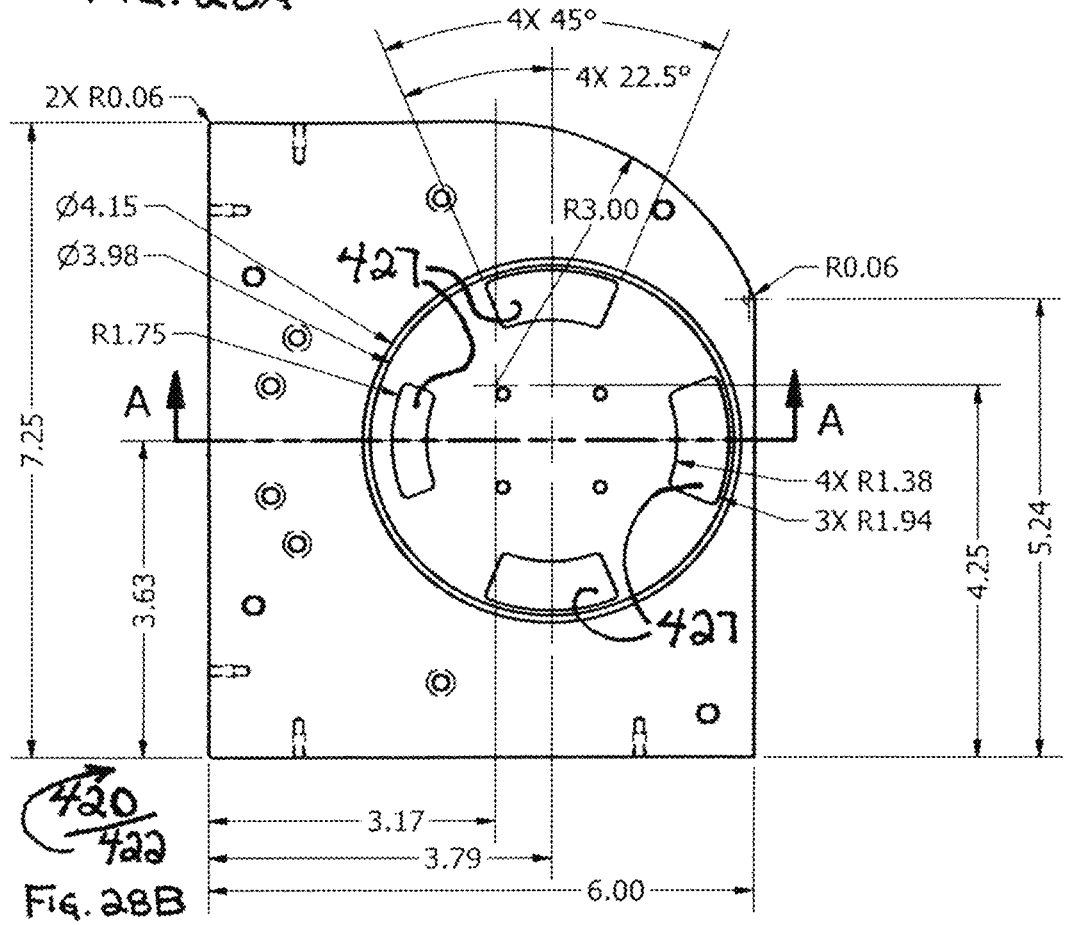

FIGS. 28A-28H are views of a chassis base, with FIG. 28A a side elevational plan view; FIG. 28B a top plan view; FIG. 28C a sectional side elevation plan view, taken along section line A-A in FIG. 28B; FIG. 28D a top perspective view; FIG. 28E a first side elevational plan view of a hole layout chart, comparing to FIG. 28A; FIG. 28F a second side elevational plan view of a hole layout chart, taken orthogonal to the direction of view of FIG. 28E; FIG. 28G a top plan view of a hole layout chart; and FIG. 28H a third side elevational plan view of a hole layout chart, taken opposite the direction of view of FIG. 28E. FIG. 28I is a hole layout table for the hole layout charts of FIGS. 28E-28II.

FIGS. 29A-29F are views of an x,y-slider, with FIG. 29A a first side elevational plan view; FIG. 29B a bottom plan view; FIG. 29C a second side elevational plan view, taken orthogonal to the direction of view of FIG. 29A; FIG. 29D a side elevational plan view, taken within detail feature A in FIG. 29A; FIG. 29E a top perspective view; and FIG. 29F a bottom perspective view.

FIGS. 30A-30D are views of an x,y-base, with FIG. 30A a top plan view; FIG. 30B a first side elevational plan view; FIG. 30C a second side elevational plan view, taken opposite the direction of view of FIG. 30B; and FIG. 30D a top perspective view.

FIGS. 31A-31F are views of a stator employed herein, with FIG. 31A a top plan view; FIG. 31B a side elevational plan view; FIG. 31C a bottom plan view; FIG. 31D a sectional side elevation plan view, taken along section line A-A in FIG. 31A; FIG. 31E a top perspective view; and FIG. 31F a bottom perspective view.

FIGS. 32A-32E are views of a stator lid, with FIG. 32A a top plan view; FIG. 32B a sectional side elevation plan view, taken along section line A-A in FIG. 32C; FIG. 32C a bottom plan view; FIG. 32D a top perspective view; and FIG. 32E a bottom perspective view.

Figure 33A:
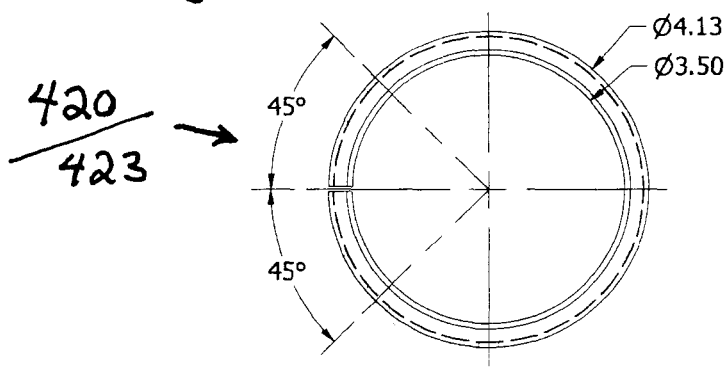
Figure 33B:
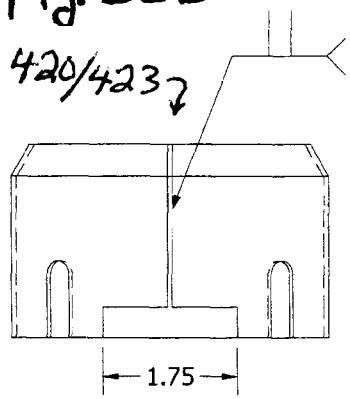
Figure 33C:
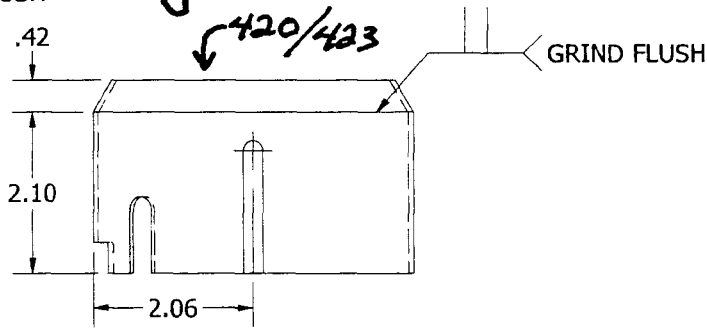
Figure 33D:
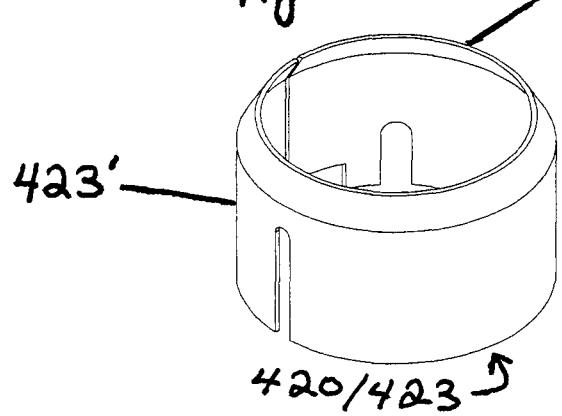

FIGS. 33A-33D are views of an air duct assembly, which includes an air duct cylinder and an air duct nozzle, with FIG. 33A a top plan view; FIG. 33B a first side elevational plan view; FIG. 33C a second side elevational plan view, taken orthogonal to the direction of view of FIG. 33B; and FIG. 33D a top perspective view.

Figure 34A:
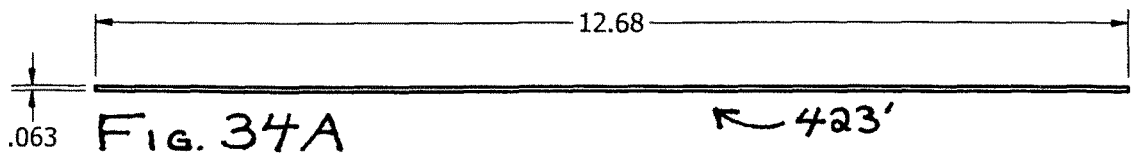
Figure 34B:
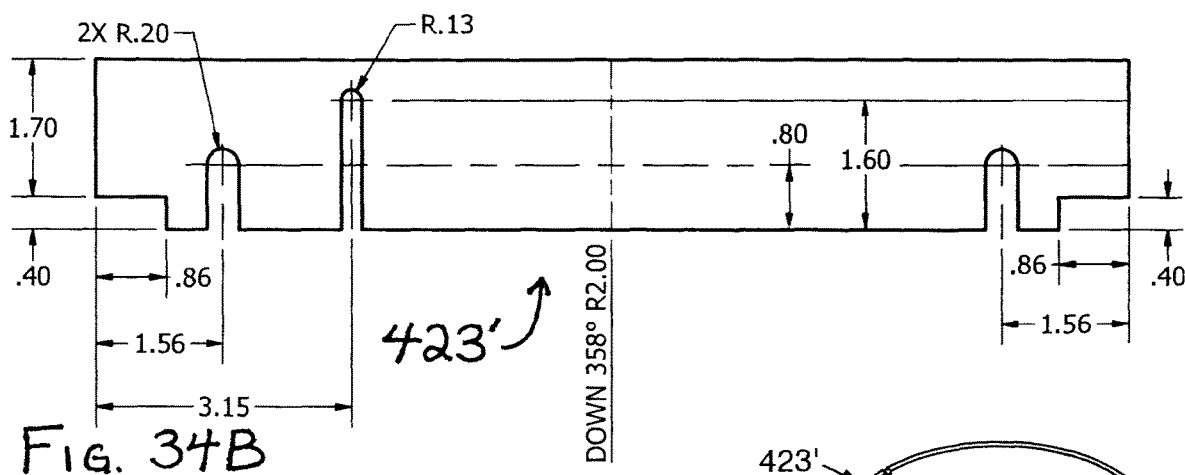
Figure 34C:
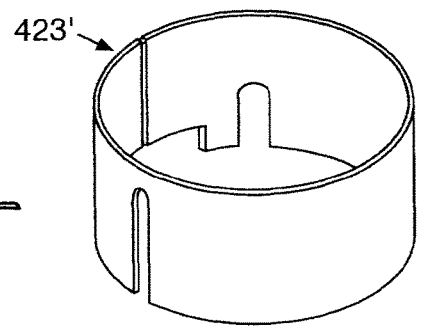

FIGS. 34A-34C are views of an air duct cylinder as found in the air duct assembly of FIGS. 33A-33D, with FIG. 34A a top plan view of an air duct cylinder before being finally formed, i.e., flat; FIG. 34B a side plan view of the flat air duct cylinder of FIG. 34A; and FIG. 34C a top perspective view of the air duct cylinder, finally formed. The present, finally formed air duct cylinder and the finally formed air duct nozzle of FIG. 35C are welded to form the air duct assembly of FIGS. 33A-33D.

Figure 35A:
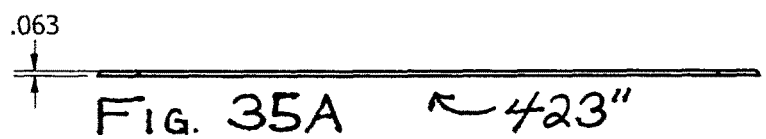
Figure 35B:
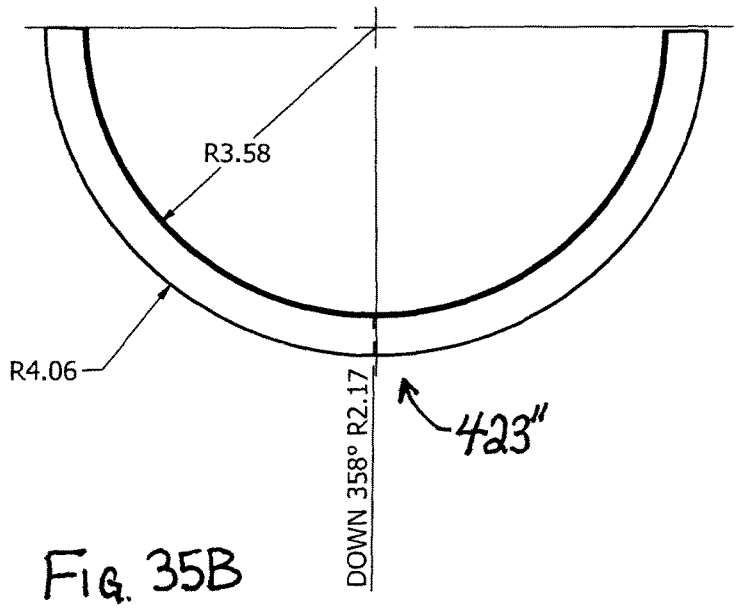
Figure 35C:
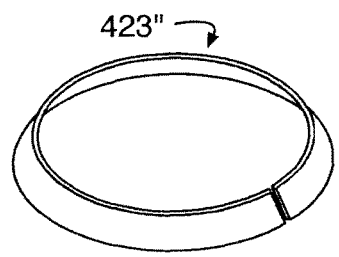

FIGS. 35A-35C are views of an air duct nozzle as found in the air duct assembly of FIGS. 33A-33D, with FIG. 35A a side plan view of an air duct nozzle before being finally formed, i.e., flat; FIG. 35B a top plan view of the flat air duct nozzle of FIG. 35A; and FIG. 35C a top perspective view of the air duct nozzle, finally formed. The present, finally formed air duct nozzle and the finally formed air duct cylinder of FIG. 34C are welded to form the air duct assembly of FIGS. 33A-33D.

Figure 36A:
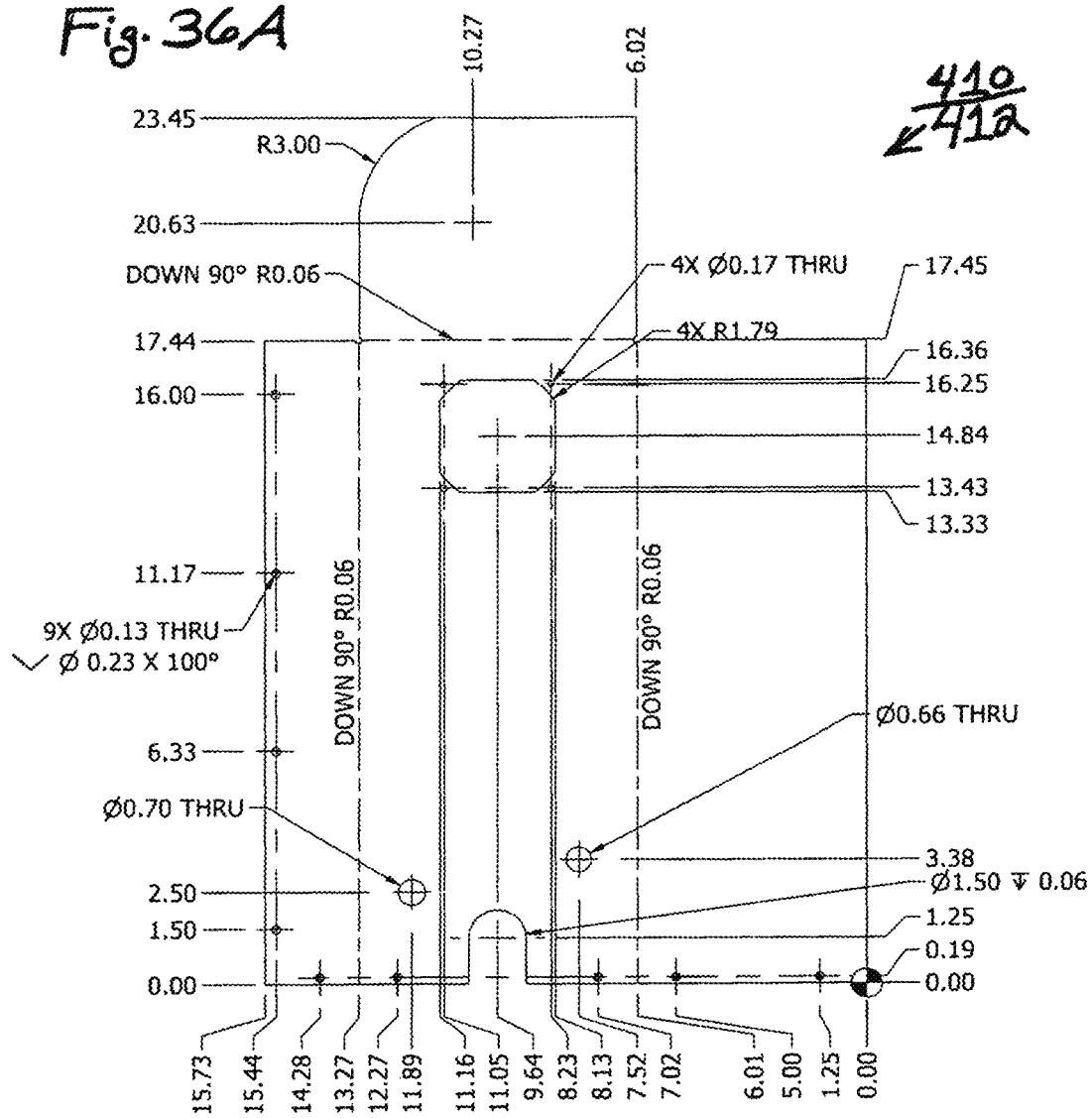

FIGS. 36A-36E are views of an elevator enclosure, with FIG. 36A a side plan view of an elevator enclosure before being finally formed, i.e., flat; FIG. 36B a top plan view of the elevator enclosure, finally formed, i.e., round; FIG. 36C a first side elevational plan view of the round elevator enclosure; FIG. 36D a second side elevational plan view of the round elevator enclosure, taken orthogonal to the direction of view of FIG. 36C; and FIG. 36E a top perspective view of the round elevator enclosure.

FIGS. 37A-37E are views of an elevator enclosure door, with FIG. 37A a side plan view of an elevator enclosure door before being finally formed, i.e., flat; FIG. 37B a top plan view of the elevator enclosure, finally formed, i.e., round; FIG. 37C a first side elevational plan view of the round elevator enclosure door; FIG. 37D a second side elevational plan view of the round elevator enclosure door, taken orthogonal to the direction of view of FIG. 37C; and FIG. 37E a top perspective view of the round elevator enclosure door.

FIGS. 38A-38C are views of a stator insulator, with FIG. 38A a top plan view; FIG. 38B a side elevational plan view; and FIG. 38C a top perspective view.

FIGS. 39A-39D are views of a motor mount body, with FIG. 39A a top plan view; FIG. 39B a side elevational plan view; FIG. 39C a bottom plan view; and FIG. 39D a top perspective view.

FIGS. 40A-40D are views of a motor mount post, with FIG. 40A a top plan view; FIG. 40B a side elevational plan view; FIG. 40C a bottom plan view; and FIG. 40D a top perspective view.

FIGS. 41A-41E are views of an x,y-actuator coupling, with FIG. 41A a top plan view; FIG. 41B a first side elevational plan view; FIG. 41C a bottom plan view; FIG. 41D a second side elevational plan view, taken orthogonal to the direction of view of FIG. 41B; and FIG. 41E a perspective plan view.

FIGS. 42A-42C are views of an x,y-actuator threaded rod, with FIG. 42A a side plan view; FIG. 42B a top plan view; and FIG. 42C a side perspective view.

FIGS. 43A-43C are views of a motor mount insulator, with FIG. 43A a top plan view; FIG. 43B a side elevational plan view; and FIG. 43C a top perspective view.

FIGS. 44A-44C are views of an encoder adapter, with FIG. 44A a top plan view; FIG. 44B a side elevational plan view; and FIG. 43C a top perspective view.

Figure 45A:
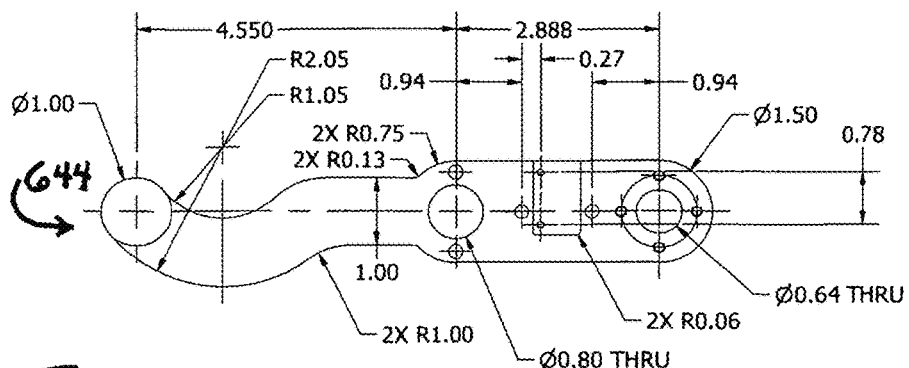
Figure 45B:
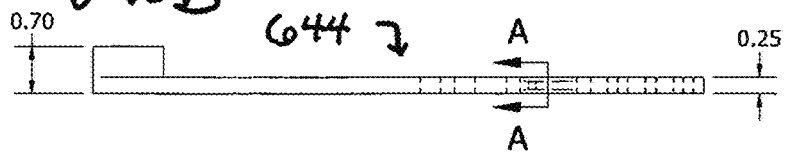
Figure 45D:
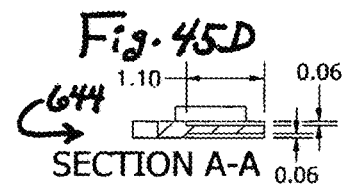
Figure 45C:
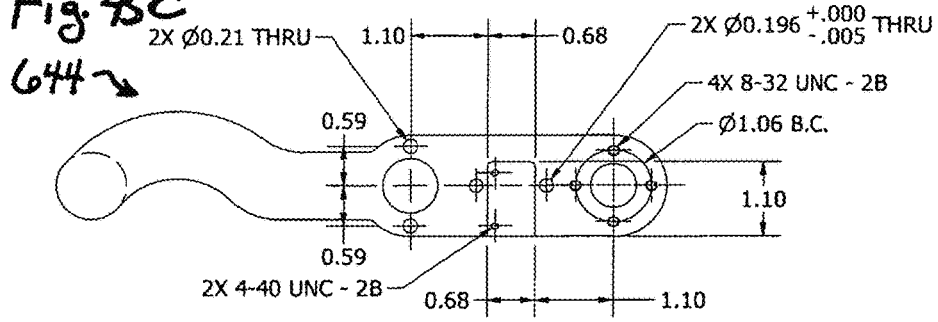
Figure 45E:
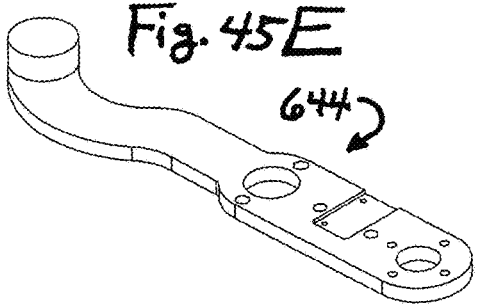

FIGS. 45A-45E, 46A-46F, 47A-47C, 48A-48K, 49A-49C, 50A-50C, 51A-51E and 52A-52F are views of sample delivery system components as for instrumentation of FIG. 1 as follows:

FIGS. 45A-45E are views of an injection arm, with FIG. 45A a top plan view; FIG. 45B a side elevational plan view; FIG. 45C a bottom plan view; FIG. 45D an elevational sectional view, taken along A-A in FIG. 45B; and FIG. 45E a top perspective view.

FIGS. 46A-46E are views of an injector receiving arm, also known as a docking port arm, portion of the mechanical thumb, with FIG. 46A a top plan view; FIG. 46B a side elevational sectional view, taken along the section line A-A in FIG. 46A; FIG. 46C is a side, elevational plan view, taken within the detail feature B in FIG. 46B; FIG. 46D is a top, perspective view; and FIG. 46E is a top perspective, cross-sectional view showing the receiving port, ejector cavity, and outlet port.

FIGS. 47A-47C are views of a servo arm extension, with FIG. 47A a side elevational plan view; FIG. 47B a top elevational plan view; and FIG. 47C a perspective view.

FIGS. 48A-48L are views of an injector alignment support and another member, with FIGS. 48A-48E views of the injector alignment support and FIGS. 48F-48L views of the other member, which may be an alternative injector alignment support and/or a mechanical thumb motor mount with motor mount post—with FIG. 48A a top plan view, FIG. 48B a side elevational plan view, FIG. 48C a bottom plan view, and FIGS. 48D and 48E respectively top and bottom perspective views of the former; and with FIG. 48F a top plan view, FIG. 48G a first side elevational plan view taken along arrow 48G in FIG. 48F, FIG. 48H a second side elevational plan view taken along arrow 48H in FIG. 48F, FIG. 48I a perspective view of the mechanical thumb motor mount; and FIG. 48J a top plan view, which is the same as a bottom plan view, FIG. 48K a side elevational plan view; and FIG. 48L a perspective view of the latter.

FIGS. 49A-49C are views of a receiver retaining cap, with FIG. 49A a side elevational plan view; FIG. 49B a bottom plan view; and FIG. 49C a bottom perspective view.

FIGS. 50A-50C are views of a syringe ejector pin, with FIG. 50A a side elevational plan view; FIG. 50B a bottom plan view; and FIG. 50C a top perspective view.

Figure 51A:
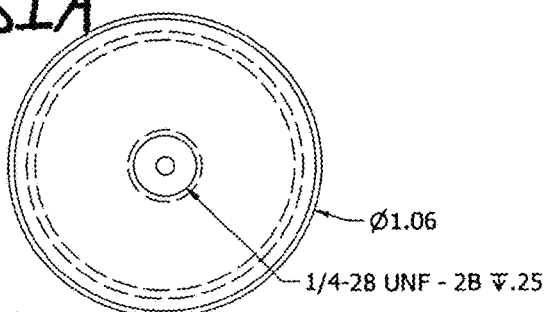
Figure 51B:
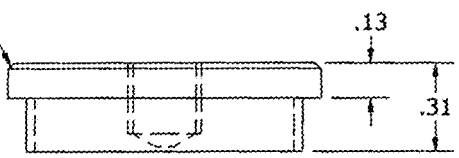
Figure 51C:
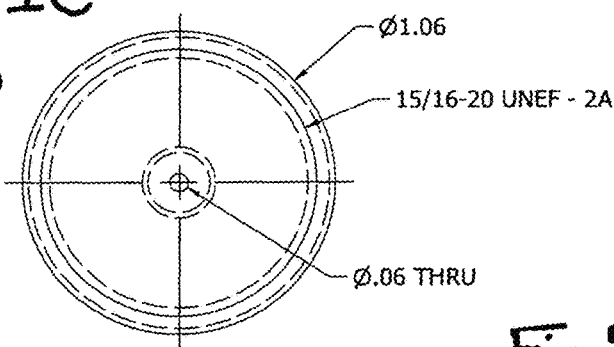
Figure 51D:
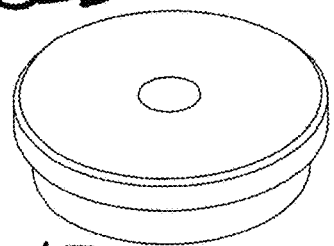
Figure 51E:
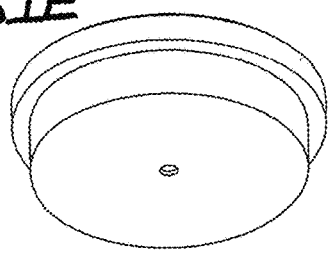

FIGS. 51A-51E are views of a syringe ejector cap, with FIG. 51A a top plan view; FIG. 51B a side elevational view; FIG. 51C a bottom plan view; FIG. 51D a top perspective view; and FIG. 51E a bottom perspective view.

FIGS. 52A-52F are views of a syringe ejector cylinder, with FIG. 52A a top plan view; FIG. 52B a side elevational plan view; FIG. 52C a sectional side elevational view, taken along the section line A-A in FIG. 52A; FIG. 52D is a bottom plan view; FIG. 52E is a top perspective view; and FIG. 52F is a bottom perspective view.

Figure 1A:
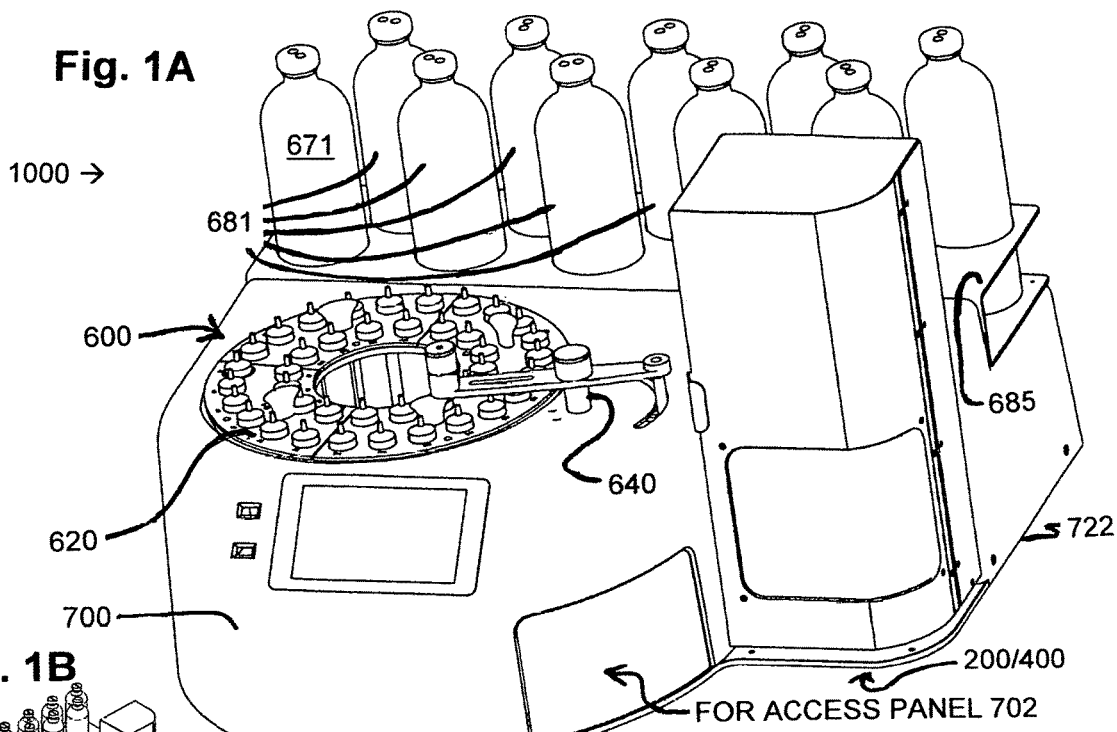
Figure 1B:
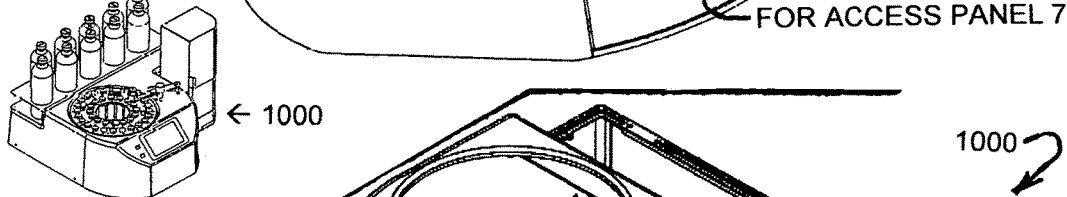
Figure 1C:
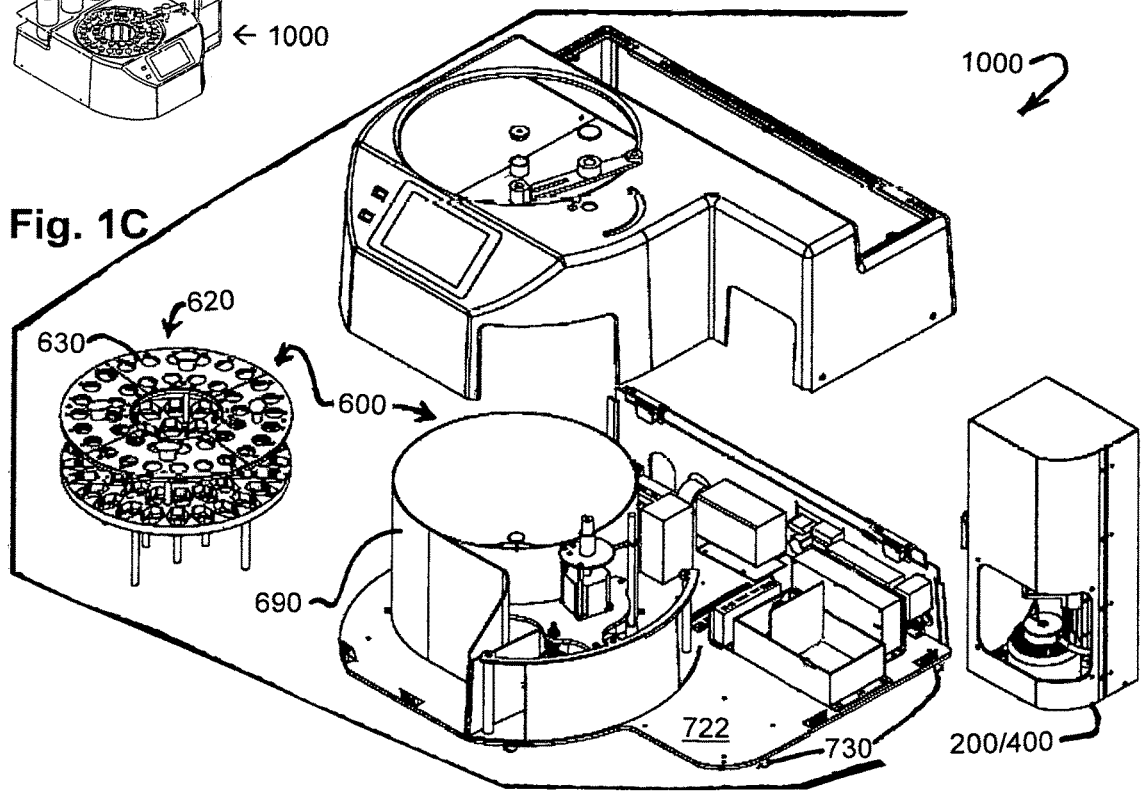
Figure 3B:
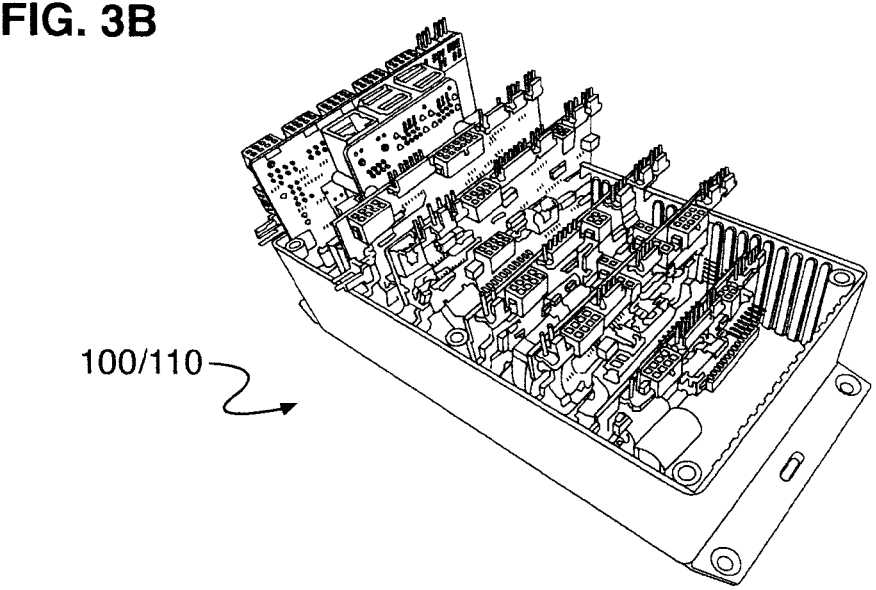
Figure 4:
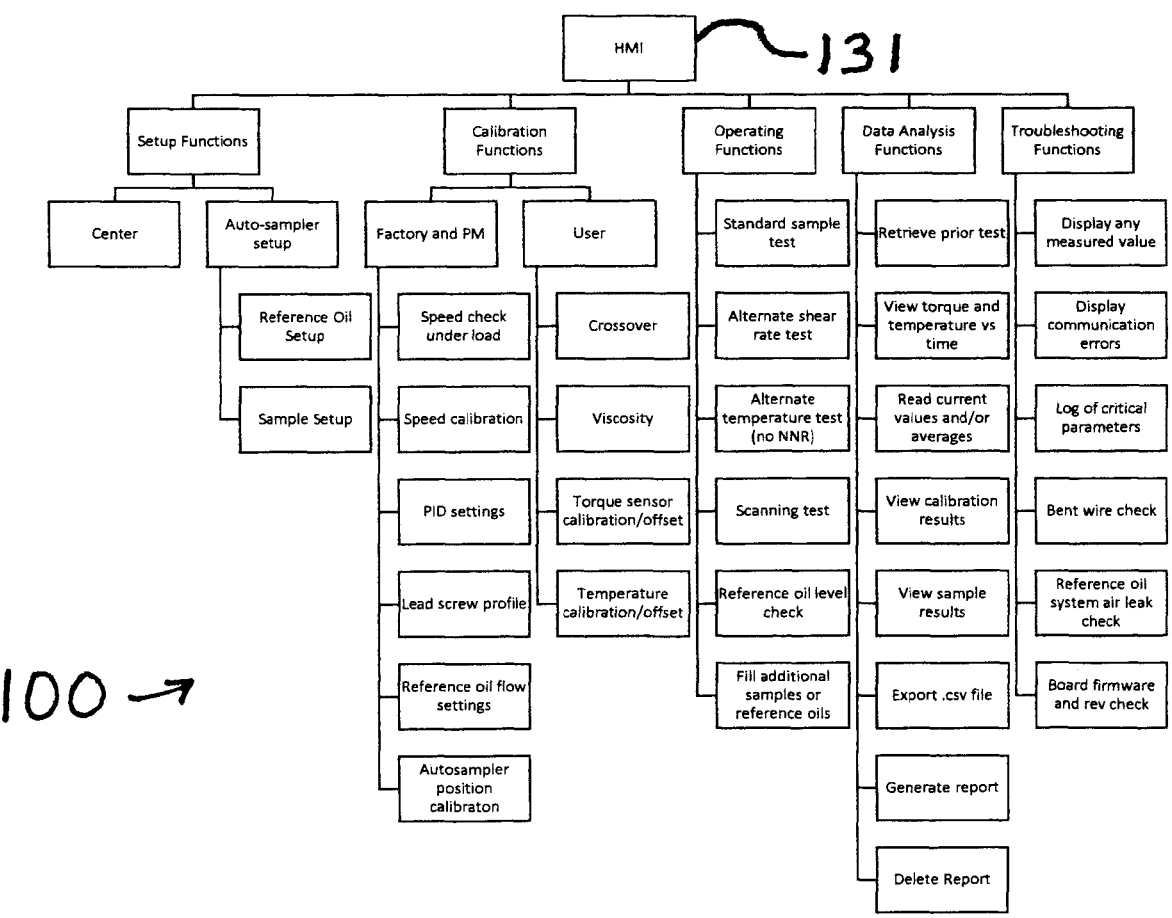
Figure 5A:
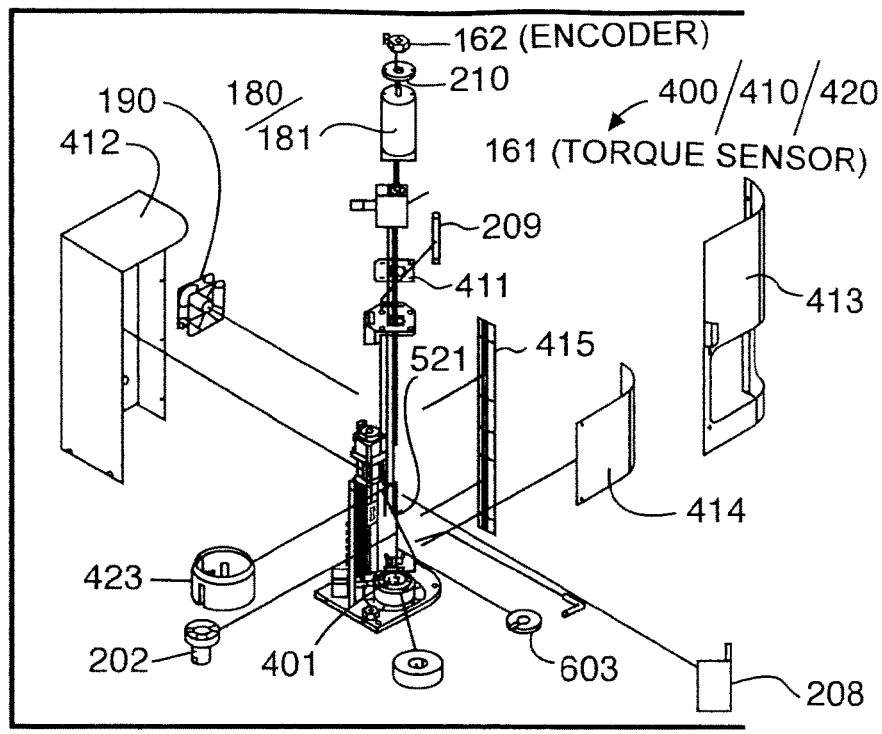
Figure 5B:
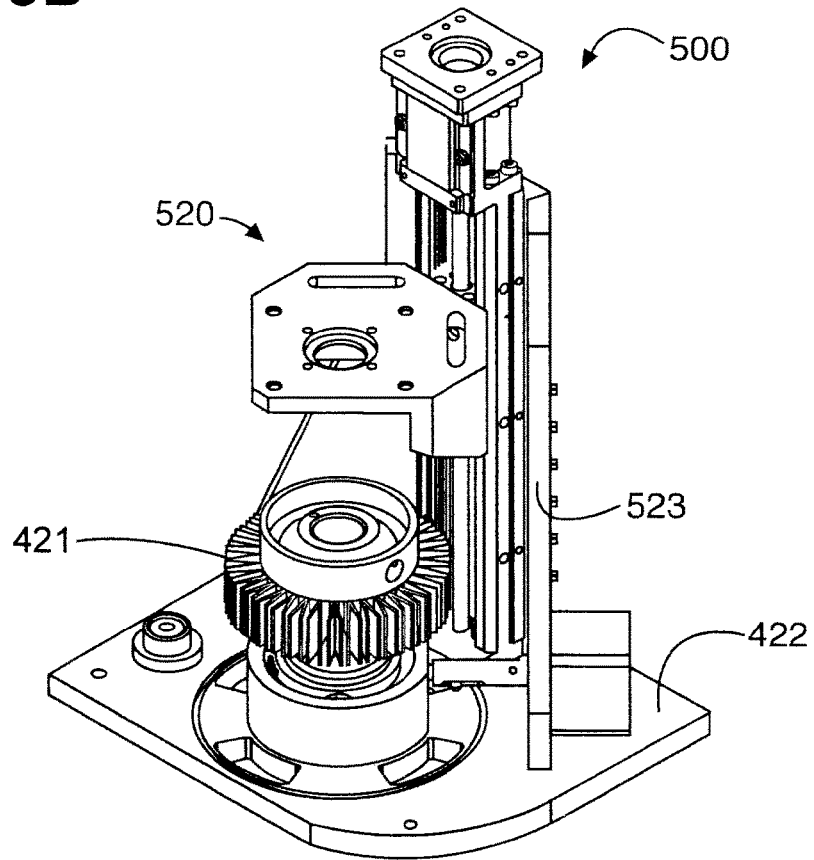
Figure 5C:
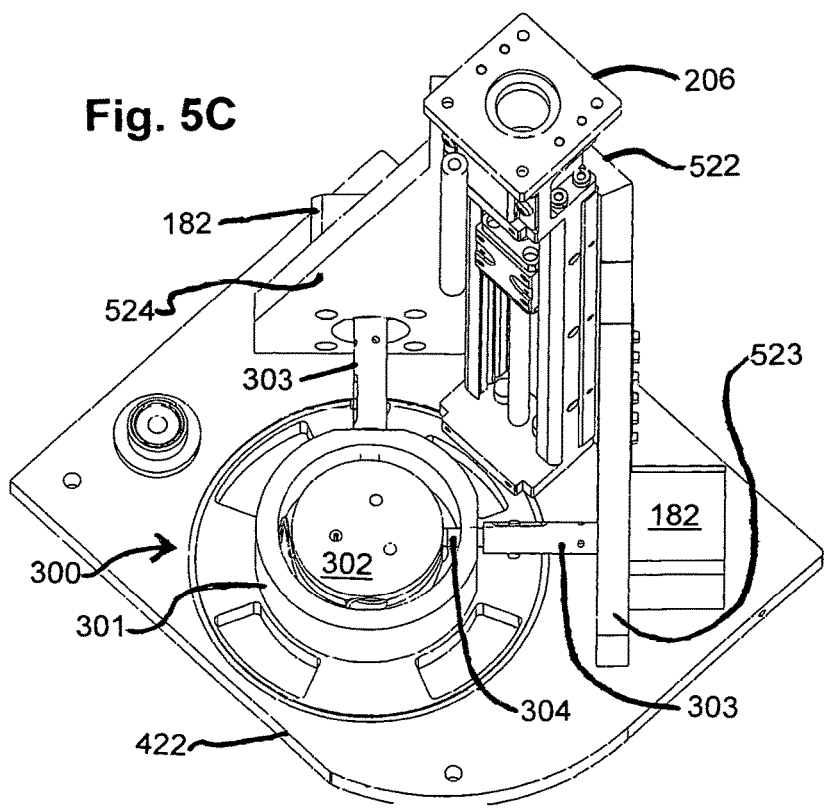
Figure 5F:
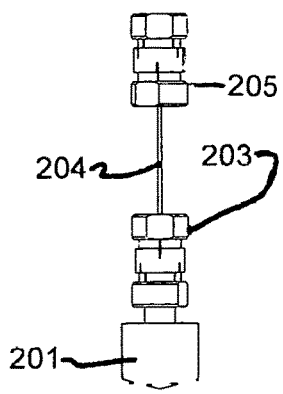
Figure 5D:
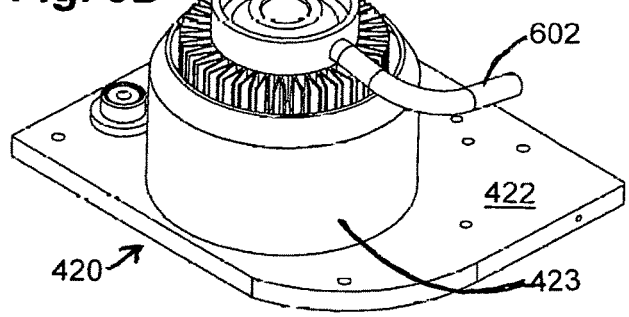
Figure 5G:
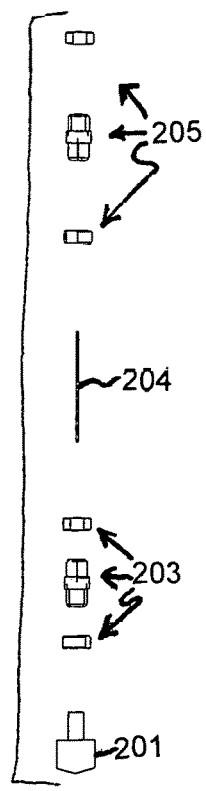
Figure 5E:
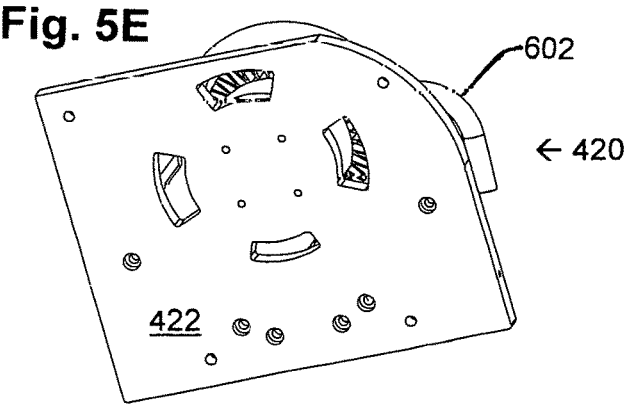
Figure 53:
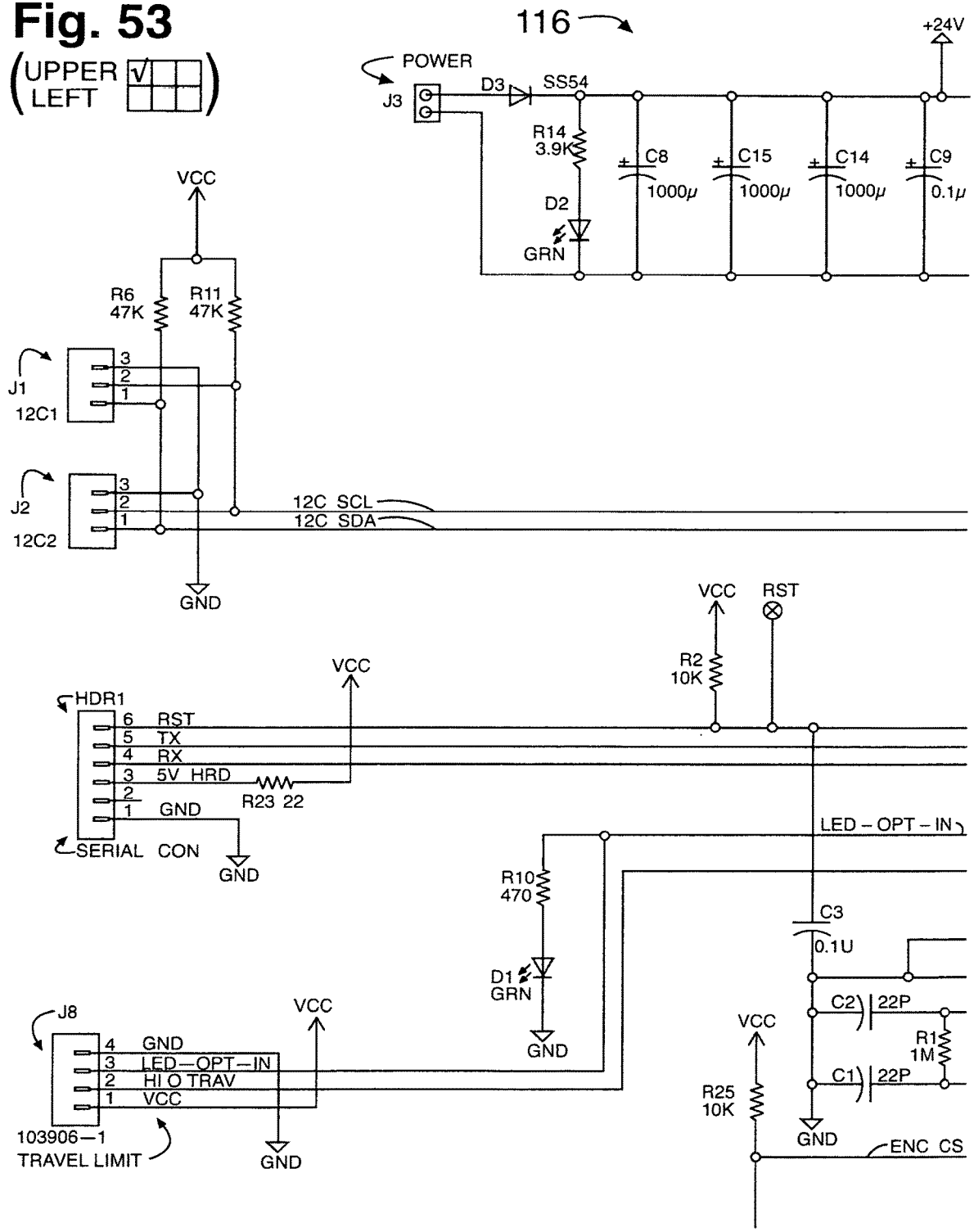
Figure 53:
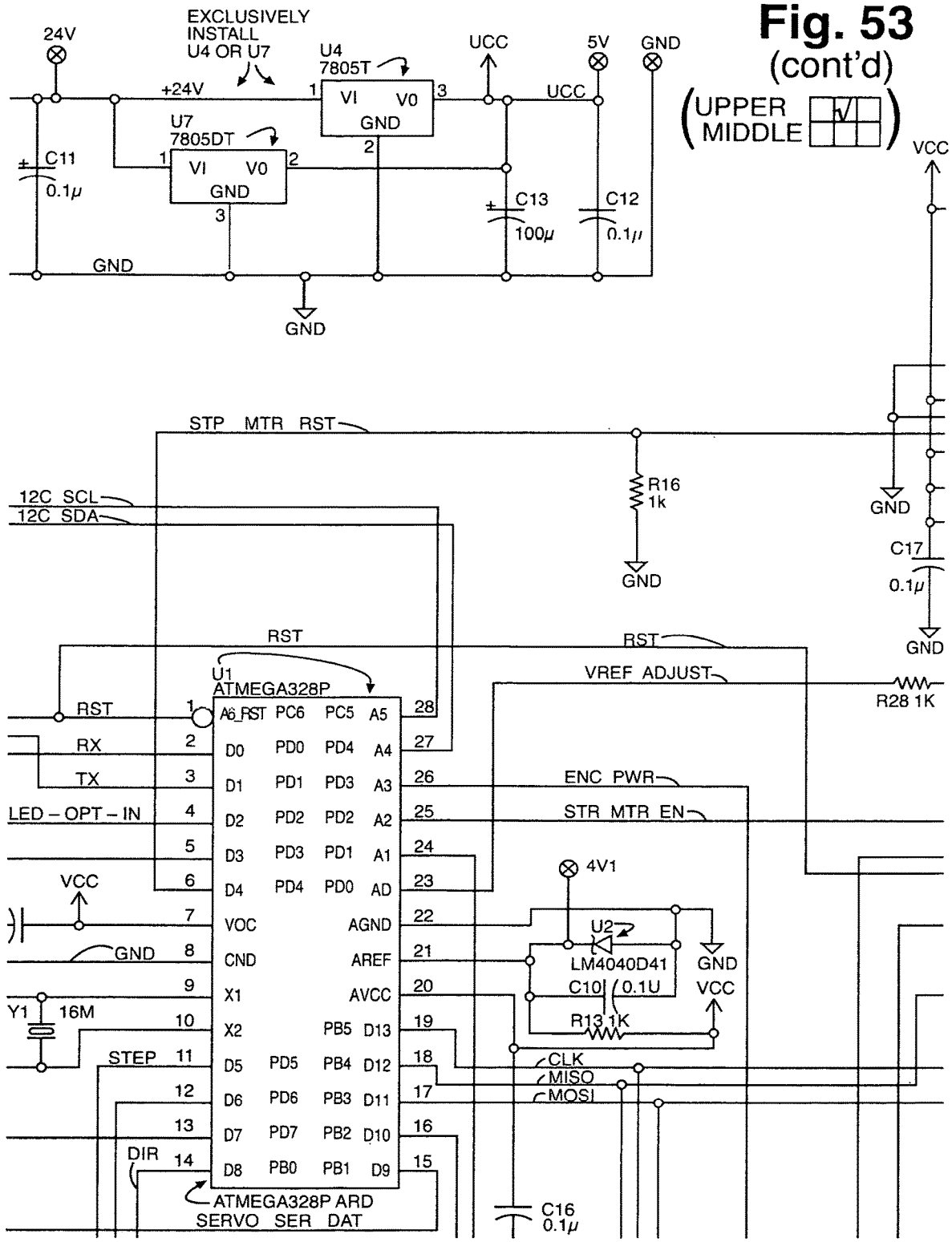
Figure 53:
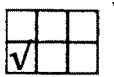
Figure 53:
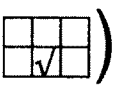
Figure 53:

FIGS. 53-59 are schematic diagrams, which can be embodied in circuit boards for various electronics of component parts as for the instrumentation of FIGS. 1A-1C and functionally shown in FIG. 2A—with the card nest cabling diagram of FIG. 3A card nest cabling diagram showing how these schematic diagrams are interrelated, and FIG. 3B illustrating a module incorporating circuit boards that can embody the same—as follows:

FIG. 53 is an electronic scheme for an auto-sampler, which can be embodied in a circuit board incorporating the scheme.

Figure 54:
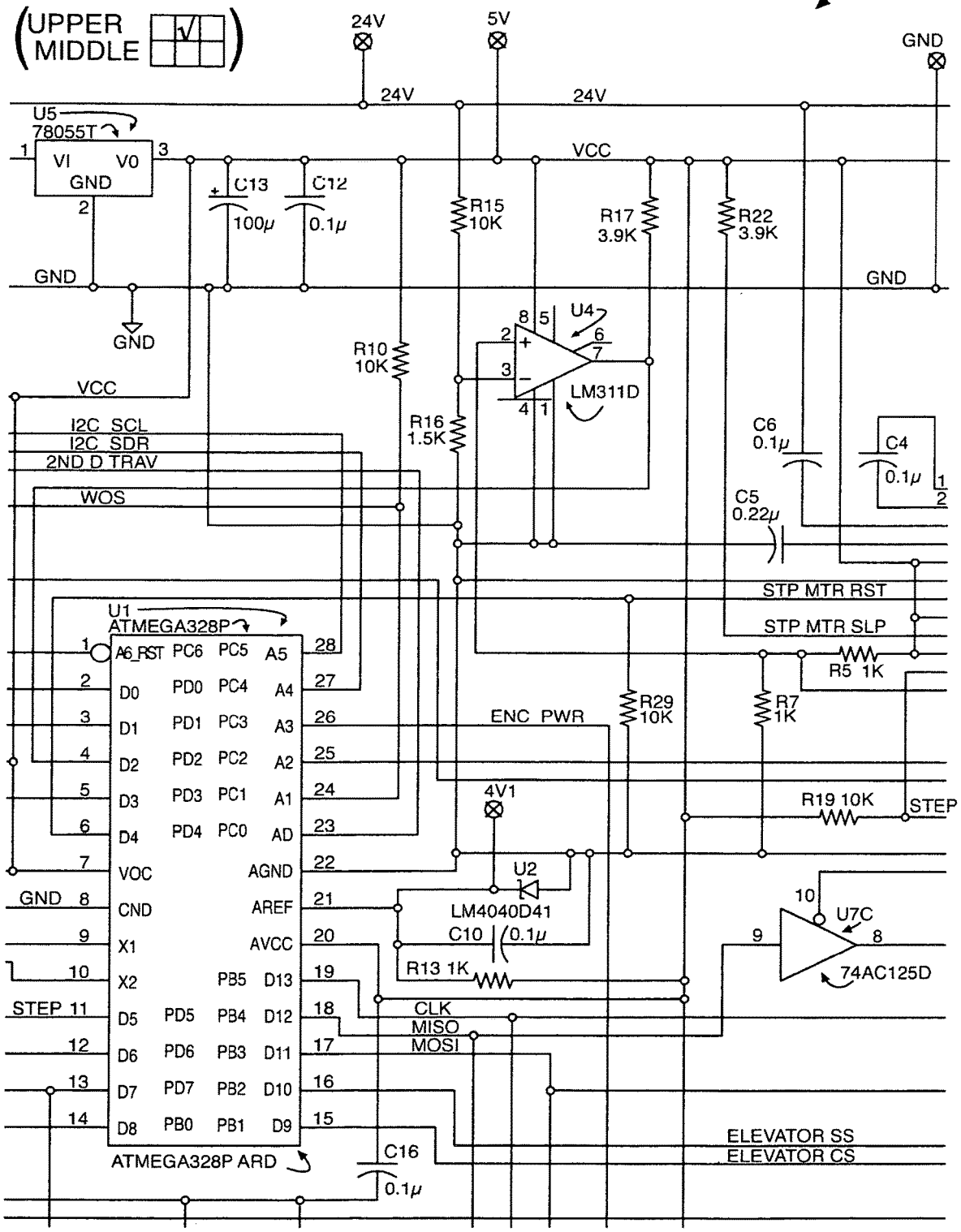
Figure 54:
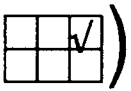

FIG. 54 is an electronic scheme for an elevator, which can be embodied in a circuit board incorporating the scheme.

Figure 55:
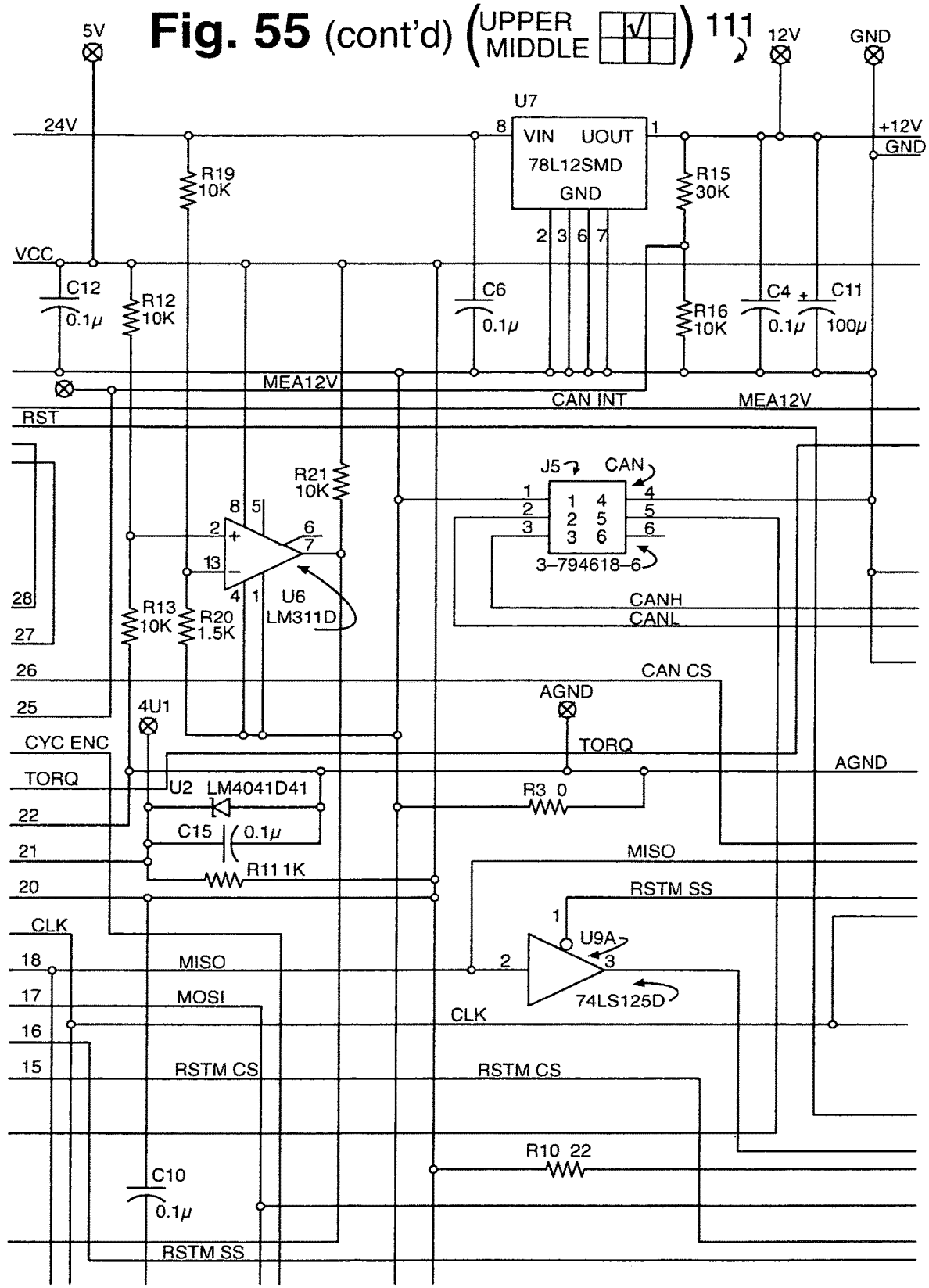
Figure 55:
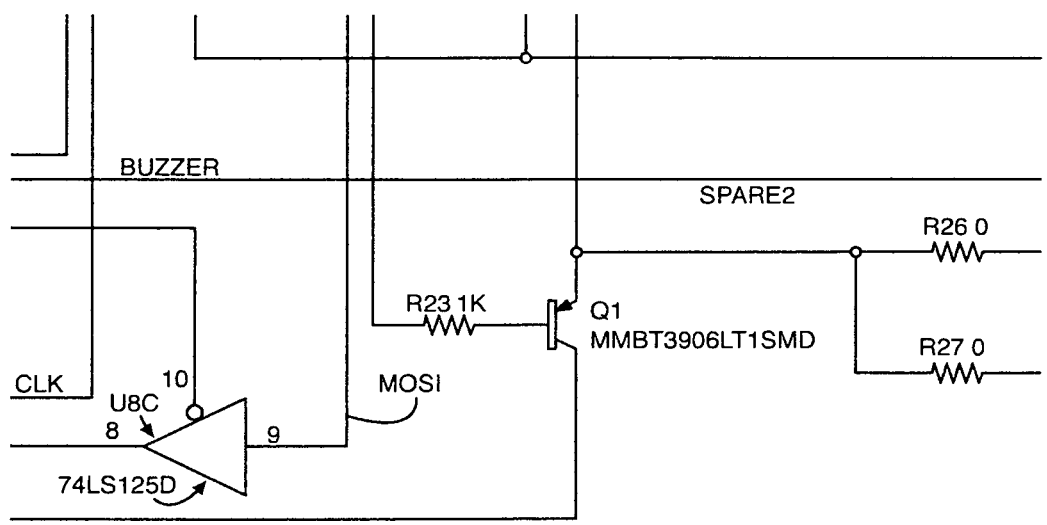

FIG. 55 is an electronic scheme for rotor speed control and torque measurement, which can be embodied in a circuit board incorporating the scheme.

Figure 56:
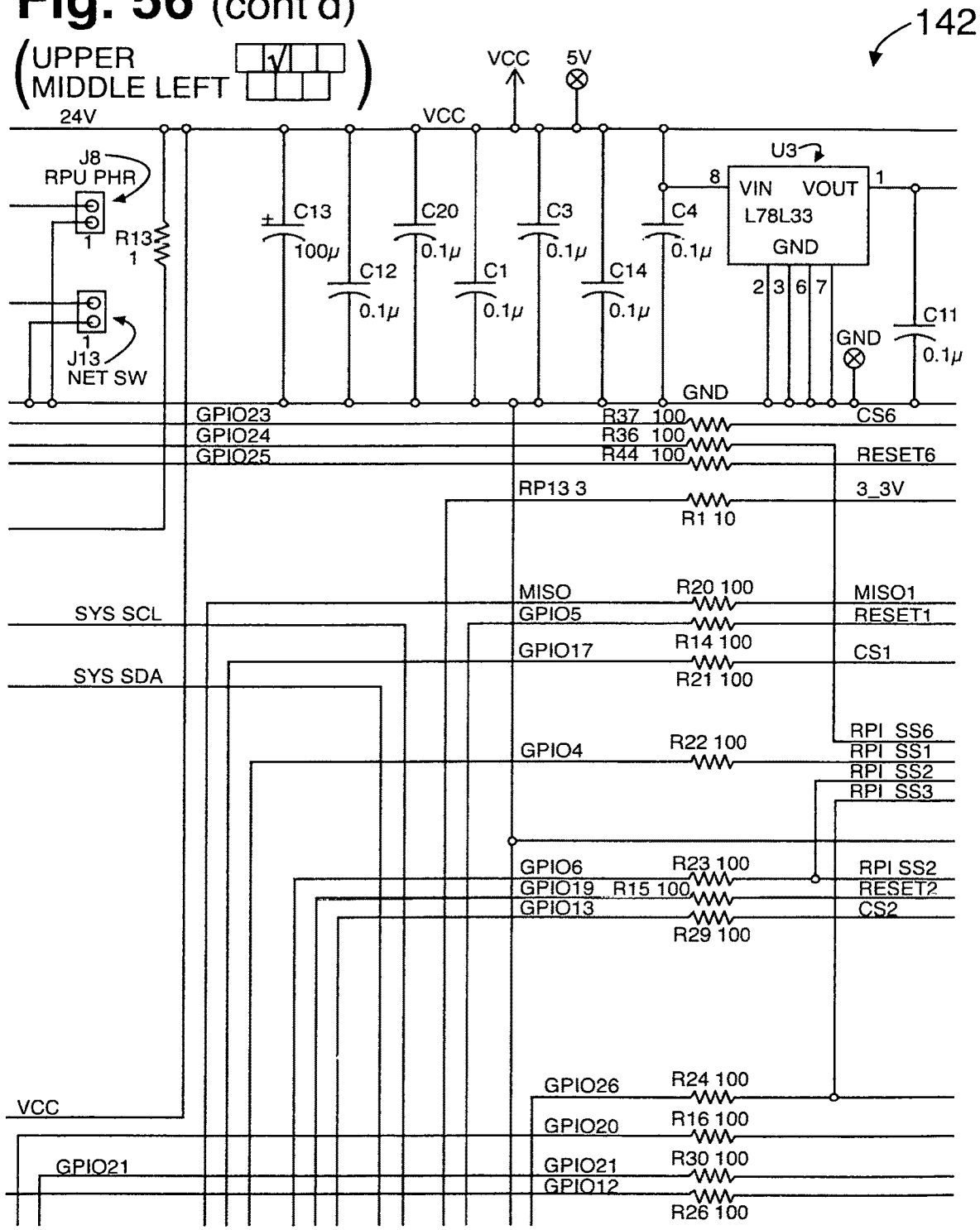
Figure 56:
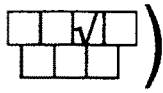
Figure 56:

FIG. 56 is an electronic scheme for a Raspberry Pi "3," single board computer, i.e., RPI3 SBC, adapter board, which can be embodied in a circuit board incorporating the scheme. Although other SBC boards could be employed with changes to the hardware and software employed, the RPI3 SBC is employed as main controller for the instant instrumentation.

Figure 57:
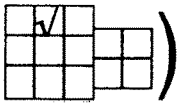
Figure 57:
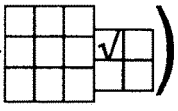
Figure 57:
Figure 57:
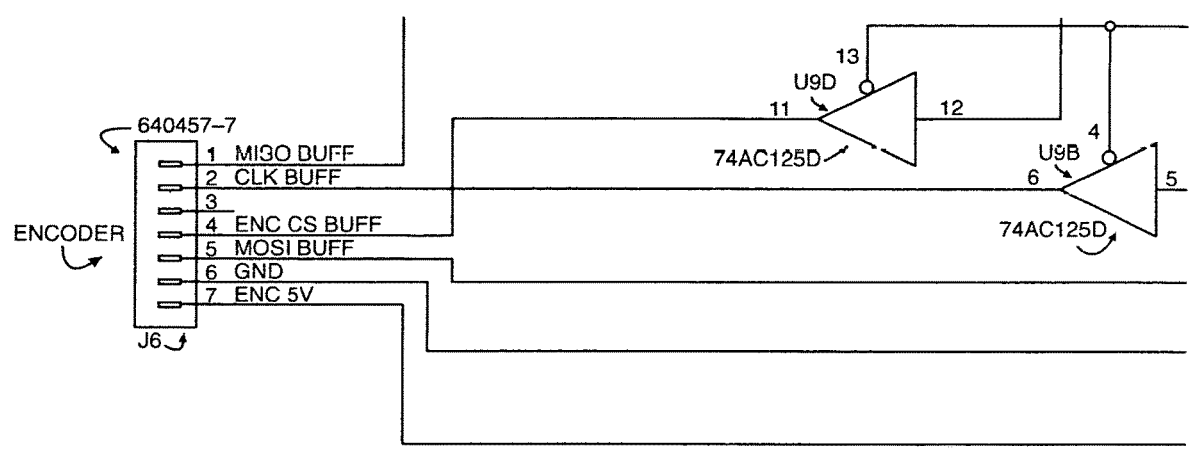
Figure 57:
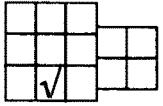
Figure 57:
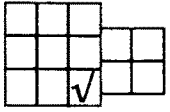
Figure 57:
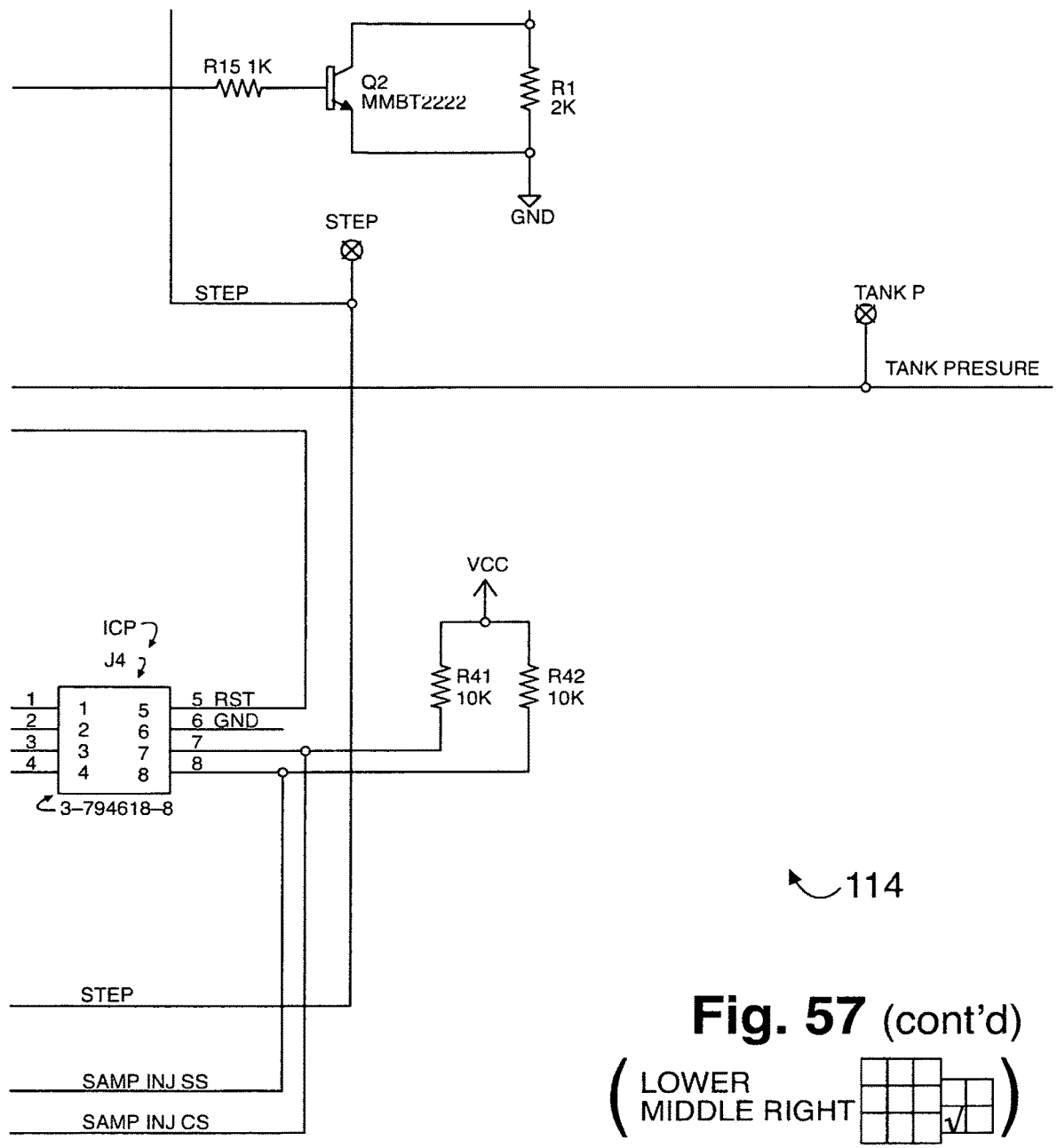
Figure 57:

FIG. 57 is an electronic scheme for reference liquid, for example, oil, sample injection, which can be embodied in a circuit board incorporating the scheme. This controls multiport valves employed to inject sample syringes. Note that positioning of the auto-sampler carousel where the test sample syringes are placed for selection for testing is controlled by the auto-sampler, FIG. 53.

Figure 58:
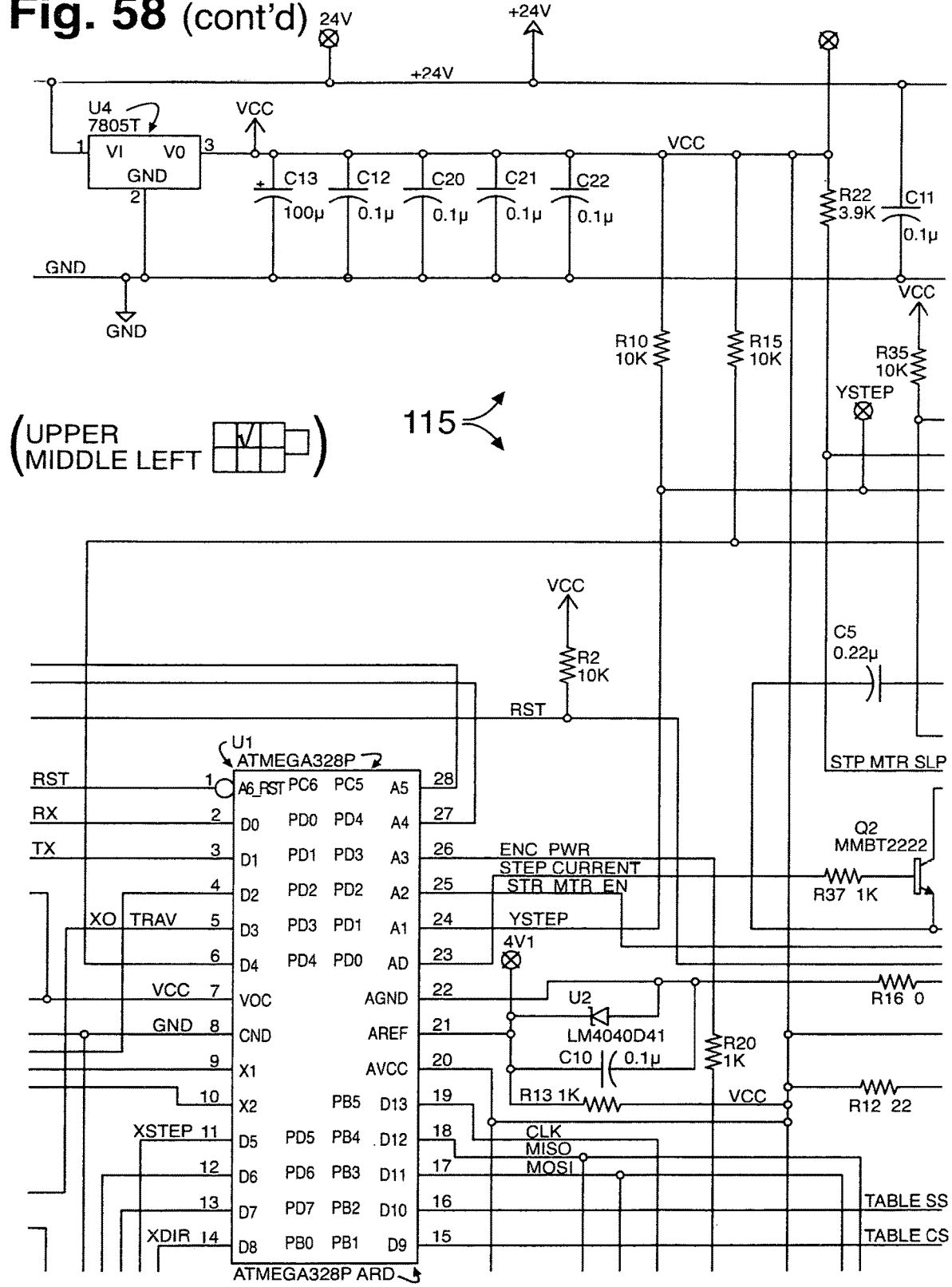
Figure 58:
Figure 58:
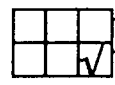

FIG. 58 is an electronic scheme for x,y-control for the rotor in relation to the stator, which can be embodied in a circuit board incorporating the scheme.

Figure 59:
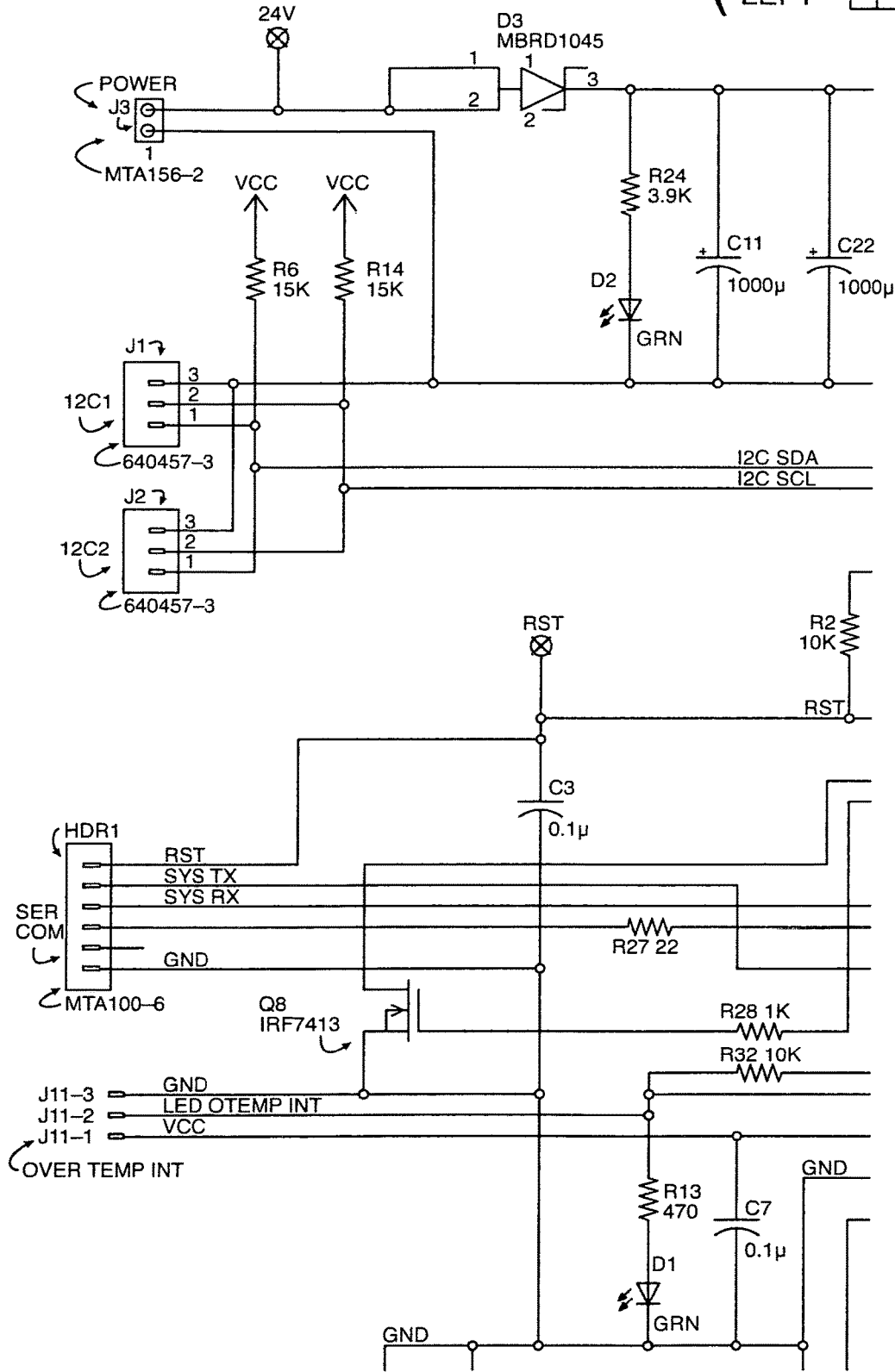
Figure 59:
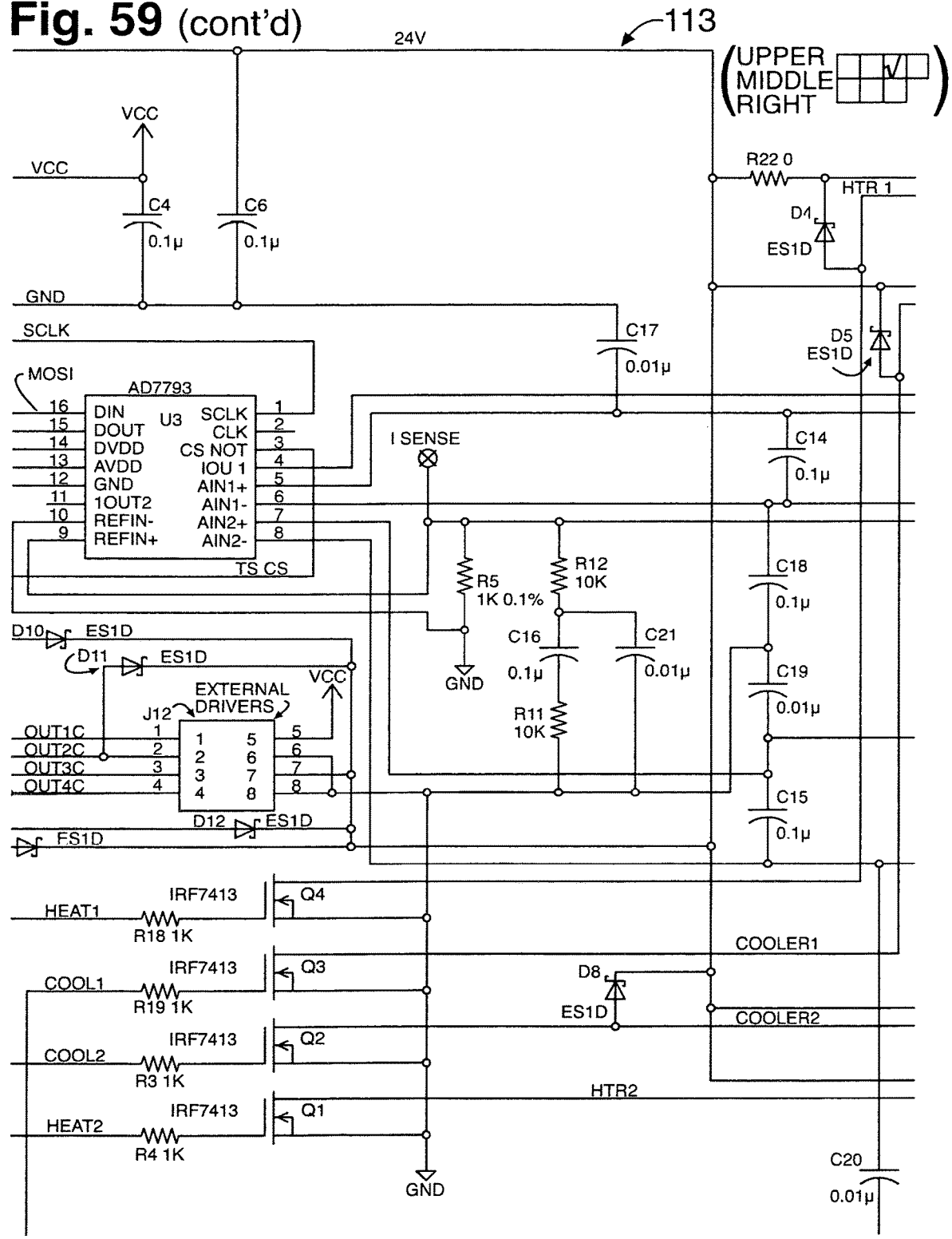
Figure 59:
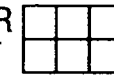
Figure 59:
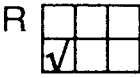
Figure 59:
Figure 59:

FIG. 59 is an electronic scheme for temperature control for the test sample during testing, which can be embodied in a circuit board incorporating the scheme.

Figure 60:
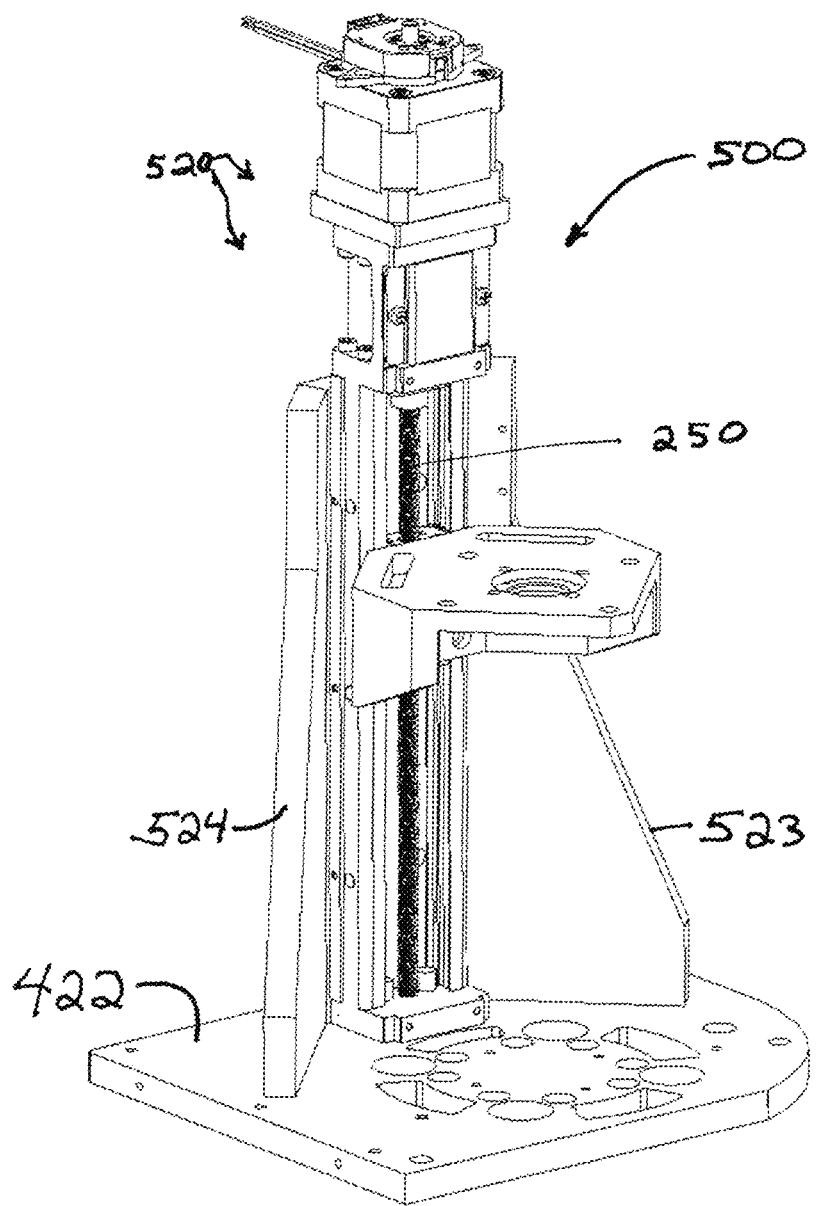

FIGS. 60-66 depict additional instrumentation embodied as advanced rotational tapered bearing simulators to test viscosities of oils, other lubricants, fuels, inks and so forth and the like, or components/features whereof, as follows:

FIG. 60 is a perspective view illustrating elevator axial positioning/rotor depth of such instrumentation.

Figure 61:
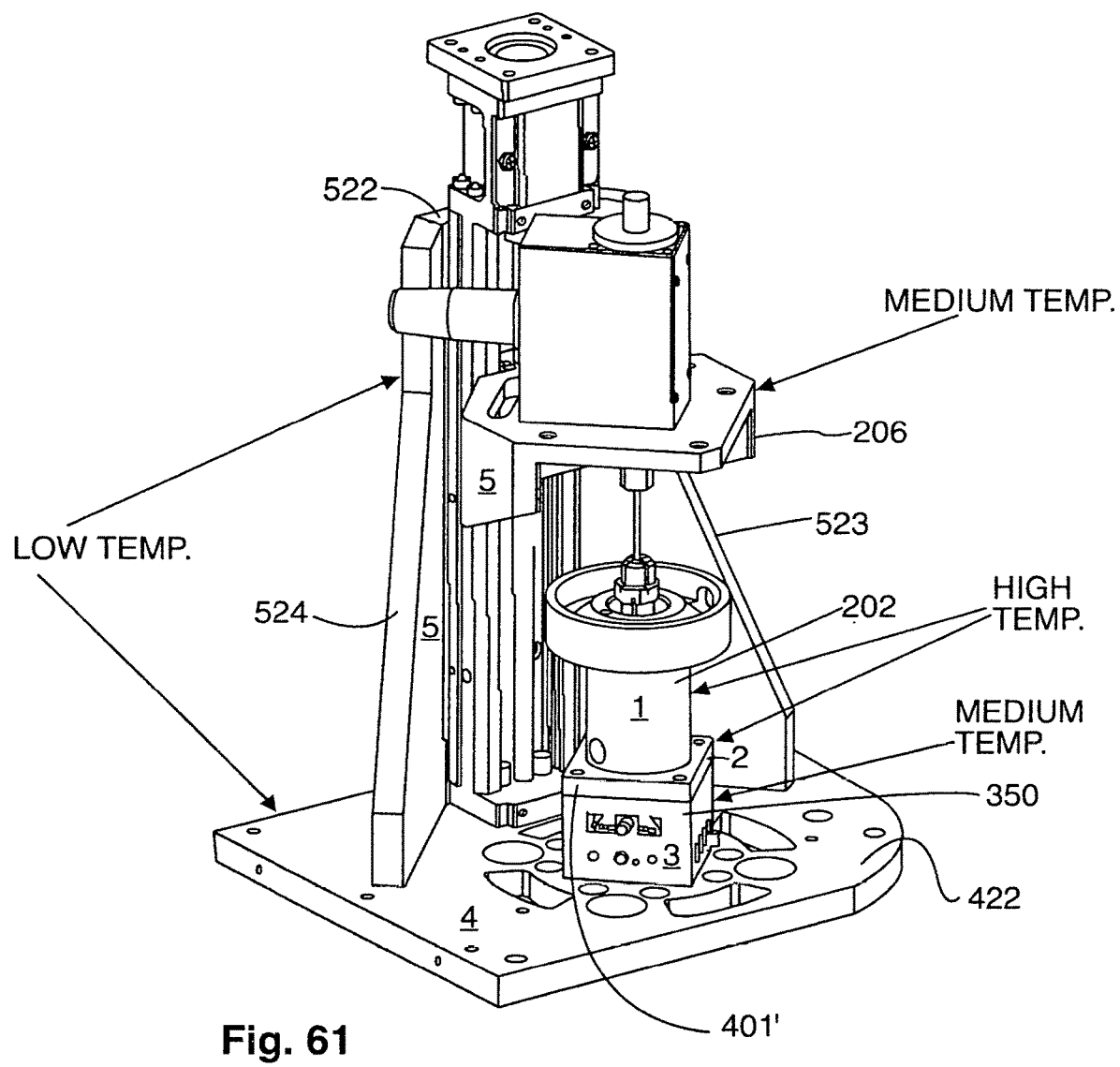

FIG. 61 is a perspective view illustrating positioning of materials pertinent to an elevating component of such instrumentation.

Figure 62:
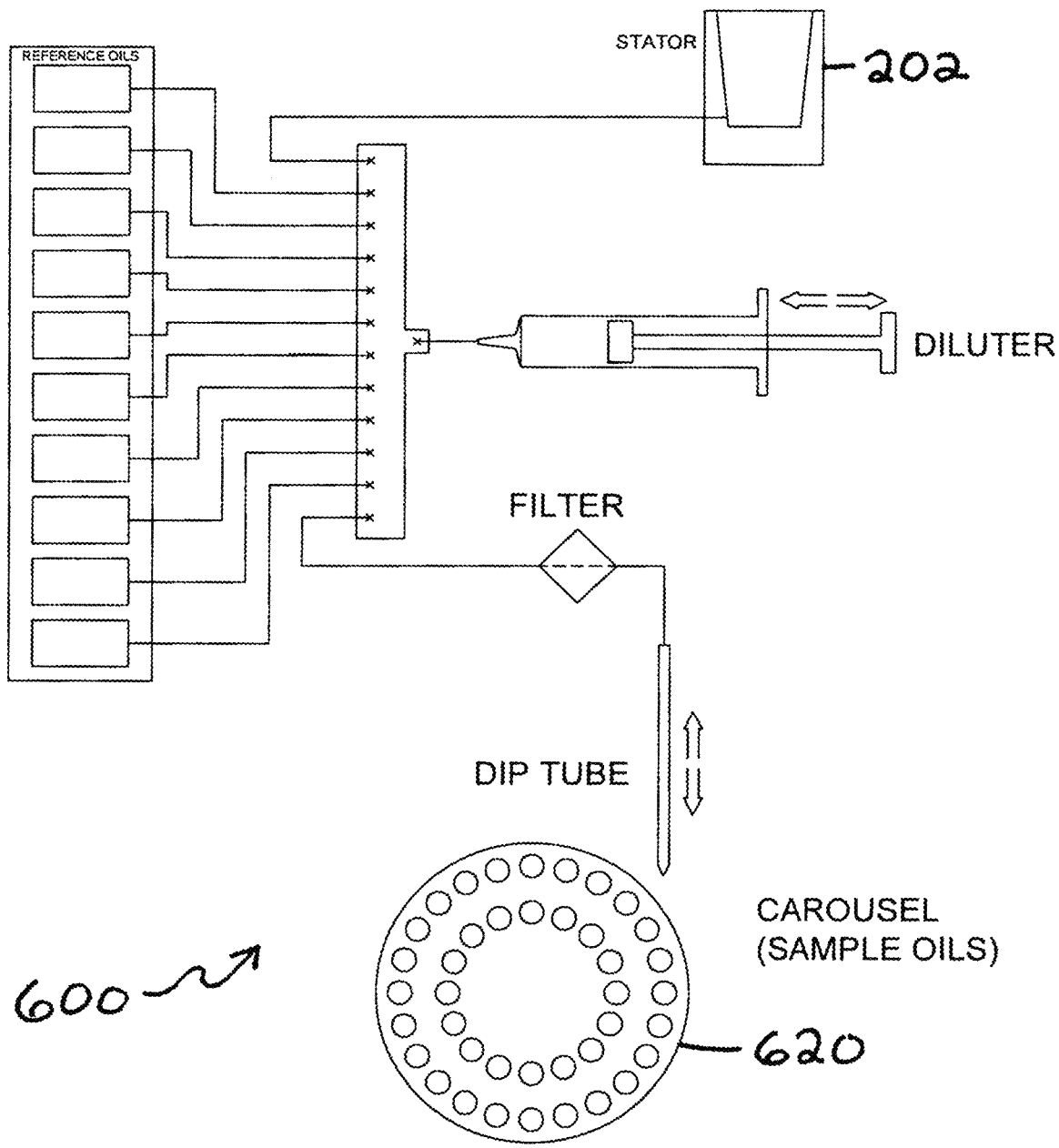

FIG. 62 is a schematic view of pneumatic reference and sample fluid delivery in such instrumentation.

Figure 63:
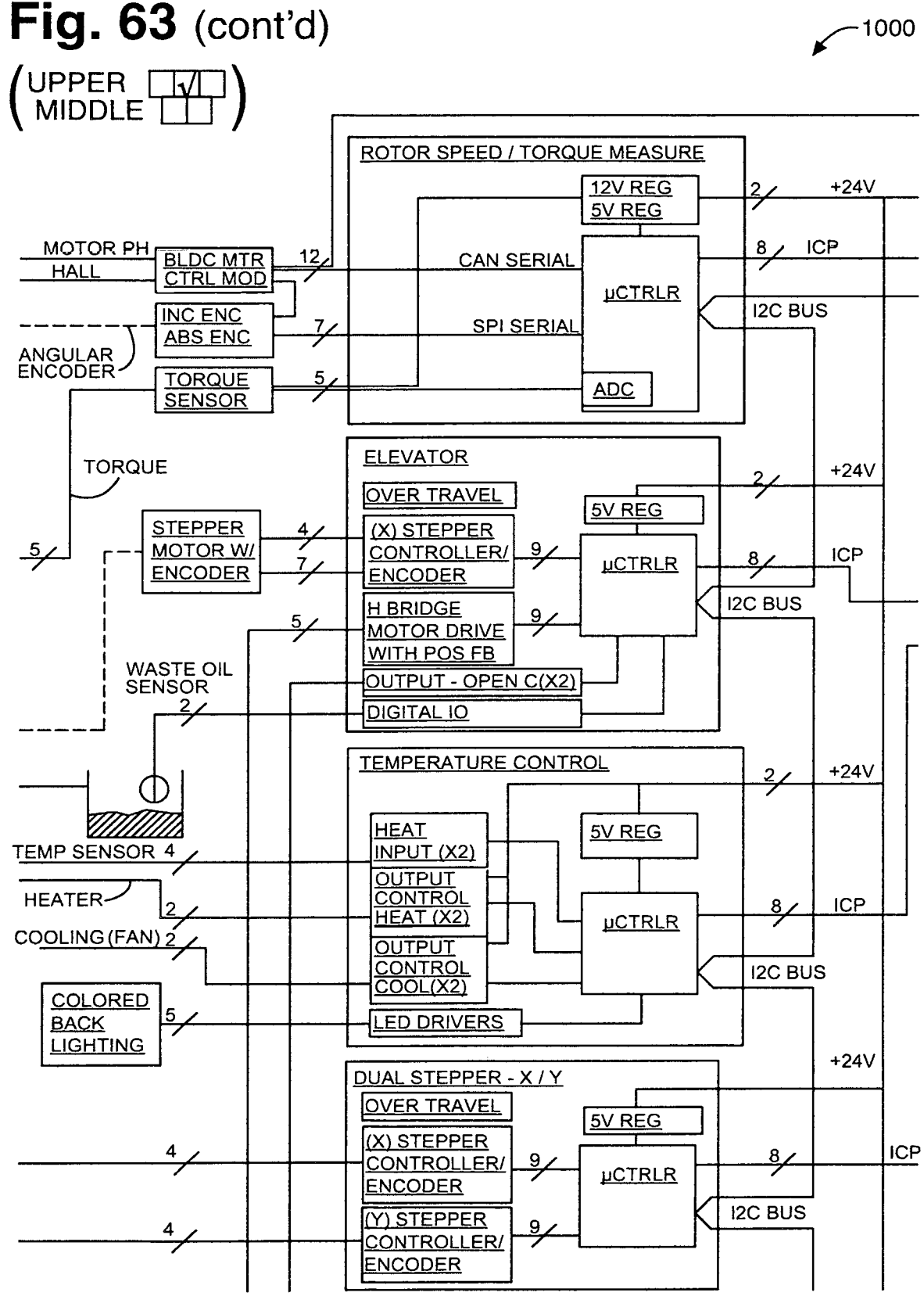
Figure 63:

FIG. 63 is a hardware design block diagram for such instrumentation.

FIGS. 64A-64D are views of enhanced chassis air cooling for such instrumentation.

Figure 65:
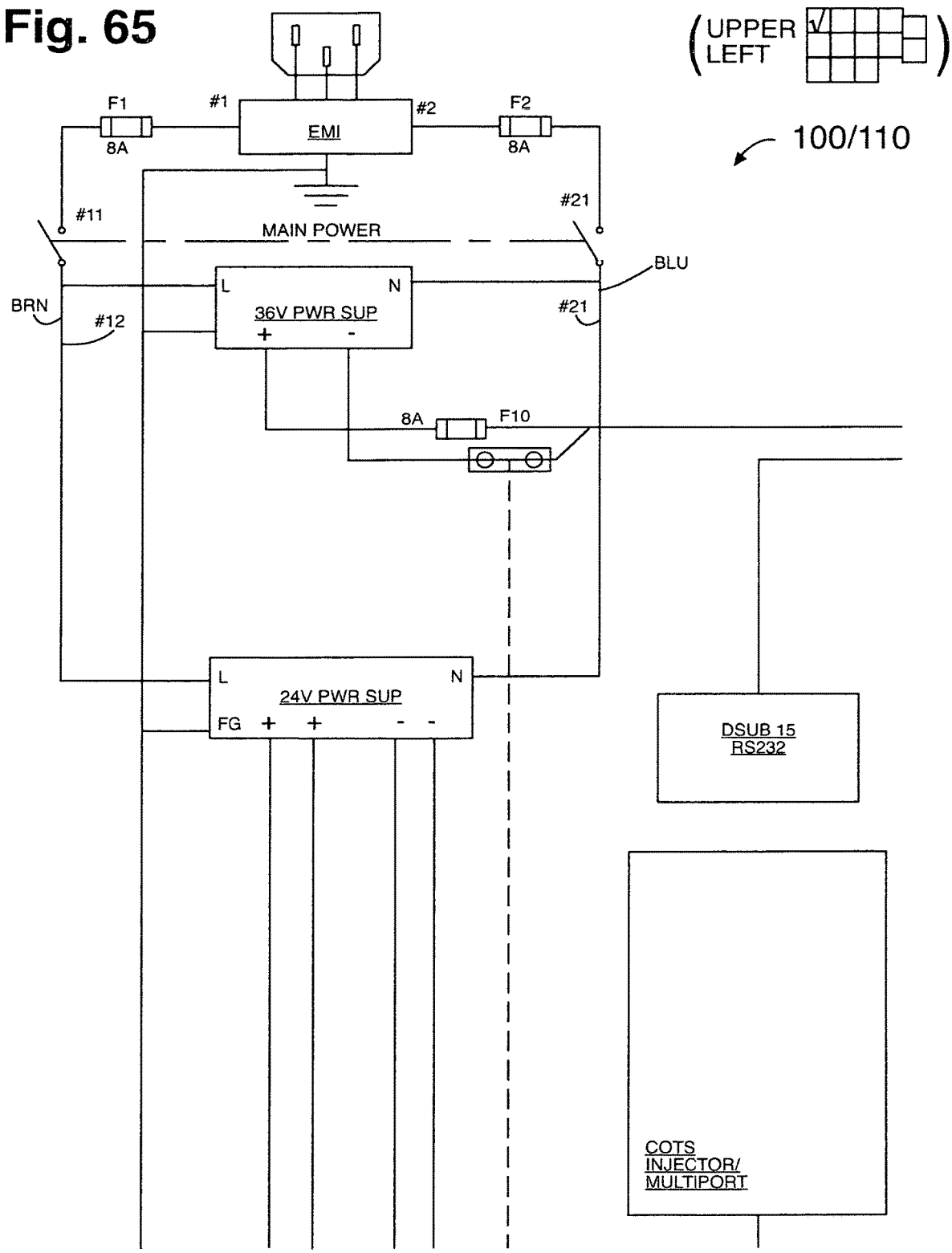
Figure 65:
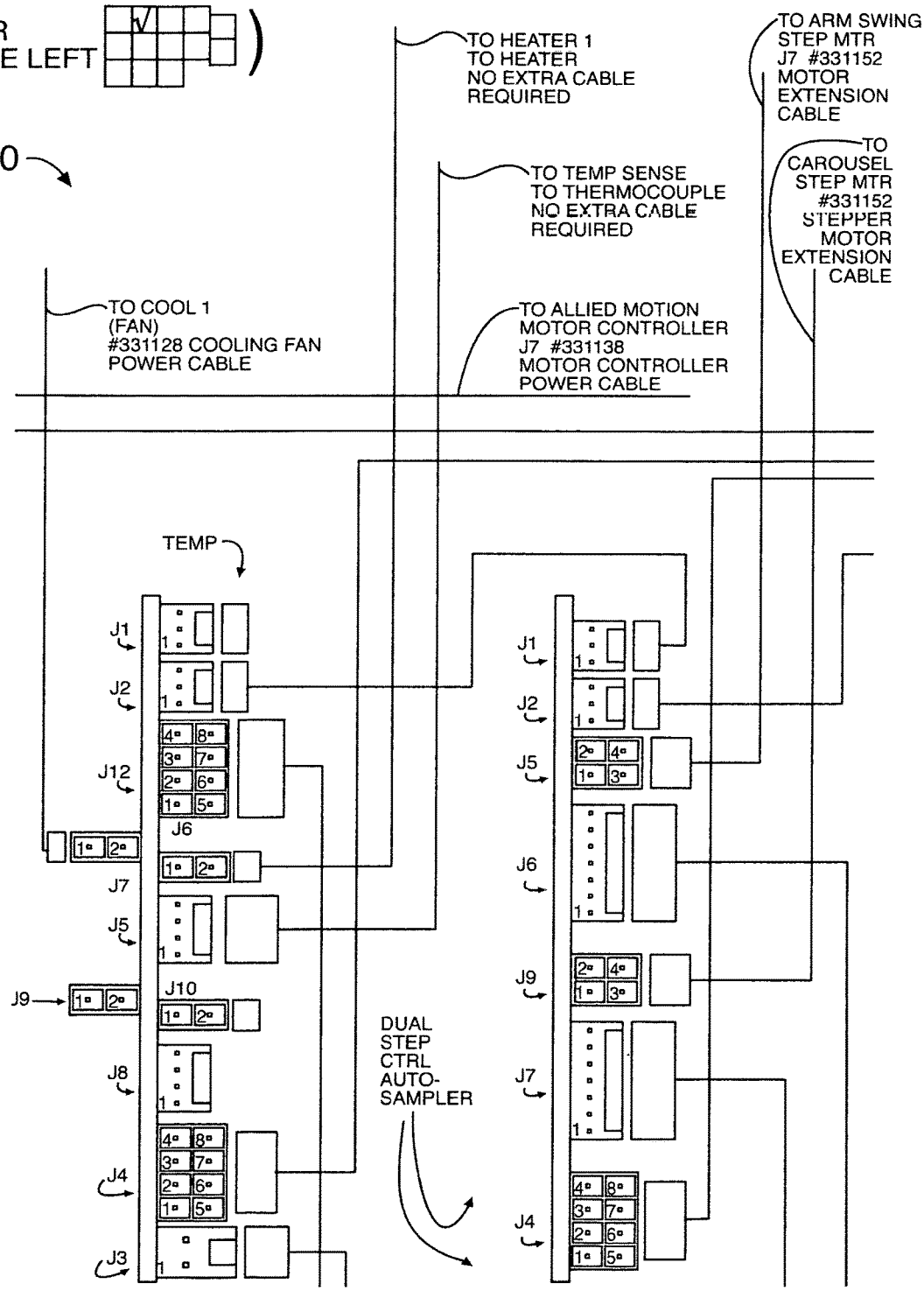
Figure 65:
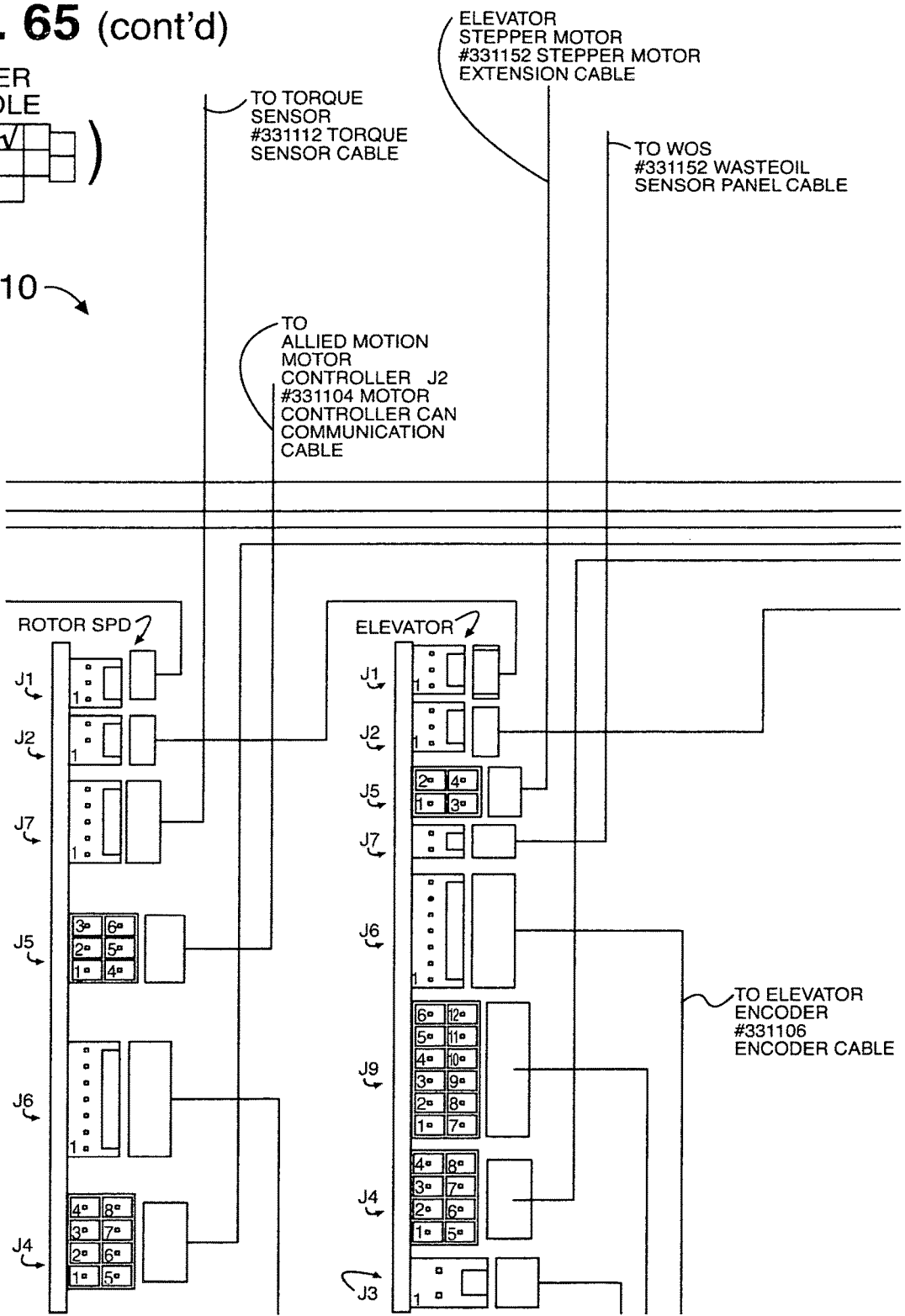
Figure 65:
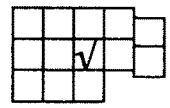
Figure 65:
Figure 65:
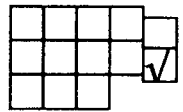
Figure 65:
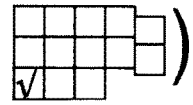
Figure 65:
Figure 65:

FIG. 65 is a schematic of card nest cabling for such instrumentation.

FIG. 66 is a flow chart spread sheet comparing prior art to such instrumentation.

ILLUSTRATIVE DETAIL

The invention can be further understood by the detail set forth below. As with the foregoing, the following, which may be read in view of the drawings, is to be taken in an illustrative, and not necessarily limiting, sense.

In one aspect, instrumentation comprises an at least partially automated instrument having electronic control and/or monitoring that includes task unit electronics, which includes a task unit electronics interface. The task unit interface provides an electronic interface for task unit electronics and controllers/networks. For instance, a plurality of electronic control and/or monitoring features—each of which having its own electronic system for controlling and/or monitoring a specific task or parameter, for example, control of component part positioning, movement, temperature, time of operation, and monitoring of the same, and so forth and the like—is in electronic communication with an electronic interface. The interface may electronically carry out function(s) such as sending commands as a main SBC to the individual function boards over an inter-integrated circuit (I2C) buss to set stator temperature, rotor motor speed, elevator elevation, and more, or request torque measurement, current stator temperature, current rotor speed, and more. The main SBC also communicates over a serial peripheral interface (SPI) buss to the individual function boards to update and re-flash the individual board firmware, and so forth and the like. Although communication schemes with an SBC are known in the art, the actual scheme and command set apropos the instant instrumentation is unique, and its hardware and command sequences enable new applications for the instrumentation such as automatically ramping speeds (shear rates) and measuring results, testing for a bent rotor shaft, and so forth. This is unique because in comparison to other electronically controlled viscometers, it has the capability to provide significantly more automation. It has particular advantages, for example, of automatically positioning the rotor for optimal centering and automatically adjusting position or speed to achieve a given shear rate.

The instrumentation may include a particular instrument component configuration and/or employ at least one particular material, and further feature(s) may be extant. For example, in a precision instrument having an elevator member in a form of a cantilevered platform that can be moved up and down between spaced apart first and second heights, a compact, vertically oriented elevator member support having at least one buttress is attached to a chassis base to provide vertical and lateral support for the elevator member so as to minimize positional variance from instrument configuration. And, for example, in a precision instrument that employs heat in a first part thereof with a second part thereof not subject to that heat, a first material having a first coefficient of thermal expansion is employed in the first part, and a second material having a second coefficient of thermal expansion different from the first coefficient of thermal expansion is employed in the second part, say, with the first coefficient of thermal expansion less than the second coefficient of thermal expansion such that, in the particular configuration under consideration, thermal expansion of aggregated first and second parts is minimized if not avoided, thus minimizing or avoiding positional variance from instrument materials.

In one embodiment, the instrumentation comprises an advanced rotational tapered bearing simulator for testing viscosities of oils and other lubricants, fuels, inks, and so forth and the like. In addition to the capability of including at least one of the particular component configuration and particular material(s) such as mentioned, as in a rotational tapered bearing simulator, among a number of other significant features, automatic x,y-control of rotor-stator centering, passive integral cooling and/or an automated sample delivery system can be provided. Also provided therein is automatic calculation of rotor-stator "rubbing contact." In addition, external cooling liquids are avoided.

Associated methodology is also provided. Thus, for example, in oil viscosity testing, an ASTM D4683 test protocol can be vastly improved with respect to both accuracy and precision. Modification of such a protocol can be effectively rendered when using present embodiments by using the automated functions to yield results with great accuracy and precision within desired ranges. Times of testing, to include set up and take down, can be shortened as well since painstaking tasks requiring great care, which heretofore were completed by the operator, can be accomplished automatically with great reliability by the instant instrumentation.

With respect to the drawings, advanced tapered bearing simulator viscometer 1000 has various component sections. These include electronics 100, which include task unit circuitry 110; rotational dynamometer tower system 200; automated x,y-control and rotor centering 300; temperature control systems 400, particularly within the rotational dynamometer tower system 200, to include passive, integral stator cooling provision 420; additional component parts 500 of the rotational dynamometer tower system 200, to include elevator 520, which helps minimize variance in rotor height and false torque shifts; sample delivery system 600, which includes sample delivery system carousel 620 and mechanical thumb system 640. Other component sections can be present, say, cabinet 700. Some additional components and features follow:

REFERENCE NUMBER COMMENT

111 Task unit circuitry for rotor speed/torque measure
112 Task unit circuitry for elevator
113 Task unit circuitry for temperature control
114 Task unit circuitry for injector
115 Task unit circuitry for x,y-table
116 Task unit circuitry for auto-sampler
130 Electronic user interface
131 HMI LCD
132 Raspberry Pi3 display
140 Controller
141, 141' Raspberry Pi3 (RPI3) controller boards
142 Task unit circuitry for adaptor interface
150 Ethernet switch
160 Sensor
161 Torque sensor
162 Rotary encoder
163 Pressure sensor
164 Limit switches
165 Temperature sensor, e.g., resistance temperature detector (RTD)
170 BLDC motor control
180 Motors
181 BLDC motor
182 Stepper motor, e.g., NEMA14
183 Stepper motor, e.g., NEMA17
184 Stepper motor, e.g., NEMA23
185 Servo
190 Fan
191 Heater
192 Multiport valve
193 Air pressure purge valve
194 Two-way valve
195 Air compressor
196 Over-pressure switch 201 Rotor
202 Stator, e.g., of #954 aluminum-bronze
203 Rotor collet
204 Wire
205 Torque sensor collet, e.g., of #303 stainless steel
206 Torque sensor platform, e.g., of #303 stainless steel
208 Motor mount body, e.g., of #6061 aluminum
209 Motor mount post, e.g., of #6061 aluminum
210 NEMA 23 encoder adapter, e.g., of #6061 aluminum
301 x,y-base, e.g., of #416 stainless steel
302 x,y-slider, e.g., of #416 stainless steel
303 x,y-actuator coupling, e.g., of #304 stainless steel
304 x,y-actuator threaded rod, e.g., of #18-8 stainless steel
401 Stator insulator, e.g., of G-7 Garolite material
410 Provisions for maintenance of component temperatures
411 Motor mount insulator, e.g., of G-7 Garolite material
412 Elevator enclosure, e.g., of 0.0625-inch coated aluminum
413 Elevator enclosure door, e.g., of 0.0625-inch coated aluminum
414 Elevator enclosure window, e.g., of polycarbonate plastic
415 Hinge
417 Chassis (elevator) enclosure side air inlet opening
421 Heat sink
422 Chassis base, e.g., of #416 stainless steel
423 Air duct assembly, e.g., of #304 stainless steel
423' Air duct cylinder for air duct assembly 423
423" Air duct nozzle for air duct assembly 423
427 Chassis base air inlet and so forth holes
428 Air inlet covering plate, e.g., of stainless steel, with handle 428H
429 Air inlet hole covering plate guide rails
521 Linear actuator
522 Corner elevator support—back, e.g., of #303 stainless steel
523 Corner elevator support—left wing, e.g., of #303 stainless steel
524 Corner elevator support—right wing, e.g., of #303 stainless steel
601 Stator inlet tubing
602 Stator drain tube
603 Stator lid, e.g., of G-7 Garolite material
604 Filter
621 Carousel motor mount, e.g., of #303 stainless steel
622 Carousel drive motor posts, e.g., of #303 stainless steel
623 Belt pulley—100-tooth
624 Belt pulley—15-tooth
625 Belt spanning pulleys 623, 624—112-tooth
626 Carousel coupler, e.g., of #303 stainless steel
627 Carousel bearing posts, e.g., of #303 stainless steel
630 Syringe holder assembly
631 Carousel lower plate, e.g., of ABS plastic
632 Carousel middle plate, e.g., of ABS plastic
633 Carousel dowels, e.g., of #6061 aluminum
634 Carousel top plates, e.g., in quarters, of #6061 aluminum
635 Knobs
641 Mechanical thumb motor mount, e.g., of #6061 aluminum
642 Mechanical thumb motor mount posts, e.g., of #6061 aluminum
643 Injector alignment support, e.g., of #7075 aluminum
644 Carousel injection lever/arm, e.g., of #7075 aluminum
645 Servo arm extension, e.g., of #6061 aluminum
646 Shaft—⅜-inch
647 Flanged Bearing—⅜-inch
648 Injector receiving arm/docking port arm, e.g., of #7075 aluminum
649 Injector retaining cap, e.g., of #6061 aluminum
650 Syringe ejector cylinder, e.g., of #6061 aluminum
651 Syringe ejector pin, e.g., of #303 stainless steel
652 Syringe ejector cap, e.g., of #6061 aluminum
653 Travel sensor blade
660 Reference oil delivery system
670 Air path
671 Air bottle—can be pressurized, e.g., up to an about 100-psi pressure, to include about from a 20-psi to a 35-psi pressure
672 Air lines
680 Oil path
681 Oil bottles—can be pressurized, e.g., up to an about 100-psi pressure, to include about from a 20-psi to a 35-psi pressure
682 Dedicated reference oil line
683 Shared reference oil line
685 Oil container rack, e.g., of #5052 aluminum
690 Carousel shroud, e.g., of powder coated #5052 aluminum
701 Cabinet member—e.g., of 0.250-inch, Kydex plastic.
702 Cabinet access panel, e.g., of Kydex (thermo) plastic
722 Cabinet base, e.g., of #6061 aluminum
727 Cabinet base air inlet and so forth holes.

The electronics component section 100, as mentioned, can include the task unit circuitry 110. The task unit circuitry 110 includes custom circuits designed to enable functions and operations of the instrumentation 1000.

Task unit circuitry 111 can be embodied as a rotor speed/torque measurement board. See, FIGS. 3B and 55. The main function of this is to interface with a motor speed control module to control the rotor speed and measure the output from a torque sensor.

Task unit circuitry 112 can be embodied as an elevator board. See, FIGS. 3B and 54. This controls the height of the elevator 520, which in turn adjusts the gap between the rotor 201 and stator 202. The elevator control function also must ascertain height very accurately, in which this board/circuit ably assists.

Task unit circuitry 113 can be embodied as a temperature control board. See, FIGS. 3B and 59. This controls temperature of the stator 202.

Task unit circuitry 114 can be embodied as an injector board. See, FIGS. 3B and 57. This controls two multiport valves 192 such as commercially available from Valco as No. C45R-8140EUTF, which are used to dispense reference oils; controls movement of the mechanical thumb 640, which injects test sample; controls valves, including two air pressure purge valves 193 such as commercially available from Nitra as No. AVP-31C1-24D; and reads pressure sensors 163 such as commercially available from Honeywell as No. ASDXAVX100PGAA5. This also controls the air compressor 195, which, for instance, may be commercially available from Viair as No. 2495.

Task unit circuitry 115 can be embodied as an x,y-table board. See, FIGS. 3B and 58. This controls the movement of an x-axis and y-axis platform 302 to which the stator 202 is mounted. This enables highly efficient and reliable alignment of the stator 202 to the rotor 201.

Task unit circuitry 116 can be embodied as an autosampler board. See, FIGS. 3B and 53. This controls the rotation of a sample holding carousel 620 and the angular positioning of the mechanical thumb system 640 to line up with the samples in the carousel 620 or clear it out of the way for removal of the carousel 620.

Electronic user interface 130 includes the HMI LCD display 131 and RPI3 SBC 141' available commercially from Raspberry Pi. This is dedicated to perform display interface duties.

The controller 140 can include an RPI3 SBC dedicated to perform as the main controller 141. The main controller interfaces with the system through adapter interface task unit circuitry 142, which can be embodied as adapter interface board 142'.

Ethernet switch 150 such as a model TL-SG105 from TP-Link, which is a 5-port gigabit switch that runs on 9-V DC, allows the RPI3 SBCs to communicate together. It also can provide connection to a customer's network.

Sensors 160 can include the torque sensor 161, which can be a Honeywell 1701-0.2NM sensor. Other sensors can include encoders 162 such as the AMT20-V absolute encoder available from CUI, Inc., which is both an incremental and an absolute encoder and can be used on the motors 180 such as the BLDC motor 181 for the rotor 201 and stepper motors 182, 183, 184 for the elevator, mechanical thumb, x-axis and y-axis adjustments, and the autosampler carousel. Pressure sensors 163, such as model ASDXAVX100PGAA5 pressure sensor commercially available from Honeywell can be used to measure the pressure built up in the air accumulator bottle 671 and reference oil bottles 681. A container for oil or other fluid may reside in rack 685. Limit switches 164, for example, a TCPT1300X01 transmissive photo interrupter from Vishay designed into a custom circuit board, can be used to notify controlling boards that moving parts are approaching end of travel or at their "home" position. Temperature sensor RTDs 165, for example, model No. MP172248 from Forberg, can be 4-wire RTDs used for temperature feedback for temperature control.

A BLDC motor control 170, such as the commercially available model SXD-20210001 from Allied Motion, is used to control the BLDC motor 181. The rotor speed/torque measurement task unit circuitry 111 embodied on a circuit board, interfaces with the BLDC motor control 170 giving commands and reading motor operation data in order to ultimately control the speed of the BLDC motor 181 and hence the rotor 201.

Motors 180 are provided in order to perform various functions. For example, the BLDC Motor 181 can be a No. BLWS235D-36V-10000 model commercially available from Anaheim Automation, which can be used to turn the rotor 201 in the stator 202 up to 10,000 rotations per minute (rpm) while providing enough torque for a broad range of sheer rate conditions. NEMA14 stepper motors 182, for example, No. 14Y101D-LW4 model from Anaheim Automation, can be used to position the stator 201 in the x,y-table system 300. NEMA17 stepper motors 183, for example, No. 17Y201D-LW4 model from Anaheim Automation, can be used to move the elevator 520 and rotate the carousel 620. A NEMA23 stepper motor 184, for example, No. 23LS22-2004E-150T model from Anaheim Automation, which is a 200-step per revolution stepper motor with an integrated 150-mm long leadscrew, can be used to actuate the mechanical thumb system 640. A small servo 185, for example, a No. B2122 model from Batan, can be used to rotationally position the mechanical thumb assembly 640 so that it lines up with samples in the carousel or can be rotated out of the way.

Fan 190, for example, a No. 3110KL-05 W-B60 model from NMB, can be mounted in the elevator tower 400. It provides air flow for the passive cooling temperature control system 420.

The heater 191, for example, a No. B78-105 model from Electro Flex Heat (EFH), which is a 80-W, 24-V polyimide heater, is adhered to the stator 202 for temperature control.

A three-way valve 194 such as a No. 30125 model from ASCO may be included to switch oil delivery between the reference oil system 660 and the sample delivery system 620.

In addition, other features, for example, a pressure switch available from Honeywell as No. 76063-00000350-01 model, may be provided for functional or safety reasons.

The rotational dynamometer tower system 200 includes the rotor 201, stator 202, rotor collet 203, wire 204, torque sensor collet 205, torque sensor 161, torque sensor platform 206, BLDC motor 181, motor mount body 207, motor mount post 208, encoder 162, and NEMA-23 encoder adapter 209. The rotor 201, rotor collet 203, and wire 204 are commercially available from Tannas Company, for example, having been employed in the commercially available model No. TBS 2011E-F rotational tapered bearing viscometer. Note, U.S. Pat. No. 5,369,988. The rotor 201 and stator 202 provide for known shear rate and a resistance to rotation proportional to the viscosity of the test fluid in the stator 202. This rotation of the rotor 201 is produced by the BLDC motor 181, and the resistance is measured by the torque sensor 161. The rotor collet 203, wire 204, and torque sensor collet 205 produce a flexible connection between the rotor 201 and torque sensor 161 to allow for the stator 202 to be moved in relation to the rotor 201 during centering. The torsional strength of the wire 204 is selected such that it will break before the torque is beyond that which the torque sensor 161 can withstand, protecting the torque sensor 161 from damage. The BLDC motor 181 is coupled to the torque sensor 161 through a commercially available Schmidt Coupling. The speed and angular position of the BLDC Motor 181, hence the rotor 201, is measured by the encoder 162. The torque sensor 161 is supported by the torque sensor platform 206. The BLDC motor 181 is supported by the motor mount body 207 and the motor mount post 208. The encoder 162 is mounted to the BLDC motor 181 employing the NEMA-23 encoder adapter 209. The rotational dynamometer tower system 200 operates in conjunction with the motor speed/torque control task control circuitry 111 and corresponding circuit board, and the BLDC motor control 170.

The x,y-control and rotor centering component section 300 includes the x,y-base 301 and x,y-slider 302, x,y-actuator coupling, x,y-actuator threaded rod, and the NEMA-14 stepper motor 182. One or more components, for example, the encoder 162, may be included. The x,y-slider 302 rests upon and can freely move across the x,y-base 301. A force to keep the x,y-slider 302 flat on the x,y-base 301 as it moves is applied by commercially available magnets mounted in the x,y-slider 302 that are attracted to the magnetic material of the x,y-base. The x,y-position of the x,y-slider 302, which determines the position of the stator 201 in relation to the rotor 102, is determined by the distance that the two x,y-actuator threaded rods 304 extend from the x,y-base 301, thus providing a lateral stop for the x,y-slider 302. Opposite the x,y-actuator threaded rods 304, commercially available springs provides a biasing force to keep the x,y-slider 302 in contact with both x,y-actuator threaded rods 304. The protrusion of the x,y-actuator threaded rods 304 into the x,y-base is controlled by the NEMA-14 stepper motors 182, which are connected to each x,y-actuator threaded rod 304 through an x,y-actuator coupling 303. As the NEMA-14 stepper motors 182 turn, the x,y-actuator coupling 303 turns accordingly, forcing the x,y-actuator threaded rod 304 to thread in or out of the x y-base 301. The changing signal from the torque sensor 161 as the NEMA-14 stepper motors 182 are turned allows an automatic centering process to occur. An encoder 162 can be mounted on each NEMA-14 stepper motor 182 in order to monitor the position of the x,y-slider 302. The x,y-control and rotor centering component section 300 operates in conjunction with the x,y-table task circuitry 115 on a corresponding circuit board.

Mechanical components of temperature control 400 are integrated into the rotational dynamometer tower system 200 to control both the temperature of the sample to be tested and the component parts of the rotational dynamometer tower system 200, to include provisions for maintenance of component temperatures 410 and the passive, integral stator cooling provision 420. The mechanical components of temperature control 400 include the stator insulator 401. The stator insulator 401 prevents heat from being transferred to the x,y-slider 302 and reduces the amount of power needed to maintain the desired temperature.

Provisions for maintenance of component temperatures 410 include the motor mount insulator 411, elevator enclosure 412, elevator enclosure door 413, elevator enclosure window 414, and hinge 415. The motor mount insulator 411 prevents the heat applied to the stator 202 from being transferred directly to the torque sensor 161 and BLDC motor 181. In addition, a commercially available heat sink may be applied to the BLDC motor 181 to prevent it from operating at temperatures higher than manufacturer specifications specify. The elevator enclosure 412, in conjunction with the elevator enclosure door 413 with the elevator enclosure window 414, which are attached as unit to the elevator enclosure 412 by the hinge 415, prevents changing external conditions from affecting the components inside it, and keeps all components at equilibrium temperatures.

The passive, integral stator cooling provision 420 includes the heat sink 421, chassis base 422, and air duct assembly 423, which may be made by joining air duct cylinder 423' with air duct nozzle 423", for example, by welding. The heat sink 421 can be commercially available as a 20 mm length segment, for example, of No. HS-1858 model material from Glary Industries. Air is drawn in through holes in the chassis base 422, through the air duct assembly 423, and over the heat sink 421. The flow of air over the heat sink 421 enables the sample in the stator 202 to be held at lower temperature settings, for example, 85° C. or lower, without the need for an active liquid-based chiller. The temperature control system 400 operates in conjunction with the temperature control task unit circuitry 113 on a corresponding circuit board, RTD 165, heater 191, and fan 190.

The additional component parts 500 of the rotational dynamometer tower system include the elevator 520, which helps minimize variance in rotor height and false torque shifts. The elevator 520 includes the linear actuator 521, NEMA-17 stepper motor 183, encoder 162, back corner elevator support 522, right wing corner elevator support 523, left wing corner elevator support 524, and limit switch 164. The linear actuator 521 can be a commercial product such as available from Nippon Bearing as a No. BG2001A-200H/A5 model with a precisely threaded screw shaft that lifts a plate with mounting holes as the shaft is turned. The linear actuator 521 is employed to precisely control the height of the rotor 201 with respect to the stator 202. The NEMA-17 stepper motor 183 turns a shaft while the encoder 162 monitors the number of turns. Based on the screw thread, height of the rotor 202 is determined. The linear actuator 521 is mounted to the back corner elevator support 522. The right wing corner elevator support 523 and left wing corner elevator support 524 help keep the back corner elevator support 522 perfectly vertical or most nearly so. The precisely vertical orientation of the back corner elevator support 522, hence the linear actuator 521, is critical to maintaining a precisely-known height of the rotor 201 with respect to the stator 202, which determines the shear rate applied to the test sample. Expansion of materials from heat changes could also affect the height of the rotor 202, and so to counter this, the back, right wing, and left wing corner elevator supports 522, 523, 524 employ #303 stainless steel. Over the height of these supports, the expansion due to heat change well nigh exactly matches the total expansion due to heat change of the much shorter x,y-base 301 and x,y-slider 302 combined, which are made of #416 stainless steel. Thus, no error is perceived in height of the rotor 201 as the components of the rotational dynamometer tower system 200 reach equilibrium or at different temperatures. The limit switch 164 is mounted to the right wing corner elevator support 523 to prevent the elevator from traveling higher than the linear actuator 521 can travel within its specified precision. The elevator 520 operates in conjunction with the elevator task unit circuitry 112 on a corresponding elevator circuit board.

The sample delivery system 600 includes the stator inlet tubing 601, which connects the stator 202 to the sample delivery system 620; the stator drain tube 602, which allows tested samples to drain out of the stator 202; and the stator lid 603, which prevents the sample from splashing out of the stator 202. It may include additional components such as a filter 604 to clean debris out of used oil samples and protect the rotor 201, stator 202, and plumbing fittings. In addition, the sample delivery system carousel 620 and mechanical thumb 640 deliver sample oil by injecting sample syringes carried by the carousel 620. Also included is the reference oil delivery system 660 that delivers reference fluid, for example, oil, by a pneumatic system that pressurizes reference oil bottles 681 and has a port from the bottles 681 passing to the stator 202.

The sample delivery system carousel 620 rotates the syringe holder assembly 630 so that the sample of interest is in the correct place to be delivered to the stator 202, and it includes the carousel motor mount 621, supported by four carousel drive motor posts 622. A NEMA-17 stepper motor 183 is mounted to the carousel motor mount 621 and turns the carousel coupler 626 through the toothed pulleys 623, 624 connected by the belt 625, which are available from Automation Direct as part Nos. APB100MXL025B-312, APB15MXL025CF-18, and 112MXL025NG. The carousel coupler 626 and four carousel bearing posts 627 fitted with commercially available bearings 627' support the syringe holder assembly 630, which is removable and which can be fitted with syringes holding samples to be tested. The syringe holder assembly 630 includes the carousel lower plate 631 connected to a carousel middle plate 632 by four carousel dowels 633. Four carousel top plates 634 are placed on top of the carousel middle plate 632 to constrain the syringes' horizontal motion. The top plates 634 are fitted with knobs 635 which, for example, may be commercially available as No. TK81BLK models from Top Knobs. A T-handle, say, commercially available as a No. M1884 model from Top Knobs, makes it possible to easily place or remove the syringe holder assembly 630 on the carousel coupler 626. In addition, an encoder 162 can be mounted directly to the carousel coupler 626 to monitor the angular position of the syringe holder assembly 630, which can only be mounted in one orientation. The sample delivery system carousel 620 operates in conjunction with the auto-sampler task unit circuitry 116 on a corresponding circuit board. Carousel shroud 690 surrounds the carousel 620.

The mechanical thumb system 640 depresses a syringe to deliver a sample placed in the syringe in the syringe holder assembly 630 to the stator 202, and it includes the mechanical thumb motor mount 641, a NEMA-23 stepper motor 184, three mechanical thumb motor mount posts 642, the injector alignment support 643, a carousel injection lever also known as the carousel injection arm 644, a servo 185, the servo arm extension 645, a ⅜-inch shaft 646 such as commercially available as No. SFW 6×260 mm model from Nippon Bearing, a ⅜-inch flanged bearing 647 such as commercially available as No.SWF6WUU model from Nippon Bearing, an injector receiving arm also known as the docking port arm 648, the injector receiving cap 649, the syringe ejector cylinder 650, the syringe ejector pin 651 having a groove in its head into which an O-ring is fitted, the syringe ejector cap 652, two travel sensor blades 653, and two limit switches 164. The mechanical thumb motor mount 641 supports the NEMA-23 stepper motor 184, and is supported by three mechanical thumb motor mount posts 642. The injector alignment support 643 is mounted to the NEMA23 stepper motor 184 using commercially available standoffs to keep all parts of the mechanical thumb system 640 in the same orientation and to hold the servo 185, which moves the docking port arm 648 between inner and outer rings of syringes in the syringe holder assembly 630 and into an idle position in which the syringe holder assembly 630 can be loaded into the sample delivery system carousel 620. The NEMA23 stepper motor 184 has a shaft extending out that threads through an integral nut mounted to the carousel injection lever 644. When the NEMA23 stepper motor 184 turns, the shaft threads through the nut, lifting the carousel injection lever 644, thus depressing the syringe. The servo 185 is connected to the ⅜-inch shaft 646 by the servo arm extension 645. The ⅜-inch shaft 646 goes through a ⅜-inch flanged bearing 647 mounted to the carousel injection lever 644, allowing it free vertical motion but constraining it horizontally so as to prevent polar rotation relative the injector receiving arm 648. The injector receiving arm 648 is held to the injector alignment support 643 by the injector retaining cap 649. The injector receiving arm 648 also has a port into which a syringe can lodge as it is depressed, and sample flows out of a channel leading from this port. Mounted above this port is the syringe ejector cylinder 650, which contains the syringe ejector pin 651, and which is sealed with the syringe ejector cap 652 with its O-ring. To eject the syringe from the injector receiving arm 648, system air pressure is applied to the port in the syringe ejector cap 652, which pushes the syringe ejector pin 651 downward, releasing the depressed syringe. The two limit switches 164 are mounted to the top and bottom of the carousel injection lever, with travel sensor blades 653 mounted employing commercially available standoffs and springs above and below the limit switches 164. When the carousel injection lever 644 reaches its highest or lowest allowed point, one of the travel sensor blades 653 is pushed to interrupt a beam of the limit switch 164. Other components may be present, for example, support for a filter for the samples or a shield to protect the operator from mechanical hazards such as pinch points. The mechanical thumb system 640 operates in conjunction with the carousel 620 and the injector task unit circuitry 114 on a corresponding circuit board.

The reference fluid, for example, oil, delivery system 660 includes an air path 670 and a reference fluid path 680, say, a liquid, for example, oil. The air path 670 has an air compressor 195, air bottle 671, multiport valve 192, two air pressure purge valves 193, two pressure sensors 163, and air lines 672. The air path 670 may contain additional components, including but not limited to plumbing fittings or an over-pressure switch 196. The reference fluid path 680, which may be called an oil path for the reason that oil is commonly tested on the instrumentation 1000, includes up to nine bottles 681 for reference fluids, for example, oils; a multiport valve 192; a number of dedicated reference fluid, say, oil, lines 682; and a shared reference fluid, say, oil, line 683. The reference oil path 680 may also contain a three-way valve 194, any number of plumbing fittings to connect lines, and/or in-bottle strainers to prevent particles from entering the stator 202. The exemplary reference oil delivery system functions by allowing a desired pressure to build in the air bottle 671 when the air compressor 195 runs. This is measured by a pressure sensor 163. When, for example, a reference oil is to be delivered to the stator 202, the air and oil multiport valves 192 are both set to the port connected to the oil bottle 681 containing the desired reference oil, by which pressure is applied to that reference oil forcing it to flow through the pertinent dedicated reference oil line 682 and the shared oil line 683 (and perhaps through a three-way valve 194) into the stator 202. Two respective purge valves 193 de-pressurize the oil bottles 681 and the air bottle 671 to stop injection and to allow each pump to start at a low pressure to minimize pump wear. De-pressurizing the oil bottles 681 is also advantageous from a safety perspective. The fluid delivery system 660 can operate in conjunction with the injector task unit circuitry 114 on a corresponding circuit board, and the x,y-table task unit circuitry 115 on a corresponding circuit board.

Other component sections can be present. For example, a waste oil sensor (WOS) with associated hardware may be provided to prevent overflows from a reservoir holding discarded test and reference fluids. This may work with the elevator task unit circuitry 112 on a corresponding circuit board.

The following specifications further illustrate the invention:

Advanced Tapered Bearing Simulator Design and Hardware 1. Overview

This specification sets forth beneficial, advanced tapered bearing simulator hardware requirements. As well, it sets forth functional characteristics and electrical interfaces and mechanical details for this instrumentation.

2. Requirements

FIG. 2A shows functional relationships for this system. Note that a motor turns the rotor at a fixed, settable, speed. Motor torque is measured. The rotor to stator height is adjustable, controlled, for instance, through stepper motor turning a linear actuator, for example, a model No. 17Y2010-LW4 stepper motor commercially available from Anaheim Automation turning a model No. BG2001A-200H/A5 linear actuator commercially available from Nippon Bearing. Stator temperature is controlled. Torque data is collected at various machine settings, and data is used for calculations resulting in test results.

2.1. Functional Description

Hardware functions of this instrumentation are described here. This assumes that multiple processors will be used to do the controlling of the system and sub-systems. Detailed descriptions of the hardware such as function, signal characteristics, pinout, interfaces, and the like are defined in the functional section paragraphs. Single or multiple custom boards can be designed to incorporate all of the features required.

2.1.1. Motor Speed Control

The rotor is spun inside the stator. The speed of the rotor must be controlled. The motor speed control scheme is capable of control adjustment via software parameters or tuning components. The system can display the measured motor speed, and has user settable motor speeds for the desired motor speed. Speed ramp sweeps can be performed, and motor speed can be determined from machine-calculated values derived from test and user input.

2.1.1.1. Brushless Direct Current (BLDC) Motor

This instrumentation can control up to a ⅓-horsepower (HP) three-phase BLDC motor at up to 8,000 rpm or more +/−1.5% rpm, for example, with a No. BLWS235D-36V-1000 model BLDC motor commercially available from Anaheim Automation. The motor has three Hall sensors—transistor to transistor logic (TTL) levels, which implies 5-V logic signals operating at up to a 50-MHz bit rate with a 10-mA sink and source current—mounted internal the BLDC motor providing for phase commutation control of the motor, and may be used as a tachometer for motor speed feedback.

2.1.1.1.1. BLDC Motor Signal Characteristics

The following table sets forth the interface to the BLDC motor:

| Area | Signal | Characteristic | Connector | Pin |
|---|---|---|---|---|
| Motor Drive | Phase 1 | <24 V, 7 A, see commutation table | | |
| Motor Drive | Phase 2 | <24 V, 7 A, see commutation table | | |
| Motor Drive | Phase 3 | <24 V, 7 A, see commutation table | | |
| Hall | Hall Sense 1 | 0 to 5 V pulse, see commutation table | | |
| Hall | Hall Sense 2 | 0 to 5 V pulse, see commutation table | | |
| Hall | Hall Sense 3 | 0 to 5 V pulse, see commutation table | | |
| Hall | Hall Power | 4.5 V to 7 VDC | | |
| Hall | Hall Return | Ground (Gnd) with respect to Hall Power | | |

2.1.1.2. BLDC Motor Controller

The BLDC motor with its control operates on thirty-six Volts Direct Current (36 VDC) or less. The BLDC motor provides commutation outputs to the BLDC Motor Controller, and, in turn, the controller provides the motor drive phases to the motor. The BLDC motor controller is an Allied Motion SXD-20210001 controller or equivalent. This controller can accommodate a quadrature encoder for tighter speed control. The quadrature encoder can be used exclusively or in conjunction with the motor Hall sensors.

2.1.1.2.1. Incremental Encoder

The motor speed controller has an incremental encoder, for example, an AMT20-V absolute encoder commercially available from CUI, Inc., on the motor shaft to improve motor control speed accuracy. The absolute encoder can send incremental single-ended quadrature signals in addition to absolute information over a serial peripheral interface (SPI), which is sufficient for this application.

2.1.1.2.2. Motor Phases

Three motor phases drive the BLDC motor. The motor phasing is shown in the following commutation sequence chart (commutation table) with "+" indicating positive motor winding voltage, "−" motor winding return, "1" logical on, and "0" logical off:

| Commutation Table | | | | | | |
|---|---|---|---|---|---|---|
| 0° | +60° | +120° | +180° | +240° | +300° | |
| + | + | NC | − | − | NC | Phase 1 |
| − | NC | + | + | NC | − | Phase 2 |
| NC | − | − | NC | + | + | Phase 3 |
| 1 | 1 | 0 | 0 | 0 | 1 | Hall Sense 1 |
| 0 | 1 | 1 | 1 | 0 | 0 | Hall Sense 2 |
| 0 | 0 | 0 | 1 | 1 | 1 | Hall Sense 3 |

2.1.1.2.3. Hall Sensors

The BLDC motor generates three TTL level Hall Sense signals corresponding to Hall Sense1, Hall Sense 2, and Hall Sense 3 from the motor for commutation control. The commutation table above gives the commutation sequence for the motor phases and associated Hall sensor signaling. The instrumentation hardware provides 4.5 VDC to 7 VDC to the commutation Hall type sensors located on the motor. The Hall Sense return line is set at ground reference.

2.1.1.2.4. BLDC Controller Serial Interface

The rotor speed—torque measurement circuit embodied in its board communicates to four subsystems. This board is one of our circuit boards that communicates with an off the shelf BLDC motor controller. The motor controller directs the rotor motor. It is shown in the FIG. 2A block diagram, and it communicates with the BLDC motor control module over a controlled area network (CAN) buss; communicates with the main SBC over an I2C buss; communicates with the main SBC over an SPI buss for in-circuit-programming (ICP); and communicates over an/the SPI buss with an absolute encoder.

# 2.1.1.2.4.1. Rotor Speed—Torque Measure to Motor Controller

The rotor speed—torque measurement (RSTM) board communicates over serial CAN communication connections to a BLDC motor controller module. The motor control module can be, for example, an Allied Motion No. SXD-20210001 model. Note, connector J5 in FIG. 55.

# 2.1.1.2.4.2. Rotor Speed—Torque Measure System Controller

The RSTM board communicates over a serial I2C interface to a system controller, here the main SBC. Note, connectors J1 and J2 in FIG. 55.

# 2.1.1.2.4.3. Rotor Speed—Torque Measure System Controller for ICP

The RSTM board communicates over an SPI serial interface to the system controller for ICP, i.e., to the main RPI3 SBC. Note, connector J4 in FIG. 55.

# 2.1.1.2.4.4. Rotor Speed—Torque Measure to Absolute Encoder

An absolute encoder measures the rotor shaft position so polar data can be taken of measured torque versus shaft position. The RSTM board communicates over SPI serial connections to an absolute encoder. As is known in the art, there are two primary types of encoders, incremental and absolute. Incremental encoders output a fixed number of pulses per revolution. Software must keep track of the pulse stream from an incremental encoder in order to know the current shaft position. Absolute encoders give an actual count number per revolution. Software only has to ask for the position from an absolute encoder to know the current shaft position. Here, the RSTM interfaces with a CUI AMT-203-V absolute encoder over a SPI serial connection. This absolute encoder detects the angular position of the rotor shaft and can resolve the angle position to 1/4096 of a rotation. This enables torque to be accurately and precisely measured at known angles of the rotor and thus generate highly reliable polar plots of torque versus rotor angle. This data can be used to determine centering and detection of bent rotor shafts. This feature, however, becomes less practical at higher rotor speeds (>1000 rpm). Note, connector J6 in FIG. 55. Note the following table:

| Area | Signal | Characteristic | Connector | Pin |
|---|---|---|---|---|
| Inj Encoder | MISO_BUFF | 0 to 5 V TTL Input - Master In Slave Out | J6 | 1 |
| Inj Encoder | CLK_BUFF | 0 to 5 V TTL Output Serial Clock | J6 | 2 |
| Inj Encoder | | Not Used | J6 | 3 |
| Inj Encoder | ENC_CS_BUFF | 0 to 5 V TTL Output - Chip Select – Active low | J6 | 4 |
| Inj Encoder | MOSI_BUFF | 0 to 5 V TTL Output - Master Out Slave In | J6 | 5 |
| Inj Encoder | GND | Ground with respect to +5 V | J6 | 6 |
| Inj Encoder | +5 V (VCC) | +5 V +/− 0.5 V, 10 mA | J6 | 7 |

2.1.2. Torque Measurement

This instrumentation can measure torque encountered by the rotor shaft. A temperature-compensated torque sensor is employed.

2.1.2.1. Torque Sensor

The temperature-compensated torque sensor employed in this instrumentation has a measurement range from 0 to 28 inch·ounces (28 in·oz, i.e., 0.2 Newton·meters, i.e., 0.2 Nm). For example, this torque sensor can be one such as a Honeywell 1701-0.2NM torque sensor or equivalent, which has an integrated sensor and signal conditioner that provides a signal proportional to the shaft torque. The output voltage from the torque sensor is +10V to −10V which correlates to +28 in oz to =28 in·oz (+0.2 Nm to −0.2 Nm).

The following table illustrates the wiring connections from the torque sensor:

| Area | Signal | Characteristic | Connector Pin |
|---|---|---|---|
| Torque | N/A | | A |
| Torque | N/A | | B |
| Torque | Torque | +/− 10 V (0.2 Mm to −0.1 Nm) | C |
| Torque | Torque GND | 0 V | D |
| Torque | Supply GND | TBD | E |
| Torque | Supply V | +12 V DC | F |
| Torque | N/A | | G |
| Torque | N/A | | H |
| Torque | N/A | | J |
| Torque | Calibration (Cal.) | 12 V input for cal., open for run | K |
| Torque | N/A | | L |
| Torque | N/A | | M |

2.1.2.2. Torque Sensor Calibration

This instrumentation employs a device to zero the torque reading when no torque is applied (offset adjustment). A gain adjustment may be provided in the torque signal path to calibrate slope. These may be hardware or software implemented. An example of a hardware implemented torque reading zeroing device with gain adjustment is using an opamp to subtract the offset and apply a gain so the output voltage from the opamp reads a voltage level in in·oz or Nm units. The offset is determined from a torque reading (voltage out when zero torque is applied). An example of a software implemented torque reading zeroing device with gain adjustment is reading the torque sensor output (with and without a torque load); then subtracting the "without torque voltage" from the "with torque voltage"; and then multiplying the resulting voltage by a gain to produce in·oz, Nm or any other torque measurement unit.

2.1.2.3. Torque Signal Measurement

The torque sensor provides a +/−10-V signal. Typical use measures a positive torque signal (0V to +10V) since typically the rotor is not turned in the opposite direction. This torque signal can be read by an analog to digital controller (ADC) chip on the RSTM board. Note, J7 in FIG. 55.

2.1.3. Elevator Control—Stepper Motor

This instrumentation can control rotor/stator height by use of a 200-step/revolution stepper motor with windings rated up to a 2-A current, holding torque>130 in·oz. The stepper motor can be controlled by the instrument or manually actuated for manual height settings. The stepper motor can have a hold current applied such that the current applied to the motor windings keeps the motor shaft from turning in order to maintain height position without the steppe motor skipping steps in this application, or drifting, i.e., moving away from the desired position. Maximum machine-controlled, i.e., instrument-controlled, motor speed is 1,500 half steps per second. Height adjustment sensitivity is less than or equal to 0.0025 millimeters (mm) per half step. An example of a suitable stepper motor for this function is the No. 17Y201D-LW4 model available from Anaheim Automation.

2.1.3.1. Stepper Motor

The instrumentation drives a stepper motor with a driver. This is the same stepper motor as in section 2.1.3. The elevator task unit circuitry on the corresponding board is designed with an integrated circuit that provides power to the stepper motor windings. Control of these windings enables the stepper motor to step or advance the motor shaft one step as well as change shaft direction. The integrated circuit enables full steps, half steps, quarter steps, and sixteenth steps although only half stepping is typically employed in the present application. This integrated circuit is referred to as a stepper motor driver. A stepper motor with an integrated driver, or a stepper motor with separate stepper motor driver drives the windings of the stepper motor with simple TTL step and direction input signals—for example, with step commands sent to the elevator board, say, "move up one hundred steps," and these commands can be given as part of a programmed movement or a manual movement such as from a Jog command input from a user—which in turn drive the stepper motor windings appropriately for the proper desired motion such that the motor raises or lowers a desired distance. The driver operates from a voltage of 24V or less, and provides an adjustable drive current up to 2 A. An example of an integrated stepper motor driver suitable for this function is a model No. A3984 driver commercially available from Allegro Micro Systems LLC, and a suitable example of a stepper motor with separate driver to be combined for this function embrace a SD7540A Driver from Advanced Micro Controls Inc. (AMCI). Both drivers can operate a model No. 17Y201D-LW4 stepper motor commercially available from Anaheim Automation. Note, the connector J5 and stepper driver U3 in FIG. 54.

The following table illustrates the stepper motor interface to the elevator board:

| Area | Signal | Characteristic | Connector | Pin |
|---|---|---|---|---|
| Step Motor | Phase 1A | Less than 24 V, <1.5 A | J5 Elevator | 2 |
| Step Motor | Phase 1B | Less than 24 V, <1.5 A | J5 Elevator | 1 |
| Step Motor | Phase 2A | Less than 24 V, <1.5 A | J5 Elevator | 4 |
| Step Motor | Phase 2B | Less than 24 V, <1.5 A | J5 Elevator | 3 |

2.1.3.2. Stepper Motor Absolute Encoder

This instrumentation has an absolute encoder to measure the rotation of the elevator lead screw in order to derive the elevator height. A 4096-position-per-rotation AMT203-V encoder such as commercially available from CUI, Inc. can be employed. This part has a SPI serial interface. Note, J6 in FIG. 54 that shows this termination.

The following table illustrates how the encoder interfaces with the elevator board:

| Area | Signal | Characteristic | Connector Pin |
|---|---|---|---|
| R/S Encoder | MISO | 0 to 5 V TTL Input - Master In Slave Out | J6 Elevator 1 |
| R/S Encoder | CLK | 0 to 5 V TTL Output Serial Clock | J6 Elevator 2 |
| R/S Encoder | ENC_Z | 0 to 5 V TTL Input Index pulse, 1 per rev | J6 Elevator 3 |
| R/S Encoder | ENC_CS | 0 to 5 V TTL Output - Chip Select – Active low | J6 Elevator 4 |
| R/S Encoder | MOSI | 0 to 5 V TTL Output - Master Out Slave In | J6 Elevator 5 |
| R/S Encoder | GND | Ground with respect to +5V | J6 Elevator 6 |
| R/S Encoder | +5 V (VCC) | +5 V +/− 0.5 V, 10 mA | J6 Elevator 7 |

2.1.3.3. Elevator Control Board

The stepper motor, stepper motor controller, and absolute encoder interface to the microcontroller based elevator control board, which in turn interfaces with the system controller board. This is done in a manner similar to that described for the RSTM board.

2.1.4. Temperature Control

In the instant instrumentation, temperature control is employed primarily to control the stator temperature. Two temperature loops are provided on the temperature control board. Each loop is controlled using proportional integral derivative (PID) control. Over-temperature warnings or errors, i.e., conditions in which excess heat is present from the stator being too hot and out of its control limits, and heating systems with controlled hot and cold elements may be incorporated by controlling a heater for heating and a fan for cooling. As an alternative, a Peltier chip system may be employed.

2.1.4.1. Stator Temperature Control Loop

Stator temperature can be controlled by using PID control. The temperature controlling function is used to control and monitor heating of the stator to a range of 180° C. to 40° C. with preferred operating settings of 150° C., 100° C. and 80° C. +/−0.1° C. A maximum temperature sampling rate is one hundred samples per second. The stator temperature is measured with a 100-ohm, 3-wire RTD at a 1-mA value. The stator temperature value can be entered into the program manually by the user or automatically by pre-programming from standard test setups.

The following tables illustrate two RTD interfaces for the two temperature control loops:

| First Temperature Control Loop Table ||||| 
|---|---|---|---|---|
| Area | Signal | Characteristic | Connector | Pin |
| Temp Ctrl | Current1in | Less than 1.5 mA | J5 Temp Sensor 1 | 1 |
| Temp Ctrl | Vsense1+ | Input Voltage >5 V | J5 Temp Sensor 1 | 2 |
| Temp Ctrl | Vsense1− | Input Voltage >5 V | J5 Temp Sensor 1 | 3 |
| Temp Ctrl | Current1out | Less than 1.5 mA | J5 Temp Sensor 1 | 4 |

| Second Temperature Control Loop Table ||||| 
|---|---|---|---|---|
| Area | Signal | Characteristic | Connector | Pin |
| Temp Ctrl | Current2in | Less than 1.5 mA | J8 Temp Sensor 2 | 1 |
| Temp Ctrl | Vsense2+ | Input Voltage >5 V | J8 Temp Sensor 2 | 2 |
| Temp Ctrl | Vsense2− | Input Voltage >5 V | J8 Temp Sensor 2 | 3 |
| Temp Ctrl | Current2out | Less than 1.5 mA | J8 Temp Sensor 2 | 4 |

2.1.4.1.1. Stator Heater

A heater can be employed to heat the stator. For instance, wrapped around the stator can be a polyimide heater, which can be a 24-V, 80-W, 7.2-ohm flexible electric heater with a 1-inch width, a 3.95-inch length, and a 0.015-inch thickness, and with two 24-inch leads coming off a centered tab along a 3.95-inch bottom edge.

2.1.4.2. Over Temperature Control

The temperature control board (TCB) provides an input for an external over-temperature device. An interface connector is provided if interfacing with an external over temperature device. This over-temperature input can be used to report errors, warnings, or control hardware by shutting instrument functions down if the over temperature event warrants these actions. Accordingly, over-temperature control is provided.

2.1.4.3. Temperature Control Board

A TCB reads the stator temperature via the RTD and adjusts power to the stator heater using PID control as determined by an on-board microcontroller. Note, U1 in FIG. 59 for the microcontroller. The TCB also interfaces with the system controller board over daisy-chained I2C serial ports. Two connectors are provided to allow one I2C buss in to the board while the second connector enables daisy-chaining out of the board. Note, J1 and J2 of FIG. 59.

2.1.4.3.1. Additional Temperature Control Loops

The TCB may be able to control two loops. Only one temperature control loop on this board for the instant instrumentation need be used. Nonetheless, since the temperature control board is designed with flexibility in mind, two loops are provided on this board. Refer to J5, J6, J7, J8, J9, and J10 in FIG. 59 for connectors for heaters, coolers and RTD sensors.

2.1.5. Sample Injector and Reference Fluid, For Example, Oil, Fill Control

The syringe injector as well as the reference fluid, for example, oil, selection system can be controlled. These tasks involve actuating the injector and the syringe ejector, controlling multiport valves for selecting reference oils, controlling the air pump, and reading limit switches and flow meter.

2.1.5.1. Reference Fluid, For Example, Oil, Samples

Dispensing reference fluid samples, for example, liquid oils, can be automated. For example, this system can dispense reference oils automatically to generate cross-over calibrations without user intervention, with air pressurizing a reference oil bottle and a valve opening a path to the stator for the reference oil to flow from that bottle.

2.1.5.2. Test Fluid, For Example, Oil, Samples

An injection of test samples such as fluids, to include liquids, for example, oils, can be carried out and be automated. Test fluid samples are handled using an auto-sampler, which can automatically dispense contents of sample syringes in and out of a "mechanical thumb."

The mechanical thumb, or injector, is a mechanism that compresses a syringe plunger to inject sample fluid, say, oil, in the instrumentation. The movement of an actuator is driven by a stepper motor driving a leadscrew. For the motor to move, the microprocessor sends pulses to the STEP input of the stepper motor controller. The controller converts the pulses to current input to the motors. The changes in current cause the motor to move. The processor also sends a directional signal to the stepper controller to move the motor in a clockwise or counter-clockwise direction. The stepper motor controller circuitry is designed to reduce the power to the drive motor. This can be accomplished by controlling the "chip enable" input line or by shorting out one of the reference voltage resistors. The stepper controller provides up to 1.5 A drive current.

2.1.5.3. Injector Over-Travel Limit

The injector board receives input signals from two external boards to indicate over-travel of the mechanical thumb system. The signals are connected to microcontroller interrupt input pins via a cable and board connector. The connector pin assignments to the external Over Travel boards are indicated as follows:

| Area | Signal | Characteristic | Connector | Pin |
|---|---|---|---|---|
| Step Motor | 5 V | 5 V | J8 Injector | 1 |
| Step Motor | Lo_O_Trav | 0 to 5 V | J8 Injector | 2 |
| Step Motor | Hi_O_Trav | 0 to 5 V | J8 Injector | 3 |
| Step Motor | GND | GND, 0 V | J8 Injector | 4 |

2.1.5.4. Syringe Ejector

Figure 8A:
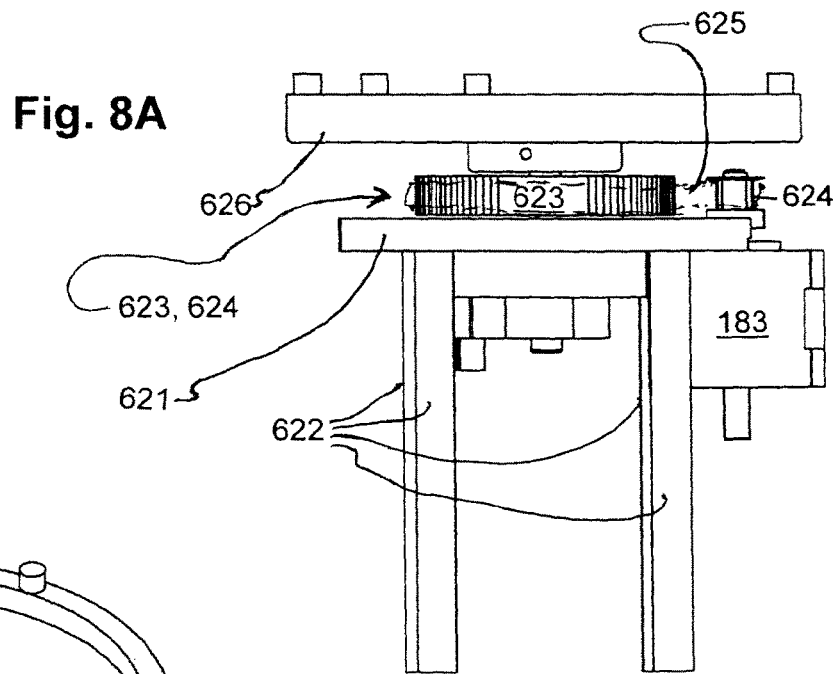
FIGS. 8A-8E are views of the carousel drive as in FIGS. 6C and 7A-7C, with FIGS. 8A, 8B and 8C, respectively, side elevational, top perspective, and bottom perspective views of the carousel drive.
Figure 8B:
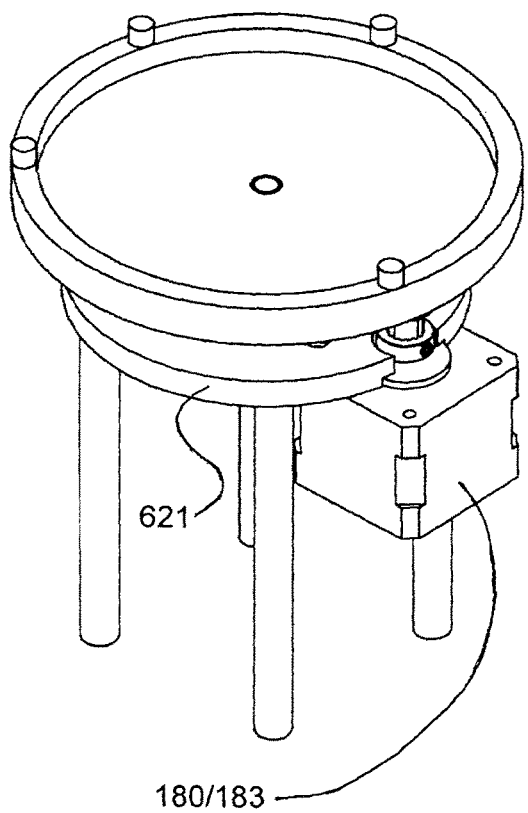
Figure 8C:
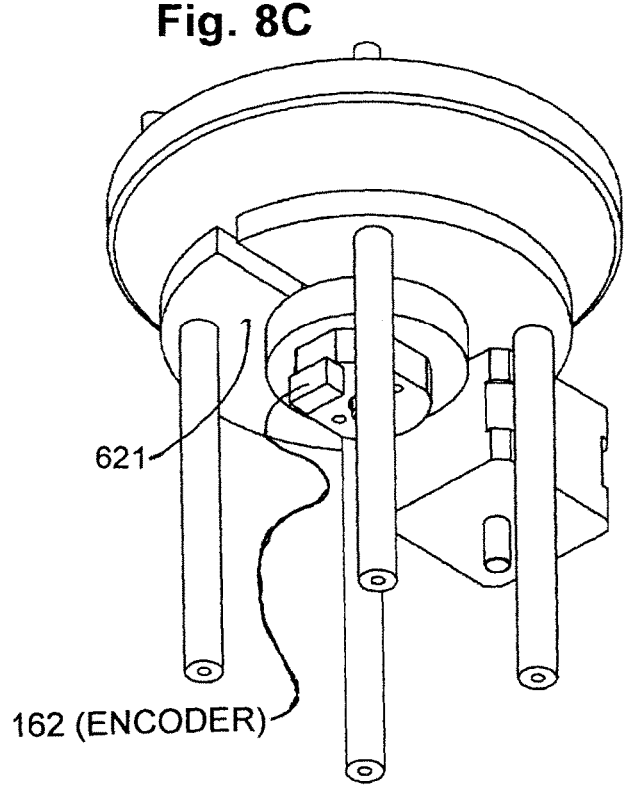
Figure 8D:
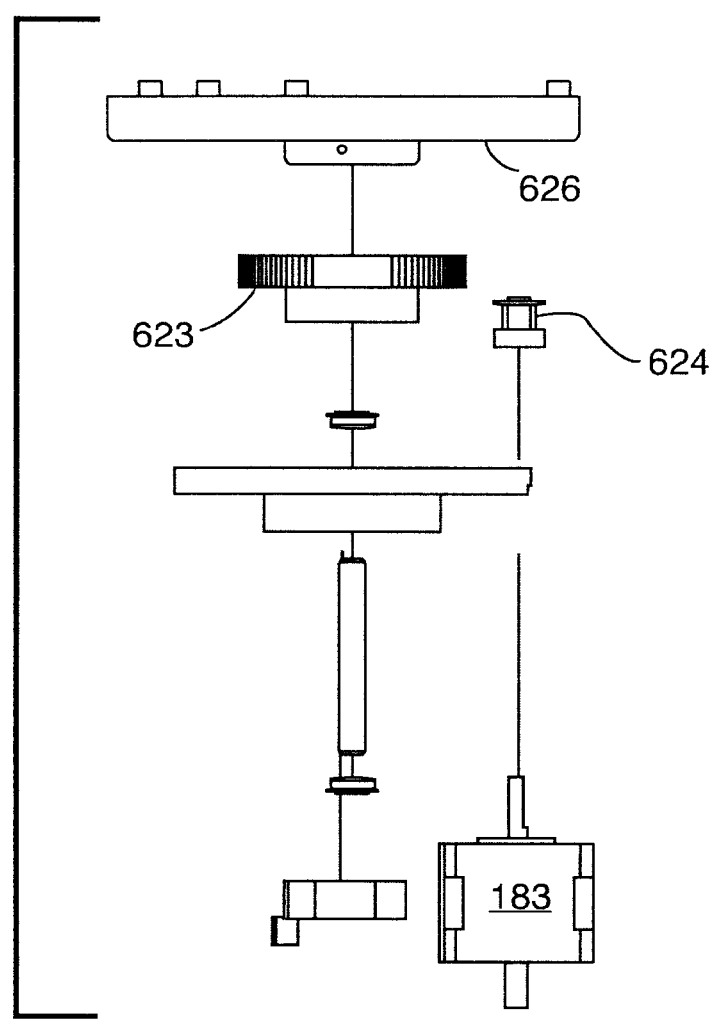
Figure 8E:
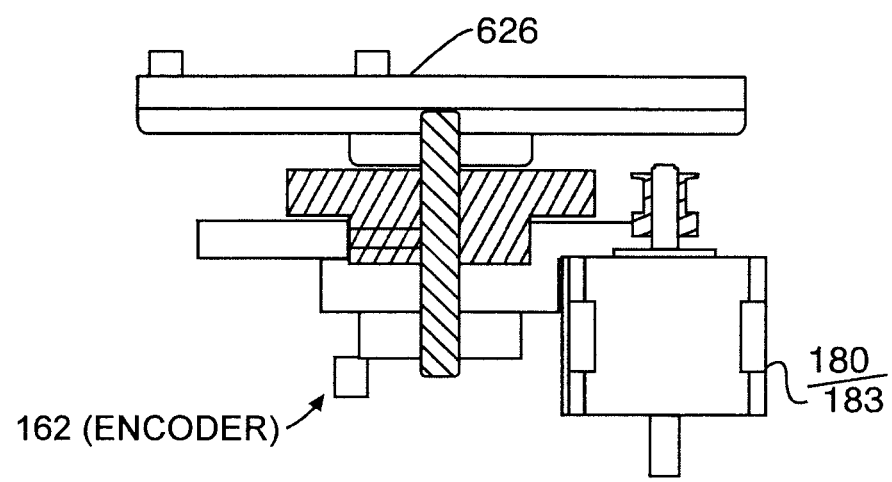

The syringe ejector releases a syringe after it is lifted into the docking port by the mechanical thumb. The ejector can be provided as pneumatic actuator controlled by a pressurized multiport valve line. Note, FIGS. 2B and 8B.

2.1.5.5. Reference Fluid, For Example, Oil, Select Multiport Valve

A sample injector and reference fluid, for example, oil, fill system can employ two or more multiport valves. For example, two multiport valves, each a model No. C45R-8140EUTF, ten-position, ¼-inch type valve, commercially available from Valco Instrument Co., Inc. (VICI), can be employed with oil as the reference fluid, with a first valve for selecting which reference oil will be passed to the stator and a second valve selecting which reference oil bottle will be pressurized. The multiport valves are ten-to-one position type valves that are controlled over an RS485 serial buss. Commands are sent from the injector board to the valves, which connect the common port to the addressed port per the command. Under normal operation, both valves point to the same port. For example, reference oil #1 is selected while reference oil bottle #1 is pressurized. The valve communicates with the injector board using an RS-485 interface controller. The valves can be daisy-chained together over the RS-485 buss

2.1.5.5.1. Pressure Measurement

A pressure sensor can monitor the pressure applied to reference fluid, for example, oil, containers. For example, with oil, the pressure sensor typically has an at least about 30-psi reading range, with a model No. ASDXAVX100PGAA5 pressure sensor commercially available from Honeywell.

2.1.5.5.2. Air Pump Control

The injector board can provide a connector that drives an air pump on and off, for example, a Viair 95C compressor, model No. 02495, or equivalent. The air pump runs off 24V at up to 5 A. The air pump can create pressure applied to reference fluid bottles for providing the predetermined reference fluid to the rotor-stator unit for calibration and testing. For example, the air pump pressure may be regulated to 30-psi maximum pressure at up to a 0.64-cubic foot per minute (CFM) delivery rate, which may be provided from the model No. 02495 from Viair.

2.1.5.6. Flow Meter

A flow meter to measure fluid flow may be provided. For example, flow of reference and/or test oil as it is being injected into the stator—which can be used to determine the amount of oil being injected—can be ascertained by employing a model No. SLI-2000 flow meter from Senserion may be employed for this measurement task. This flow meter can be communicated via the well RS485 serial communication standard. A Senserion No. LG16-2000A flow meter, which has a 0 to 5V analog output, may be employed.

2.1.6. Instrumentation x,y-Table Control

The instrumentation has a movable table to allow rotor-stator alignment. This table can be manually adjusted or motorized for automation.

2.1.6.1. Motorized x,y-Table Control

The instant instrumentation can drive x-axis and y-axis stepper motors with associated drivers, one stepper motor with one driver for the x-axis and the other stepper motor with another driver for the y-axis. For example, NEMA14 stepper motors with integrated drivers, each a No. 14Y101D-LW4 model commercially available from Anaheim Automation may be employed. A No. A3984 model commercially available from Allegro Micro Systems LLC may drive the windings of the stepper motor with simple TTL step and direction input signals. (These two input signals are digital inputs and provided from the x,y-board's microcontroller. The direction input signal commands the stepper motor to turn clockwise when high and counter clockwise when low. The step input advances the stepper motor one step on the rising edge of a pulse on the step input. It takes one hundred step pulses to move the motor one hundred steps. With a 200-step/revolution motor set for half stepping, one hundred steps turns the motor shaft ¼ of a revolution.) In turn, the stepper motor windings are driven for the desired motion. The driver typically operates from 24-V power or less, and provides an up to 2-A adjustable drive current.

The following tables illustrate interface of the x- and y-stepper motors with the x,y-board:

| X Step Motor Interface Table | | | | |
|---|---|---|---|---|
| Area | Signal | Characteristic | Connector | Pin |
| X Step Motor | Phase 1A | Less than 24 V, <0.5 A | J5 Stepper Motor | 2 |
| X Step Motor | Phase 1B | Less than 24 V, <0.5 A | J5 Stepper Motor | 1 |
| X Step Motor | Phase 2A | Less than 24 V, <0.5 A | J5 Stepper Motor | 4 |
| X Step Motor | Phase 2B | Less than 24 V, <0.5 A | J5 Stepper Motor | 3 |

Y Step Motor Interface Table

| Area | Signal | Characteristic | Connector | Pin |
|---|---|---|---|---|
| Y Step Motor | Phase 1A | Less than 24 V, <0.5 A | J9 Stepper Motor | 2 |
| Y Step Motor | Phase 1B | Less than 24 V, <0.5 A | J9 Stepper Motor | 1 |
| Y Step Motor | Phase 2A | Less than 24 V, <0.5 A | J9 Stepper Motor | 4 |
| Y Step Motor | Phase 2B | Less than 24 V, <0.5 A | J9 Stepper Motor | 3 |

The x,y-table controller board interfaces with the system controller over daisy-chained I2C serial ports. Two connectors are provided to allow one I2C bus in to the board while the second connector enables daisy-chaining out of the board. Note, connectors J1 and J2 of FIG. 58. These connections are defined as follows:

First Connection Definition Table

| Area | Signal | Characteristic | Connector | Pin |
|---|---|---|---|---|
| System Interface | I2C_SDA | I2C Serial Data | J1 System Comm | 1 |
| System Interface | I2C_SCL | I2C Serial Clock | J1 System Comm | 2 |
| System Interface | GND | Signal Return | J1 System Comm | 3 |

Second Connection Definition Table

| Area | Signal | Characteristic | Connector | Pin |
|---|---|---|---|---|
| System Interface | I2C_SDA | I2C Serial Data | J2 System Comm | 1 |
| System Interface | I2C_SCL | I2C Serial Clock | J2 System Comm | 2 |
| System Interface | GND | Signal Return | J2 System Comm | 3 |

2.1.7. System Controller Board

The instrumentation employs a system controller board that communicates with subsystem boards such as described above and does additional communication and control functions. For example, note the following:

A Raspberry Pi (RPI) SBC is used as the system controller. As such, an interface board is required to make connections between the PI board and subsystem boards such as the rotor speed-torque measure board, elevator board, temperature controller board, injector board, auto-sampler board, and x,y-control boards. Note, FIG. 2A to see how this adapter interface board connects to the RPI3 SBC and the sub-system boards.

The system controller adapter interface board interfaces with the sub-system boards such as the rotor speed-torque measure board, elevator Board, temperature controller board, injector board, auto-sampler board, and x,y-control boards, over daisy-chained I2C serial ports. Two connectors are provided to allow one I2C buss in to the board while the second connector enables daisy-chaining out of the board.

The system controller adapter interface board has six-ICP capability for its subsystem microcontrollers on the individual subsystem boards, rotor speed-torque measure board, elevator board, temperature controller board, injector board, auto-sampler board, and x,y-control boards. Note that ICP1, ICP2, ICP3, ICP4, ICP5, and ICP6 connections are dedicated IO lines for RESET, chip select (CS), and slave select (SS) signals, and operate on a common SPI bus (MOSI, MISO, and SCLK). The system controller adapter interface board has hardware that enables buffers/decoders for the six ICP channels (SPI signals).

The system control adapter interface has a female 40-pin header that mates to the GPIO male header on the RPI3 board. The following chart maps the Raspberry Pi board GPIO lines to interface and control functions.

| Hdr | Pin # | RPi3 GPIO | Signal | Description |
|---|---|---|---|---|
| PI2 | 15 | 22 | RESET5 | Reset 5 |
| PI2 | 13 | 27 | CS5 | Chip Select 5 |
| PI2 | 24 | 08 | SS5 | Slave Select 5 |
| PI2 | 26 | 07 | RESET4 | Reset 4 |
| PI2 | 32 | 12 | CS4 | Chip Select 4 |
| PI2 | 36 | 16 | SS4 | Slave Select 4 |
| PI2 | 38 | 20 | RESET3 | Reset 3 |
| PI2 | 40 | 21 | CS3 | Chip Select 3 |
| PI2 | 37 | 26 | SS3 | Slave Select 3 |
| PI2 | 35 | 19 | RESET2 | Reset 2 |
| PI2 | 33 | 13 | CS2 | Chip Select 2 |
| PI2 | 31 | 06 | SS2 | Slave Select 2 |
| PI2 | 29 | 05 | RESET1 | Reset 1 |
| PI2 | 07 | 04 | SS1 | Slave Select 1 |
| PI2 | 11 | 17 | CS1 | Chip Select 1 |
| PI2 | 27 | | ID_SD | |
| PI2 | 28 | | ID_SC | |
| PI2 | 05 | SCL (03) | SYS_SCL | I2C Clock |
| PI2 | 03 | SDA (02) | SYS_SDA | I2C Data |
| PI2 | 08 | TXD (14) | TXD | TTL/RS485 Transmit data |
| PI2 | 10 | RXD (15) | RXD | TTL/RS485 Receive data |
| PI2 | 12 | 18 | 485_SEL_DIR | RS485 Select Tx or Rx |
| PI2 | 21 | MISO (9) | MISO | SPI Master in |
| PI2 | 19 | MOSI (10) | MOSI | SPI Master out |
| PI2 | 23 | SCLK (11) | SCLK | SPI Clock |
| PI2 | 16 | 23 | CS6 | Chip Select 6 |
| PI2 | 18 | 24 | SS6 | Slave Select 6 |
| PI2 | 22 | 25 | RESET6 | Reset 6 |
| PI2 | 1 | | 3.3V_RPI | 3.3 V from RPI |
| PI2 | 17 | | 3.3V_RPI | 3.3 V from RPI |
| PI2 | 2 | | VCC | 5 V from R11 |
| PI2 | 4 | | VCC | 5 V from RPI |
| PI2 | 6 | | GND | 0 V |
| PI2 | 9 | | GND | 0 V |
| PI2 | 14 | | GND | 0 V |
| PI2 | 20 | | GND | 0 V |
| PI2 | 25 | | GND | 0 V |
| PI2 | 30 | | GND | 0 V |
| PI2 | 34 | | GND | 0 V |
| PI2 | 39 | | GND | 0 V |

This adapter board interfaces with the standard Raspberry Pi3 Single board computer by way of the P1 40-pin header.

2.1.7.1. Digital Communication

The instrumentation is capable of serial digital communication. For example, serial digital communication over an RS485 Buss may be conducted with the auto-samplers. In general, the instant instrumentation can support a RS485 serial communication buss that can communicate commands to a commercial auto-sampler unit such as a Cetac T42C using the auto-sampler's command set defined in its software.

2.1.7.2. Auto-Sampler Communication

Although communication with a commercial auto-sampler may engaged, an integrated auto-sampler can be provided. Thus, there can be more definition of necessary requirements.

The present auto-sampler is a custom design integrating into the advanced rotational tapered bearing simulator viscometer instrumentation for automatic running of multiple test samples. For example, it includes a carousel that can hold forty samples in 30-mL capacity syringes. The mechanical thumb injects samples in the syringes into the stator for testing.

The auto-sampler can control rotation of the sample carousel and stopping the rotation to within +1-1° of the specified target angle. This positioning enables all forty oil syringe sample locations on the carousel to efficiently align with the receiver arm of the mechanical thumb. Once a syringe with its sample is aligned with the receiver arm, the sample can be injected into the instrumentation. The rotation of the carousel is done via a stepper motor. The stepper motor control can drive the stepper motor with at least four hundred steps per revolution and deliver up to 2 A of motor current. The maximum machine controlled motor speed is 1,000 half steps per second. A stepper motor control circuit on the auto-sampler board controls stepper motor movement with simple TTL step and direction input signals.

As mentioned, the auto-sampler drives the carousel with a stepper motor. The driver operates from a voltage less than 24V. The motor has a resolution of two hundred full steps per revolution (four hundred half steps per revolution) and has a torque of greater than 25 in·oz. The stepper motor is connected to the auto-sampler board via a connector such as tabulated below:

| Area | Signal | Characteristic | Connector | Pin |
| --- | --- | --- | --- | --- |
| Step Motor | Phase 1A | Less than 24 V, <0.5 A | J5 Stepper Motor | 2 |
| Step Motor | Phase 1B | Less than 24 V, <0.5 A | J5 Stepper Motor | 1 |
| Step Motor | Phase 2A | Less than 24 V, <0.5 A | J5 Stepper Motor | 4 |
| Step Motor | Phase 2B | Less than 24 V, <0.5 A | J5 Stepper Motor | 3 |

The auto-sampler has an absolute encoder to measure the carousel angle. The auto-sampler communicates over a SPI serial connection to the absolute encoder. This encoder has a resolution greater than 4,000 divisions per rotation, and is connected to the auto-sampler control board by a board connector such as tabulated as follows:

| Area | Signal | Characteristic | Connector | Pin |
| --- | --- | --- | --- | --- |
| El Encoder | MISO | 0 to 5 V TTL Input - Master In Slave Out | J6 Encoder | 1 |
| El Encoder | CLK | 0 to 5 V TTL Output Serial Clock | J6 Encoder | 2 |
| El Encoder | ENC_Z | 0 to 5 V TTL Input Index pulse, 1 per rev | J6 Encoder | 3 |
| El Encoder | ENC_CS | 0 to 5 V TTL Output - Chip Select - Active low | J6 Encoder | 4 |
| El Encoder | MOSI | 0 to 5 V TTL Output - Master Out Slave In | J6 Encoder | 5 |
| El Encoder | GND | Ground with respect to +5 V | J6 Encoder | 6 |
| El Encoder | ENC_PWR | +5 V +/−0.5 V, 10 mA | J6 Encoder | 7 |

The auto-sampler can rotate the receiver arm, which is the part of the mechanical thumb mechanism where syringes are loaded. The auto-sampler allows syringes to be loaded from the outer carousel ring or the inner carousel ring, or to be moved out of the way for carousel removal. The receiver arm can position the arm to at least these three primary positions and stop the rotation to within +/−2° of the specified target angle. The rotational range is less than 120°. The auto-sampler control board interfaces with the servo via a connector such as follows:

| Area | Signal | Characteristic | Connector | Pin |
| --- | --- | --- | --- | --- |
| Servo | +5 V(VCC) | +5 V +/0.5 V, 100 mA | J7 | 1 |
| Servo | SERVO_FB | Servo Feedback, Analog 0 to 5 V | J7 | 2 |
| Servo | SERVO_DAT | Servo Serial Data 0 to 5 V Logic | J7 | 3 |
| Servo | GND | Ground | J7 | 4 |

The auto-sampler control board provides ICP capability for its microcontroller. The system controller board connects to the auto-sampler control board via the ICP connector such as tabulated as follows:

| Area | Signal | Characteristic | Connector | Pin |
| --- | --- | --- | --- | --- |
| In CKT Prog | MISO | Master In Slave Out, 0 to 5 V Logic | J4 ICP | 1 |
| In CKT Prog | +5 V(VCC) | +5 V | /0.5 V, 10 mA | J4 ICP | 2 |
| In CKT Prog | CLK | Serial Clock, 0 to 5 V Logic | J4 ICP | 3 |
| In CKT Prog | MOST | Master Out Slave In, 0 to 5 V Logic | J4 ICP | 4 |
| In CKT Prog | RESET | Active low, 0 to 5 V Logic | J4 ICP | 5 |
| In CKT Prog | GND | Ground with respect to +5 V | J4 ICP | 6 |
| In CKT Prog | CS | Chip Select 0 to 5 V Logic | J4 ICP | 7 |
| In CKT Prog | SS | Slave Select 0 to 5 V Logic | J4 ICP | 8 |

The auto-sampler controller board interfaces with the system controller over daisy-chained I2C serial ports. Two I2C connectors are on the auto-sampler control board. The first is for receiving in-coming communication traffic. The second is electrically connected to the first I2C connector and passes the communication traffic to the next downstream board. I2C_SCL and I2C SDA lines are terminated with a weak 47-KOhm pull-up. These connections are as follows:

| First I2C Connector | | | | |
| --- | --- | --- | --- | --- |
| Area | Signal | Characteristic | Connector | Pin |
| System Interface | I2C_SDA | I2C Serial Data | J1 System Comm | 1 |
| System Interface | I2C_SCL | I2C Serial Clock | J1 System Comm | 2 |
| System Interface | GND | Signal Return | J1 System Comm | 3 |

| Second I2C Connector | | | | |
| --- | --- | --- | --- | --- |
| Area | Signal | Characteristic | Connector | Pin |
| System Interface | I2C_SDA | I2C Serial Data | J2 System Comm | 1 |
| System Interface | I2C_SCL | I2C Serial Clock | J2 System Comm | 2 |
| System Interface | GND | Signal Return | J2 System Comm | 3 |

The auto-sampler controller can use an Atmel ATMEGA328P microcontroller with an Arduino boot loader preprogrammed.

2.1.7.3. Human-Machine Interface (HMI)

The instrumentation supports a touch screen display that can be used as the HMI. It can be used, for example, to display test settings, measurement, test results, error codes, prompts, images, or any other pertinent information. The touch screen also enables convenient data entry input from operators. Previous tapered bearing simulator versions required an external laptop type personal computer to provide these features.

2.1.8. Mechanical Hardware

Physical characteristics herefor are found in the drawings and elsewhere herein.

2.1.8.1. Physical Size

The exemplary instrumentation can be housed in one enclosure. Also, for example, various embodiments can have approximate sizes and weights as follows:

| | |
| --- | --- |
| Height of tower | 17.5 inches |
| Height with reference fluid bottles installed | 17.25 inches |
| Height of carousel unit | 9.5 inches |
| Width overall | 27.75 inches |
| Width of tower | 7.375 inches |
| Depth overall | 25 inches |
| Depth of tower | 6.125 inches |

| | |
|---|---|
| Weight, empty | 83 lbs. |
| Weight, fully charged with reference fluids and samples | 100 lbs. |

2.1.8.2. Cabinet Configuration

The instrumentation can be modular. Thus, there can be modules for major subsystems such as electrical controls, rotor/stator, reference samples, test samples, and so forth and the like.

2.1.8.3. Rotor-Stator Configuration

The instrument can have an enclosed rotor-stator and elevator subassembly. This has benefits of control of fluctuations in data caused by ambient temperature fluctuations, air movements, and so forth. In addition, the stator has a built-in drain trough and accommodation for heat-sink mounting.

2.1.8.3.1. Rotor-Stator Size

The exemplary instrumentation can have a rotor/stator that is the same as the current production tapered bearing simulator viscometer as from Tannas Company. This lends itself to efficient, reliable employment in accepted, standardized test methodologies.

2.1.8.3.2. Rotor-Stator Alignment

As noted, the instant instrumentation can efficiently obtain superb rotor-stator alignment.

2.1.8.3.3. Rotor-Stator Rubbing Contact

As noted, unlike prior instruments, the instant instrumentation can automatically calculate "rubbing contact" and related parameters without making physical contact between the rotor and stator. Manual determination is replaced hereby with highly efficient, automated determination. Thus, the instant instrumentation is easier to use and more reliable.

2.1.9. Power Requirements

The exemplary instrumentation can operate on direct current (DC) or alternating current (AC) supply. An AC supply is preferred. For instance, the AC can be about from a 90-V to a 265-V supply, say, a nominal 120-V or a 240-V, 50- or 60-cycles per second power supply.

2.1.9.1. DC Power Operation

The exemplary instrumentation, no matter the initial supply, may employ DC power for use in many of the unit's subsystems. For example, model Nos. CUS2000M-24 and EVS36-8R4 24V and 36V power supplies, respectively, which are commercially available from TDK Lambda may convert a 90-V to 265-V, 50- or 60-cycles per second AC power source into 24- and 36V internal operating power supplies required to operate all DC circuits within the instant instrumentation.

The following table illustrates DC power supplies needed herefor:

| Power | Current | Where Used |
|---|---|---|
| 24 V | 8 A | RSTM, Elevator, Temperature, x,y-control, Injector, Rotor Motor, Adapter, Auto-sampler |
| 36 V | 8 A | Rotor Motor |

Additional Illustrative Detail

Among other things, employment of one or more of the following may benefit the present instrumentation, including the tapered bearing simulator viscometer 1000:

Elevator axial positioning can be enhanced so that rotor depth is determined and taken advantage of with high efficiency by high precision ball screw 250, which is stepper motor driven, and coordinated with a 12-bit encoder for angular position of the ball screw shaft. See, FIG. 60. Each half step of this motor results in 0.0025 mm of vertical movement. In addition, backlash is automatically compensated in software programming. When moving in a direction opposite the previous movement, the motor moves two half-steps extra to account for backlash.

Compact dovetail linear stage 350 is an x,y-linear stage that bolts to the chassis base 422. Stator insulator 401' connects to the top of the linear stage 350, and the stator 202 mounts to the insulator 401'. The top of the linear stage 350 moves in relation to the bottom of the stage, allowing the x,y-position of the stator 202 to be manually adjusted using a hex driver. For example, the model of the x,y-linear stage 350 can be No. DS40 from Newport Corporation ("Photonics Solutions for Extending the Frontiers of Science"). The linear stage 350 is used for movement of the top relative to the bottom of up to 0.55 of an inch. An 80-thread per inch drive screw can drive its precision preloaded upper and lower dovetail slides. The unit measures 1.57×1.57×1.18 inches, and has a locking mechanism and holes in the top and bottom for mounting. Use of linear actuators to turn lead screws of the stage 350 can provide for automatic operation.

As mentioned previously, material selection is carried out to minimize if not practically eliminate loss of accuracy and/or precision from expansion and/or contraction of elevator and associated materials. Accordingly, these materials are selected and positioned for this purpose, as experimentation corroborates with temperature measurement of individual components. For example, grades of stainless steel and thermal insulator materials can be selected based on linear thermal expansion coefficients and configurations and sizes of pertinent components such that the rotor 201 rises at the same rate as the stator 202. Consequently, the rotor depth does not change appreciably, if at all. As can be appreciated by the foregoing disclosures, but with particular reference to FIG. 61, this is seen with selection of the following materials:

| | Location | Material |
|---|---|---|
| 1 | (stator 202) | #954 aluminum-bronze |
| 2 | (stator insulator 401) | G-7 silicone glass fiber composite, e.g., Garolite |
| 3 | (compact dovetail linear stage 350) | #6061 aluminum |
| 4 | (chassis base 422) | #416 stainless steel |
| 5 | (corner elevator supports 522, 523, 524; torque sensor platform 206) | #303 stainless steel. |

In lieu of pressurized bottles such as the bottles 681, a syringe pump can be employed for reference and sample fluid delivery. See, FIGS. 62 and 63. This operation can be automatic. Additionally, heating of reference oil bottles 681, plumbed lines, sample fluids to be tested, syringe pump, multiport valve, and any component that transfers fluid can be carried out to reduce the viscosity of fluid flowing through the fluid delivery system and thus reduce the risk of cross contaminating the targeted fluid measurement. Note that this will not affect the measured viscosity because the temperature of the fluid is controlled in the stator 202 before being measured.

As the fan 190, a variable speed fan can be employed to pull air either across just the upper half of the elevator chassis enclosure 410, for example, to include across the torque sensor 161 and rotor motor 181, or through the entire enclosure 410, for example, to include across the torque sensor 161, rotor motor 181, and stator 202. The variable speed fan, for example, may have a 170-cfm (cubic feet per minute) or greater maximum flow rate, a maximum pressure drop of 383.6 Pa or greater, be mounted at the top, back of the chassis (elevator) enclosure 412, and act as an exhaust fan. Fan speed can be automatically controlled with software and mapped to different speeds depending on power transmitted to the rotor and on operating temperature. This passive integrated cooling enables measurement over a range about from 80° C. to 150° C. or higher, for example, to about 200° C., through provision of cooling needed for components such as the torque sensor 161, and so forth, at higher temperatures and extra cooling capacity available for lower temperature operation, for example, about 80° C., with one-unit operation. Further controlled cooling by blocking either the chassis elevator enclosure side air inlet hole 417 or the chassis base air inlet holes 427 with a small plate, for example, a thin, flat, 4-inch by 4-inch square plate 428 with rounded corners and handle 428H, can be employed by manually sliding in and out of rails 429 mounted inside the cabinet elevator enclosure 412 and accessible through opening the elevator enclosure door 413 or under the chassis base 422 mounted to stand off from the upper surface of the cabinet base 722 by a suitable distance, for example, about a half of an inch, with the lower surface of the cabinet base 722 set off from the laboratory counter or table top a suitable distance, for example, about from half of an inch to an inch, say, with mounting feet 730. See, e.g., FIGS. 1C and 64A-64D. This allows for greater operating range in temperature over prior art tapered bearing simulator devices. The plate 428 may be automated or replaced with automated louver(s) and/or rotary cover(s), which can be accomplished by linear actuator(s), solenoid(s) and/or stepper motor(s).

If an operating temperature below 80° C. is desired, a liquid chiller may be employed. The chiller uses refrigerated water or coolant or cold tap water flowing around or through the stator 202. Examples of refrigeration units that can be employed to provide refrigerated water or other liquid coolant include well known commercially available models CD-200F from Julabo or TLC 10-3 from Tamson. The cool liquid flowing through or around the stator may flow through copper or other tubes that are wrapped around the stator 202, through channels in a material wrapped around the stator 202, or through channels bored into the stator 202. Water flow rate can be held constant and bring the temperature of the stator 202 below the desired operating temperature. A heater band around the stator 202 can then provide fine control over the temperature and hold the stator temperature at the desired operating temperature.

Also, especially for certain fluids, for example, used and/or high viscosity oils, it is sometimes difficult to completely flush out samples, which can make cross contamination a problem. The reference oil setup can be employed to inject a "flush" of a clean oil of moderate viscosity following the testing of specific samples so as to ameliorate if not avoid such contamination.

Card nest cabling is seen in FIG. 65.

Rubbing Contact Determination

A method to automatically determine rubbing contact can be carried out such as follows:

Rubbing contact is the point at which the rotor and stator will touch. In past versions of the tapered bearing simulator instrument, this was determined by slowly lowering the rotor into the stator while turning the rotor by hand. Rubbing contact was defined to be the point at which the rotor would no longer turn easily by hand as it began to touch the stator. This rubbing contact provided a lower-most position beyond which the rotor cannot be lowered without damaging the rotor and stator. It also provided a means of determining the position at which to perform the crossover calibration. The rubbing contact is historically slightly higher than would be expected by finding the "theoretical contact position", which is the y-intercept of a straight line regression of position vs inverse torque data points collected with a Newtonian oil.

This method improves over the manual finding of rubbing contact by first, eliminating the possibility of operator error in which a rotor becomes locked into a stator and permanently damaged when the rotor is lowered from rubbing contact instead of raised after the operation; second, reducing the time it takes to find rubbing contact; and third, by having no contact made during the finding of rubbing contact so that any potential for minor damage that could be caused by contact between the rotor and stator is eliminated. The method follows:

1) Inject into the stator a Newtonian reference oil, such as is typically used for crossover calibration. Slowly lower the elevator with rotor spinning at operating speed until the torque reaches a pre-determined value.
   a. The torque value can be hard coded for all instances or can be entered on a case-by-case basis.
   b. The proper torque value will impact the effectiveness of the method.
   c. The particular value torque value can be determined empirically from historical data.
2) Once the desired torque is reached, collect torque data for four points at even position increments with the stator moving upwards.
3) Calculate the regression for the points plotted as position vs. inverse torque to a straight line fit. Determine the slope and intercept, i.e., the first, and correlation coefficient.
   a. The intercept value from this regression is the "theoretical contact position."
   b. The correlation coefficient must be at least 0.995 to use the "theoretical contact position."
   c. Use the intercept value to calculate rubbing contact using the equation from historical data: rubbing contact=theoretical contact position×(second slope+ second intercept), with these second values empirically determined (historical).
   d. The slope and intercept in the rubbing contact equation will vary for other temperatures, for example, as determined by historical data.

Broadly considered, such a method may be considered to be algorithmic.

Finding Center

Exemplary algorithms/processes for automatically finding center, using oil as examples of the fluid employed, are set forth as follows:

A. Using Torque or Standard Deviation of Torque, First Variation

1) Begin with the rotor 201 already lowered into the stator 202 with an approximate alignment. Approximate alignment can be by eye or from the use of a tool that shows the position of the rotor relative to the stator prior to lowering.

2) Measure torque at a given rotor speed with a Newtonian reference oil in the stator 202. Note that the value to minimize can be torque, standard deviation of torque, or a combination of the two values, such as A×torque+B×standard deviation of torque, where A and B are empirically or theoretically determined coefficients. All of these values can be calculated from the torque measurement. The value to be minimized can be referred to as the "monitored value."
3) Increment the x-position of the stator 202 and measure torque:
   a) If the monitored value has decreased, the next increment in x-position shall be in this same direction. If it has increased, the increment in the x-position shall be in the opposition direction.
   b) Repeat step 3 until the monitored value is increased or stays the same for increments in either direction.
4) Increment the y-position of the stator 202 and measure torque:
   a) If the monitored value has decreased, the next increment in y-position shall be in this same direction. If it has increased, the increment in the y-position shall be in the opposition direction.
   b) Repeat step 4 until the monitored value is increased or stays the same for increments in either direction.
5) Repeat steps 3 and 4 sequentially until the monitored value is increased or stays the same after each iteration of steps 3 and 4.

B. Using Torque or Standard Deviation of Torque, Second Variation
1) Begin with the rotor 201 already lowered into the stator 202 with an approximate alignment. Approximate alignment can be by eye or from the use of a tool that shows the position of the rotor 201 relative to the stator 202 prior to lowering.
2) Measure torque at a given rotor speed with a Newtonian reference oil in the stator 202. Note that the value to minimize can be torque, standard deviation of torque, or a combination of the two values, such as A×torque+B×standard deviation of torque, where A and B are empirically or theoretically determined coefficients. All of these values can be calculated from the torque measurement. The value to be minimized can be referred to as "monitored value."
3) Increment x-position value across the available width of the stator 202:
   a) Find the center x-position by taking the position halfway between where the monitored value begins to increase at the edges of the stator 202. Note that the available width of the stator 202 can be determined by a maximum limit in the monitored value to avoid possible damage to the rotor/stator 201/202 set.
   b) Set the x-position value to the center x-position.
4) Increment y-position value across the available width of the stator 202:
   a) Find the center y-position by taking the position halfway between where the monitored value begins to increase at the edges of the stator 202. Note that the available width of the stator 202 can be determined by a maximum limit in the monitored value to avoid possible damage to the rotor/stator 201/202 set.
   b) Set the y-position value to the center x-position.
5) Repeat steps 3-4 sequentially until the monitored value is increased or stays the same with each iteration of steps 3 and 4.

C. By Mapping Torque Vs. Absolute Rotor Position
1) Begin with the rotor 201 already lowered into the stator 202 with an approximate Alignment. Approximate alignment can be by eye or from the use of a tool that shows the position of the rotor relative to the stator prior to lowering.
2) Measure torque at a given rotor speed with a Newtonian reference oil in the stator 202 over a full cycle of rotor motion or several cycles of rotor motion.
3) Note the angular position with maximum torque value and incrementally change position of x and y to increase the gap between rotor 201 and stator 202 at the angle with maximum monitored value.
4) Repeat steps 2 and 3 until the torque value is nearly constant at all angular positions. The condition that is considered nearly constant may be empirically determined and could be different for different instances of the invention, including different instances of rotor/stator 201/202 sets.

Further Information

The viscometer 1000 excels in efficiency over good prior art devices, to include the tapered bearing simulator viscometers disclosed by U.S. Pat. Nos. 4,445,365 and 5,565,621 and the TBS™ 2100E-F HTHS Tapered Bearing Simulator, and so forth. See, FIG. 66.

Dimensions and other numerical values mentioned in the specification, to include the drawings, may be considered to be approximate or exact. This also applies with respect to any tolerances mentioned in the specification.

Epilogue

As persons skilled in the art recognize from the foregoing, among other things, the present invention may be embodied such as follows:

1. Instrumentation, which comprises an at least partially automated rotational tapered bearing simulator viscometer having electronic control and/or monitoring that includes at least one of the following:
   A) task unit electronics, to include a task unit electronics interface, for controlling and/or monitoring a plurality of separate unit tasks;
   B) a particular component configuration, wherein the instrumentation has an elevator member in a form of a cantilevered platform that can be moved up and down between spaced apart first and second heights, and a compact, vertically oriented elevator member support having at least one buttress attached to a chassis base to provide vertical and lateral support for the elevator member so as to minimize positional variance from instrument configuration;
   C) employment of at least one particular material, wherein the instrumentation has heat in a first part thereof with a second part thereof not subject to that heat, and has a first material having a first coefficient of thermal expansion employed in the first part, and a second material having a second coefficient of thermal expansion different from the first coefficient of thermal expansion employed in the second part such that, in the particular configuration at hand, thermal expansion of aggregated or assembled first and second parts is minimized if not avoided, thus minimizing or avoiding positional variance from instrument materials; and D) at least one of the following:
- A') automatic x,y-control of rotor-stator centering;
- B') passive integral cooling, which includes an electronically controllable, variable speed fan to cool components of the instrumentation;
- C') an automated sample delivery system: and
- D') an active cooling device.

2. Instrumentation of embodiment1, which includes two of items A, B, C and D or more.
3. Instrumentation of embodiment 1, which includes three of items A, B, C and D or more.
4. Instrumentation of embodiment 1, which includes the items A, B, C and D.
5. Instrumentation of embodiment 1, wherein one or more of the following (A', B', C', D') applies:

A') the automatic x,y-control of rotor-stator centering can employ one or more of the following (i, ii):
- i) incremental, repeated changes in x and y position toward a minimum value of one or more of the following (a, b, c):
  - a) of the measured torque value;
  - b) of a standard deviation of torque value over an extended number of cycles of rotor motion, determined over a few seconds, say, about one, two, three, five or ten, up to a minute or two; and
  - c) of a combination of measured torque and standard deviation of torque values, such as a linear combination of A×torque value+B×standard deviation of torque value where A and B are empirically determined coefficients; and
- ii) by comparing the position of absolute encoder vs. torque over one full cycle or more cycles of rotor motion, which may also include incremental motion of x-position and y-position but with direction of motion determined from encoder position rather than attempted randomly;

B') the passive integral cooling, which includes an electronically controllable, variable speed fan to cool components of the instrumentation, includes one or more of the following (i, ii) for control of fan speed:
- i) by closed-loop temperature control, such as on/off, PI, and/or PID using stator temperature as feedback; and
- ii) by open-loop control based on theoretical or empirically determined mapping based on temperature of operation and power delivered to the stator determined through the measured torque and speed; and C') the automated sample delivery system employs at least one of the following (i, ii, iii):
- i) external bottle(s) and/or separation of reference fluid(s) employing different plumbing such that the reference fluid(s) do not require space in any sample rack present with the instrumentation, and to minimize if not avoid cross-contamination between the reference fluid(s);
- ii) fluid delivery by one or more of the following (a, b, c):
  - a) air pressure
  - b) a syringe pump; and
  - c) a pump other than the syringe pump; and
- iii) heating to reduce potential cross contamination of fluid(s), which may include incorporation of one or more of the following (a, b, c, d):
  - a) heated reference fluid tubing line(s), sample oil tubing line(s), multiport valve(s), and/or stator tubing line(s);
  - b) a heated dip tube(s), syringe(s) and/or syringe pump(s);
  - c) sample heating inside the auto-sampler (carousel); and
  - d) reference fluid heating by heating reference fluid bottle(s); and D') the active cooling device can be employed for temperatures at about 80° C. or below and/or is selected from one or more of the group consisting of
- i) a liquid chiller;
- ii) a refrigerant gas that can directly cool by direct contact of the gas flowing through a refrigerant containing conduit with the object to be cooled, without employment of an intermediary liquid; and
- iii) a Peltier chip.

6. Instrumentation of embodiments 1-5, each of which includes the item D.
7. In a precision instrument that includes at least one of A) having an elevator member in a form of a cantilevered platform that can be moved up and down between spaced apart first and second heights, and B) employment of heat in a first part thereof with a second part thereof not subject to that heat—the improvement to which comprises at least one of the following:
A') for the elevator member in a form of a cantilevered platform that can be moved up and down between spaced apart first and second heights, a compact, vertically oriented elevator member support having at least one buttress attached to a chassis base to provide vertical and lateral support for the elevator member so as to minimize positional variance from instrument configuration; and
B') for the employment of heat in a first part thereof with a second part thereof not subject to that heat, a first material having a first coefficient of thermal expansion employed in the first part, and a second material having a second coefficient of thermal expansion different from the first coefficient of thermal expansion employed in the second part, such that, in the particular configuration at hand, thermal expansion of aggregated or assembled first and second parts is minimized if not avoided, thus minimizing or avoiding positional variance from instrument materials.
8. The instrument of embodiment 7, wherein both A' and B' features are provided.
9. The instrument of embodiment 7, which further includes passive integral cooling, which includes an electronically controllable, variable speed fan to cool components of the instrument.
10. Instrumentation of embodiments 1-5 and embodiment 6 and the instrument of embodiments 7-9, each of which can test oil viscosity.

INCORPORATIONS BY REFERENCE

U.S. Pat. Nos. 4,445,365, 5,369,988 and 5,565,621 mentioned above are incorporated herein by reference in their entireties, to include, of course, their drawings.

CONCLUSION TO THE INVENTION

The present invention is thus provided. Various feature(s), part(s), step(s), subcombination(s) and/or combination(s) can be employed with or without reference to other feature(s), part(s), step(s), subcombination(s) and/or combination(s) in the practice of the invention, and numerous and sundry adaptations can be effected within its spirit, the literal claim scope of which is particularly pointed out in the following claim(s):

What is claimed is:

1. Instrumentation, which comprises an at least partially automated rotational tapered bearing simulator viscometer having electronic control and/or monitoring that includes a rotor-stator ensemble ire which a rotor rotates in a stator when a test fluid resides during operation: of the instrumentation; a plurality of electronic sensors to assist in said control and/or monitoring, at least one of which is a temperature-compensated torque sensor that senses torque from the rotor rotating in the stator and in contact with the test fluid; and the following (A-D):
  A) task unit electronics, to include a task unit electronics interface, for controlling and/or monitoring a plurality of separate unit tasks;
  B) a particular component configuration, wherein the instrumentation has an elevator member in a form of a cantilevered platform that can be moved up and down between spaced apart first and second heights, and a vertically oriented elevator member support having at least one buttress attached to a chassis base to provide vertical and lateral support for the elevator member so as to minimize positional variance from instrument configuration, wherein:
    the rotor-stator ensemble, the elevator member, and the vertically oriented elevator member support are positioned in a hollow elevator enclosure unit supported on the chassis base; and
    with operation of the instrumentation, the elevator member raises the rotor from and lowers the rotor to a predetermined position in proximity to the stator for testing of the test fluid;
  C) employment of a particular material combination, wherein the instrumentation has heat in a first part thereof with a second part thereof not subject to the same amount of heat, and has a first material having a first coefficient of thermal expansion employed in the first part, and a second material having a second coefficient of thermal expansion different from the first coefficient of thermal expansion employed in the second part such that, in the particular configuration of the instrumentation, thermal expansion of aggregated or assembled first and second parts is minimized if not avoided, thus minimizing or avoiding positional variance from instrument materials, wherein said first part includes the rotor-stator ensemble, and said second part includes the vertically oriented elevator support; and
  D) integral cooling including cooling with air, which includes an electronically controllable, variable speed fan to cool components of the instrumentation, wherein, during operation of the instrumentation, said fan causes air to pass:
    over the vertically oriented elevator member support and the rotor-stator ensemble such that expansion due to heat change of said support and said ensemble substantially match; and
    over the temperature-compensated torque sensor such that said temperature-compensated torque sensor remains within effective operating temperature.

2. The instrumentation of claim 1, which is integrated to reside on a single cabinet base upon which resides items A, B, C and D, wherein: a hollow cabinet resides on the cabinet base, within which resides item A provided as an integrated circuit board module; and items B, C and D reside in or on the hollow elevator enclosure unit, which also resides on the cabinet base.

3. The instrumentation of claim 2, which includes an automated sample delivery system in a form of a carousel that resides in the hollow cabinet and on the single cabinet base.

4. The instrumentation of claim 2, which includes a test fluid cooling device that includes at least one of the following:
  a liquid chiller;
  a chiller that cools by direct contact of the object to be cooled with a conduit through which refrigerant gas flows without employment of an intermediary liquid; and
  a Peltier chip.

5. The instrumentation of claim 2, which includes at least one of the following (E, F):
  E) automatic x,y-control of rotor-stator centering, which employs at least one of the following (i, ii):
    i) incremental, repeated changes in x and y position toward a minimum value of at least one of the following (a, b, c):
      a) the measured torque value;
      b) a standard deviation of torque value over an extended number of cycles of rotor motion, determined over about from one second to two minutes; and
      c) a combination of measured torque and standard deviation of torque values as a linear combination of Y×torque value+Z×standard deviation of torque value; wherein Y and L are empirically determined coefficients; and ii) by comparing the position of an absolute encoder vs. measured torque over one full cycle or more cycles of rotor motion, which also includes incremental motion of x-position and y-position put with direction motion determined from encoder position; and
  F) an automated sample delivery system, which employs at least one of the following (i,
    i) external bottle(s) and/or separation of reference fluid(s) employing different plumbing such that the reference fluid(s) do not require space in any sample rack present with the instrumentation, and minimizing if not avoiding cross-contamination between the reference fluid(s);
    ii) fluid delivery by at least one of the following (a, b, C):
      a) air pressure;
      b) a syringe pump; and
      c) a pump other than the syringe pump; and
    iii) heating to reduce potential cross contamination of fluid(s), which includes incorporation of at least one of the following (a, b, c, d):
      a) heated reference fluid tubing line(s), sample oil tubing line(s), multiport valve(s), and/or stator tubing line(s);
      b) heated dip tube(s), syringe(s) and/or syringe pump(s);
      c) sample heating inside the auto-sampler; and
      d) reference fluid heating by heating reference fluid bottle(s).

6. The instrumentation of claim 2, which is configured to be capable of testing oil viscosity.

7. The instrumentation of claim 1, which includes an automated sample delivery system including a carousel that resides in the hollow cabinet and on the single cabinet base.

8. The instrumentation of claim 7, which is configured to be capable of testing oil viscosity.

9. The instrumentation of claim 1, which includes a test fluid cooling device that includes at least one of the following:
- a liquid chiller;
- a chiller that cools by direct contact of the object to be cooled with a conduit through which refrigerant gas flows without employment of an intermediary liquid; and
- a Peltier chip.

10. The instrumentation of claim 9, which is configured to be capable of testing oil viscosity.

11. The instrumentation of claim 1, which includes at least one of the following (E, F):
- E) automatic x,y-control of rotor-stator centering, which employs at least one of the following (i, ii):
  - i) incremental, repeated changes in x and y position toward a minimum value of at least one of the following (a, b, c):
    - a) the measured torque value;
    - b) a standard deviation of torque value over an extended number of cycles of rotor motion, determined over a time duration ranging from about one second long up to about two minutes long; and
    - c) a combination of measured torque and standard deviation of torque values as a linear combination of Y×torque value Z×standard deviation of torque value, wherein Y and Z are empirically determined coefficients; and
  - ii) by comparing the position of an absolute encoder vs. measured torque over one full cycle or more cycles of rotor motion, which also includes incremental motion of x-position and y-position with direction of motion determined from encoder position; and
- F) an automated sample delivery system, which employs at least one of the following (i, ii, iii):
  - i) external bottle(s) and/or separation of reference fluid(s) employing different plumbing such that the reference fluid(s) do not require space in any sample rack present with the instrumentation, and minimizing if not avoiding cross-contamination between the reference fluid(s);
  - ii) fluid delivery by at least one of the following (a, b, c):
    - a) air pressure;
    - b) a syringe pump; and
    - c) a pump other than the syringe pump; and
  - iii) heating to reduce potential cross contamination of fluid(s), which includes incorporation of at least one of the following (a, b, c, d):
    - a) heated reference fluid tubing line(s), sample oil tubing line(s), multiport valve(s), and/or stator tubing line(s);
    - b) heated dip tube(s), syringe(s) and/or syringe, pump(s);
    - c) sample heating inside the auto-sampler; and
    - d) reference fluid heating by heating reference fluid bottle(s).

12. The instrumentation of claim 11, which includes item E.

13. The instrumentation of claim 11, which includes item F.

14. The instrumentation of claim 1, wherein the electronically controllable, variable speed fan includes at least one of the following for control of fan speed:
closed loop temperature control using stator temperature as feedback; and
open loop temperature control using mapping based on temperature of operation and power delivered to the stator determined through measured torque and speed of the rotor.

15. The instrumentation of claim 1, wherein the hollow elevator member enclosure unit has an adjustably closable side air inlet opening, and the chassis base has an adjustably closable bottom air inlet opening.

16. The instrumentation of claim 1, which is configured to be capable of testing oil viscosity.

17. In a precision instrument that includes a first member mounted on a base of the instrument, which is movable and in a form of a cantilevered platform that can be moved to and from spaced apart first and second positions; a second member spaced apart from said first member and having a spaced apart relationship to a third member; and employment of heat in a first part of the instrument with a second part thereof not subject to the same amount of heat—the improvement comprising the following:
- A) for said first member, a first member support having at least one buttress attached to a chassis base to provide support for said first member perpendicularly and laterally with respect to the chassis base so as to minimize positional variance of said second member with respect to said third member, wherein:
  - said second member includes a rotor, said third member includes a stator, and said rotor and said stator are part of a rotor-stator ensemble;
  - said first member, said first member support, said second member, and said third member are positioned in a hollow enclosure unit supported on the chassis base; and
  - with operation of the instrument, said first member moves said second member from and moves said second member to a predetermined position in relation to said third member
- B) for the employment of heat in a first part thereof with a second part thereof not subject to the same amount of heat, a first material having a first coefficient of thermal expansion employed in the first part, and a second material having a second coefficient of thermal expansion different from the first coefficient of thermal expansion employed in the second part, such that, in the particular configuration of the instrumentation, thermal expansion of aggregated or assembled first and second parts is minimized if not avoided, thus minimizing or avoiding positional variance caused from said employment of heat on instrument materials, wherein said first part includes the rotor and the stator, and said second part includes the first member support; and
- C) a temperature control system configured to be capable of adjusting the temperature of the first member, the second member, and/or the third member such that expansion and/or contraction due to heat change of said first member support and said rotor-stator ensemble substantially match.

18. The instrument of claim 17, which is configured as a rotational tapered bearing simulator viscometer capable of testing oil viscosity.

19. The instrument of claim 17, wherein said temperature control system includes integral air cooling, which includes an electronically controllable, variable speed fan to cool components of the instrument.

20. The instrument of claim 19, which is configured as a rotational tapered bearing simulator viscometer capable of testing oil viscosity.

\* \* \* \* \*

UNITED STATES PATENT AND TRADEMARK OFFICE
CERTIFICATE OF CORRECTION

PATENT NO. : 10,823,656 B1
APPLICATION NO. : 16/350085
DATED : November 3, 2020
INVENTOR(S) : Sarah R. Nuss-Warren et al.

It is certified that error appears in the above-identified patent and that said Letters Patent is hereby corrected as shown below:

In the Claims

Claim 1, Line 4 (Column 41, Line 9): Delete "ire" and insert therefor -- in --.

Claim 1, Line 5 (Column 41, Line 10): Delete the ":" after the word, "operation.".

Claim 5, Line 11 (Column 42, Line 27): Delete "about from one second to two minutes;" and insert therefor -- a time duration from about one second long up to about two minutes long; --.

Claim 5, Line 15 (Column 42, Line 31): Delete "Y×torque value+Z×standard" and insert therefor -- Y × torque value + Z × standard --.

Claim 5, Line 16 (Column 42, Line 32): Delete "value;" and insert therefor -- value, -- and delete "L" and insert therefor -- Z --.

Claim 5, Line 17 (Column 42, Line 33): Insure that the limitation beginning with "ii)" begins a separate subparagraph.

Claim 5, Line 21 (Column 42, Line 37): Delete "put" and between "direction" and "motion" insert -- of --.

Claim 5, Line 24 (Column 42, Line 40): Delete "(i" and insert therefor -- (i, ii, iii): --.

Claim 5, Line 32 (Column 42, Line 48): Delete "b, C):" and insert therefor -- b, c): --.

Claim 5, Line 36 (Column 42, Line 52): Delete "cross contamina-" and insert therefor -- cross-contamina- --.

Claim 7, Line 1 (Column 42, Line 65): Delete "claim 1," and insert therefor -- claim 2, --.

Signed and Sealed this
Second Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,823,656 B1

Claim 8, Line 1 (Column 43, Line 1): Delete "claim 7," and insert therefor -- claim 3, --.

Claim 9, Line 1 (Column 43, Line 3): Delete "claim 1," and insert therefor -- claim 2, --.

Claim 10, Line 1 (Column 43, Line 12): Delete "claim 9," and insert therefor -- claim 4, --.

Claim 11, Line 1 (Column 43, Line 14): Delete "claim 1" and insert therefor -- claim 2 --.

Claim 11, Lines 11-12 (Column 43, Lines 25-26): Delete "a time duration ranging from about one second long up to about two minutes long;" and insert therefor -- about from one second to two minutes; --.

Claim 11, Line 15 (Column 43, Line 29): Delete "Y×torque value Z×standard" and insert therefor -- $Y \times$ torque value $+ Z \times$ standard --.

Claim 12, Line 1 (Column 43, Line 61): Delete "claim 11," and insert therefor -- claim 5, --.

Claim 13, Line 1 (Column 43, Line 63): Delete "claim 11," and insert therefor -- claim 5, --.

Claim 17, Line 26 (Column 44, Line 40): After "member" insert a -- ; --.